United States Patent [19]

Morley et al.

[11] 4,213,174

[45] Jul. 15, 1980

[54] PROGRAMMABLE SEQUENCE CONTROLLER WITH DRUM EMULATION AND IMPROVED POWER-DOWN POWER-UP CIRCUITRY

[75] Inventors: Richard E. Morley, Mason; Michael A. Bromberg, Nashua; William A. Taylor, Campton, all of N.H.

[73] Assignee: Andover Controls Corporation, Andover, Mass.

[21] Appl. No.: 802,261

[22] Filed: May 31, 1977

[51] Int. Cl.$^{2}$ .......................... G06F 15/46; G06F 9/00; G05B 11/32

[52] U.S. Cl. ...................................... 364/104; 364/900

[58] Field of Search ............... 364/104, 107, 200, 900, 364/100, 103, 418, 550, 551; 307/141, 141.4, 141.8; 165/13, 14; 236/44 R, 44 C, 46 R, 46 A, 46 C, DIG. 8

[56] References Cited

U.S. PATENT DOCUMENTS

| | | | |
|---|---|---|---|
| 3,345,619 | 10/1967 | Anderson et al. | 364/200 |
| 3,555,251 | 1/1971 | Shavit | 364/900 X |
| 3,881,172 | 4/1975 | Bartlett et al. | 364/900 |
| 3,974,484 | 8/1976 | Struger et al. | 364/900 |
| 3,996,565 | 12/1976 | Nakao et al. | 364/900 |
| 4,001,599 | 1/1977 | Karklys | 307/141 |
| 4,019,175 | 4/1977 | Nakao et al. | 364/900 |
| 4,023,109 | 5/1977 | Shreve | 328/75 |
| 4,030,073 | 6/1977 | Armstrong, Jr. | 364/900 |
| 4,048,662 | 9/1977 | Yomigida | 364/900 |
| 4,065,676 | 12/1977 | Elias | 307/66 |

FOREIGN PATENT DOCUMENTS

| | | |
|---|---|---|
| 733654 | 5/1966 | Canada . |
| 743265 | 9/1966 | Canada . |
| 760603 | 6/1967 | Canada . |

OTHER PUBLICATIONS

F.X. Systems Corp., Kingston, N.Y., "Series SP-72000 Sequence Program Controller", (Bulletin 74-01-07).

*Primary Examiner*—Joseph F. Ruggiero

*Attorney, Agent, or Firm*—Mattern, Ware, Davis & Stoltz

[57] ABSTRACT

A programmable sequence controller is disclosed utilizing digital and analog inputs in order to generate digital output driver signals for the control of external systems or devices. The controller emulates mechanical sequence drums so that at any one time each of the simulated drums within the controller executes one of the addressable drum lines programmed within the drum. Each line of each simulated drum can be programmed to specify the energization or deenergization of any output driver as well as the energization or de-energization of any memory bit utilized by the controller in order to provide communication between drums. Each drum may also be programmed to have one or two sets of exit conditions, which if met, cause the controller to effectively rotate the drum to a specified drum line and execute this new drum line during the next scan of the controller. The controller can also sense emergency conditions and cause any or all of the drums to rotate to a specified line regardless of the drum line then being executed by the controller for each of the drums. An improved power-down, power-up circuitry insures an ordered and complete shutdown of the controller if any of a number of conditions exist, including utility AC failure and impending failure of several of the power supply voltages. Handshaking circuitry between the power supply and the remainder of the controller insures that the controller maintains memory validity for all types of shutdown situations, including momentary losses of any supply voltage.

The programmable sequence controller includes a clock-calendar capable of continued operation during periods of extended power outages. The clock-calendar can be utilized in any drum line to form part of the control scheme.

All programming of the simulated drum lines is performed through an interconnected data communication device such as a teletypewriter and utilizes a simple user-oriented language, with monitoring and diagnostic capability to facilitate debugging.

57 Claims, 63 Drawing Figures

| | |
|---|---|
| FIG. 11A | FIG. 11C |
| FIG. 11B | FIG. 11D |

FIG. 11E

| | |
|---|---|
| FIG. 12A | FIG. 12C |
| FIG. 12B | FIG. 12D |

FIG. 12E

| | |
|---|---|
| FIG. 13A | FIG. 13C |
| FIG. 13B | FIG. 13D |

FIG. 13E

| | |
|---|---|
| FIG. 16A | FIG. 16C |
| FIG. 16B | FIG. 16D |

FIG. 16E

INPUT-OUTPUT CONFIGURATION

| | |
|---|---|
| FIG. 17A | FIG. 17C |
| FIG. 17B | FIG. 17D |

FIG. 17E

PROGRAMMABLE SEQUENCE CONTROLLER WITH DRUM EMULATION AND IMPROVED POWER-DOWN POWER-UP CIRCUITRY

BACKGROUND OF THE INVENTION

1. Field of the Invention

This invention relates to programmable sequence controllers and to improved power-down, power-up circuitry for any data processing device.

2. Description of the Prior Art

A number of prior art patents disclose sequence controllers or mechanical drums for providing sequence control capability. A list of prior art is set forth below in Table 1. A majority of these references are directed to mechanical sequence drums of which U.S. Pat. No. 3,307,382, Hacker et al, appears to be the most relevant. This reference discloses a random access drum having binary coding for moving drum 11 to desired positions. The sequence of operations on drum 11 may be completely random, as specified by the operator, and is thus unlike most of the other prior art references. In short, this reference discloses an electro-mechanical random access means for controlling and moving an electro-mechanical programmer to control the sequence of cycles actuated by the programmer independently of the sequence of arrangement on the programmer. This reference, however, does not disclose an electronic emulation of mechanical sequence drums nor the capability of these simulated sequence drums to communicate with each other by internal memory bits; and thus become part of the overall control program. Branching capability

TABLE 1

PRIOR ART REFERENCES

| Patent No. | Inventor | Year Issued |
|---|---|---|
| U.S.2,922,900 | Gieringer | 1960 |
| 3,008,059 | Gorsuch et al | 1961 |
| 3,189,697 | Holzer | 1965 |
| 3,194,902 | Bauer | 1965 |
| 3,204,087 | Millis, Jr. | 1965 |
| 3,215,791 | Fontaine | 1965 |
| 3,215,999 | Dawson | 1965 |
| 3,234,410 | Sherman | 1966 |
| 3,253,108 | Mumma | 1966 |
| 3,274,348 | Blomquist et al | 1966 |
| 3,307,382 | Hacker et al | 1967 |
| 3,331,929 | Holtkamp | 1967 |
| 3,413,425 | Lovegrove | 1968 |
| 3,477,258 | Walker et al | 1969 |
| 3,538,284 | Alexander et al | 1970 |
| 3,566,051 | Hulterstrum et al | 1971 |
| 3,566,364 | Hauck | 1971 |
| 3,586,918 | Roland | 1971 |
| 3,586,937 | Holzer | 1971 |
| 3,600,602 | Yartz | 1971 |
| 3,663,938 | Baer | 1972 |
| 3,717,730 | Utter | 1973 |
| 3,725,618 | Voland et al | 1973 |
| 3,735,063 | Stillbert | 1973 |
| 3,755,695 | Krick et al | 1973 |
| 3,809,831 | Godwin et al | 1974 |
| 3,819,886 | Homan et al | 1974 |
| 3,846,676 | Ryczek | 1974 |
| 3,864,611 | Chang | 1975 |
| 3,886,378 | Morgan | 1975 |
| 3,937,981 | Nystuen et al | 1976 |
| 3,264,397 | Glickman et al | 1966 |
| 3,382,489 | VanBosse | 1968 |
| 3,260,998 | Fluegel | 1966 |
| 3,142,820 | Daniels | 1964 |
| 3,752,966 | Foy, Jr. et al | 1973 |
| 3,665,399 | Zehr et al | 1972 |

TABLE 1-continued

PRIOR ART REFERENCES

| Patent No. | Inventor | Year Issued |
|---|---|---|
| 3,760,167 | Schrimshaw | 1973 |
| 3,201,572 | Yetter | 1965 |
| 3,467,947 | Rees | 1969 |
| 3,459,925 | Goosey et al | 1969 |
| 2,877,398 | Gimpel et al | 1959 |
| 3,092,819 | Cochinal | 1963 |
| 3,039,687 | Chope | 1962 |
| U.K.1,126,891 | Jensen | 1968 |

is also not disclosed or suggested in this reference. Furthermore, the present invention is distinguished from Hacker et al by incorporating a clock-calendar capable of use in defining exit conditions upon which the controller leaves a currently scanned line to another specified drum line.

U.S. Pat. No. 3,204,087, Millis, Jr., discloses a general purpose parallel sequencing computer which utilizes a magnetic memory drum 23. The system provides for a generalized sequencing technique which possesses coding flexibility and is able to sequence a large number of actuators in a parallel relationship to each other, or in any mixture of serial and parallel relationships. The sequence technique employs a rotating magnetic memory drum, a series of output actuators to be controlled by the system, and a mechanical commutator driven by the drum which effectively interconnects to computer with actuators. The memory drum includes a working, a transfer, and a short re-circulating channel, all divided or programmed by several associated permanent channels, into a series of equally lengthened sections. The working channel holds the present or operating information of all sections, while the transfer channel carries advance information relating to the next actuator control cycle for each section. This reference however does not disclose or suggest multiple drum emulation by a single controller nor the communication from one drum to any other drum through the use of internal memory bits. Furthermore, a programming language of simple, user oriented format is neither disclosed nor suggest by Millis or any of the other cited prior art references. Furthermore, the power-down, power-up circuitry between the power supply and the remaining portions of the controller is neither disclosed nor suggested by this or any of the cited prior art references.

Lastly, U.K. Patent No. 1,126,891 discloses a sequence controller for a working machine. This controller has auxiliary switch means provided for rendering ineffectual the conditioning of the sequence control to provide a command signal for the next normal program stage. It also includes means for deriving at least one alternative command signal deviating from the normal program. This reference does not disclose multiple simulated drums nor their communication with each other. Furthermore, this reference does not disclose a simple user-oriented program language nor a clock-calendar capable of use as forming a part or all of an exit condition within any selected drum line.

SUMMARY OF THE INVENTION

The programmable sequence controller according to the present invention provides for easy user programming of the controller in order to obtain a desired control of an external machine or system. The controller is particularly adapted for energy management such as the control of heating and cooling systems, including solar powered systems used in buildings of all kinds. The controller incorporates an accurate clock-calendar which keeps track of the time of day, month, and year and which may be utilized by the controller for actuating and de-actuating outputs for specified periods of time and at specified times of the day, month, or year. The clock-calendar has an independent power source so that the controller does not lose track of time if an electrical power outage occurs. In addition, the controller includes a random access memory that can maintain valid data for extended periods of time during a power outage.

The controller implements its control function by means of 32 digital output drivers. These drivers coupled to power amplifying devices, such as triacs, can actuate solenoids which control valves, pumps, or other system components. Outside events are communicated to the controller by 32 digital inputs which can be driven by switches and other contact closures. In addition, the controller can read up to 32 analog input voltages which can be driven by thermistors, pressure gauges, humidity gauges, flow meters, and other similar analog devices.

The controller includes a communications interface for interconnection with an external interactive terminal by which an operator can generate a desired control program and observe this program within the controller as well as the various conditions of the inputs and outputs. This communications interface also provides for control program modification by the user, as well as to provide the user with the capability of setting specified output drivers while allowing the controller to execute the control program, noting the results therefrom, without those results affecting the interconnected device or system. This method of isolating the controller from the external device or system is very advantageous during initial programming and de-bugging of the control program.

The digital inputs are each associated with indicator lights which are ON when the switch is closed and OFF when the switch is open. The digital outputs when connected to control triacs, can be used to switch 117 VAC. The analog inputs are driven by variable resistance devices such as thermistors. The variable resistance elements are connected to form a voltage divider with a fixed resistor. The analog voltage is then read at the junction between the fixed resistor and the variable resistor.

The controller in operation simulates eight drums, each drum having up to 100 or more addressable line locations. These drum lines can be specified by the user through the interconnected data communications devices to specify the circumstances when the controller will turn digital outputs ON and OFF. In addition, the controller can be programmed to scan for emergency conditions and to activate special control sequences if these emergency conditions are present. For each selected drum line, the user can set limit points for selected analog inputs, examine the digital inputs, and control the state of the digital outputs. In addition, the user can vary the action of the control program depending upon the time of day, month, or year. The control program can also specify timers and limit points for these timers.

The analog input voltages are automatically converted into appropriate units so that the user can set limit points in terms of degrees, pounds per square inch, relative humidity percentages, seconds, days, and other familiar units while the controller automatically scales these inputs to simplify the control program, and thus makes it easy to understand and maintain the control logic.

During each control cycle, that is, the execution of the presently selected drum line of each drum, the controller processes the selected drum line. The controller then sets the output drivers either ON or OFF as specified by the drum line. After setting the outputs of the selected drivers, the controller sets specified internal memory bits to the specified ON or OFF state. These bits are used to communicate control information from one drum to any other drum.

Each drum line may also define two independent sets of conditions for leaving the particular line. After setting the specified outputs and memory bits, the controller examines the conditions for leaving the line. If the first set of conditions is met, the controller changes the line number for that drum so that the new line is executed during the next control cycle. If the first set of exit conditions is not met, the controller examines the second set of exit conditions, if present, and, if satisfied, changes the line number for that drum to the line number specified in the second set of exit conditions for execution on the next control cycle.

If an emergency condition is detected for a drum, the line number for that drum is changed regardless of the line the drum would normally execute. The emergency condition may also change the drum lines of the remaining drums to specified lines for their execution on the next control cycle or scan by the controller. In this manner, the controller can be programmed to automatically jump to a predetermined emergency sequence whenever emergency conditions are found to exist.

In the absence of an emergency, once a drum is set, or "pointed to", a given drum line, it remains at that line until one of the set of exit conditions for that line is totally satisfied. An emergency condition, however, may change the line number for a drum regardless of the exit conditions.

The controller also incorporates power-down, power-up circuitry which insures the proper operation of the controller following start-up of the controller after a power failure or a controller computing failure. This circuitry requires the controller to acknowledge a "power drum" signal from the power supply associated with the controller when this signal indicates that a power shutdown is going to occur.

The controller does this by generating a "GOODBYE" signal that forces the power supply to enter a "STANDBY" or reset state. As the power supply enters the STANDBY state, the controller performs housekeeping operations which insure that all stored data is valid and which puts the controller in a configuration to allow proper power-up.

By controller acknowledgement of an impending shutdown of the power supply, the problem of a transient power failure is eliminated, since a momentary power failure cannot reenergize the controller before the power supply has entered the STANDBY state.

Once in the STANDBY state, correction of the problem causes the power-down signal to change state followed in about one-half second with a change in state of a STANDBY signal. This time period insures that the controller resumes operation in an orderly fashion. Invalid data within the various central processor associated memories due to power supply transients is thus eliminated. This handshaking circuitry is applicable to any data processing device.

OBJECTS OF THE INVENTION

Therefore, it is a principal object of the present invention to provide a programmable sequence controller utilizing digital and analog inputs, digital output drivers, and internal memory bits for controlling an external machine or system, wherein the controller utilizes electronic drums, communicable with each other by the memory bits, each drum having a number of user programmable drum lines, each line capable of designating specified outputs and internal memory bits as ON or OFF, as well as specifying exit conditions for causing the electronic drum, when executing the line, to rotate to another program drum line for execution by the controller during its next scan or control cycle;

Another object of the present invention is to provide a controller of the above description utilizing a control program for designating the drivers and exit conditions of the drum line which is readily usable by people who may not be knowledgeable about computer languages;

A further object of the present invention is to provide a controller of the above description further including a clock-calendar utilizable in the program drum lines for designating exit conditions based in whole or part on specified calendar dates or periods of times;

An additional object of the present invention is to provide a controller of the above description wherein the analog inputs may be specified in units convenient to the user;

A still further object of the present invention is to provide a controller of the above description wherein communications with an interconnected interactive terminal or other data communicating or generating device may be passed along to additional controllers, in a daisy-chain configuration;

An additional object of the present invention is to provide a controller of the above description utilizing a power-down, power-up handshaking configuration between the power supply and the remaining portions of the controller to have an ordered shut-down of the controller and to insure that invalid data is not stored in the controller;

Other objects of the present invention will in part be obvious and will in part appear hereinafter.

THE DRAWINGS

For a fuller understanding of the nature and objects of the present invention, reference should be had to the following detailed description taken in connection with the accompaning drawings, in which.

Figure 1:
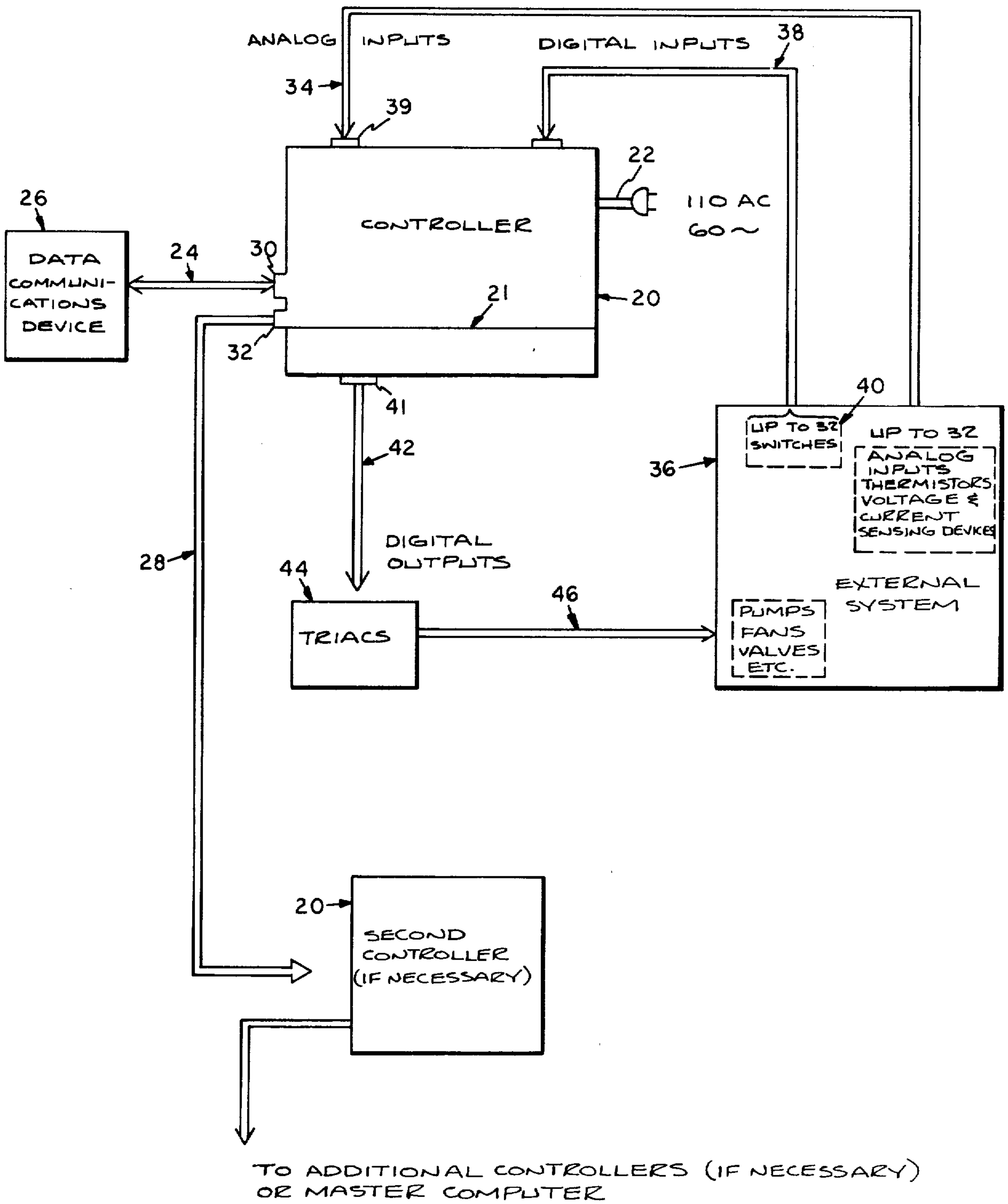
FIG. 1 is a diagram showing the interrelationship of a controller according to the present invention with an external system which it controls along with a communication interface between the controller and an external data communication device, such as a teletypewriter.
Figure 3A:
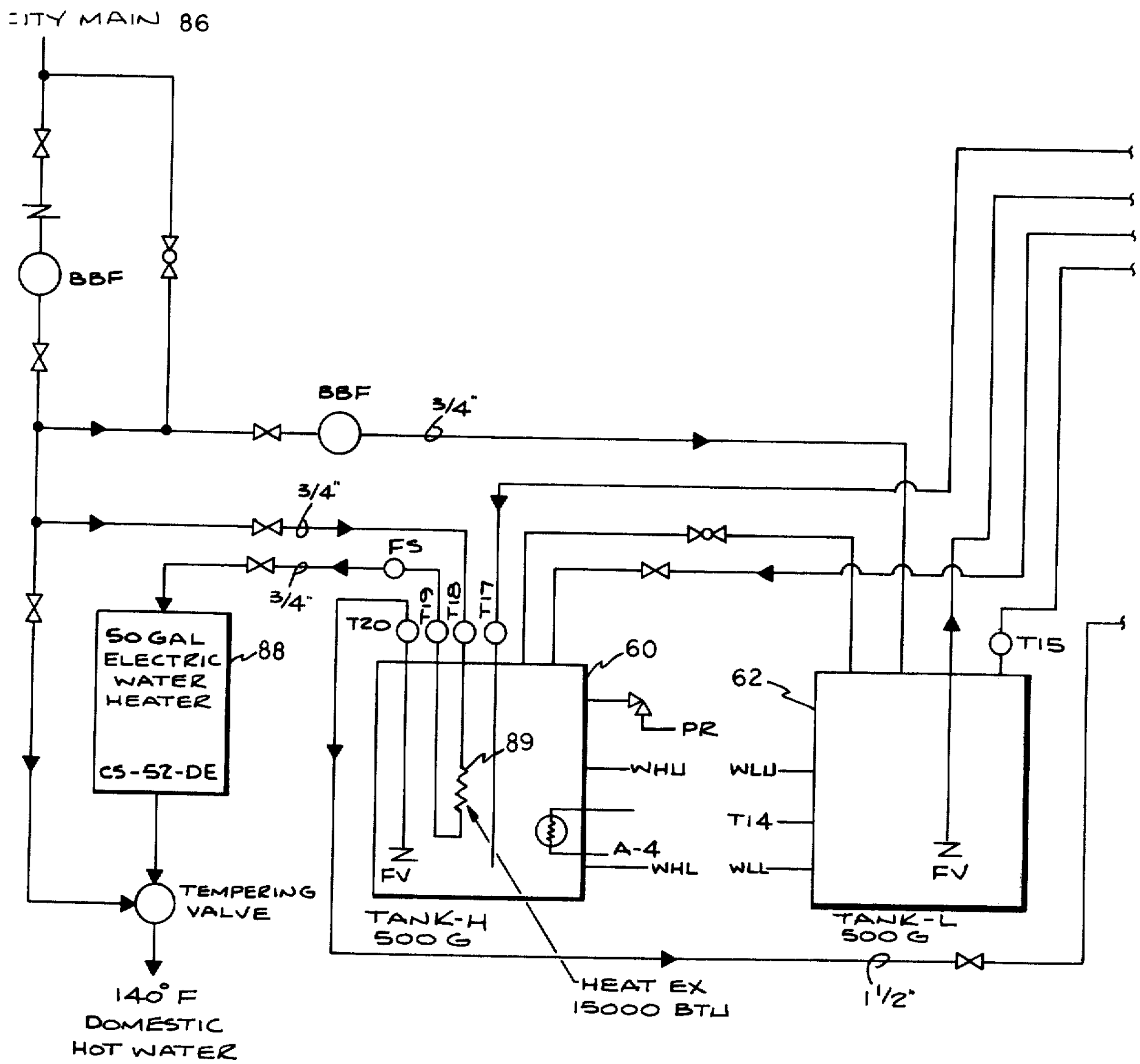
Figure 3B:
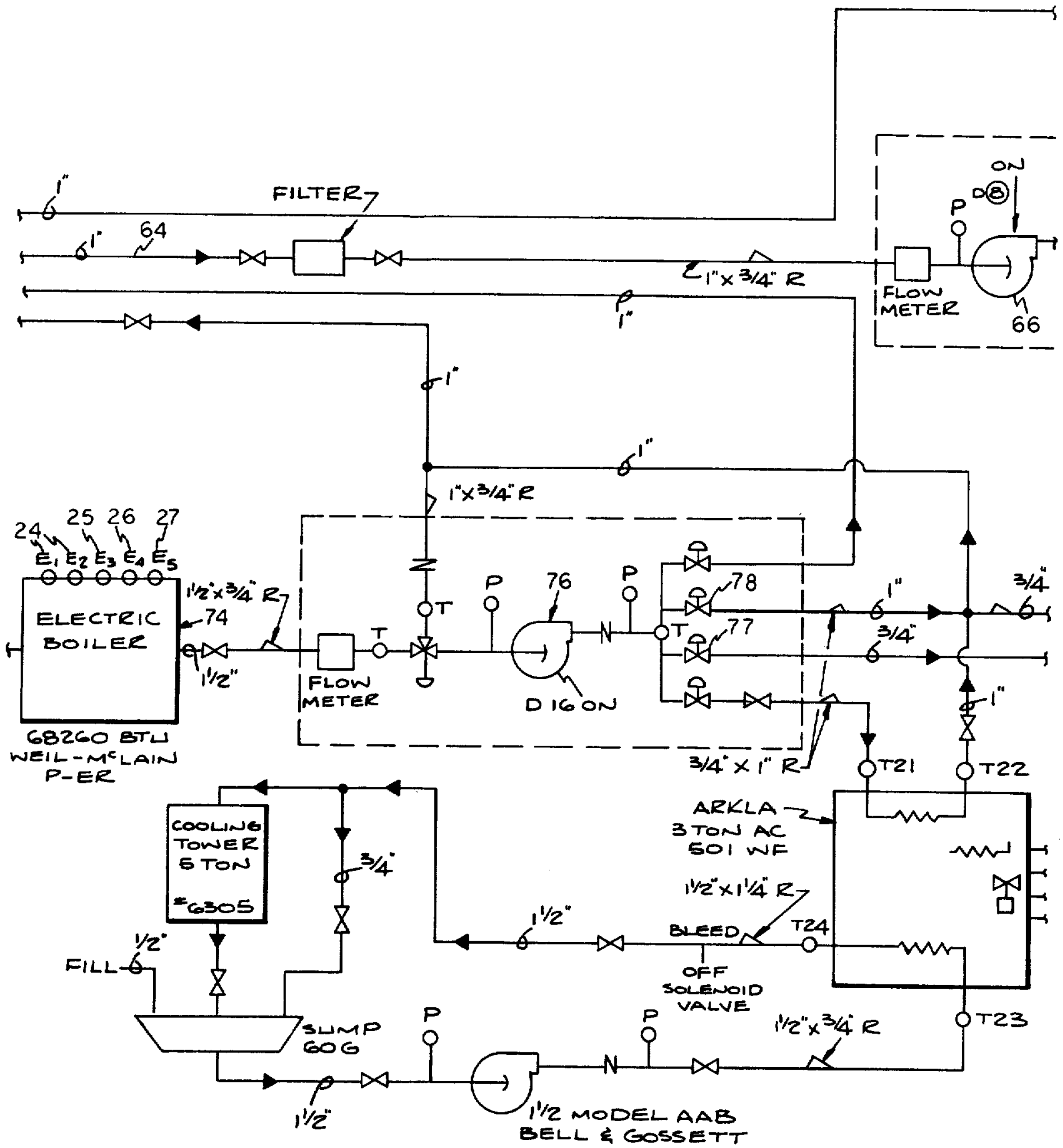
Figure 3C:
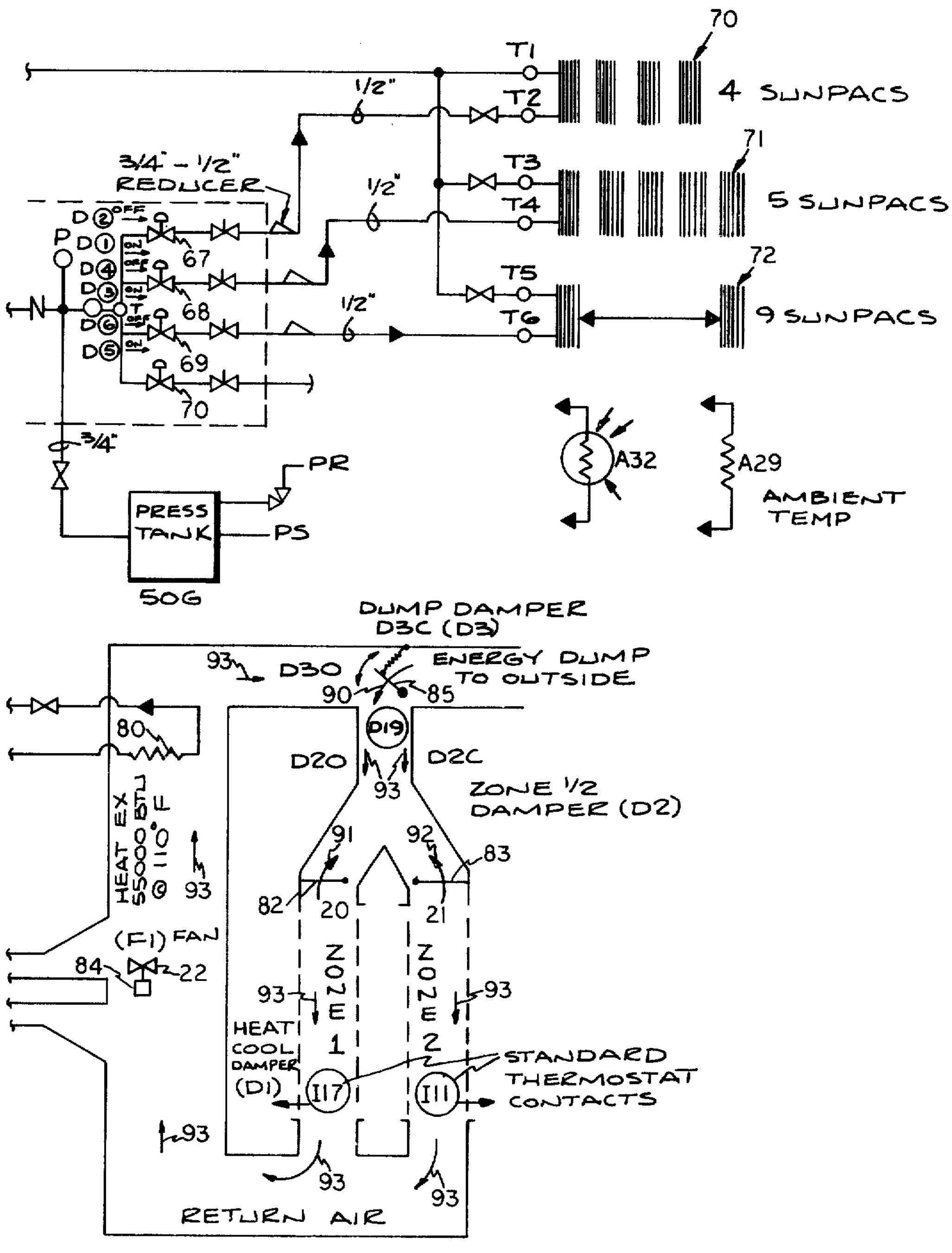
Figure 3D:
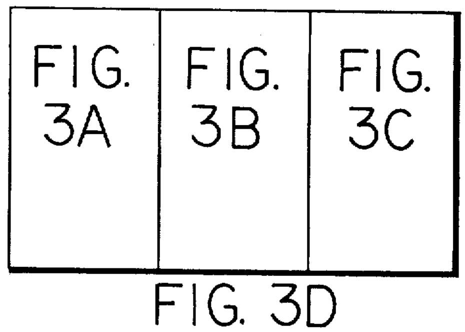
Figure 5D:
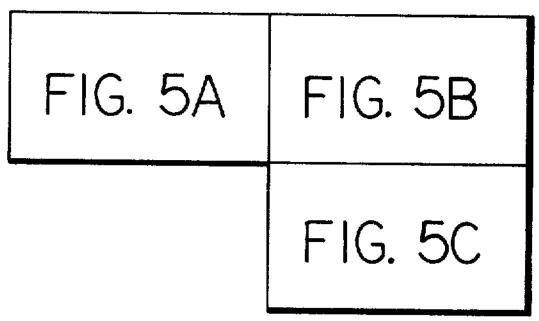
Figure 6E:
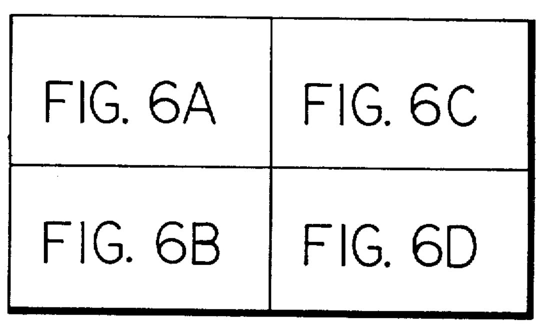
Figure 4:
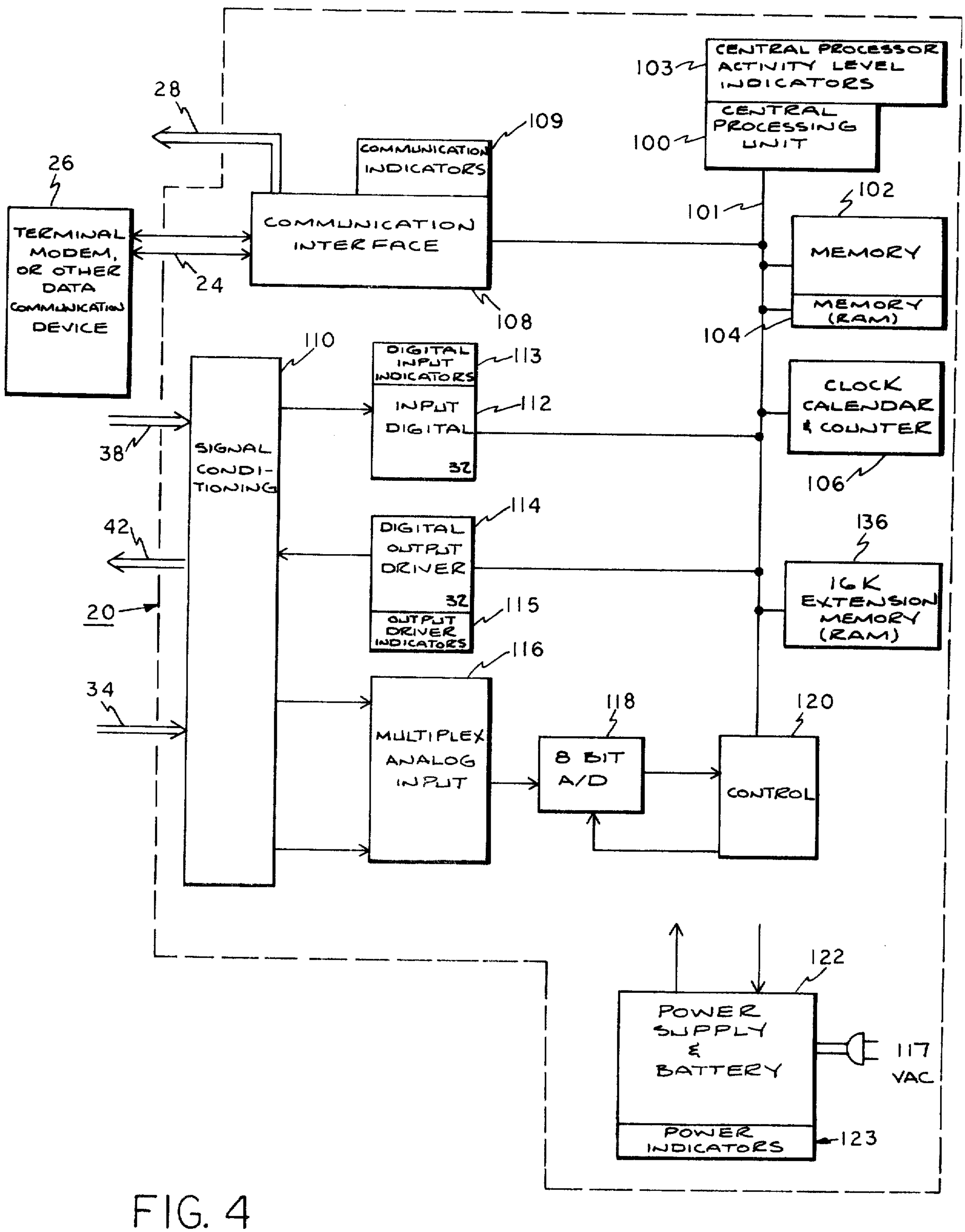
Figure 4A:
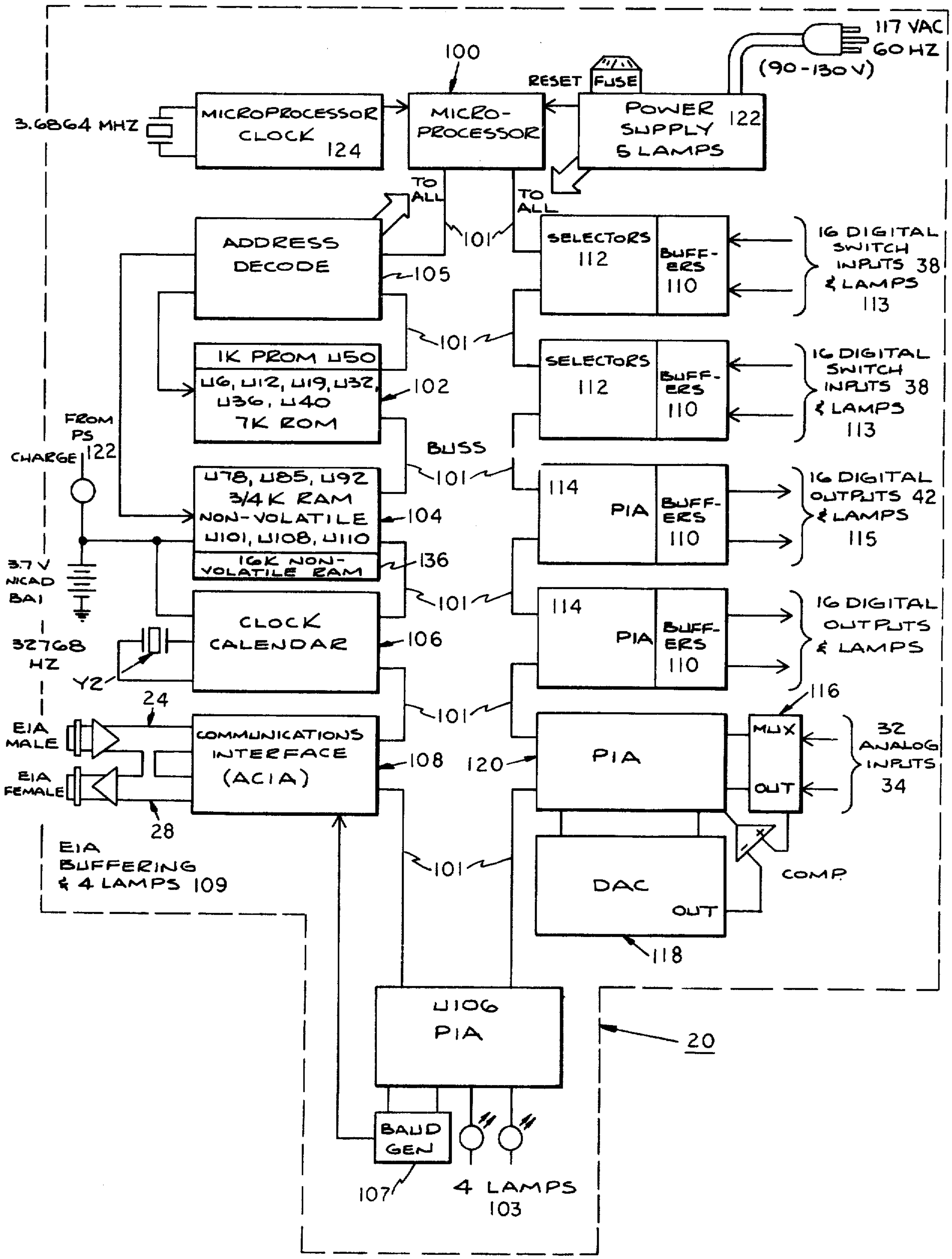
Figure 5A:
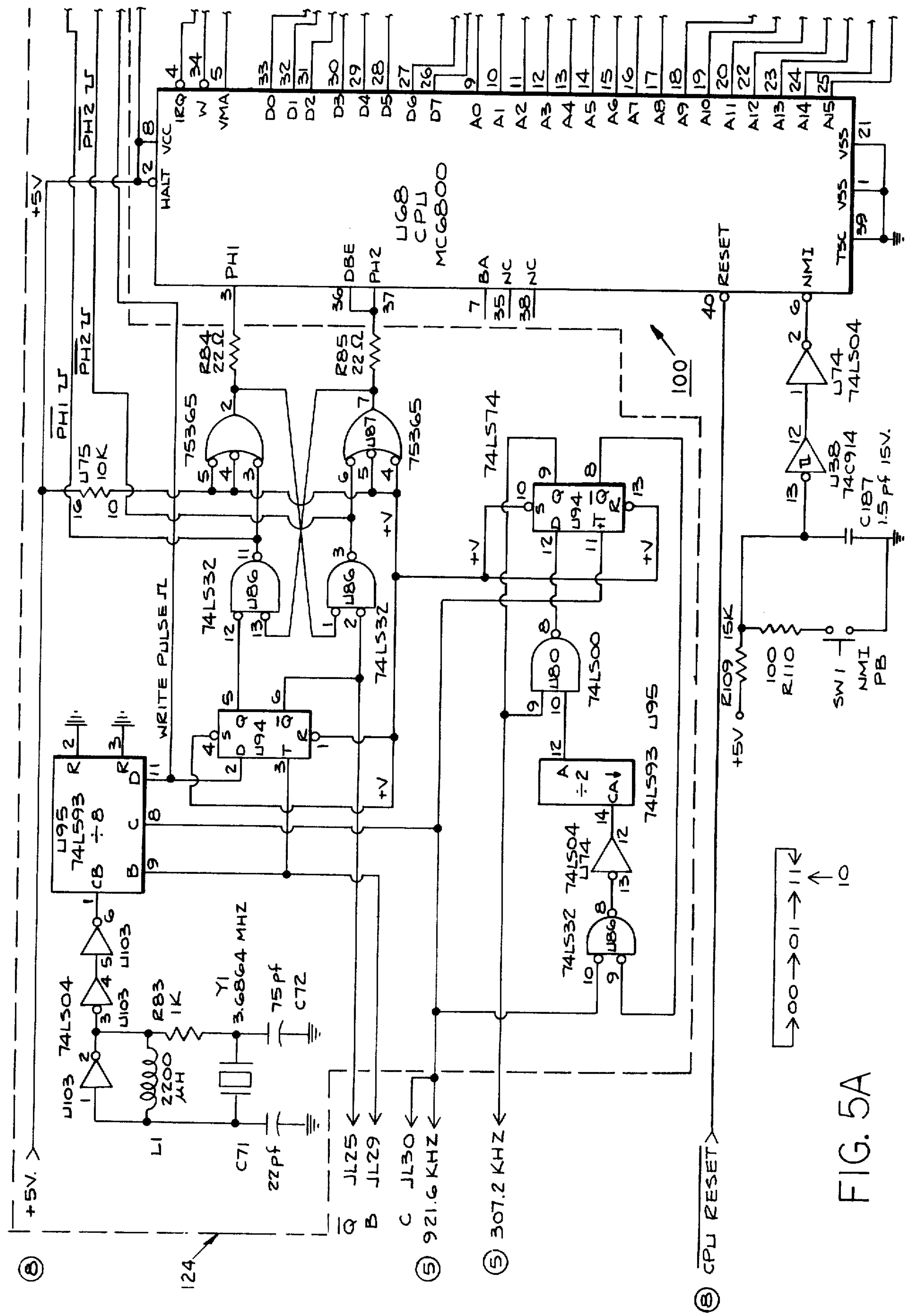
Figure 5B:
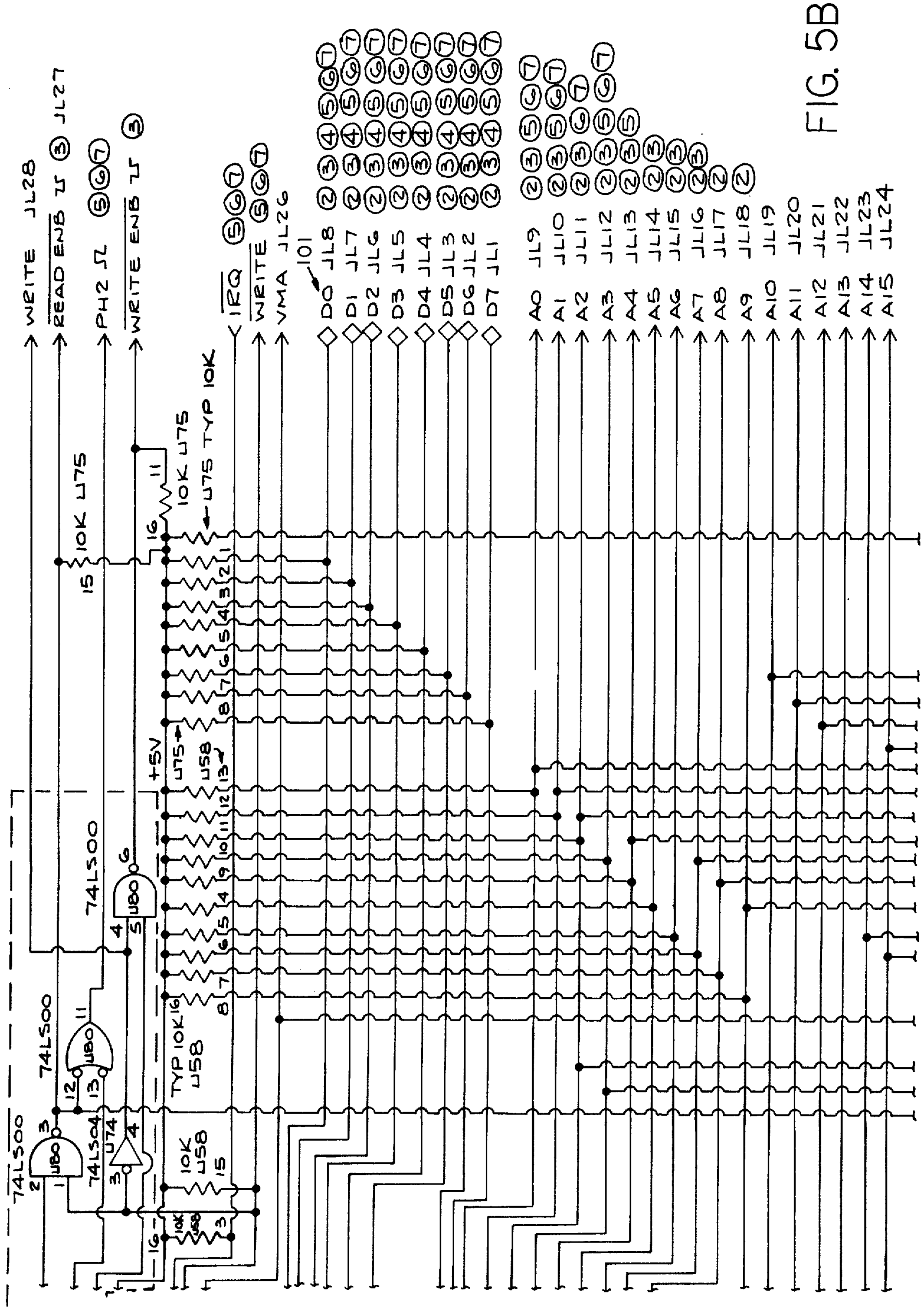
Figure 5C:
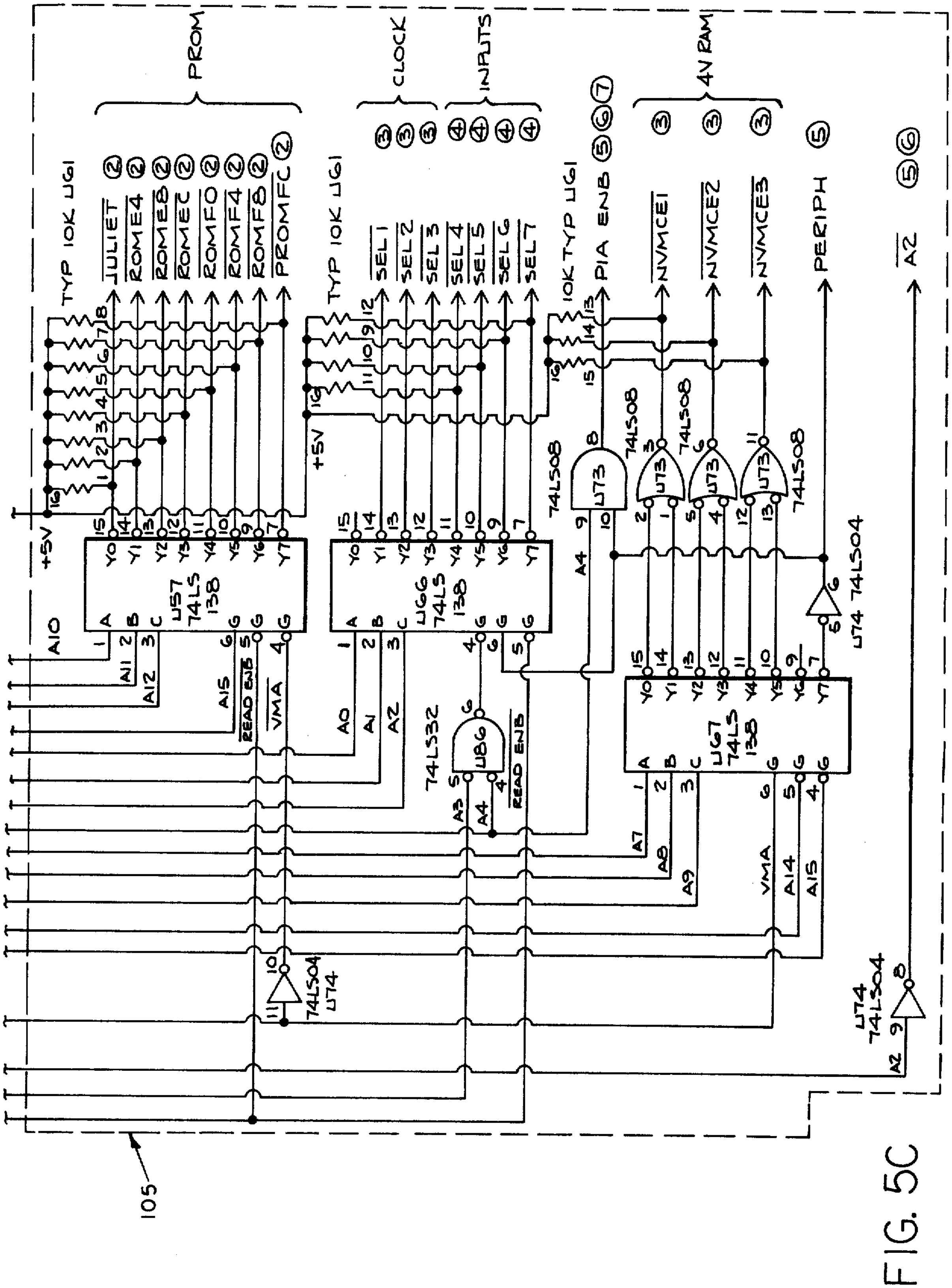
Figure 6A:
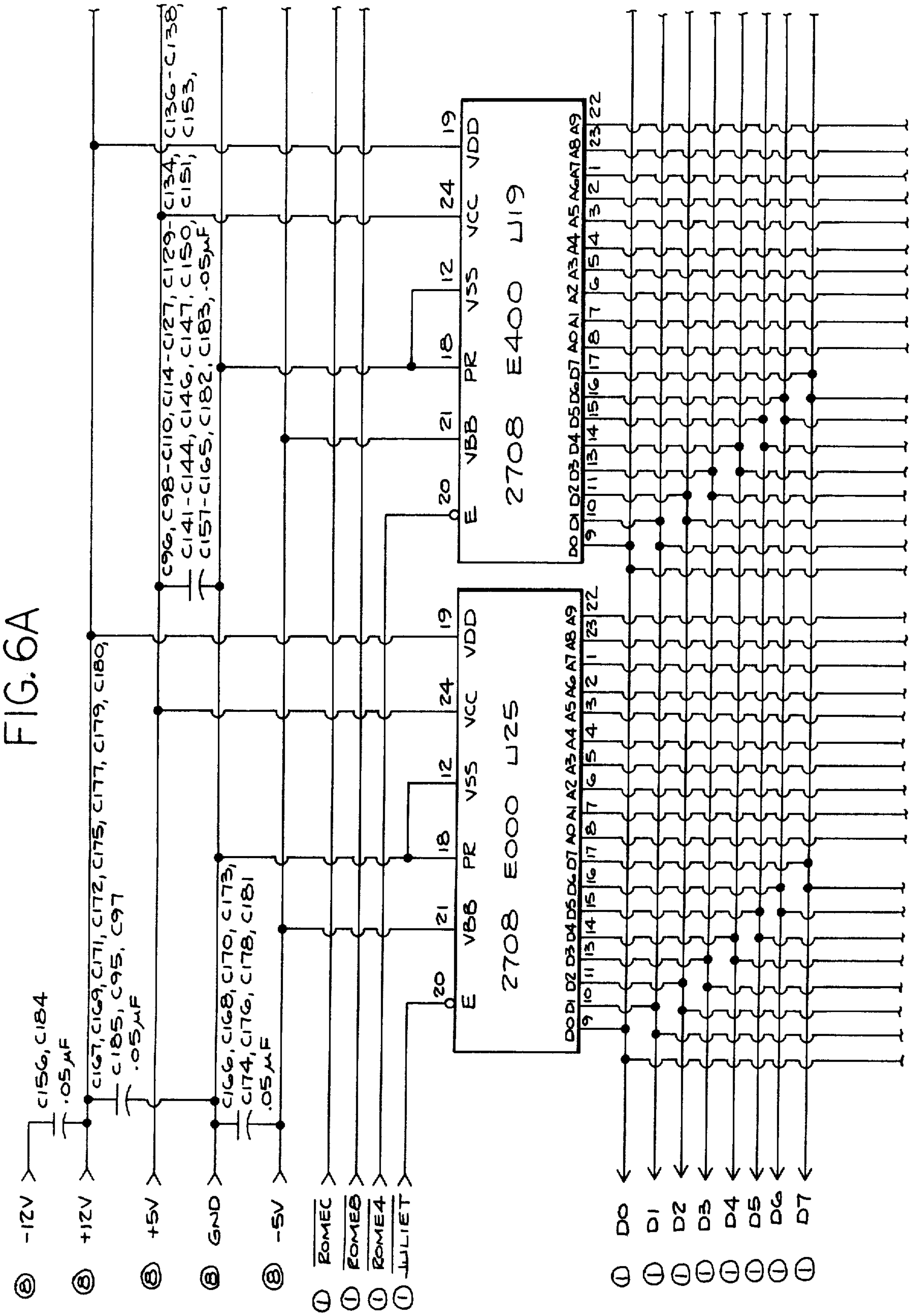
Figure 6B:
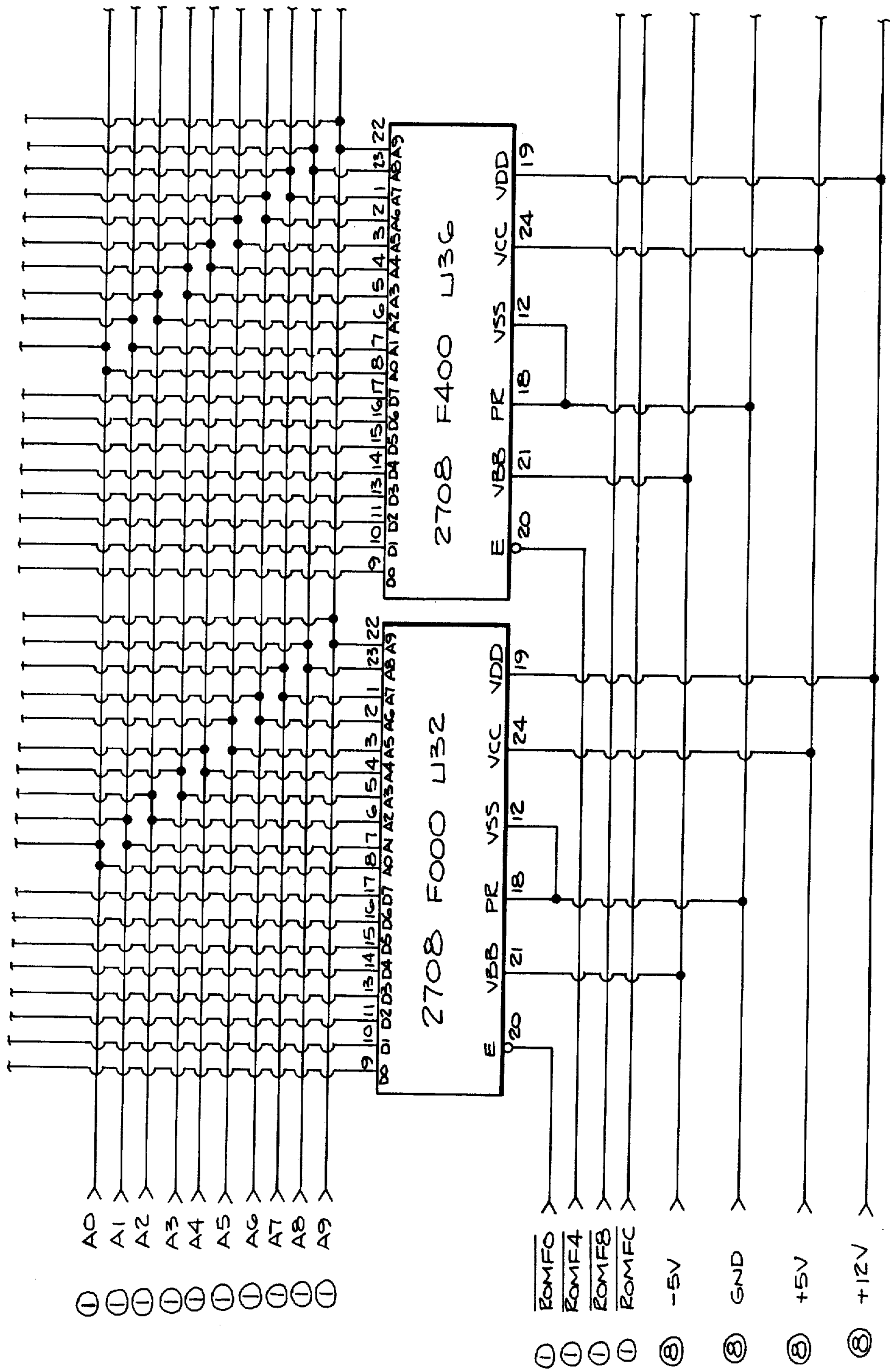
Figure 6C:
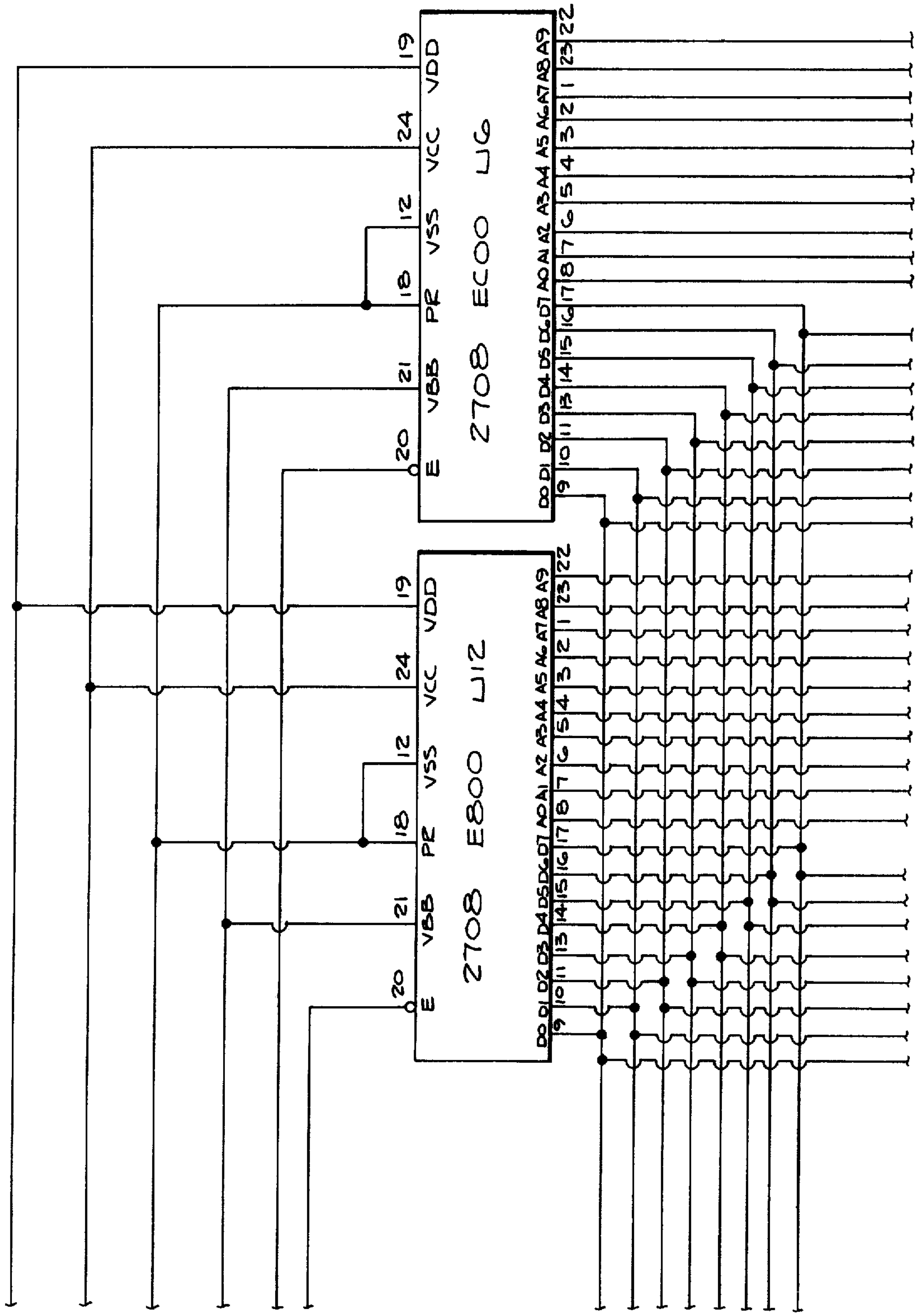
Figure 6D:
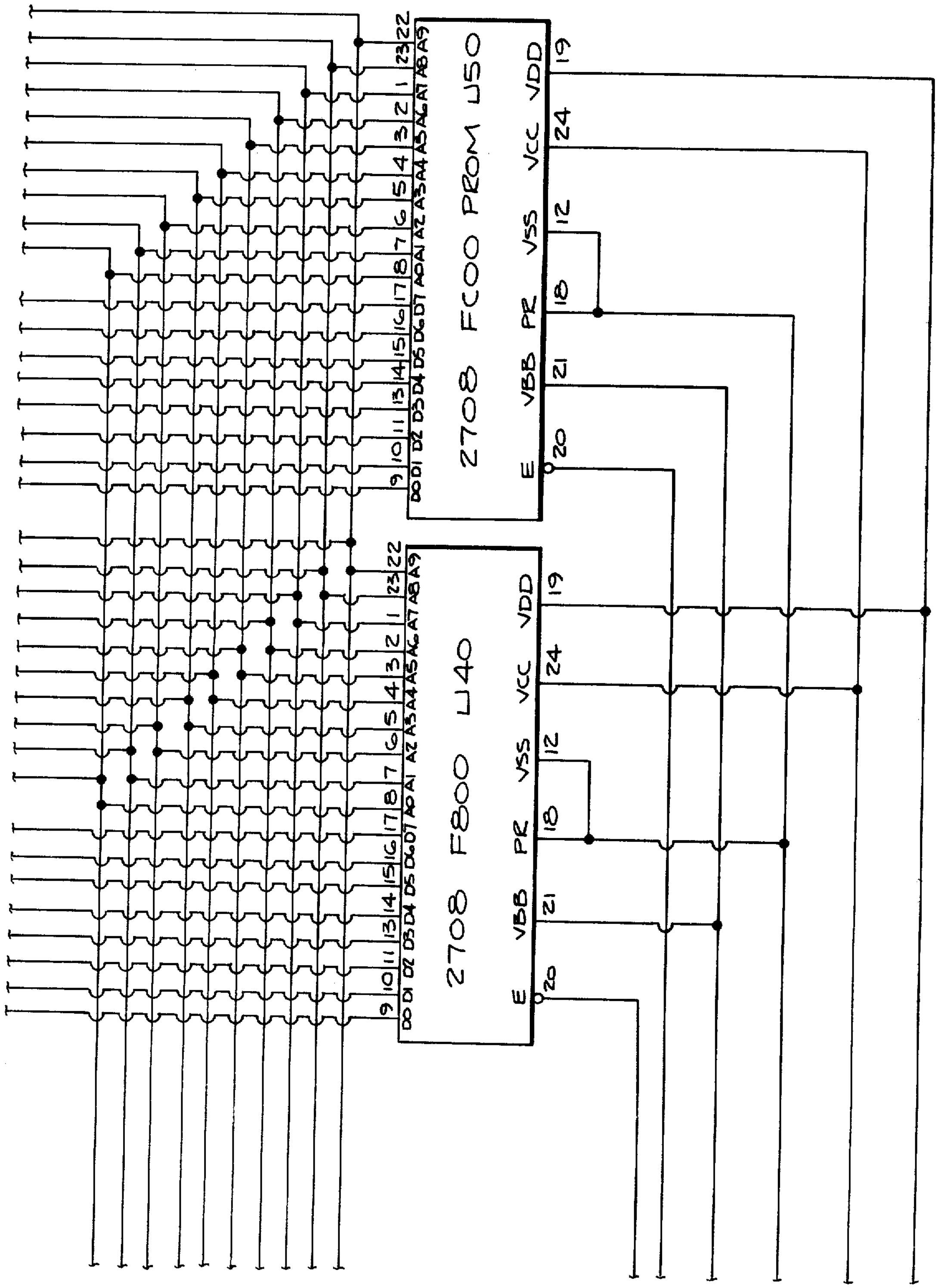
Figure 7A:
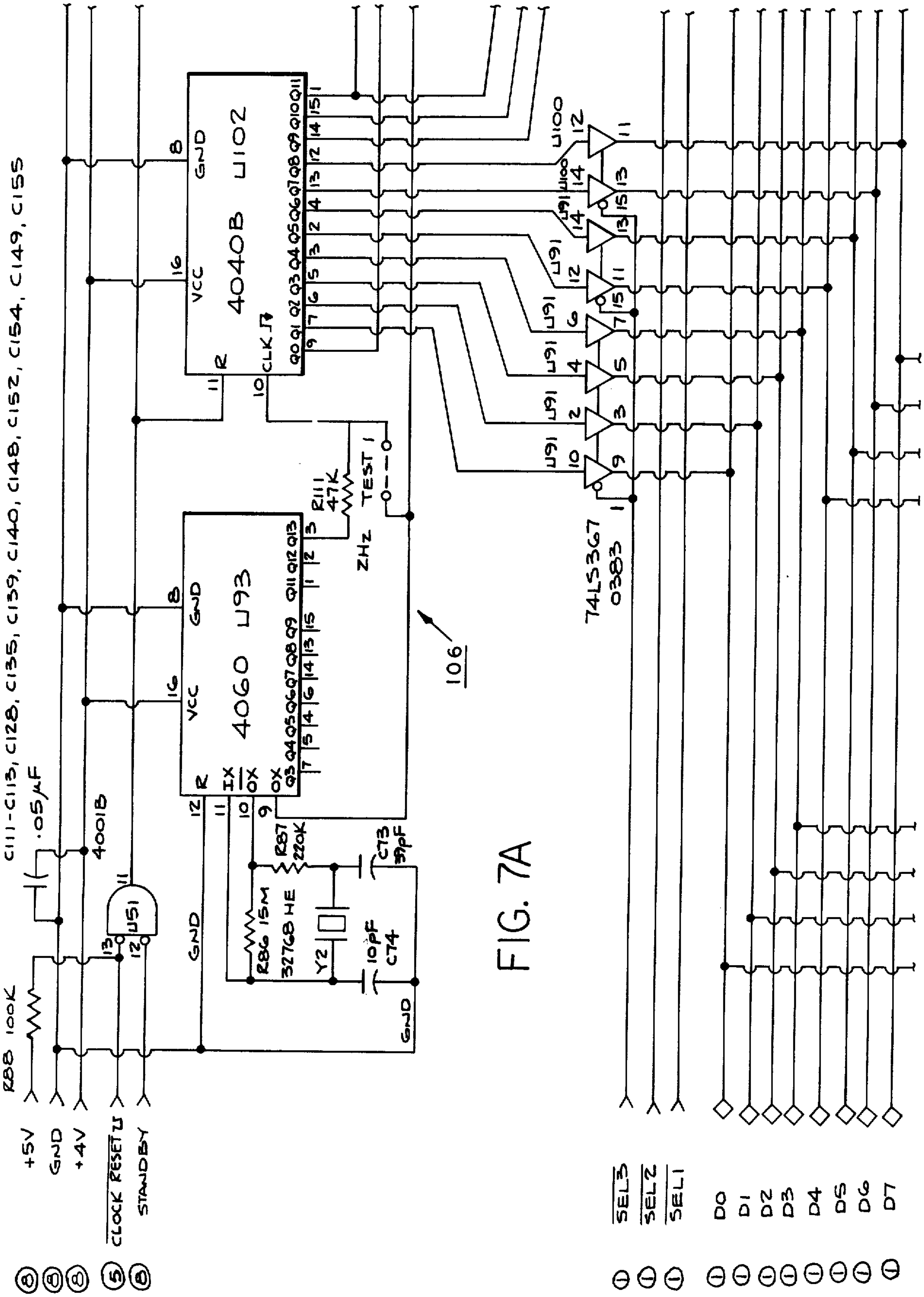
Figure 7B:
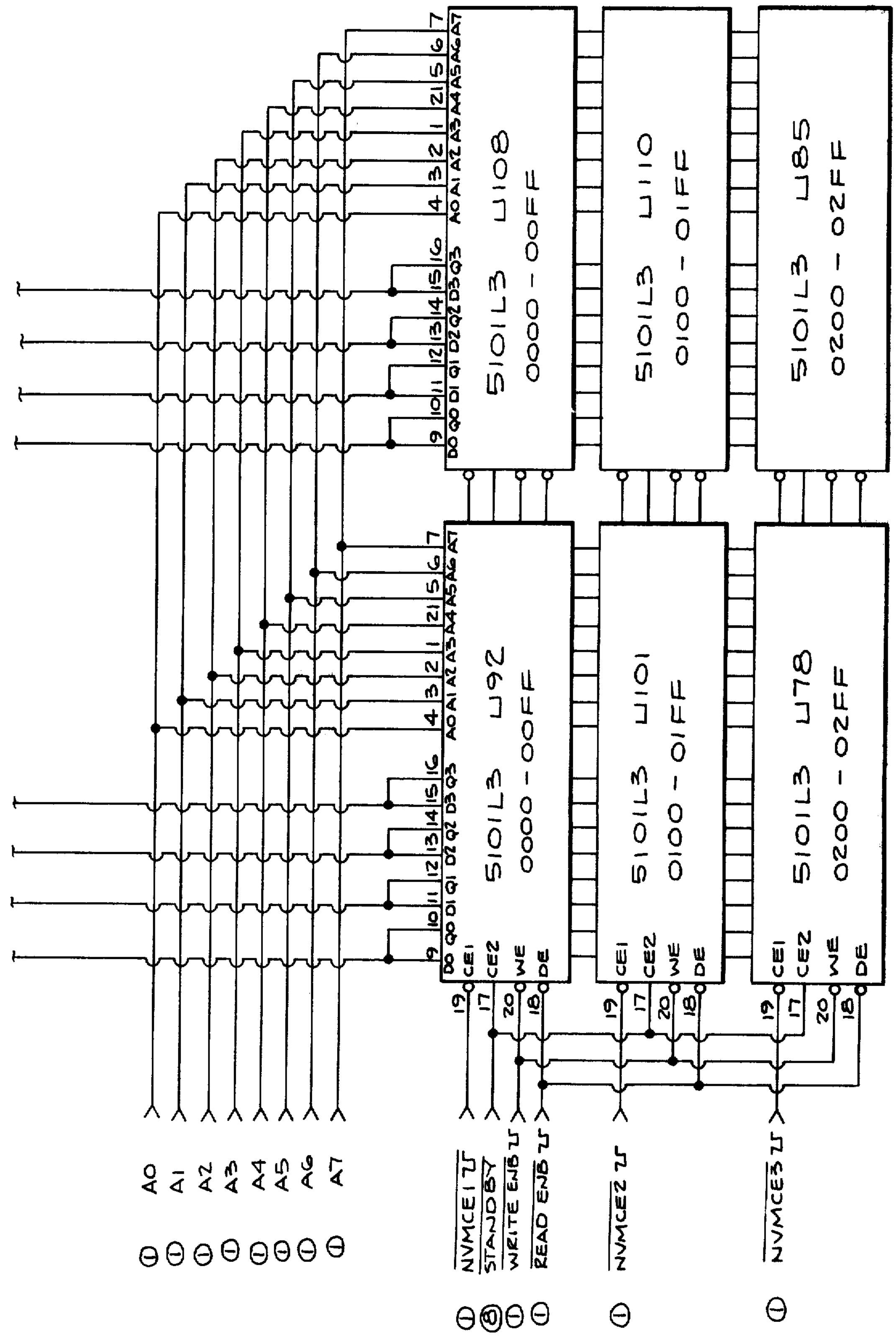
Figure 7C:
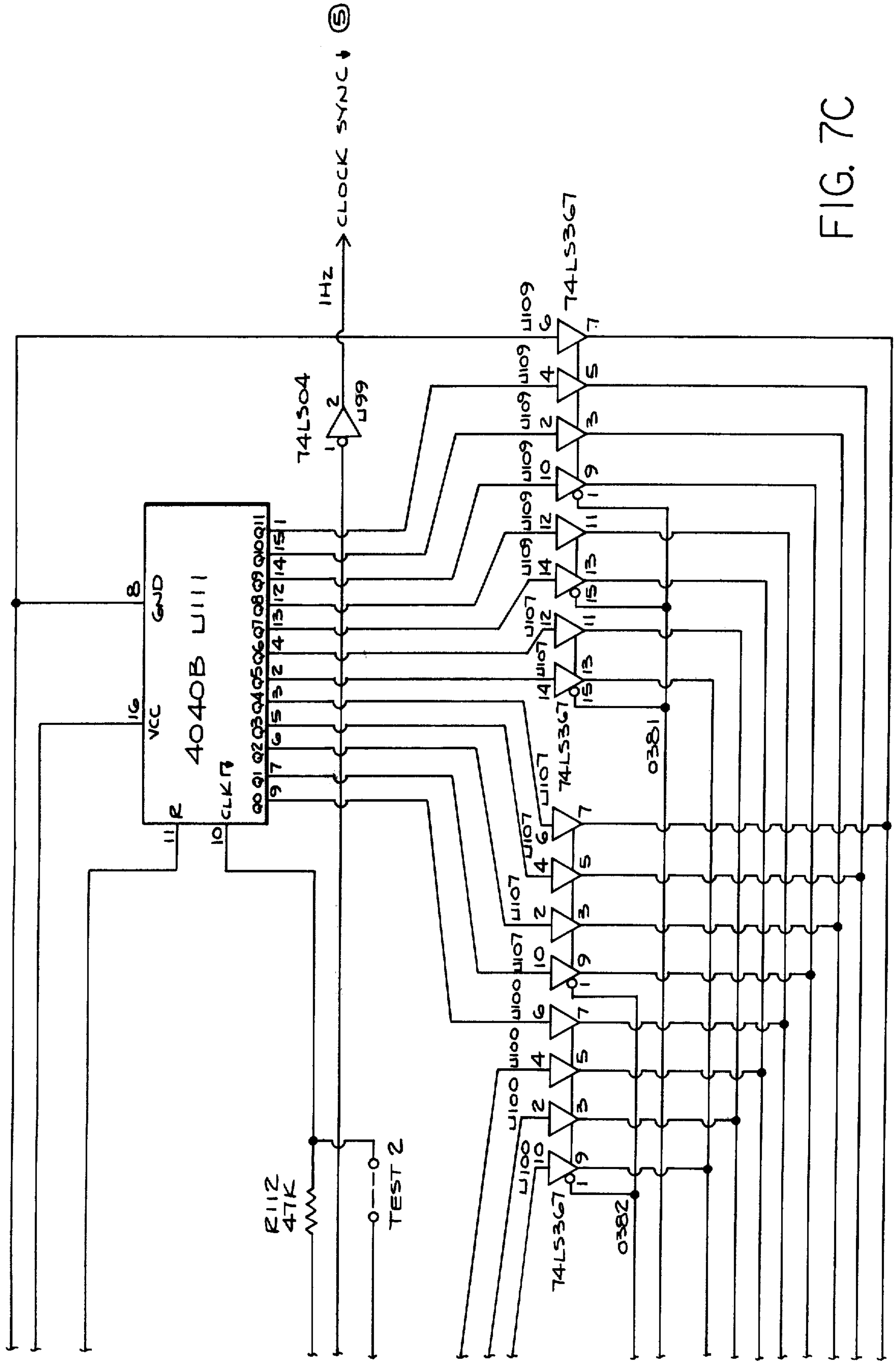
Figure 7D:
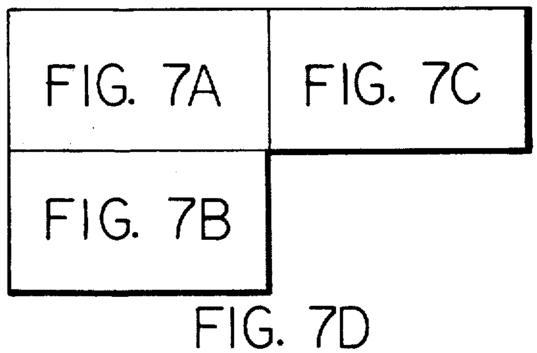
Figure 8E:
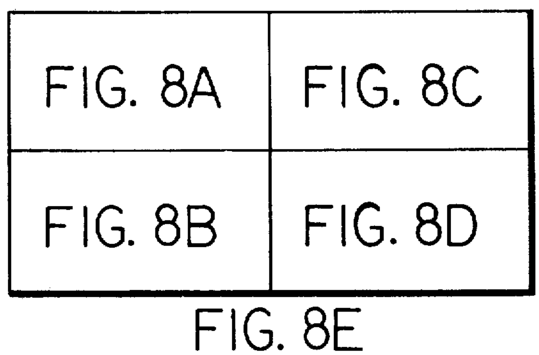
Figure 9E:
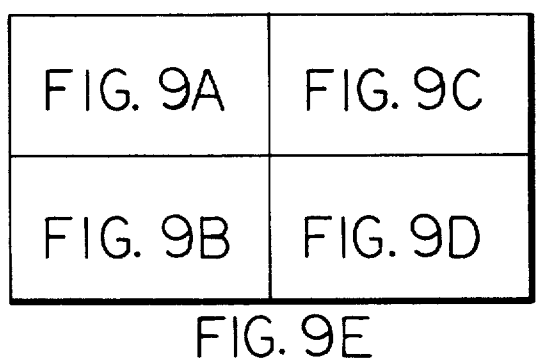
Figure 10E:
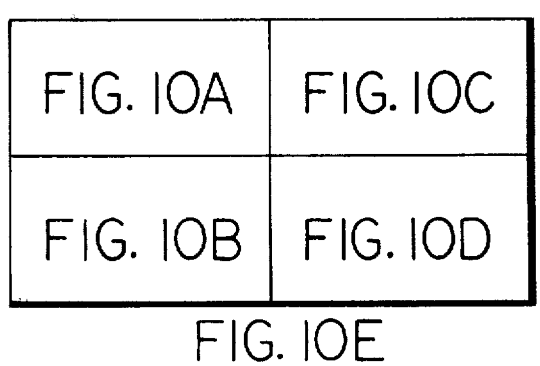
Figure 8A:
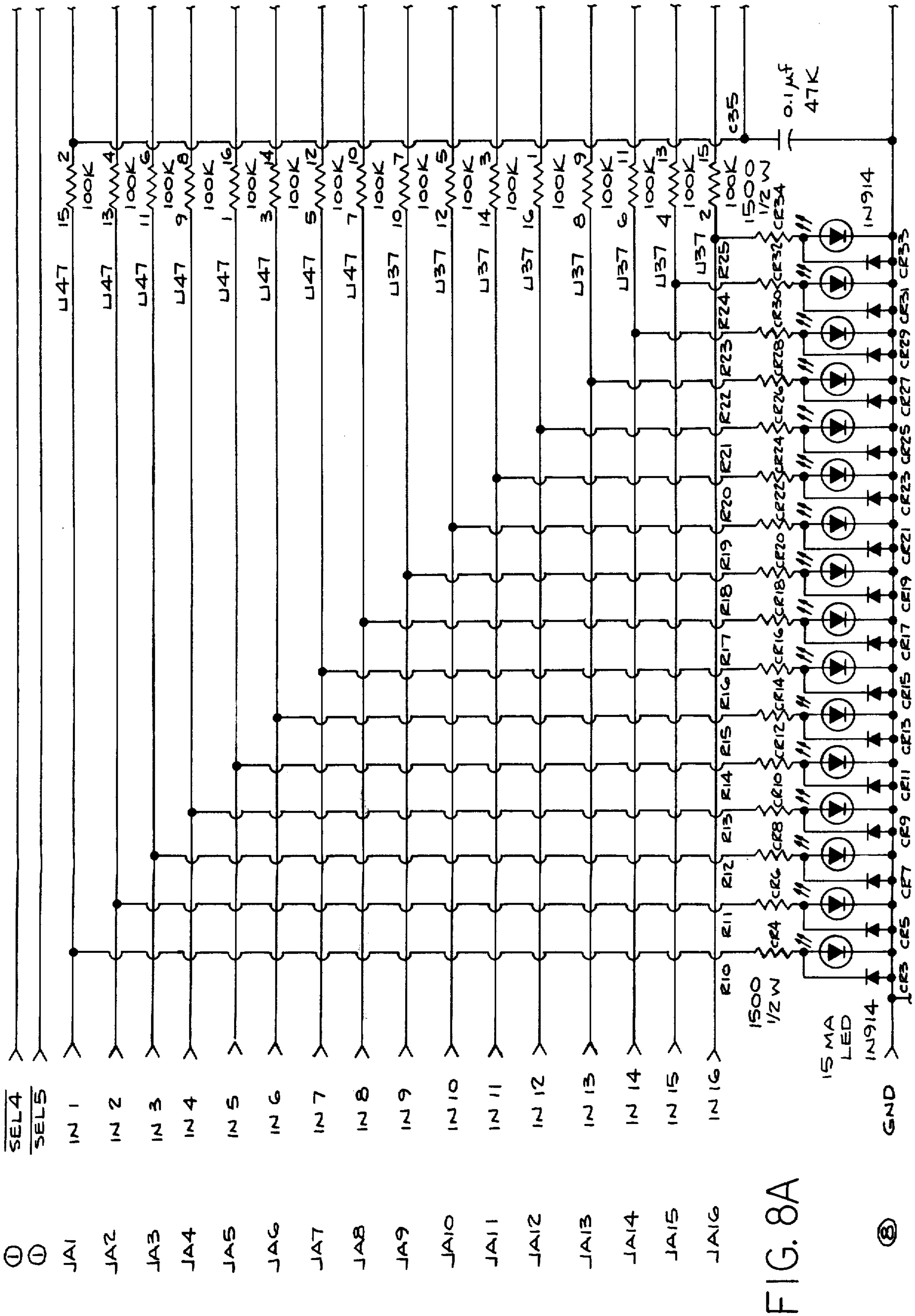
Figure 8B:
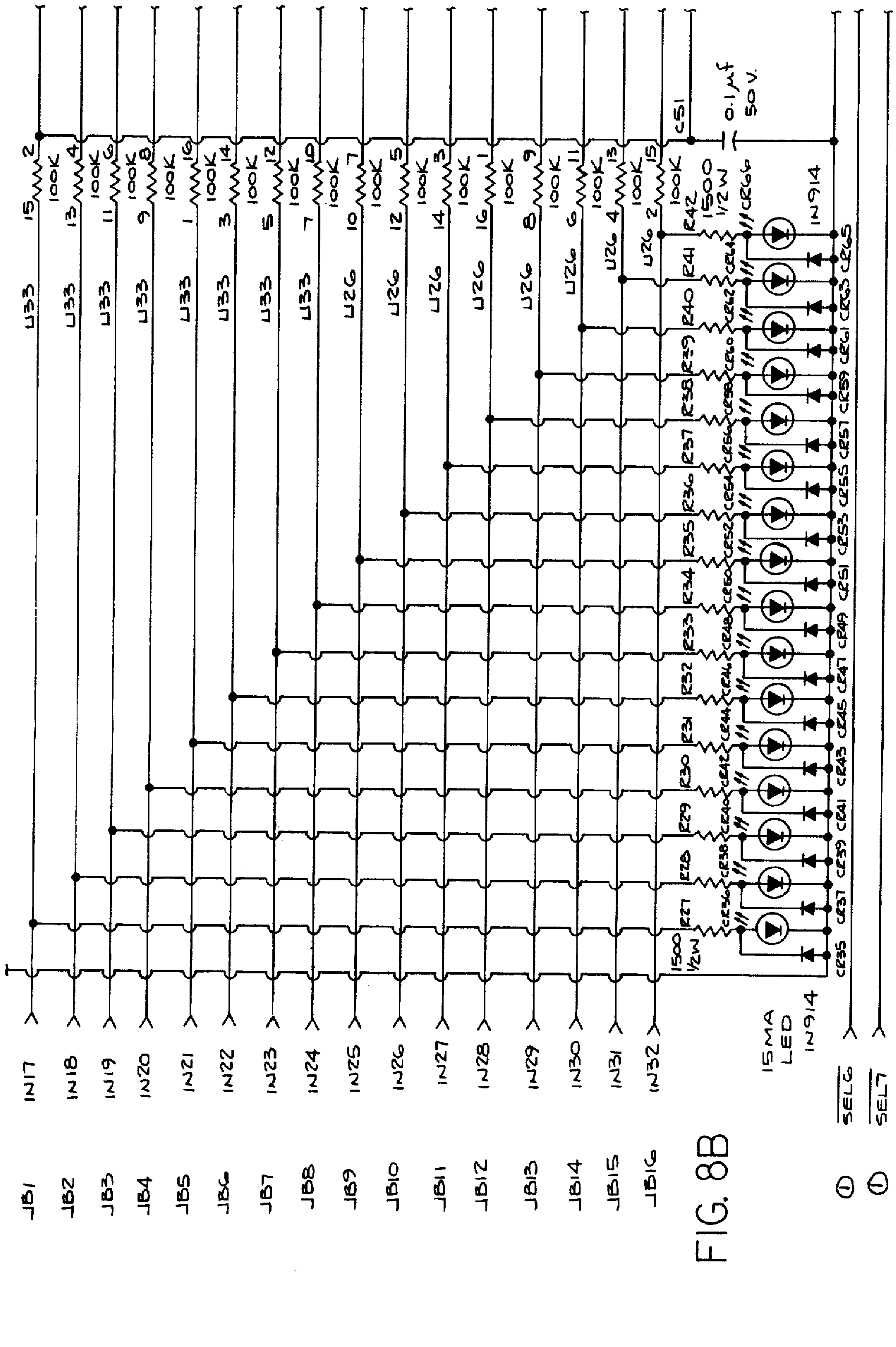
Figure 8C:
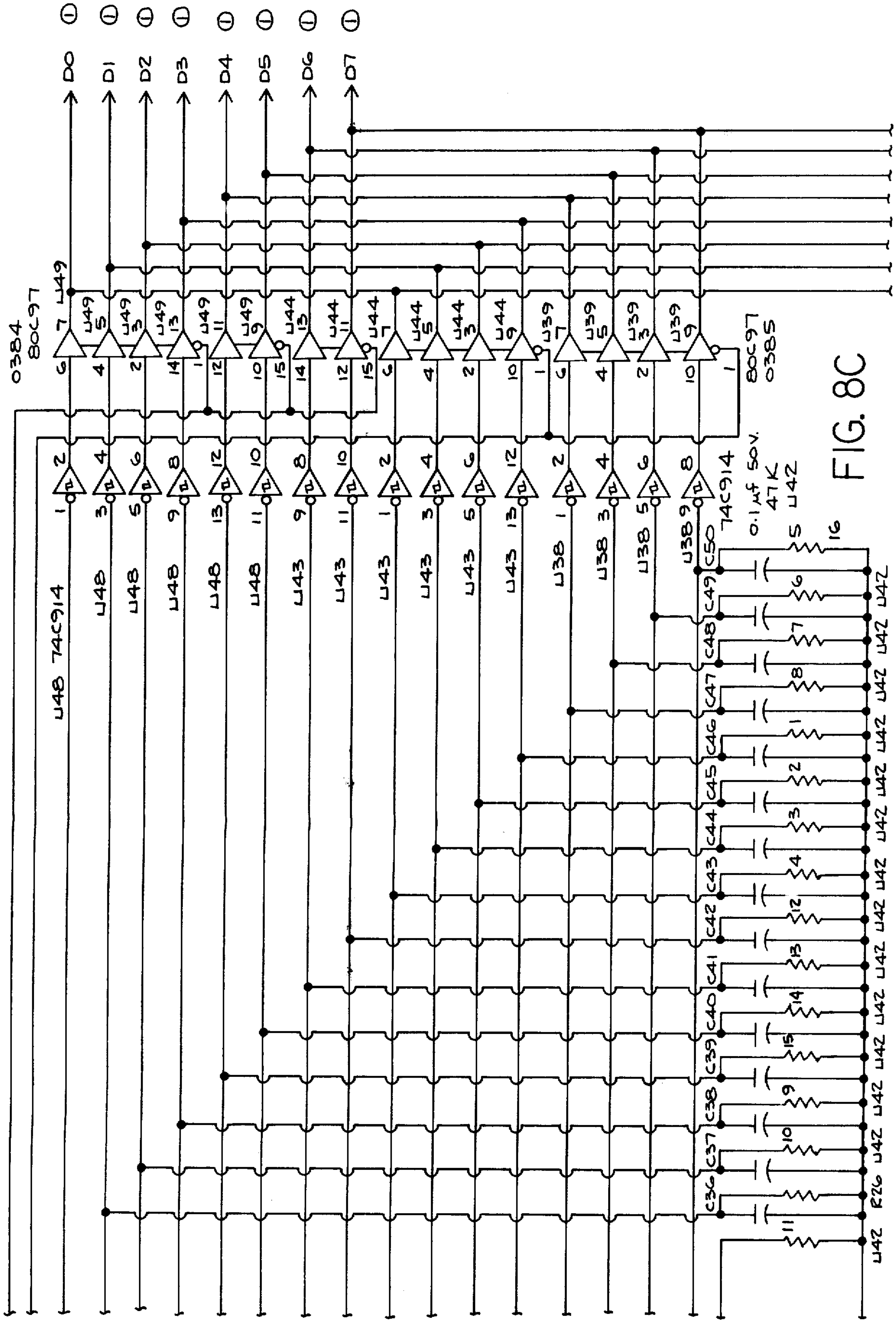
Figure 8D:
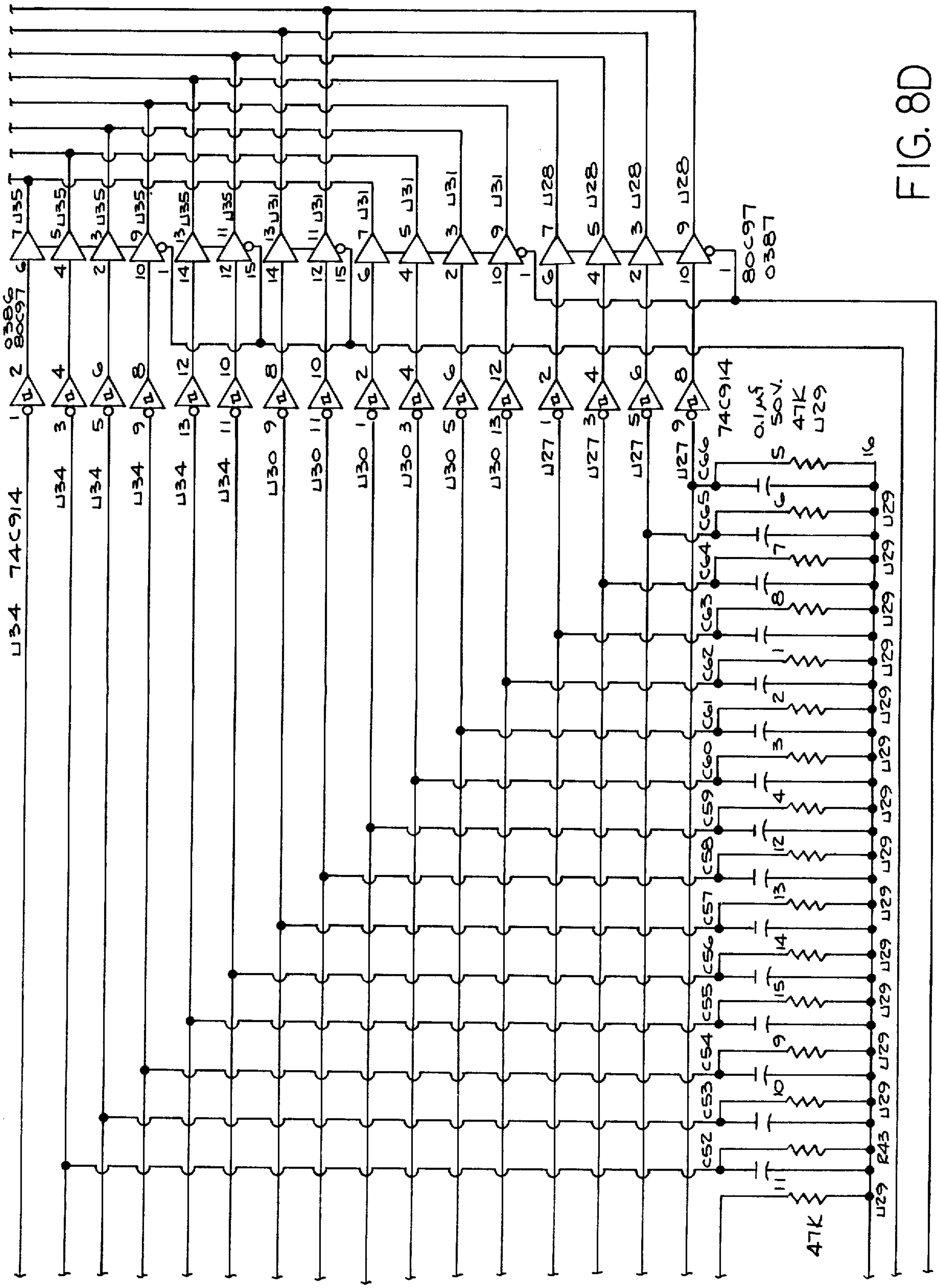
Figure 11A:
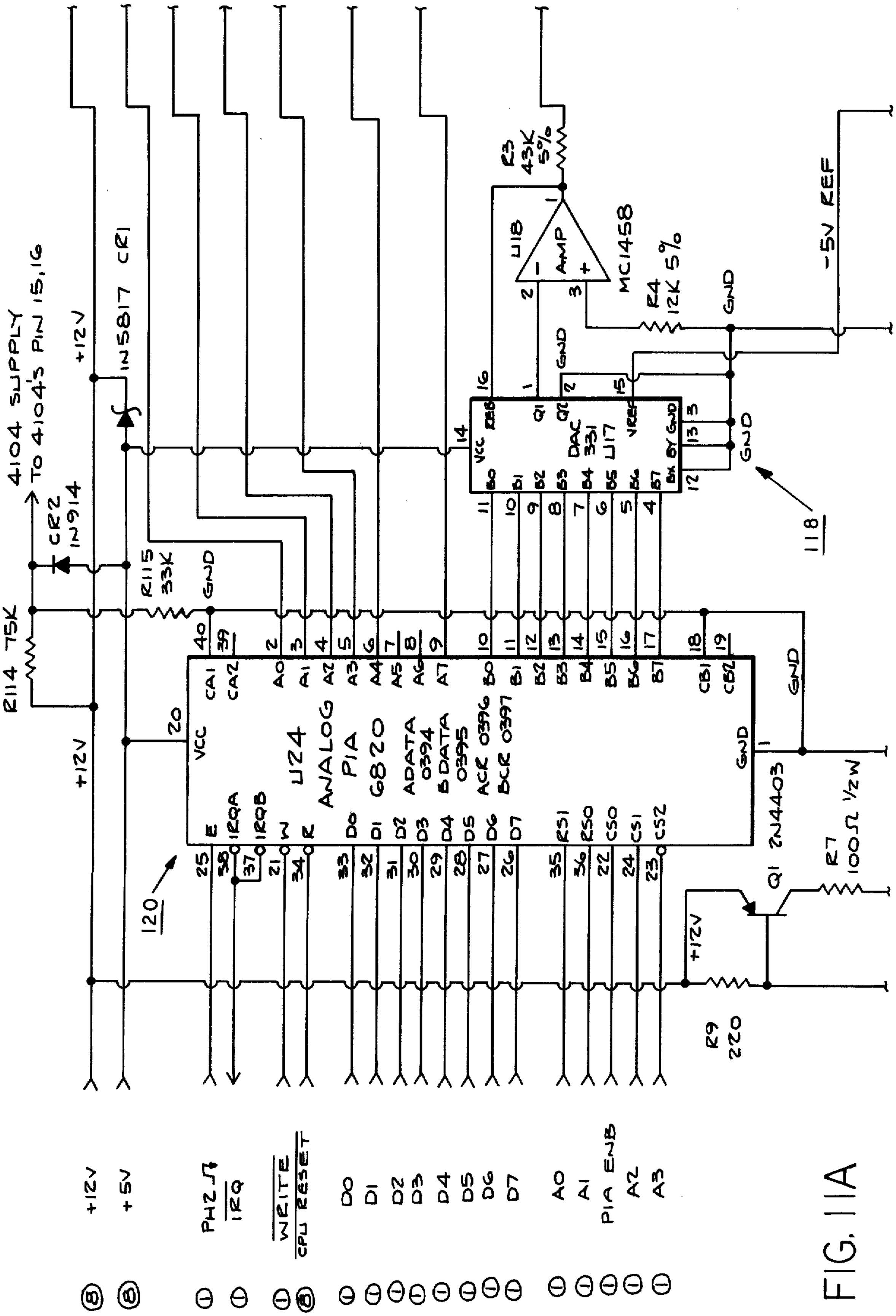
Figure 11B:
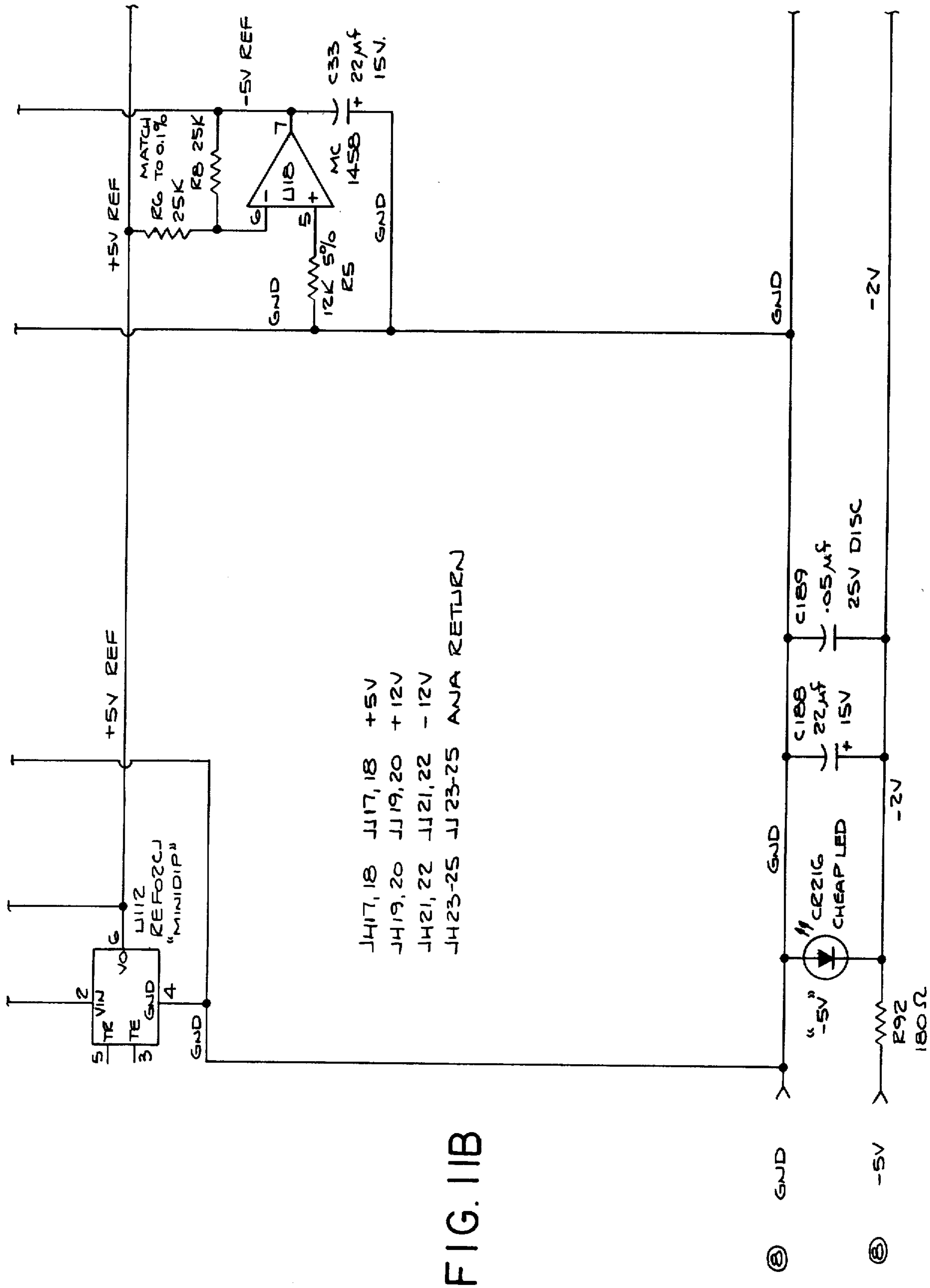
Figure 11C:
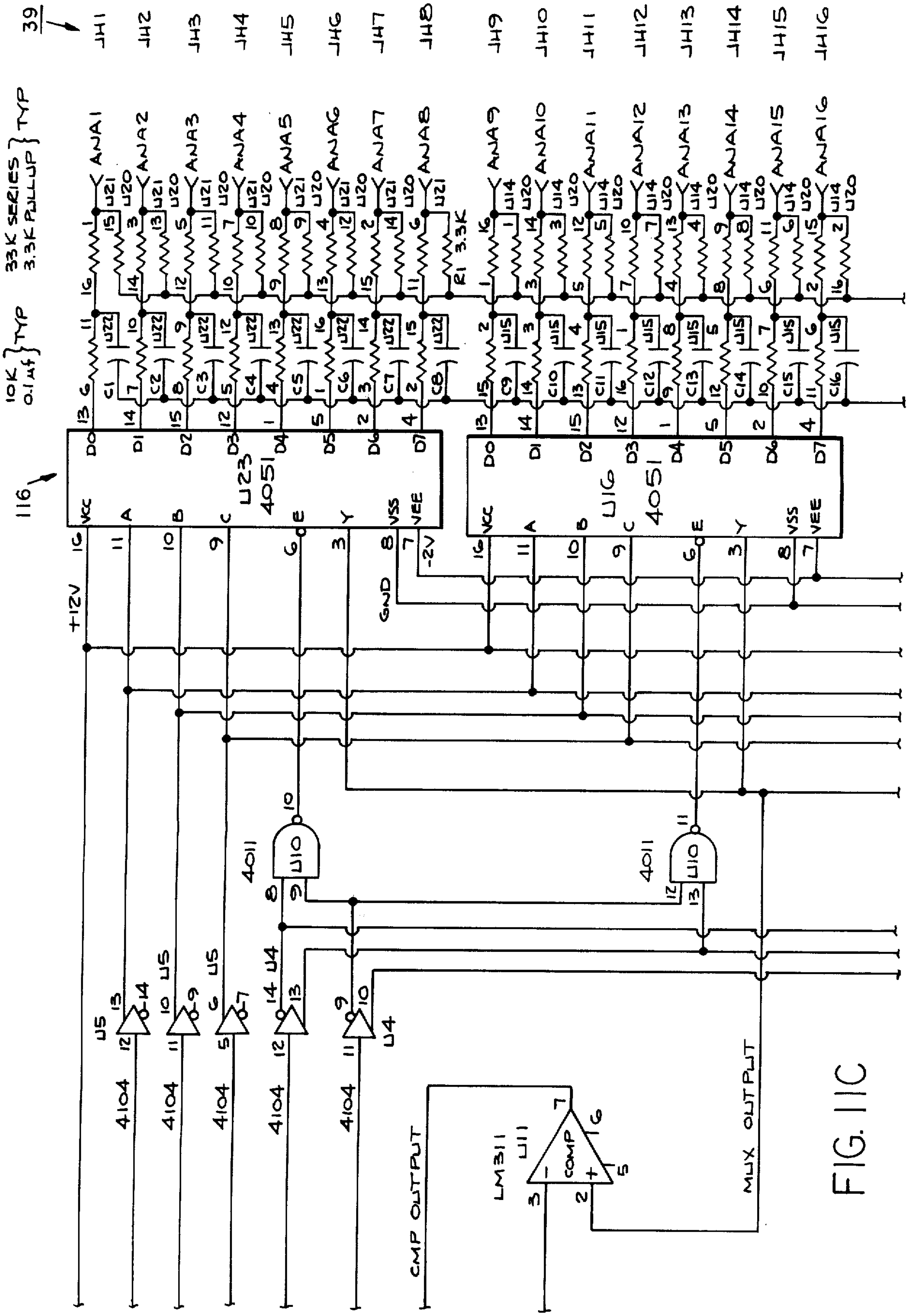
Figure 11D:
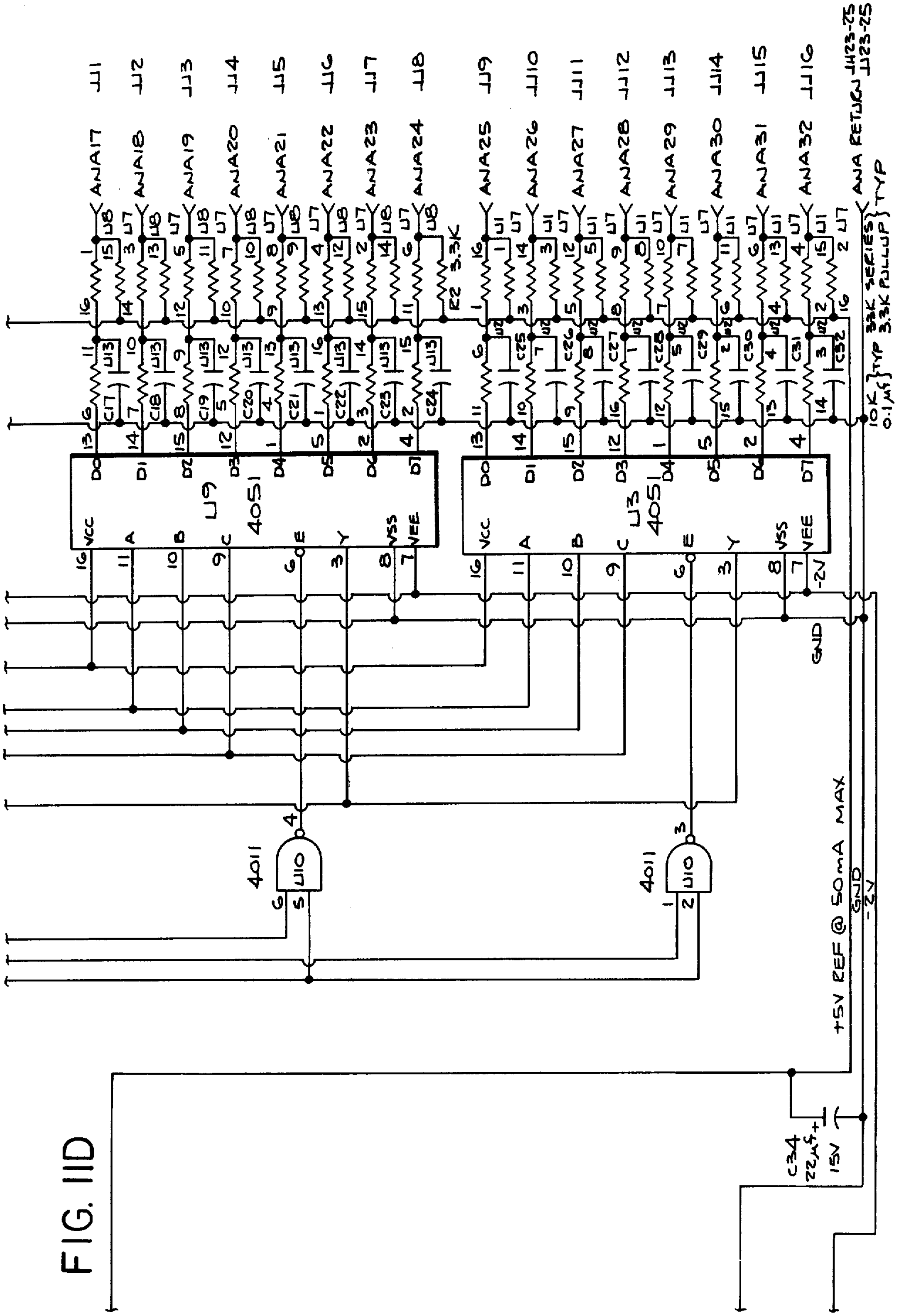
Figure 12A:
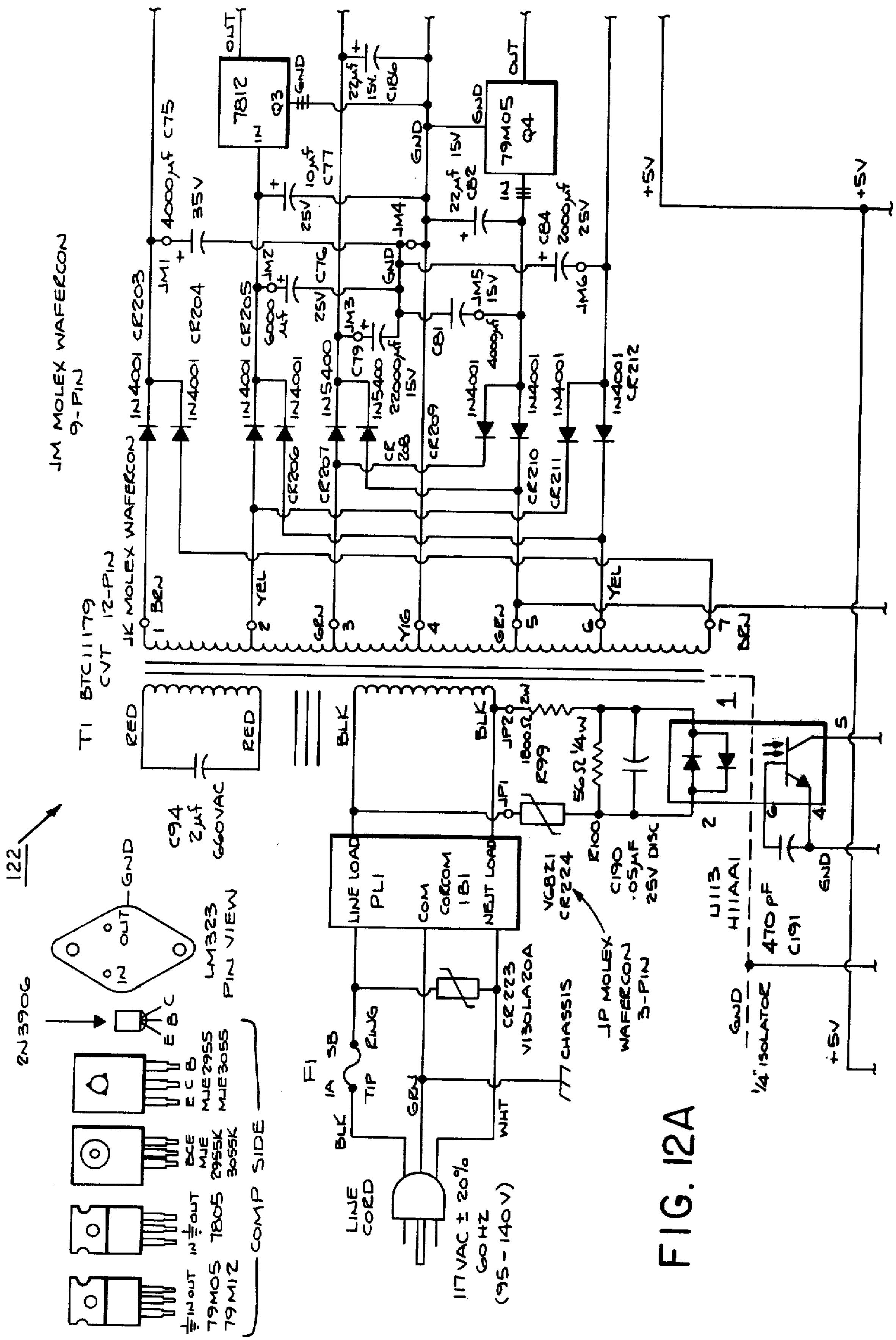
Figure 12B:
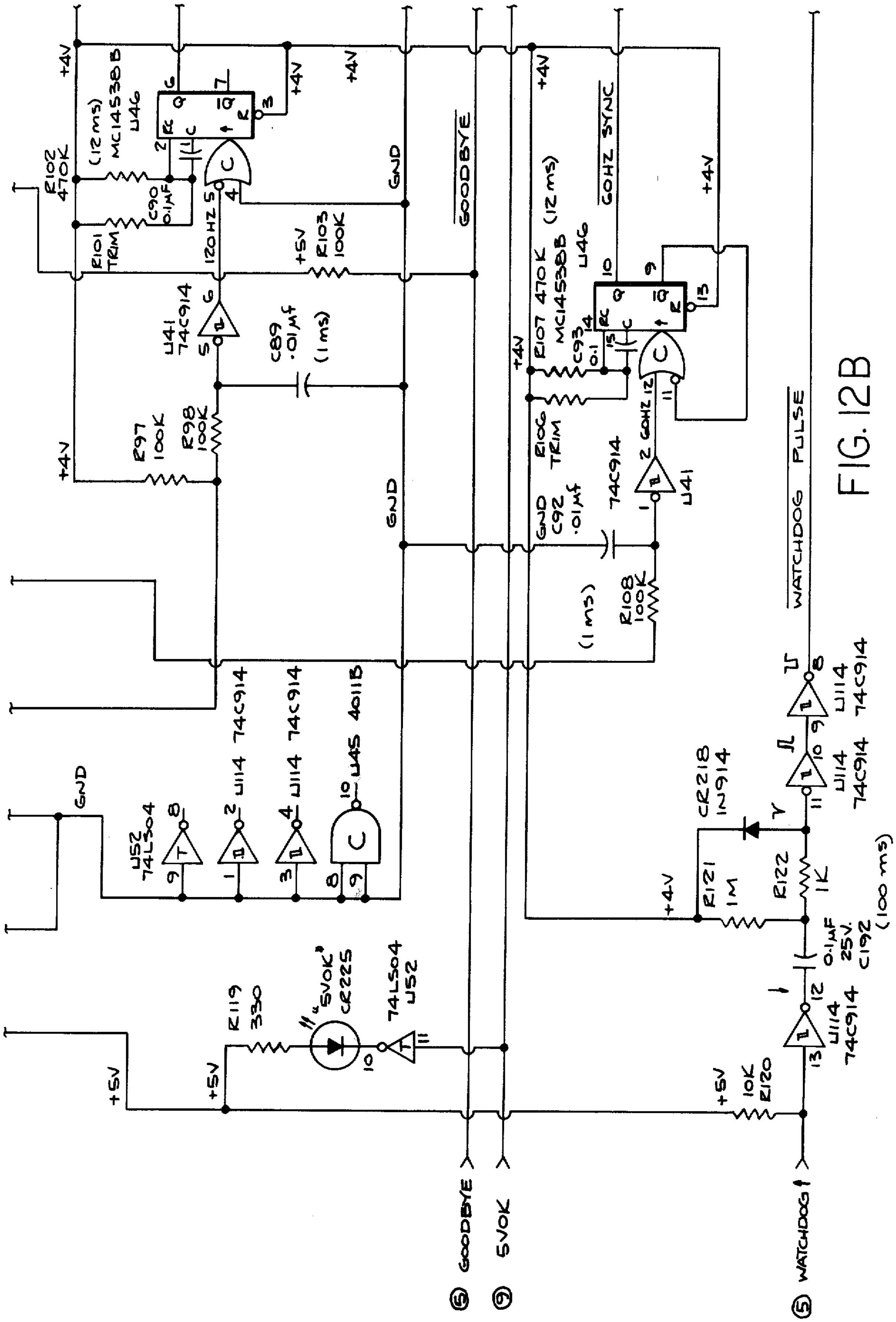
Figure 12C:
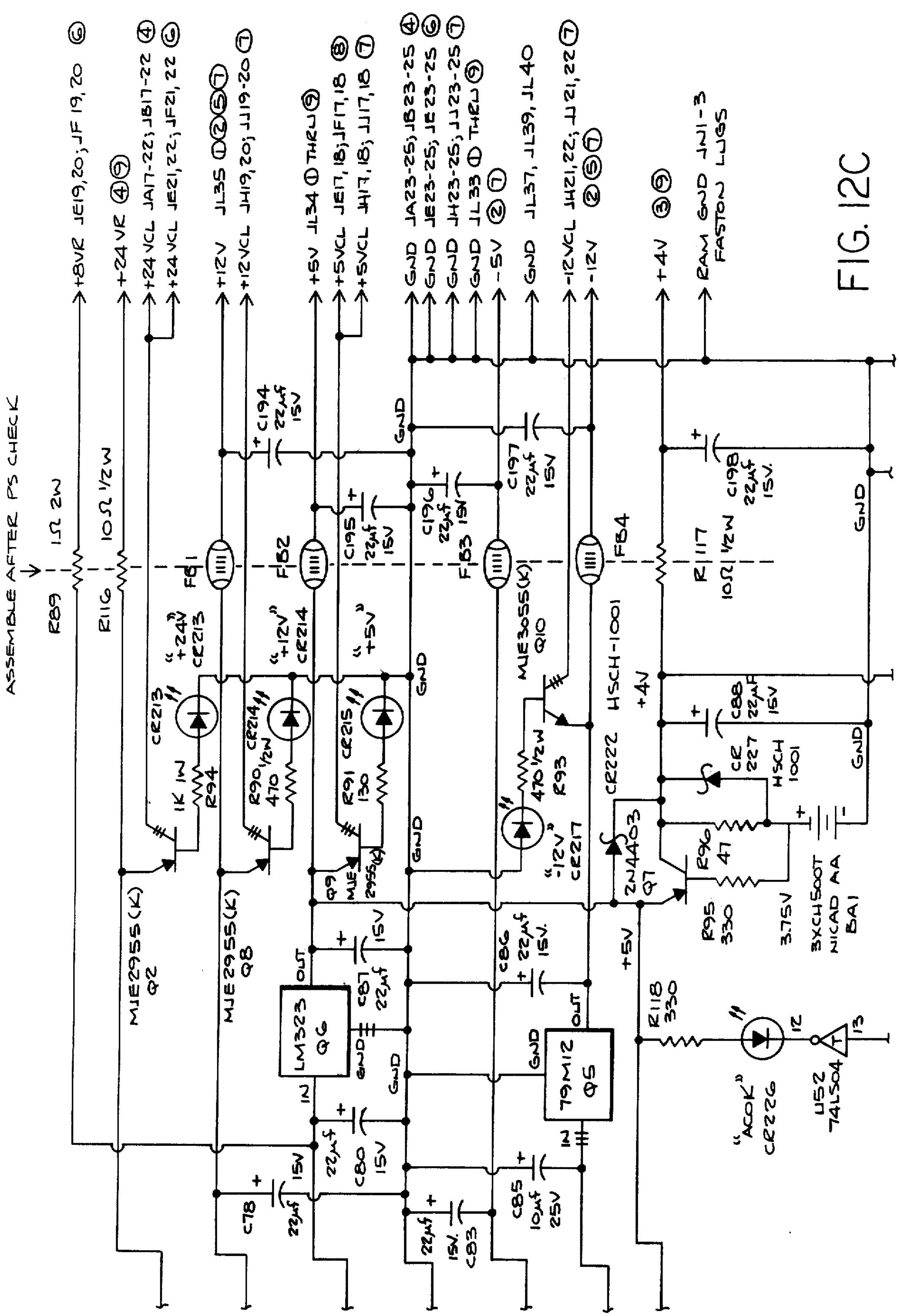
Figure 12D:
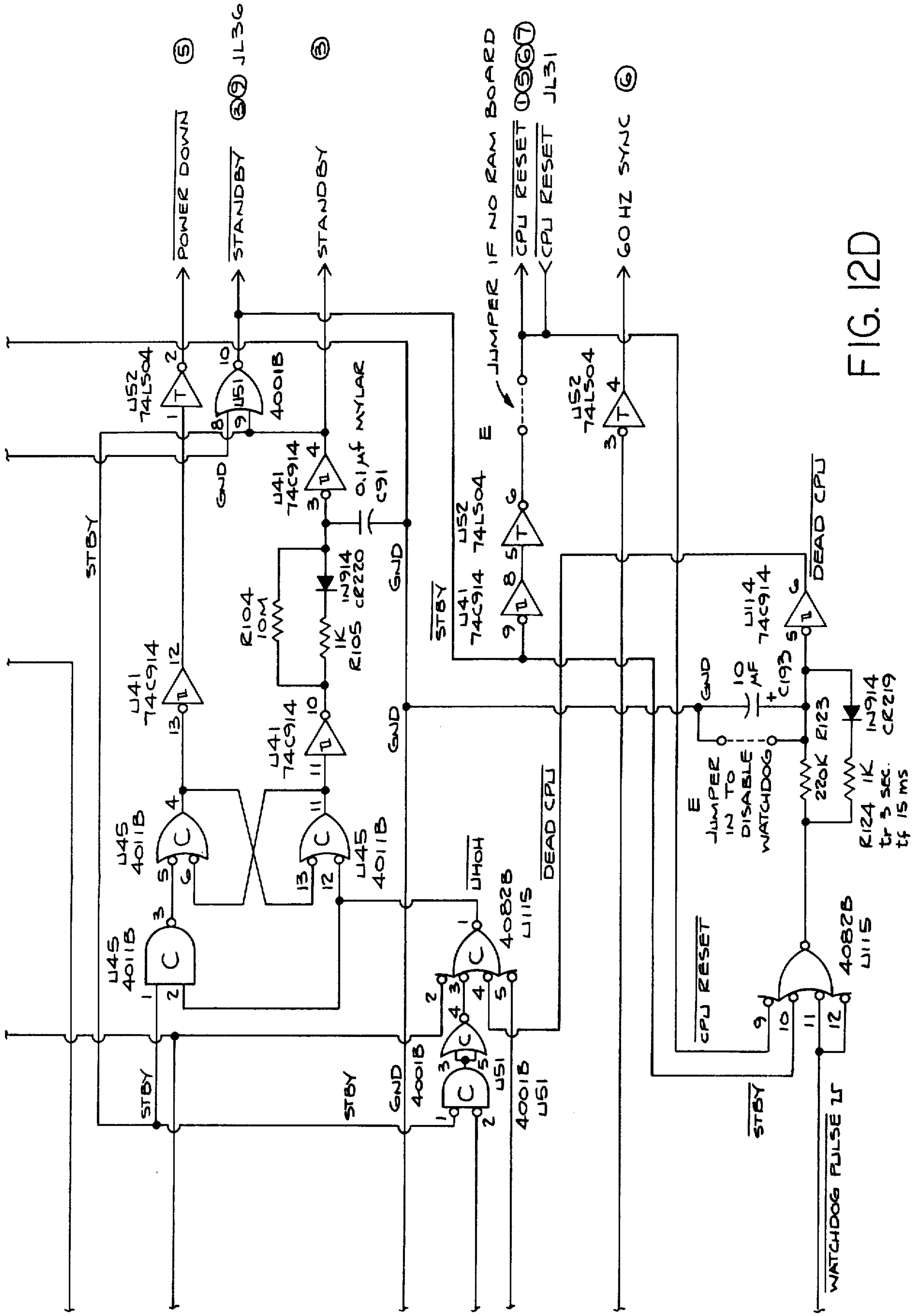
Figure 13A:
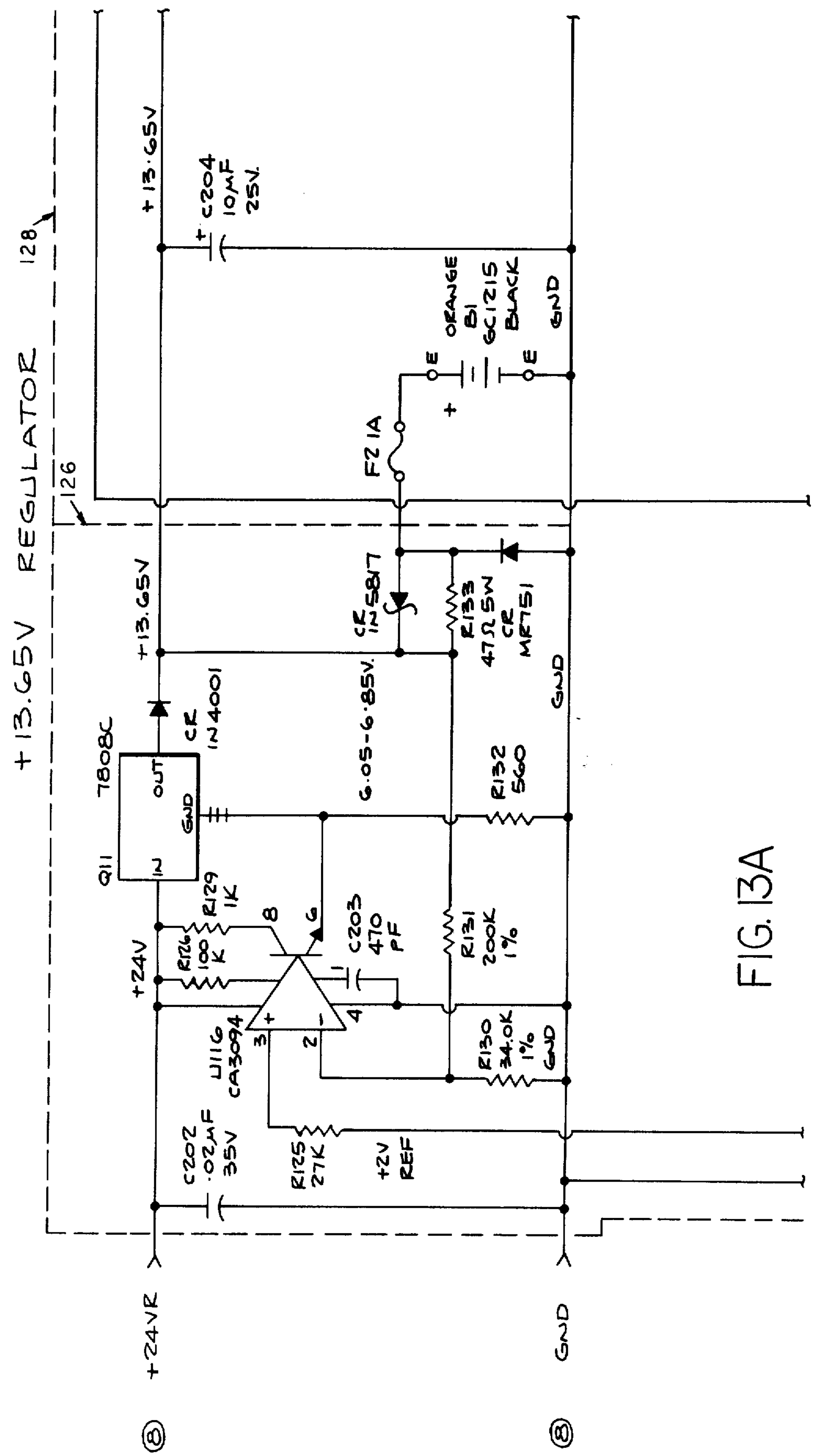
Figure 13B:
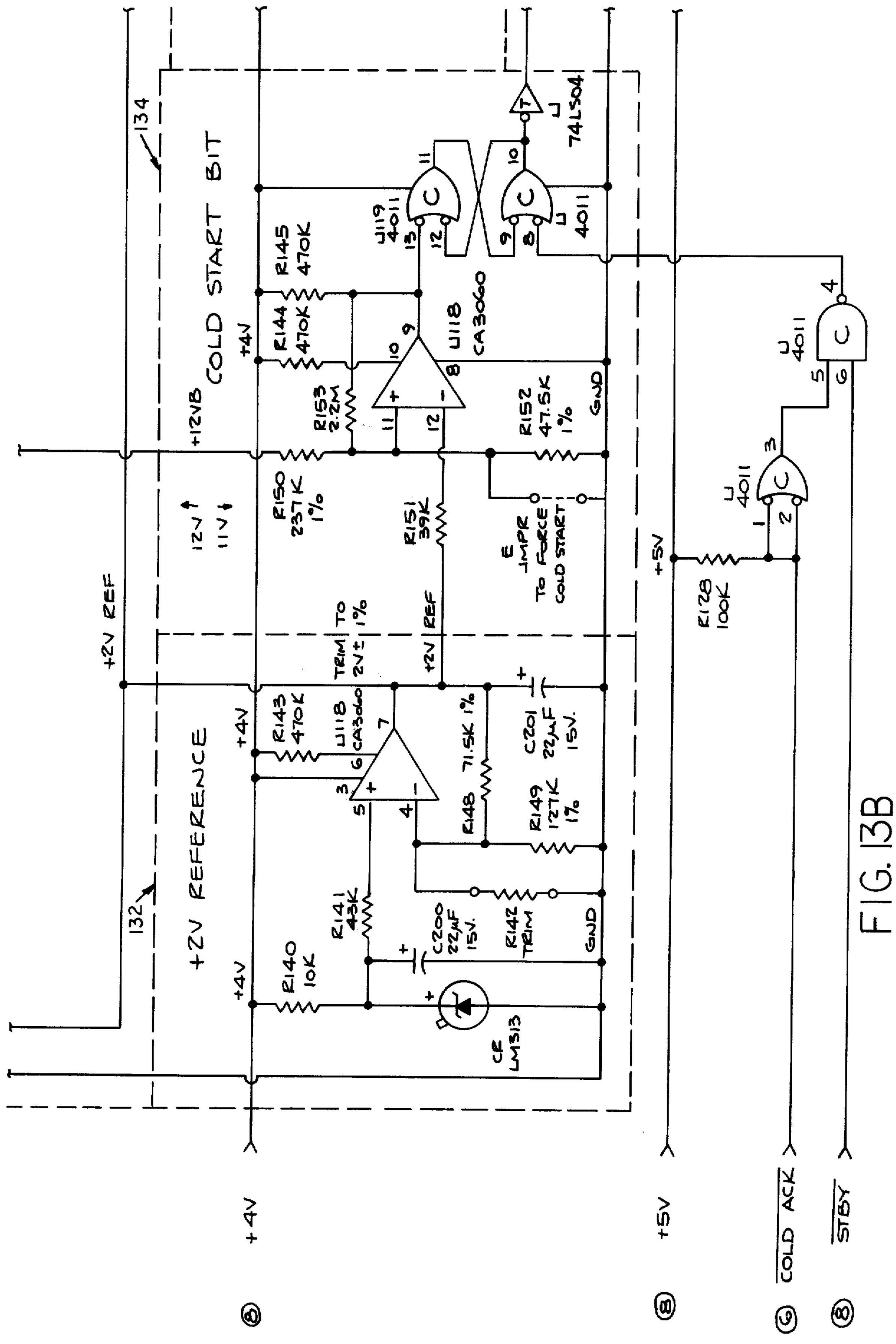
Figure 13C:
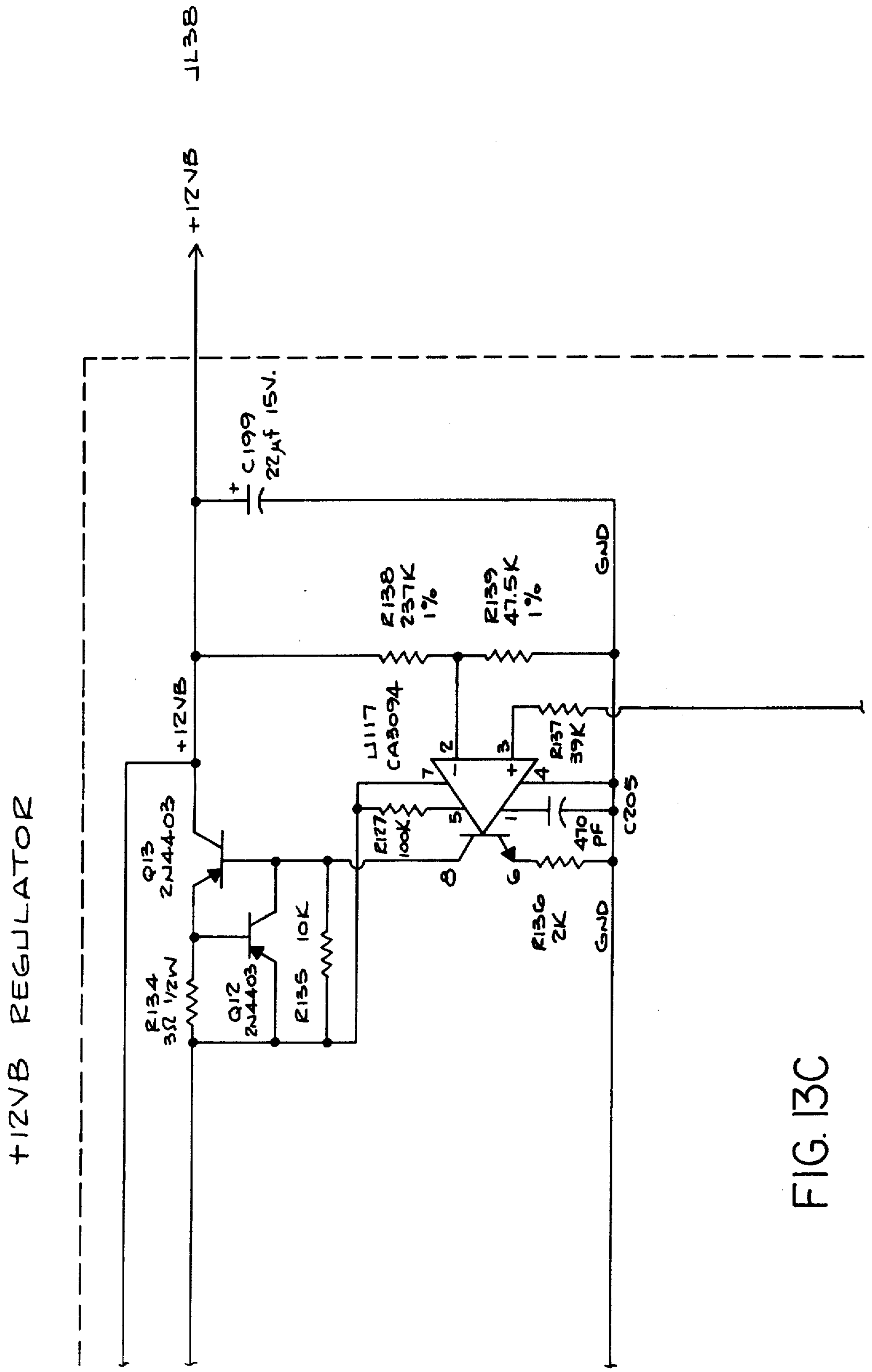
Figure 13D:
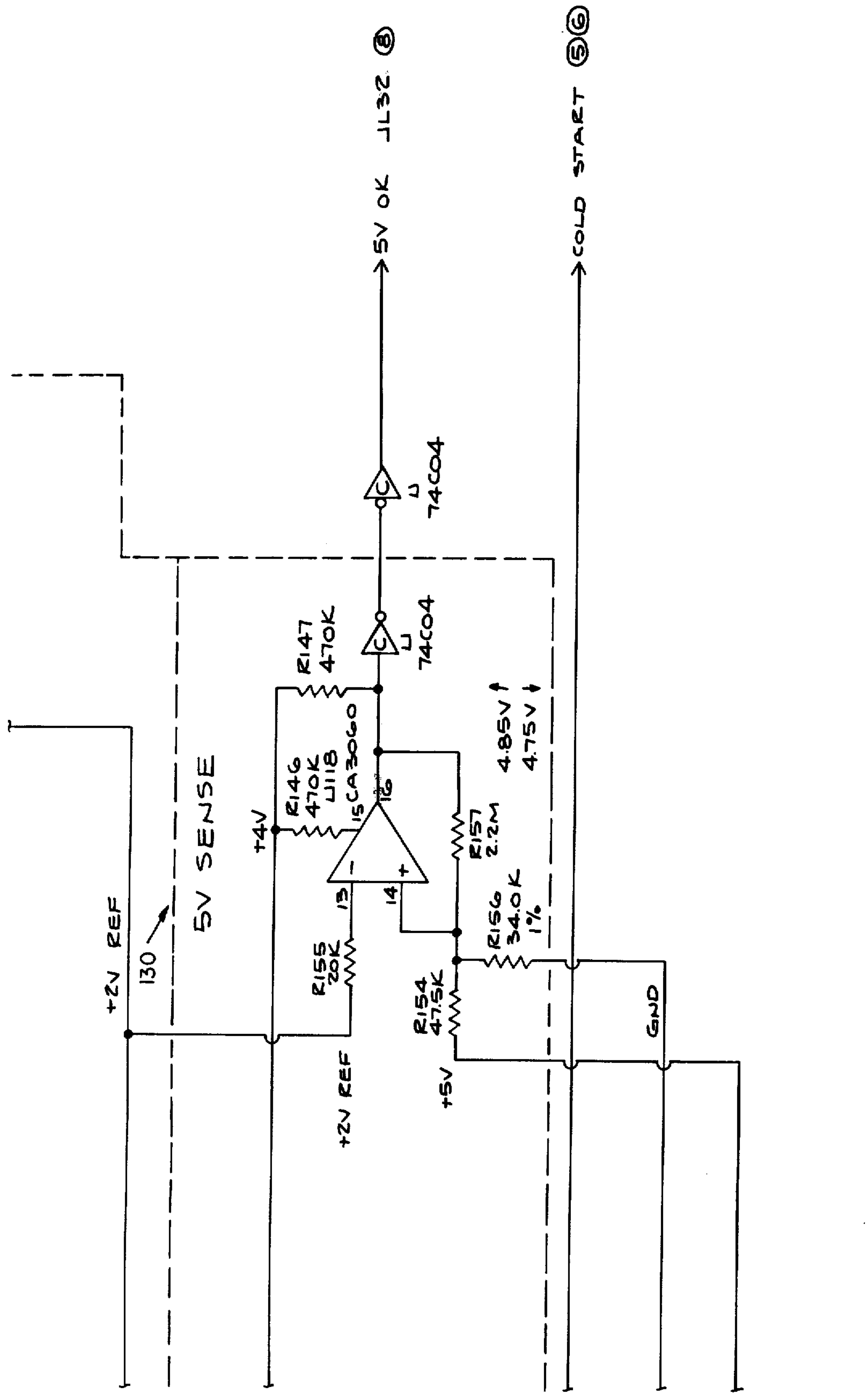

FIG. 3, comprising FIGS. 3A, 3B, and 3C, is a schematic diagram illustrating a typical system that can be controlled by the controller according to FIG. 1;

FIG. 3D is a diagram showing how FIGS. 3A, 3B and 3C are put together to form FIG. 3;

FIG. 4 is a block diagram of the controller illustrating its basic constituent parts;

FIG. 4A is a more detailed block diagram of the controller;

FIG. 5, comprising FIGS. 5A, 5B, and 5C is a schematic diagram of the central processing unit portion of the controller shown in FIG. 1;

FIG. 5D is a diagram showing how FIGS. 5A, 5B, and 5C are put together to form FIG. 5;

FIG. 6, comprising FIGS. 6A, 6B, 6C, and 6D is a schematic diagram of the read only memory portion of the controller shown in FIG. 1;

FIG. 6E is a diagram showing how FIGS. 6A, 6B, 6C, and 6D are put together to form FIG. 6;

FIG. 7, comprising FIGS. 7A, 7B, and 7C, is a schematic diagram of the non-volatile random access memory and clock-calendar of the controller shown in FIG. 1;

FIG. 7D is a diagram showing how FIGS. 7A, 7B, and 7C are put together to form FIG. 7;

FIG. 8, comprising FIGS. 8A 8B, 8C, and 8D is a schematic diagram of the digital input portion of the controller shown in FIG. 1;

FIG. 8E is a diagram showing how FIGS. 8A, 8B, 8C, and 8D are put together to form FIG. 8;

FIG. 9, comprising FIGS. 9A, 9B, 9C and 9D, is a schematic diagram of the communications input/output portion of the controller shown in FIG. 1 as well as communication between the controller and the power supply of the controller;

FIG. 9E is diagram showing how FIGS. 9A, 9B, 9C, and 9D are put together to form FIG. 9;

FIG. 10, comprising FIGS. 10A, 10B, 10C, and 10D is a schematic diagram of the digital output drivers of the controller shown in FIG. 1;

FIG. 10E is a diagram showing how FIGS. 10A, 10B, 10C, and 10D are put together to form FIG. 10;

FIG. 11, comprising FIGS. 11A, 11B, 11C, and 11D, is a schematic diagram of the analog input portion of the controller shown in FIG. 1;

FIG. 11E is a diagram showing how FIGS. 11A, 11B, 11C, and 11D are put together to form FIG. 11;

FIG. 12, comprising FIGS. 12A, 12B, 12C, and 12D is a schematic diagram of the power supply including a portion of the circuitry for communicating power-down, power-up situations to and from the remainder of the controller shown in FIG. 1;

FIG. 12E is a diagram showing how FIGS. 12A, 12B, 12C, and 12D are put together to form FIG. 12;

FIG. 13, comprising FIGS. 13A, 13B, 13C, and 13D, is a schematic diagram of the battery control portion of the controller shown in FIG. 1; FIG. 13E is a diagram showing how FIGS. 13A, 13B, 13C, and 13D are put together to form FIG. 13.

Figure 14:
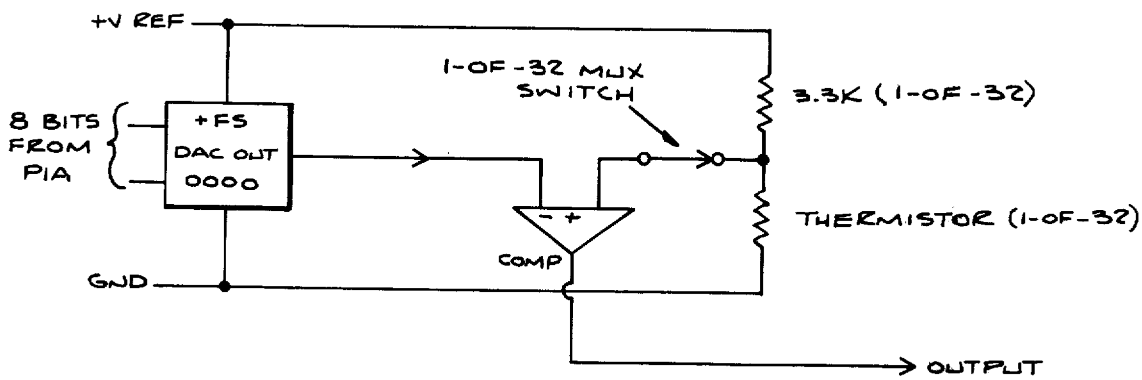
Figure 15:
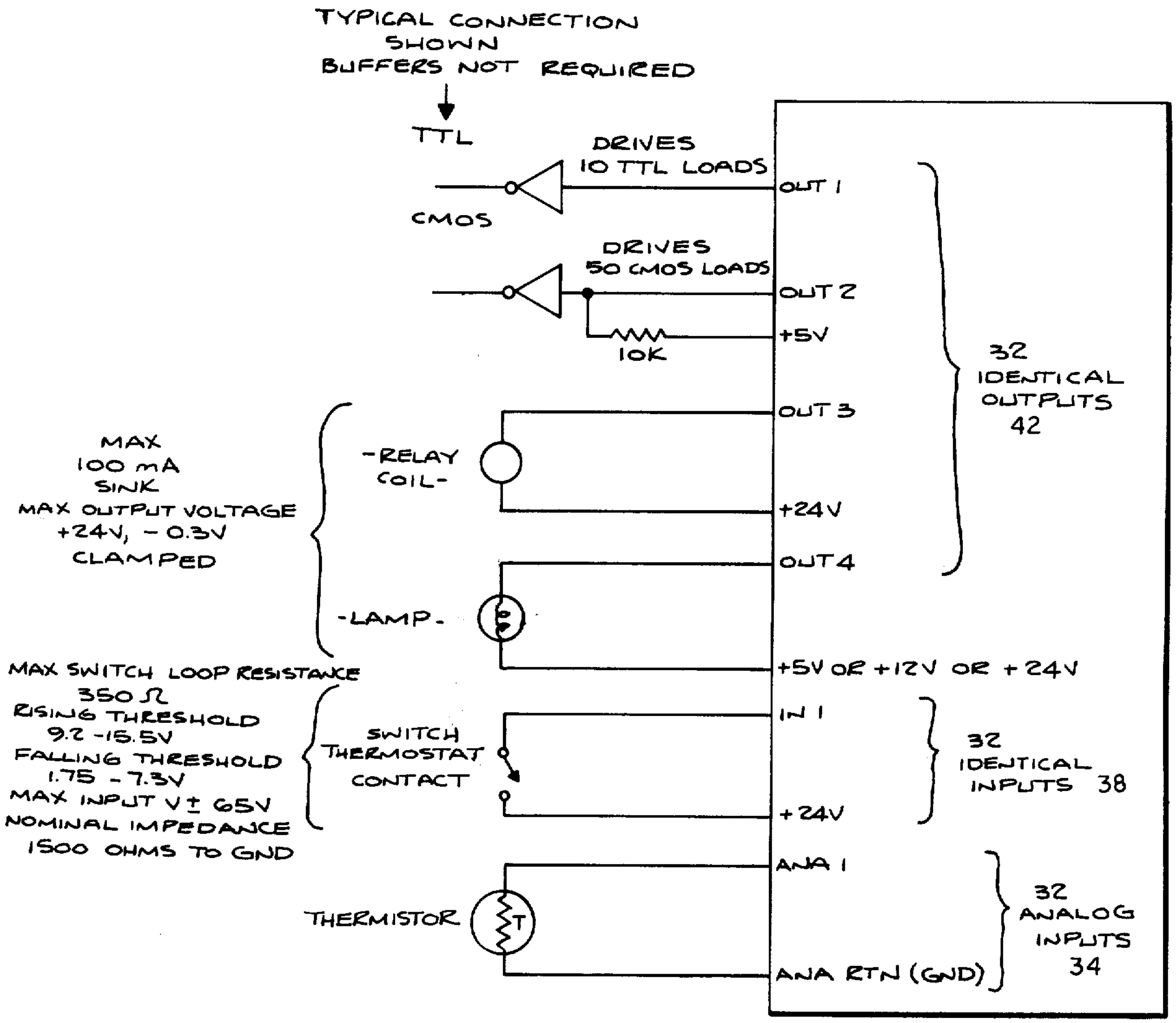
Figure 16A:
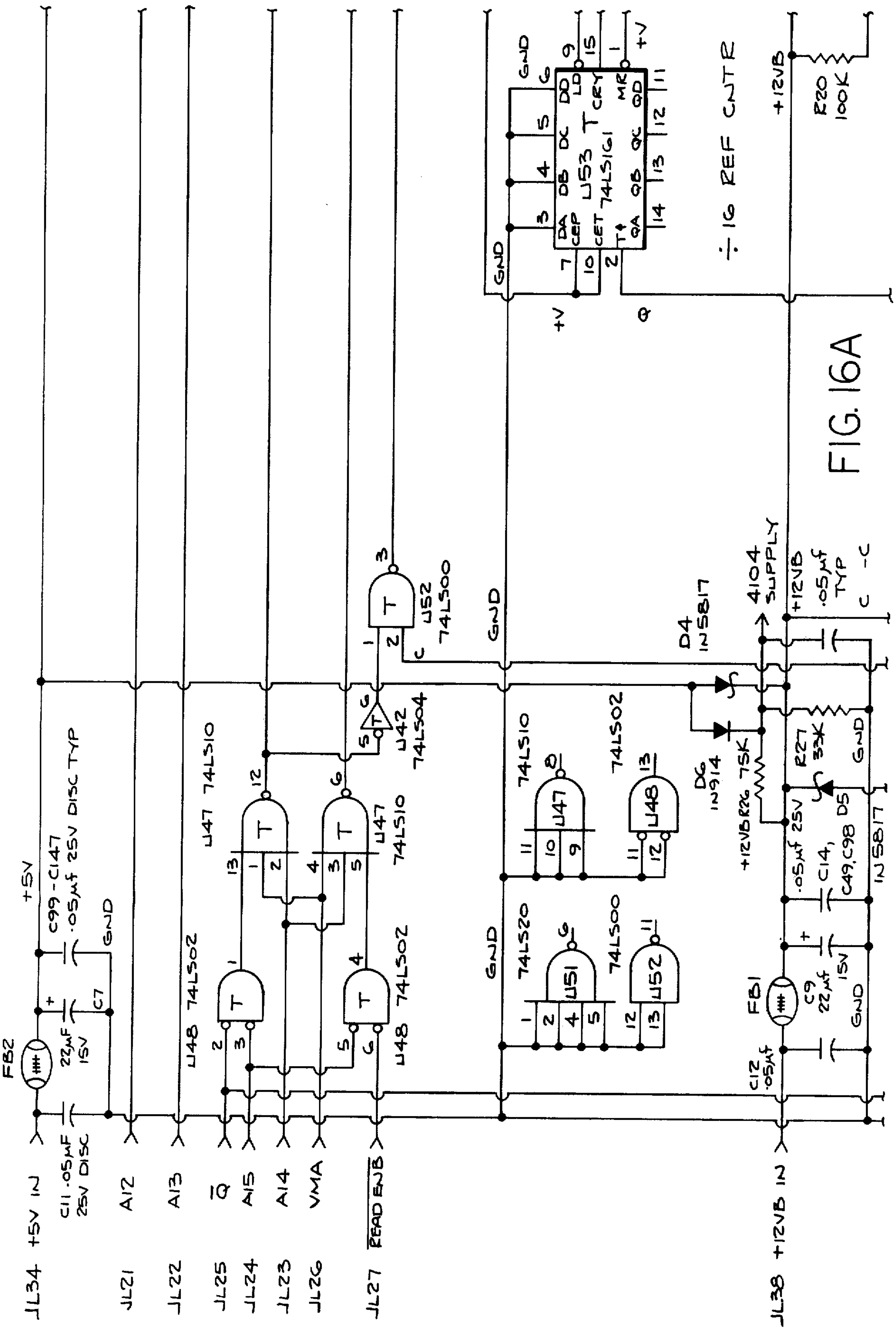
Figure 16B:
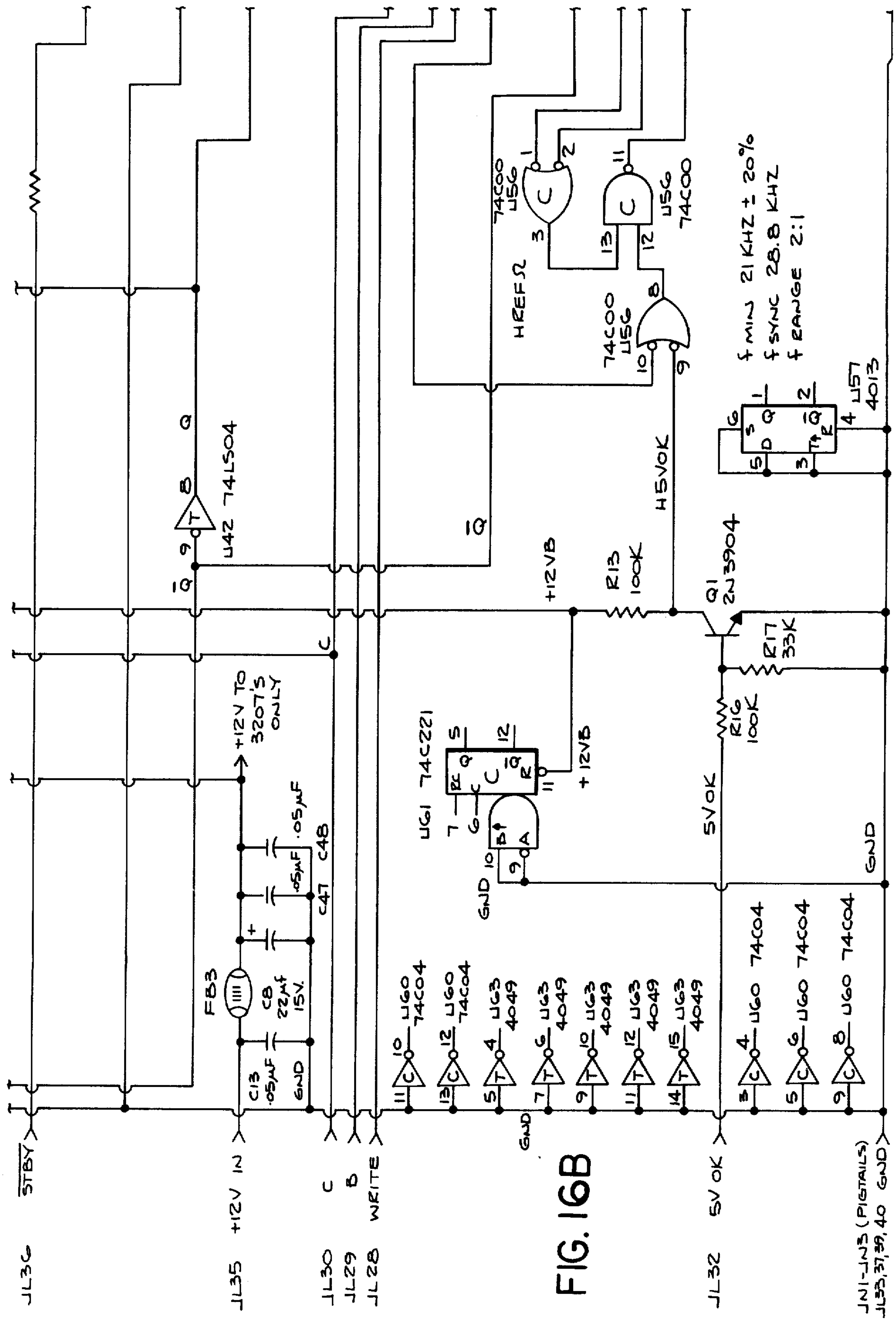
Figure 16C:
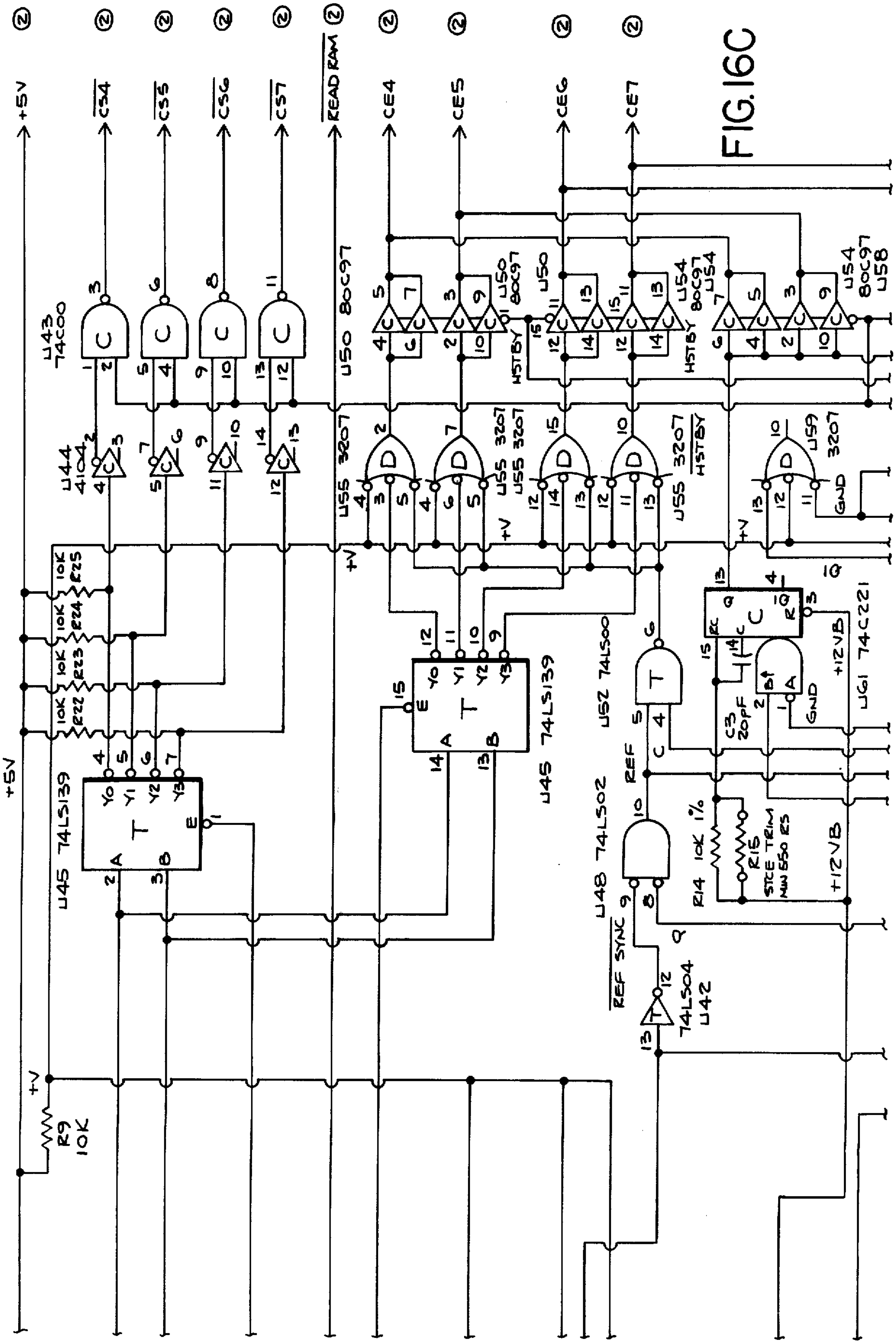
Figure 16D:
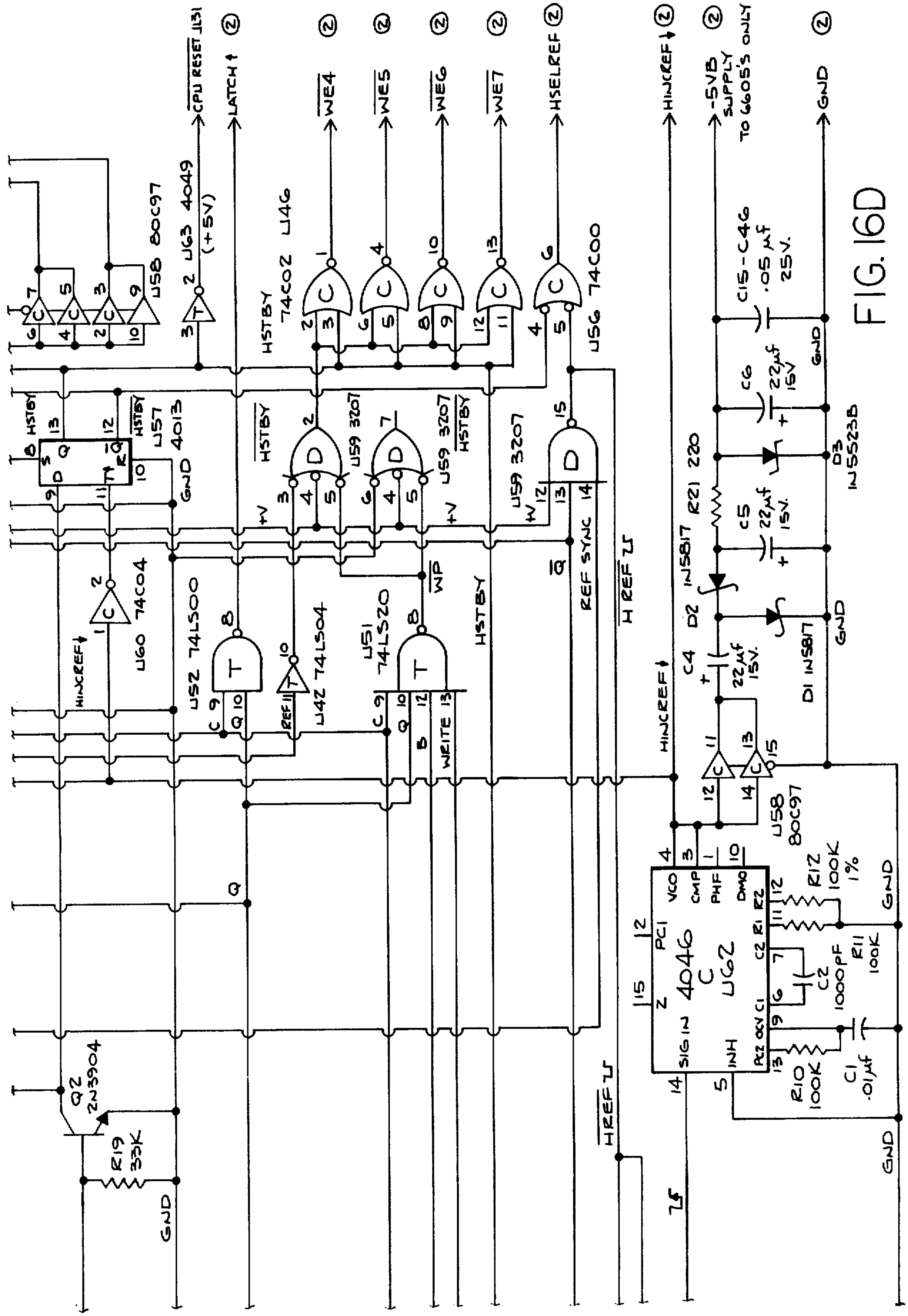
Figure 17A:
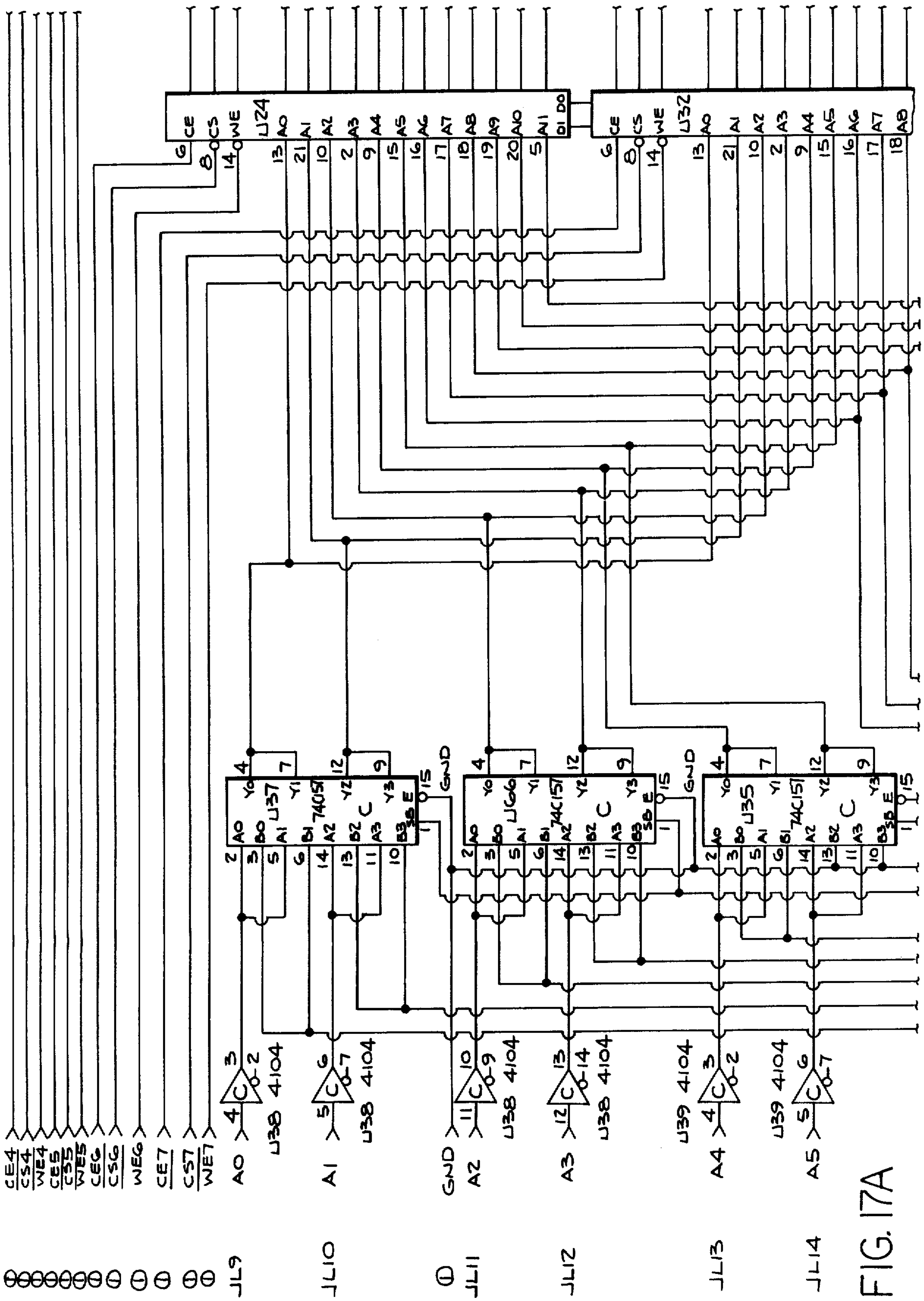
Figure 17B:
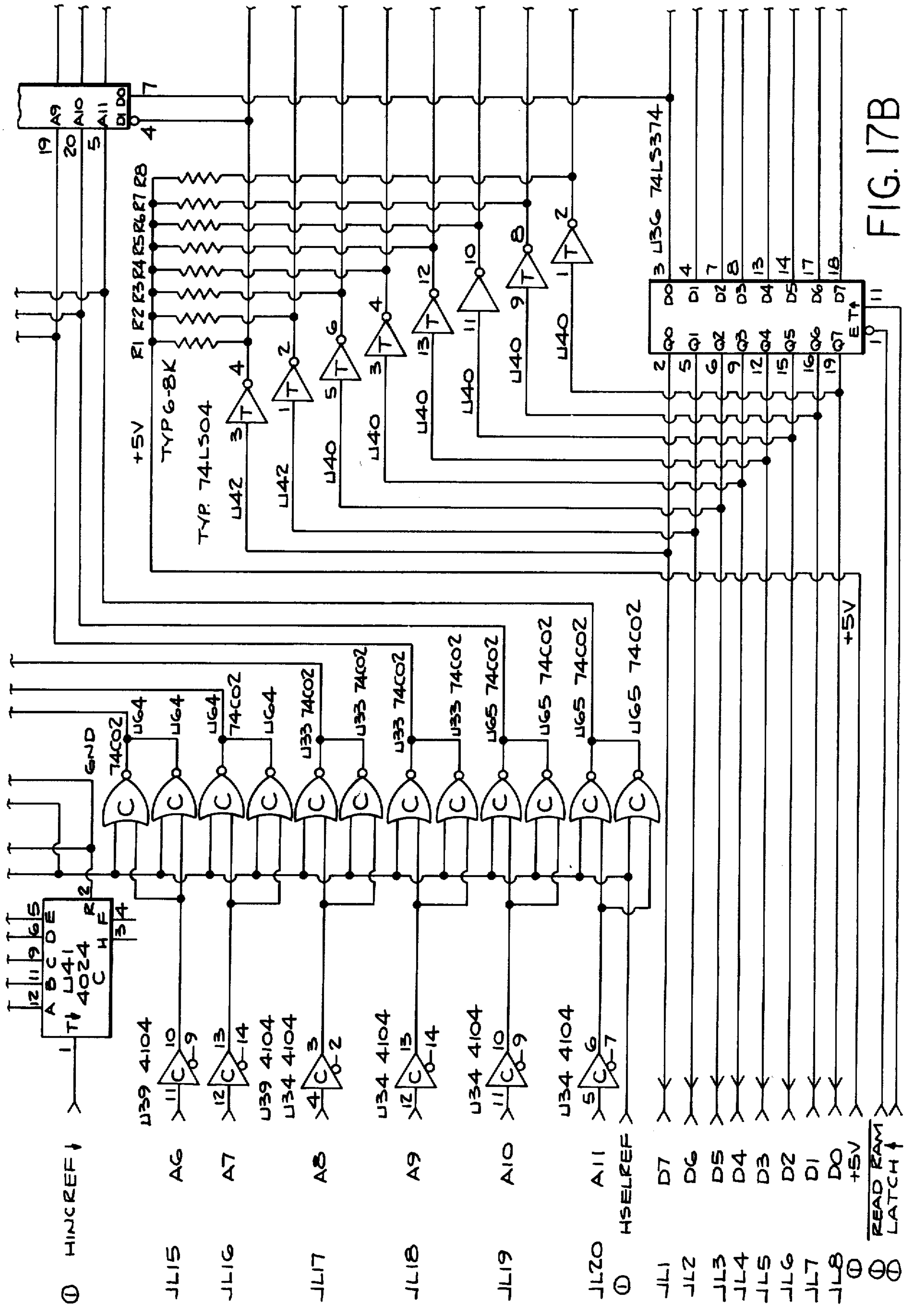
Figure 17C:
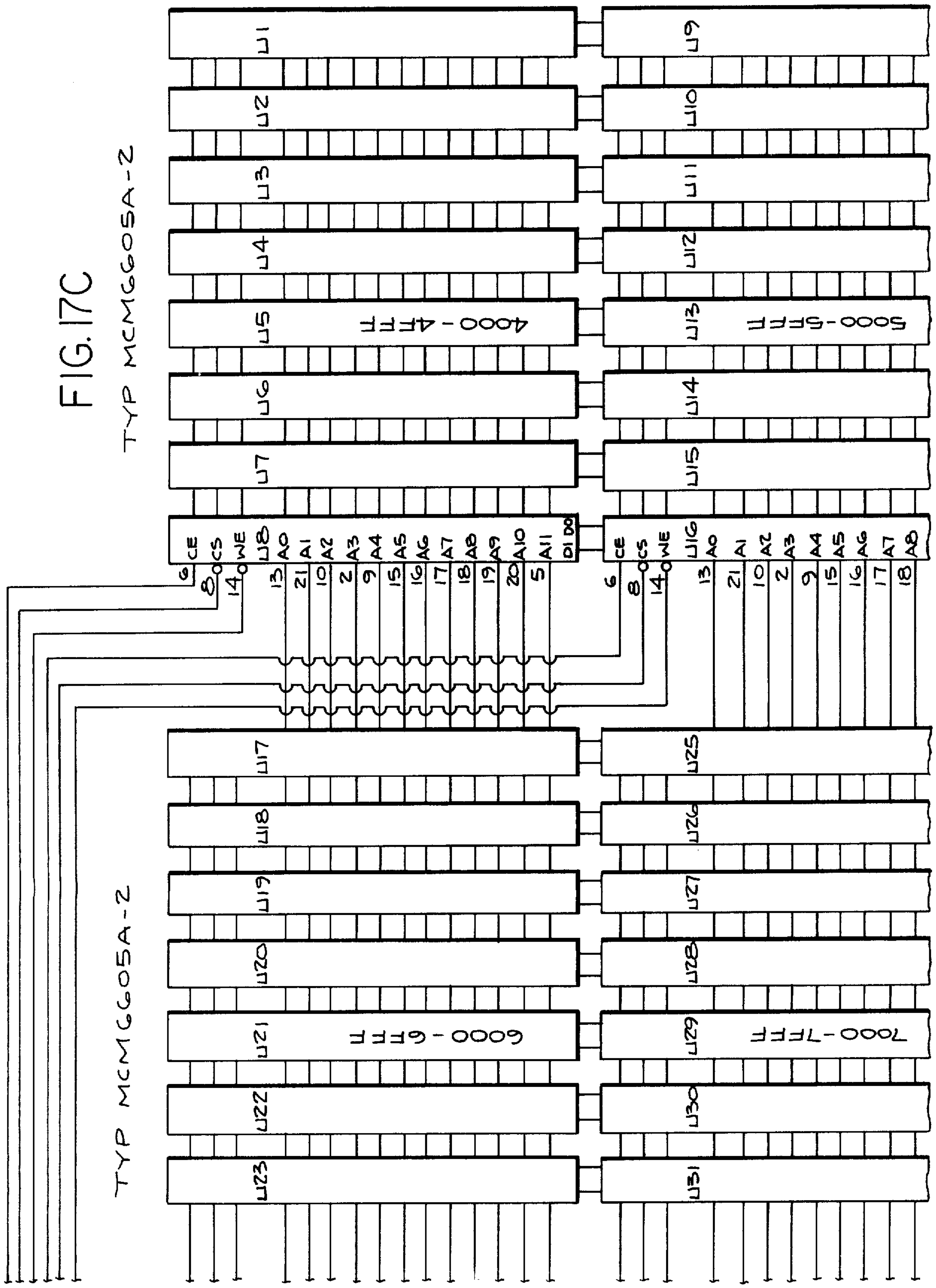
Figure 17D:
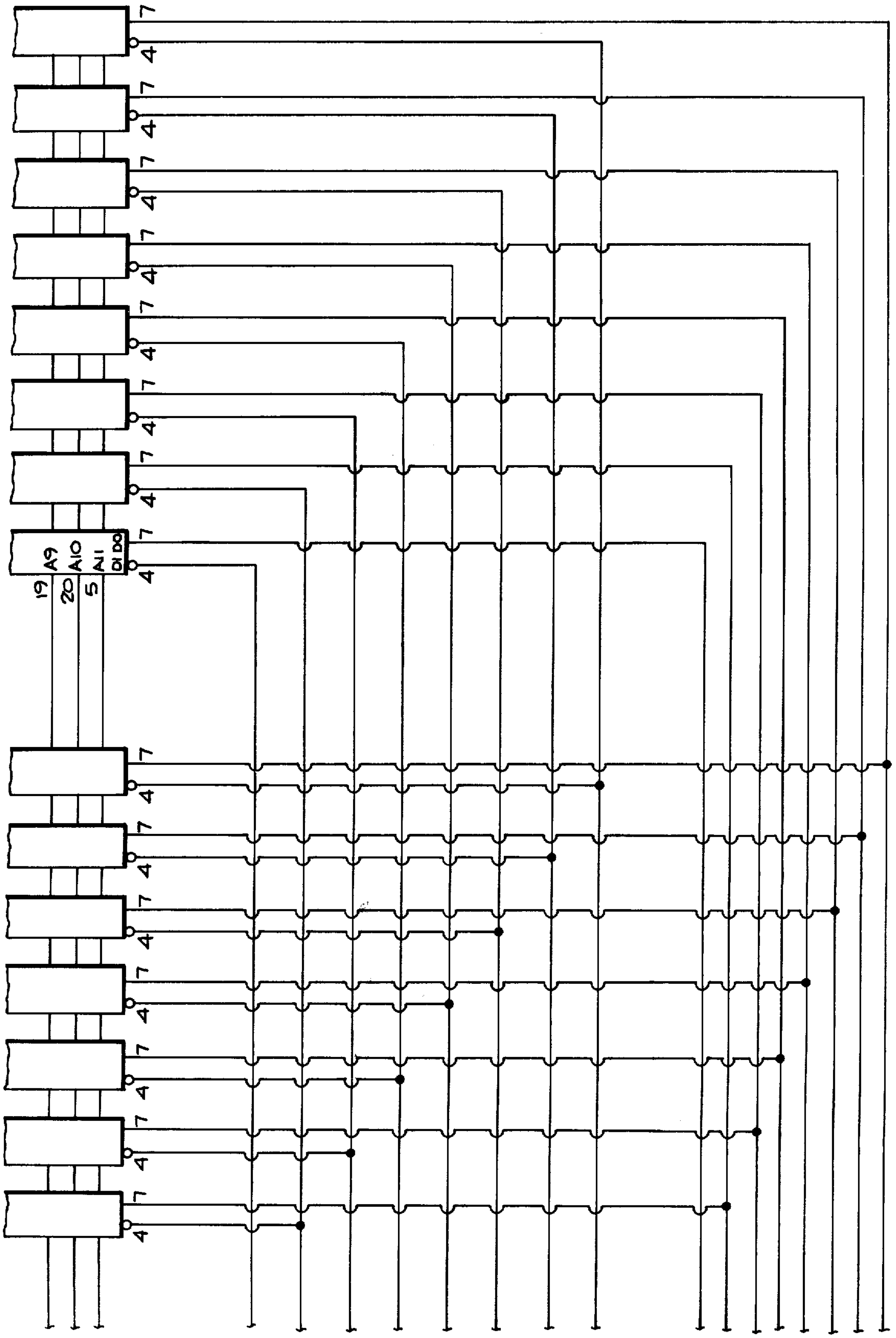

FIG. 14 is a detail schematic of a representative analog input and its comparison with a preset value;

FIG. 15 is a detail diagrammatic schematic of the input/output configuration of the controller;

FIG. 16, comprising FIGS. 16A, 16B, 16C, and 16D is a schematic diagram of the timing and control portions of a 16K byte volatile random access memory used in the controller shown in FIG. 1;

FIG. 16E is a diagram showing how FIGS. 16A, 16B, 16C, and 16D are put together to form FIG. 16;

FIG. 17, comprising FIGS. 17A, 17B, 17C, and 17D, is a schematic diagram of the memory plane and buffers of the 16K random access memory shown in FIG. 16; and FIG. 17E is a diagram showing how FIGS. 17A, 17B, 17C, and 17D are put together to form FIG. 17.

DETAILED DESCRIPTION

As can best be seen in FIG. 1, a programmable sequence controller 20 according to the present invention utilizes five interfaces with the external world for its operation. The first interface is a power interface 22 for receipt of 117 VAC 60 cycle input power. The controller and the associated power supply therewith accepts power over a wide range, typically from 90 to 130 VAC and will tolerate momentary drops in the line voltage with little or no error. As will be explained more fully later, a battery backup is also provided for maintaining power to certain portions of the controller during utility outages.

A second interface is a computer or communications link 24 that is coupled to a data communications device 26 for the transfer of data to and from the controller. The communications link utilizes full duplex EIA RS232C variable baud inputs and outputs. The computer link is character asynchronously organized utilizing ASCII code. This computer link can be "daisy-chained" via cable 28 for interconnection to a second programmable sequence controller 20' which may in turn communicate with other programmable sequence controllers or a master control device such as a digital computer. In order to have this daisy-chain capability, the controller 20 has an input communications connector 30 and an output communications connector 32 for receipt of the computer communications link 24 and the daisy-chain cable 28 respectively. This daisy-chain capability of transmitting information to and from the controller and a data communications device with the concurrent capability of transferring the data to other program sequence controllers provides for management system capability utilizing a multiplicity of program sequence controllers.

A third class of interface is the analog inputs link 34 which can communicate with the controller up to 32 analog inputs from an external system 36, such as a heating and cooling system for a building. These analog inputs are primarily intended for thermistor or temperature sensing. The analog inputs may also be used as an 8-bit voltage or current sensing analog input having a five volt full scale range. Input options are also available to accept four to ten milliamperes on any of the commonly accepted interface standards used in the temperature and process control areas.

A fourth class of interface is the digital inputs link 38 which can transfer data of up to 32 switches 40 associated with the external system. These switches are typically thermostats, manual mode switches, valve closures, level sensing devices, and similar ON-OFF devices. These closures connect a 24 volt input power to the controller for signifying the closure of the contact.

The last class of interface is the digital output link 42. This output can drive up to 32 digital outputs with 0.1 amps at 30 VDC. These outputs are normally associated with solid state relays 44, such as triacs, which in turn can drive outputs ranging from 24 to 220 VAC in both form A and form C relay configurations. The solid state relay output link 46 can therefore drive devices associated with the external system such as pumps, fans, and valves.

Figure 2:
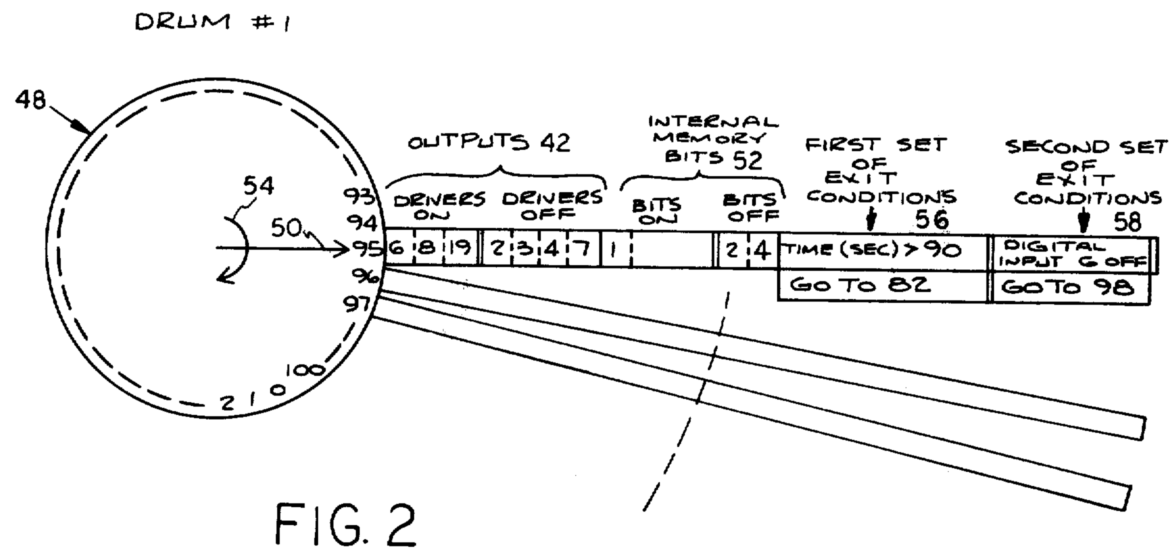
FIG. 2 is a diagrammatic illustration of the drum line concept used in the controller shown in FIG. 1.

As can best be seen in FIG. 2, the operation of controller 20 in accepting the analog and digital inputs from the external system and the generating of digital outputs to control the system can best be visualized as analogous to a mechanical sequence drum 48 having 100 different lines and a pointer 50 which selects one of these lines. However, the function of the controller is much more than an electronically emulated mechanical sequence drum which turns outputs ON or OFF depending upon the drum setting since the controller cannot only turn digital outputs 42 ON and OFF but it can also set internal memory bits 52 ON and OFF and is not limited to a fixed rotation of the drum such as shown by arrow 54 but can move from any drum line to any other drum line by setting a first set of exit conditions 56 specifying the circumstances when the pointer of the drum line should switch to another drum line as well as specifying the line number of this other drum line. In addition, a second set of exit conditions 58 can be specified for any drum line denoting a second set of conditions upon which the pointer of the drum will move to another drum line as well as specifying the line number of this other drum line. These sets of exit conditions are sometimes called exit specifications. In this manner, the very powerful operation known as branching is created which provides the programmer with decision making capability in his or her control program.

In short, the controller emulates a mechanical sequence drum and makes this emulation much more powerful by providing the capability of the sequence controller to jump from any presently executed drum line to any other drum line as well as providing decision making branching capability by providing two sets of exit conditions which can be analyzed and implemented so that the controller moves to one of two specified drum lines, depending upon which of the two exit specifications first occurs. Furthermore, the controller is capable of emulating eight sequence drums at the same time. In operation, the controller executes the selected line for the first drum and proceeds to sequentially execute the selected line of the remaining drums, returning once again to the first drum and continuing in a repetitive manner. Communication and thus indirect control from one drum to any other drum is achieved by setting and referencing internal memory bits from one drum to any other drum.

As will be explained more fully later, the program user is able to input his desired program into the controller by use of a data communications device such as a teletypewriter or a paper tape communications device. The advantage of the drum line simulating concept is that it is direct and requires little or no training on the part of the user. In other words, the controller is user-programmable without requiring him or her to be knowledgeable in software. This eliminates one of the problems in the past for process energy control since in such a field, the user typically is not sophisticated in computer software techniques and would otherwise have to pose his process problems to one who was sophisticated in software with the subsequent "translation" of the user's process creating a difficult boundary to cross and effectively manage. Now the process energy control personnel can directly form a control program without the necessity for utilizing a software specialist. In addition, due to the relatively simple format of the control program, the control program is easy to debug and modify in the field. This is facilitated by the controller's capability of logically disconnecting itself from the external system while maintaining the digital outputs 42 in set configurations regardless of the control program being executed by the controller. The user is then able to monitor the execution of the control program without the generated outputs affecting the external system. This greatly facilitates debugging and insures that the external system will not be harmed during initial programming and debugging of the control program.

Since the drum line, such as line 95 depicted in FIG. 2, can specify many outputs, internal memory bits, and first and second sets of exit conditions, it necessarily requires a great deal of memory within the controller for its specification. However, with the advent of large scale microprocessor systems, such as the Motorola M 6800 Microcomputer Family, the microcomputer utilized in the present controller, this memory need is easily met. The Motorola M 6800 Microcomputer Family publications including its "Systems Reference and Data Sheets" published by Motorola Semiconductor Products Inc. (May 1975), of Phoenix, Arizona, are hereby incorporated by reference.

The Control Program

Before describing the details of the architecture used in the controller, a description of the manner and type of control program used in the controller as well as its application in a typical system will be set forth. As explained above, the control program can specify drum lines for up to eight sequence drums, with communication capability between drums. Each line sets specified output drivers 42 as required by that line in the control program. In addition, each line may define two sets of exit conditions for leaving the line. During each scan by the controller, the line pointed to by each of the drums is executed. This scan is called a control cycle. In operation, the controller after setting the outputs designated by the current drum line, examines the first set of exit conditions for leaving the line. If this set of conditions is met, the controller changes the line number for that drum so that the new line is executed during the next control cycle.

At the beginning of each control cycle, the controller examines the states of all analog inputs 35 and all digital inputs 40. If an emergency condition is detected, as explained more fully later, the line number for any drum may be changed. If such an emergency occurs, the line number before the emergency condition is lost and it is up to the emergency control sequence to resume normal operation at the end of the emergency. During the emergency, as specified by the line number to which the emergency condition causes the drum to rotate, outputs can be set so as to sound alarms, turn off valves, or do other things as specified by the control program to alleviate the emergency or to notify an operator.

In the absence of an emergency, once a drum is set to a given drum line; i.e. the mechanically simulated pointer 50 (FIG. 2) is pointing to a particular drum line, the controller will remain at that line until either the first or second set of exit conditions for that line are totally satisfied. An emergency condition, however, may change the line number for a drum regardless of the exit conditions of the line that the controller is pointing to.

Each of the eight drums in the controller has 100 drum lines. The drums are numbered from 1 to 8. Lines 1,000 to 1,099 are associated with the first drum, lines 2,000 to 2,099 with the second drum, etc. It is not necessary to use all eight drums. Emergency conditions are specified in exactly the same manner as normal lines except that emergency lines are numbered 9,000 through 9,010. Thus, up to ten emergency lines may be specified and stored within the controller.

When the controller is started, control is given to line zero of each drum. Thus, the first lines to be executed by the controller are lines 1,000; 2,000; 3,000; etc.

Each drum line as stated earlier may specify the settings of digital outputs. Output drivers have two states, ON and OFF. The drivers which are to driven ON are listed first in a drum line, followed by the drivers which are to be driven OFF. The controller drives the outputs to the specified conditions whenever the line is encountered. Outputs are driven in numerical order, regardless of the order in which they are specified in the particular drum line. Thus, if outputs 7 and 5 were specified to be ON in a particular drum line, output 5 then output 7 would be turned ON sequentially by the controller. Following the driving of outputs to be turned ON, the controller turns OFF the outputs specified to be driven OFF. Outputs which are not listed in the drum line executed by the controller are simply ignored and left in their previous condition specified by previous drum lines executed by the controller. The numerical nomenclature for the 32 output drivers is 01 through 32.

Thus, a sample format for the output specification of a drum line is as follows:

DRIVER ON 01, 05/OFF 07, 03, 05

The control program language as set forth in Table 5' would present this specification as,

OD 01, 05

FD 07, 03, 05

When the controller comes to this line for execution, outputs 01 and 05 are driven ON and then outputs 03, 05 and 07 are driven OFF. Because output 05 is specified both as ON and OFF, a brief pulse is produced on output 05.

In addition to specifying outputs, the drum line may also specify internal memory bits 52 (see FIG. 2) which can be set either ON or OFF. Memory bits are numbered 01 through 80 in the control program. Bits are specified whenever the line in which they are entered is encountered by the controller. Bits which are to be set ON are listed first, followed by bits which are to be set in the OFF condition. Bits which are not mentioned are ignored and are therefore left at their previous state as dictated by previously executed drum lines. A sample internal bit specification is as follows:

BIT ON 03, 50/OFF 32

The control program language set forth in Table 5' would present this specification as,

OB 03, 50

FB 32

Thus, when the controller comes to a drum line with the above internal bit specification, the controller turns ON bits 03 and 50 and turns OFF bit 32. Because the internal memory bits are examined only by the controller, the order in which they are listed in the drum line is unimportant. These internal memory bits, as mentioned earlier, are used for communications between the eight drums emulated by the controller. In this way the various drums which may be performing different control functions for the external system can ascertain the state of the other control functions being undertaken and depending upon the conditions of these other control functions change its control state. An example might be where drum 1 is controlling the filling of a water tank such that when the water tank is full, memory bit 01 is set ON. Drum No. 2 may be controlling a cooling or heating cycle which is then able to ascertain that the water cycle is complete and therefore is able to commence the selected heating or cooling cycle operation. Without the memory bits, the second drum would not know when the filling of the water tank was complete.

Besides the setting of output drivers and internal memory bits, the drum lines can also specify the conditions when the drum is to leave a particular line and go to some other line within the drum. As mentioned earlier, each drum line may specify up to two sets of exit conditions (sometimes called exit specifications) for transferring control to another line on the same drum. The set of exit conditions consists of states of output drivers, digital inputs, limit points for analog inputs, internal memory bits, and expiration times for timers. The controller checks the exit conditions specified for the line during each control cycle. If one of the sets of exit conditions is completely satisfied, the control is given to the associated drum line specified in the exit condition on the next control cycle. Sets of exit conditions are examined in the order in which they are specified in the control program. If the first set is satisifed, control is passed to its specified exit line and the second set of exit conditions is not examined. If the first set of exit conditions is not completely satisfied, the controller will examine the second set of exit conditions to see if it is satisfied. If neither set of exit conditions is satisfied, the same drum line is executed on the next control cycle.

Each set of exit conditions is associated with a line number which is to receive control if the conditions are met. This line number must be in the same drum. If it is not in the same drum, an error message is generated by the controller (see Table 5' for a list of error messages). If a line number is not specified in an exit specification and that specification is satisfied, the controller transfers control to the next higher drum line within the drum. It should be noted that it is possible for both sets of exit conditions to specify the same line number to receive control if the exit conditions are met. A set of exit conditions may contain many different conditions involving many different types of information. It is important to note that all the conditions in a set of exit conditions must be satisfied before the controller will exit from the currently controlled line. The format for specifying exit conditions depends on the type of condition and, therefore, these different types and their formats are discussed separately below.

As mentioned earlier, digital inputs 40 have only two states, ON and OFF, and are numbered 01 through 32. Variable number 00 is defined as a non-existant digital input which is always OFF. In an exit specification, inputs which are required to be ON are listed first followed by inputs which are listed to be OFF. The digital input portion of the set of exit conditions is satisfied if all inputs specified to be ON are ON and all inputs specified to be OFF are OFF. Digital inputs not mentioned in the exit specification are ignored. A sample of a set of exit conditions utilizing digital inputs is as follows:

DIGITAL ON 05, 08/OFF 22

The control program language as set forth in Table 5' would present this specification as, X1 . . . (desired line number)

OI 05, 08

FI 22

This portion of the exit specification is satisfied if digital inputs 05 and 08 are ON and digital input 22 is OFF. If the same input number is specified to be both ON and OFF, the exit specification is never satisfied. If input 00 is specified to be OFF, the condition for input 00 is always satisfied, and if digital input 00 is specified to be ON, the condition is never satisfied.

Memory bits may also be utilized in a set of exit conditions. Internal memory bits which must be ON are listed first followed by inputs which must be OFF. Bits which are not listed are ignored. A sample of a set of exit conditions utilizing internal memory bits is as follows:

BIT ON 07, 32, 45/OFF 45, 77

The control program language as set forth in Table 5' would present this specification as, XI . . . (desired line number

OB 07, 32

FB 45, 47

This portion of the exit specification indicates that bits 07, 32 and 45 must be ON, and bits 55 and 77 must be OFF. If the same bit is specified to be both ON and OFF, the exit condition can never be satisfied.

Analog inputs may also be used to specify exit conditions. Analog inputs are automatically scaled when they are read by the controller so that trip points can be specified in terms which the program user can readily understand; such as degrees Fahrenheit, pounds per square inch, percent of relative humidity, etc. Analog inputs are numbered 01 through 32, and each analog input in the exit specification is associated with a trip point. Analog exit conditions can be programmed to be satisfied if the analog value exceeds the trip point, if it is less than the trip point, if it is equal to the trip point, or if is not equal to the trip point. Analog inputs which are not mentioned do not participate in the set of exit conditions. A sample analog input specification is as follows:

ANALOG 22>15, 37>2, 12<50, 32<200, 19=57, 20#5

The control program language set forth in Table 5' would present this statement as, X1 . . . (desired line number)

AX 22>15, 37>2, 12<50, 32<200, 19=57, 20#5

This portion of a set of exit conditions is satisfied if analog input 22 is greater than 15, input 37 is greater than 2, input 12 is less than 50, input 32 is less than 200, input 19 is equal to 57, and input 20 is not equal to 5.

Analog inputs can also be compared with one another. The set of exit conditions for a trip point based on the sum or difference of two analog inputs contains the associated number of the two inputs which are to be compared, followed by the trip point. Pairs of inputs whose sums or differences are to be greater than the trip point are listed first, followed by pairs of analog inputs whose differences are to be less than the trip point. A sample difference set of exit conditions is as follows:

ANALOG 15−35>180, 45+60>90, 35−74<78, 01−02=3, 01+05#79

The control program for this specification is the same except for substituting "AX" for "ANALOG" (see previous example). This portion of an exit condition is satisfied if analog input 15 minus input 35 is greater than 180, input 45 plus input 60 is greater than 90, input 35 minus input 74 is less than 78, input 01 minus input 02 is equal to 3, and input 01 plus input 05 is not equal to 79. The controller allows comparison between analog inputs regardless of their types. However, the results of comparing analog inputs which are sensing different parameters such as degrees Fahrenheit and gallons per minute may or may not be meaningful in a control program. This, of course, would depend upon what the control programmer requires in order to control the external system. Thus, a situation might exist where if the combined value of the ambient temperature measured in °F. and the internal pressure of a fluid reservoir measured in PSI is in excess of 130, that a valve on the fluid reservoir is opened to insure that the fluid contained therein does not undergo some form of chemical change due to the combined temperature and pressure within the container. Here, the analog inputs of the ambient temperature of the fluid and the pressure within the fluid container could be added together to give a meaningful result.

Furthermore, the controller includes a clock-calendar and maintains special analog variables which reflect the calendar and time of day. These variables are given special names. These names are capable of being used in a drum line exit specification wherever an analog input number would otherwise be acceptable. The names and meaning of the calendar variables are set forth below in Table 2:

TABLE 2

(see also Table 5)

| | |
|---|---|
| OUR | Hour of Day (φ to 23) This calendar variable ranges from φ to 23. This number is automatically corrected for Daylight Savings Time when it occurs in an area in which the controller is being utilized. |
| DAY | Day of the Month. (1 to 31) This calendar variable ranges from 1 to 31, and is automatically corrected for the length of the month and for Leap Year. This calendar variable changes at midnight and remains constant until the following midnight. |
| WHD | Day of the Week (Monday, Tuesday, Wednesday, Thursday, Friday, Saturday, Sunday) This calendar variable ranges for 1 for Monday to 7 for Sunday. This variable changes at midnight and remains constant until the following midnight. |
| MTH | Month of the Year (January, February, March, April, May, June, July, August, September, October, November, December) This variable ranges from 1 for January to 12 for December. This variable is corrected for Leap Years and variations in the length of the months. |

In addition to keeping track of absolute time, that is, time related to the calendar, the controller also allows the user to program time intervals between events. For each simulated drum, there are five types of timers each of which is brought to zero when control is first transferred to a line specifying that timer. An exit specification utilizing a timer is satisfied if the timer value exceeds the specified trip point. Timers are also cleared if an emergency condition for a drum is activated since the emergency condition causes a new line to receive control.

The five timer types each measure different intervals of time. The timer names and their meanings are set forth in Table 3 below.

TABLE 3

(see also Table 5)

| | |
|---|---|
| TID | This timer measures elapsed time in days, from 1 to 256 and increments at midnight. |
| TIH | This timer counts from 1 to 256 hours, and increments whenever the clock-calandar of the controller is reset from 59 to φ. |
| TIM | This timer counts from 1 to 256 minutes. It increments whenever the master seconds counter of the clock-calendar is reset from 59 to φ. |
| TIS | This timer counts from 1 to 256 seconds. |
| T.S. | This timer counts from .1 to 25.6 seconds and increments in tenths of seconds. An example of a timer in an exit specificaton is set forth below: |
| | X1. . . (desired next line number) |

TABLE 3-continued (see also Table 5)

| |
|---|
| AX TID 4 |

This condition is satisfied when the timer value is greater than 4, which occurs when the drum has been executing the line specifying this condition for five midnights. That is, the timer will increment from 1 to 5, which is greater than 4, on the fifth midnight for the day timer. The intervals spent on the line could be as short as four days, 0.1 seconds, if the line was first executed just before midnight on the first day. It can also be as long as 4 days 23 hours, 59 minutes, and 59.9 seconds, if the line was first executed just after midnight of the first day.

Because all conditions in an exit specification must be satisfied for the specification to be satisfied, if more than one timer is contained in a specification, it is satisfied when the longest timer has exceeded its trip point.

In addition to specifying timers to be greater than a trip point value, they may also be specified to be equal to, not equal to, or less than a trip point value. Thus, the specification, X1 . . . (desired next line number)
AX TID<4 is satisfied so long as fewer than 4 midnights have occurred since the controller has first acted upon the drum line containing this timer specification.

In addition to digital inputs, analog inputs, internal memory bits, absolute calendar time, and timers being utilized in any exit specification, output drivers may also participate in the exit specification. A sample set of exit conditions utilizing output drivers is as follows:

DRIVER ON 01, 05/OFF 06, 07

For the control program commands set forth in Table 5', this exit specification would be written, X1 . . . (desired line number)
OD 01, 05
FD 06, 07

This set of exit conditions is satisfied if output drivers 101 and 105 are ON and drivers 106 and 107 are OFF. By utilizing any of the above events as part of a set of exit conditions for either the first or second exit specification, the conditional jump and branching capability of the controller is made very powerful. Virtually any event that is sensed by the controller or is driven by the controller can be utilized in the control program for specifying when the controller should leave any particular drum line and move to another drum line within the same drum.

As mentioned earlier, in addition to the one hundred drum lines for each of the eight drums, there are also exit emergency conditions which can be programmed into the controller. The emergency exit specification contains a list of conditions to be satisfied, followed by a list of line numbers which are to receive control during the next control cycle. The specification for an emergency condition utilizes the same rules as the exit specification for non-emergency drum lines. Any number of drum lines may be listed for the emergency condition. Emergency exit condition specifications are programmed in line numbers 9,000 to 9,010. In essence, then, they represent a dedicated additional drum whose only function is to ascertain if a set of emergency exit conditions are satisfied and if they are, to cause the remaining drums to revolve to line numbers as specified by the emergency specification regardless of the state of the drum lines previously being executed by the non-emergency drums. Emergency conditions, however, may only utilize one test unlike the standard drum lines which may use one or two sets of conditions. The emergency conditions can not reference timers and cannot set output drivers. However, the emergency condition if satisfied, can list more than one drum line which is to receive control.

Control Program Example

At this point in the description, it is helpful to give an example of an actual external system which is controlled by the programmable sequence controller. The external system is illustrated in FIG. 3, comprising FIGS. 3A, 3B and 3C. The system shown in FIG. 3 is for heating and cooling a home or building utilizing, in part, energy received from the sun. A legend corresponding to the various devices shown in FIG. 3 is set forth in Table 4.

TABLE 4

| LEGEND | DESCRIPTION |
|---|---|
| BBF | BEECO BACKFLOW PREVENTER |
| T | TEMPERATURE SENSOR |
| P | PRESSURE GAUGE |
| FS | FLOW SWITCH |
| PS | PRESSURE SWITCH |
| WL | WATER LEVEL |
| PR | PRESSURE RELIEF VALVE |
| PRV | PRESSURE REDUCER VALVE |
| [illegible] | ELECTRIC VALVE |
| [illegible] | ELECTRIC TEMPERING VALVE |
| [illegible] | CIRCUIT SETTERS |
| [illegible] | REDUCER FITTING |
| [illegible] | CHECK VALVE |
| FV | FOOT VALVE |

This heating and cooling system utilizes a high temperature water tank 60 for the storing of high temperature water and a low temperature water tank 62. Water is moved from the low temperature tank through piping 64 and a pump 66. The water exiting from pump 66 is controlled by a series of valves 67, 68, and 69 which are respectively turned on by output drivers 1, 3, and 5 being in the ON state and output drivers 2, 4, and 6 being in the OFF state. These valves can be analogized to requiring an ON button to be depressed and an OFF button to be released in order to open the valve and vice versa to close the valve.

The outputs from these valves supply water to three banks of solar panels 70, 71 and 72 whose purpose is to collect the solar radiation and convert it into increasing the temperature of the water flowing therethrough. The particular solar collectors shown in FIG. 3 are manufactured by Owens Illinois. All of the water returns from these banks of solar collectors are connected together and returned from the collector array to high tank 60.

In operation, the water is moved from low tank 62 to the collector array when the sun comes up in the morning. A photosensor A-32 is utilized to sense the outside ambient light. Thus, when the sun rises, it is desired to turn pump 66 ON and to keep it ON until sometime in the evening when the sun sets.

Another requirement of the system is to prevent water from freezing in the solar collectors. Thus, it is a requirement that when the water temperature is less than 32° F. for more than four hours, it is necessary to move the water by turning ON the pump for a short period of time.

When the water is being heated by the solar collectors, it can be used to generate heating or cooling within the building. For this to occur, it is necessary that water be pumped from high tank 60 to an electric boiler 74 where it is further heated if the water temperature is below a predetermined level. From there, the water is driven by pump 76, through valves 77 and 78, to a heat exchanger 80 where it is converted into heating air for the home or building. The water is then returned to low temperature tank 62 ready for additional pumping to the solar collector in order to obtain additional heat.

Since the heating area has two separate zones (zone 1 and zone 2), two separate thermostats (I 17 and I 11) are used to generate corresponding digital input signals to the interconnected controller indicating the need for heat in the area controlled by the specific zone. Dampers 82 and 83 are used to cut off or allow air flow into zones 1 and 2 respectively. Fan 84 is used to force air past the heat exchanger 80 and through zones 1 or 2.

In addition to supplying heat to the two zones, it is also necessary that excess heat stored in the high tank 60 be dumped to the outside if it is not required in heating either of the two zones. To accomplish this, a damper 85 must be closed so as to block air flow through zones 1 and 2 while fan 84 is turned on causing the heat exchanger to pass the unwanted heat to the outside.

As also shown in FIG. 3, additional water for the system is obtained from an outside water source such as a city main 86. In addition, the water within the high temperature tank 60 can also be used to preheat water in an electric water heater 88 for use in supplying domestic hot water. A separate heat exchanger 89 is utilized to heat this incoming water to the domestic hot water heater.

The control program for implementing the requirements of the solar powered hot water heating system described above is set forth in Table 5. The symbols used in this control program are defined in Table 5', an instruction list for a control program.

TABLE 5

CONTROL PROGRAM CORRESPONDING TO SYSTEM SHOWN IN FIG. 3

```
OP 1000
        OD 2,4,6
        FD 1,3,5,8
        X1 1001
             AX TIS>90,32<100
        X2 1003
             AX TIH>4,29<75
OP 1001
        OD 1,3,5
        FD 2,4,6
        X1 1002
             AX TIS>90
        X2 0000
OP 1002
        OD 8
        X1 1000
             AX TIS>90,32>100
        X2 0000
OP 1003
        OD 1,3,5
        FD 2,4,6
        X1 1004
             AX TIS>90
        X2 0000
OP 1004
        OD 8
        X1 1000
```

TABLE 5-continued

CONTROL PROGRAM CORRESPONDING TO SYSTEM SHOWN IN FIG. 3

```
            AX TIM>40
        X2 0000
OP 1050
        X1 0000
        X2 0000
OP 2000
        X1 2010
            AX 4>185
        X2 2001
            OB 2
            AX 4<120
OP 2001
        OD 24-25
        OB 10
        X1 2002
            AX 4>131
        X2 2002
            FB 2
            AX 4<131
OP 2002
        FD 24-27
        X1 2000
        X2 0000
OP 2010
        OD 19
        FD 24-27
        OB 11
        X1 2011
            AX TIS>45
        X2 0000
OP 2011
        OD 16,22
        X1 2012
```

TABLE 5-continued

CONTROL PROGRAM CORRESPONDING TO SYSTEM SHOWN IN FIG. 3

```
            AX 4<180
        X2 2010
            AX 4>190
OP 2012
        FD 16,19,22
        X1 2000
            AX TIS>45
        X2 0000
OP 3000
        X1 3002
            OI 11
        X2 3002
            OI 17
OP 3002
        OD 20-21
        FD 22
        OB 2
        X1 3003
            AX TIS>90
        X2 0000
OP 3003
        OD 16,22
        X1 3004
            FI 11,17
            AX TIS>5
        X2 0000
OP 3004
        FD 16,20-22
        FB 2
        X1 3000
            AX TIS>90
        X2 0000
CL
```

TABLE 5'

COMMAND LIST

PROGRAMMING (EDIT)

| | |
|---|---|
| AX | ANALOG EXIT SPECIFICATION |
| CL | CLOSE LINE BEING EDITED |
| FB | BITS WHICH ARE OFF/TURN OFF BIT |
| FD | DRIVERS WHICH ARE OFF/TURN OFF DRIVER |
| FI | INPUTS WHICH ARE OFF |
| OB | BITS WHICH ARE ON/SET BIT |
| OD | DRIVERS WHICH ARE ON/TURN ON DRIVER |
| OI | INPUTS WHICH ARE ON |
| OP | OPEN A DRUM LINE FOR EDIT |
| PU | PUNCH THE PROGRAM |
| RL | RELOAD THE DRUM LINES |
| RU | RUN THE PROGRAM |
| ST | SET TIME |
| XI | FIRST EXIT SPECIFICATION |
| X2 | SECOND EXIT SPECIFICATION |
| XE | EMERGENCY EXIT SPECIFICATION |
| XX | GET OUT OF EDIT WITHOUT CLOSING |
| ZH | CLEAR HISTORY FILE |
| Z& | REINITIALIZE ENTIRE SYSTEM |
| ZM | ZAP DRUM |

PRINT

| | |
|---|---|
| PA | PRINT ANALOG |
| PB | PRINT THE BIT MEMORY |
| PD | PRINT DRIVERS |
| PH | PRINT HISTORY FILE |
| PI | PRINT DIGITAL INPUTS |
| PL | PRINT DRUM LINE |
| PM | PRINT DRUM |
| PP | PRINT CURRENT DRUM POSITION |
| PU | PUNCH THE PROGRAM |
| PX | PRINT DISABLED |
| TI | PRINT TIME |

DIAGNOSTIC

| | |
|---|---|
| AA | ALTER ANALOG VALUE |
| AV | ADVANCE DRUM LINE |
| CB | CLEAR BIT |
| CH | CLEAR & DISABLE DRIVER MESSAGE |
| CI | CLEAR INPUT |
| DA | DISABLE ANALOG |
| DB | DISABLE BIT |
| DD | DISABLE DRIVER |
| DI | DISABLE INPUT |
| DM | DISABLE DRUM |
| EA | ENABLE ANALOG |
| EB | ENABLE BIT |
| ED | ENABLE DRIVER |
| EI | ENABLE INPUT |
| EL | ENABLE ALL |
| EM | ENABLE DRUM |
| NS | REMOVE DRUM LINE STOP |
| RM | ROTATE THE DRUM |
| RS | RESET TO LINE ZERO |
| SB | SET MEMORY BIT |
| SH | SET AND DISABLE OUTPUT DRIVER HARDWARE |
| SI | SET DIGITAL INPUTS |
| SL | STEP A DRUM LINE |
| SP | STOP |
| TI | PRINT TIME |

TIME

TABLE 5'-continued

| | |
|---|---|
| | REAL TIME |
| MTH | Month of year (JAN, FEB, MAR, APR, MAY, JUN, JUL, AUG, SEP, OCT, NOV, DEC) |
| WHD | Day of week (MON, TUE, WED, THU, FRI, SAT, SUN) |
| DAY | Day of month (1 to 31) |
| OUR | Hour of day (0 to 23) |
| | INTERVAL TIME |
| TID | Elapsed time in days (1 to 256) |
| TIH | Elapsed time in hours (1 to 256) |
| TIM | Elasped time in minutes (1 to 256) |
| TIS | Elapsed time in seconds (1 to 256) |
| T.S | Elapsed time in 1/10 of seconds (.1 to 25.6) |
| | DESCRIPTIONS OF ERROR MESSAGE CODES |
| 1 | COMMAND NAME NOT FOUND OR NOT YET DONE |
| 2 | FORCED TO TRANSFER TO NONEXISTENT LINE |
| 3 | REMOVED STOP FROM NONEXISTENT LINE |
| 4 | DID NOT HAVE SLASH IN STOP |
| 5 | OUTPUTTED LINE # REFERS TO NONEXISTENT LN |
| 6 | ASKED TO FIND NONEXISTENT LINE # |
| 7 | VALUE OUT OF RANGE IN COMMAND LINE |
| 8 | OPEN OF NEW LINE BUT NO LINE NUMBER |
| 9 | LINE NUMBER NOT VALID |
| 10 | EDIT COMMAND SPECIFIED, BUT NOT IN EDIT |
| 11 | INPUT SETTINGS SPECIFIED IN X1 OR X2 MODE |
| 12 | X1 or X2 ADDRESS IS FOR DIFFERENT DRUM |
| 13 | AX SPECIFIED WHEN NOT IN X1 OR X2 MODE |
| 14 | UNRECOGNIZEABLE RELATIONAL IN ANALOG SPEC |
| 15 | INCORRECT VALUE IN ANALOG SPECIFICATION |
| 16 | TOO MANY ANALOG SPECIFICATIONS FOR BUFFER |
| 17 | ALPHA ARGUMENT NOT FOUND IN TABLE |
| 18 | NUMERIC ARGUMENT 65K |
| 19 | BAD DELIMETER BETWEEN ARGUMENTS |
| 20 | BAD FIRST DIGIT OF LINE NUMBER |
| 21 | MULTIPLE XE ADDRESSES FOR SAME DRUM |
| 22 | NEW LINE REQUESTED, BUT MEMORY FULL |
| 23 | CAN'T PUNCH WHILE STILL IN EDIT |
| 24 | INVALID DRUM NUMBER |

As shown in Table 5, three drums, namely drums 1, 2 and 3 are used to implement the control program. As shown in FIG. 1, the user can input this control program via a teletypewriter, a hand-held interactive computer terminal, or other data communications device 26. The controller, when it is ready to receive the instructions from the user, types the letter R. The desired control program is then entered as shown in Table 5.

As seen in Table 5, line numbers 1,000, 1001, 1002, 1003, 1004, and 1050 are defined in drum No. 1 for control of a portion of the system shown in FIG. 3. Line 1000 is an initializing line which requires that drivers 2, 4, and 6 are driven ON and drivers 1, 3, 5, and 8 are driven OFF. This, in effect, turns OFF valves 67, 68, and 69 as well as pump 66. As mentioned earlier, it is necessary in the case of the valves that in order to turn them OFF, it is necessary to energize their OFF input and de-energize or turn OFF their ON inputs. Therefore, to turn OFF the valves, it is necessary not only to turn ON their OFF inputs 2, 4, and 6 but to turn OFF their ON inputs 1, 3 and 5.

After the controller initially establishes these output states for the valves and pump 66, it examines the two sets of exit conditions (X1 and X2) for drum line 1000. The first set of exit conditions is satisfied if the time in seconds is greater than 90 and analog input 32 (the photosensor) is less than 100. This means that the controller for Drum 1 will remain on line $\phi$ for at least 90 seconds and that the analog input 32 must be less than 100. The number 100 represents a number within a full scale range of $\phi$ to 255. Since the photocell is a cadmium sulfide cell, its impedance drops as the light intensity increases, and its value will represent a number less than 100 during the daytime and a number greater than 100 at night. Therefore, if this exit condition is met, namely, that the controller has been on line $\phi$ for Drum 1 for 90 seconds and it is daylight, Drum line 1001 (the number following X1) is executed during the next control cycle of the controller for Drum 1.

If the first exit specification is not satisfied, the controller will examine the second exit specification (X2). This specification causes the controller to examine the time in hours and it is satisified if this time in hours is greater than 4 and if analog input 29 (the ambient temperature sensor) is less than 75. The number 75 is again a number on a scale from $\phi$ to 255 and is the value in the voltage domain equivalent to 32° F. Therefore, this exit specification is met if the ambient temperature has been less than 32° F. for more than four hours; thereby representing a time when water should be passed through the solar collectors in order to prevent freezing. If the second exit specification is met, the controller will go to line 3 for Drum 1 after executing drum line zero for drums 2, 3, 4, 5, 6, 7, and 8. If neither exit specification is met, the controller will return to Drum 1, line zero after executing a drum line of the other seven drums. This is the control cycle that the controller continuously performs.

If the first exit specification for drum line $\phi$ is met, the controller will next execute line 1 of Drum 1. Here the controller turns ON valves 67, 68, and 69 and also has one exit condition which causes the controller to next execute line number 1002 if the time in seconds is greater than 90. The statement X2 0000 simply means that there is no second set of exit conditions. This exit condition need not be specified.

The controller therefore proceeds to line 1002 whereupon driver number 8 turns on pump 66 and causes water to flow from the low tank 62 and through the solar panels 70, 71, and 72. The time delay specified in line 1002 is merely to insure that the valves are fully open before pump 66 is energized. The pump will remain ON as specified by exit condition X1 until the ambient light indicates that nightfall has occurred and the pump has been on for at least 90 seconds. At this time, drum line 1000 would again be executed causing the valves 67, 68, and 69 to be turned off along with pump 66.

Therefore, under normal operating conditions in which the anti-freezing requirements are not required, the controller will cycle from lines 1001 to 1002 back to 1001 so as to turn ON pump 66 and open valves 67, 68, and 69 during the day and to close the valves and turn OFF the pump at night.

The second exit condition for line 1000 basically is the anti-freeze protection provision. Thus, the controller will move to line 1003 if the ambient temperature is less than 32° F. for more than four hours. At line 1003, the controller will cause valves 67, 68 and 69 to open and will then exit to line 1004 after a time delay of 90 seconds. At line 1004, pump 66 is activated and will remain so for 40 minutes at which time, the controller will return control to line 1000 which causes the valves to close and pump 66 to turn off. In this way, water flow is moved through the collector arrays during outside low temperature periods in order to prevent the lines and collector arrays from being damaged by ice.

Finally, with respect to Drum 1, line 1050 is called a dummy line since it does absolutely nothing. Its use is essentially as a line that can be executed by the controller so that the controller will just stay at the line unless told to leave by the operator. Such a line can be useful during debugging operations or at other times when it is desired to maintain the current state of the valves and pump, regardless of external conditions.

Drum 2 as set forth in Table 5 is defined by drum lines 2000, 2001, 2002, 2010, 2011, and 2012. This drum basically operates auxiliary heat as generated by electric boiler 74 and also allows the system to pump excess heat when the energy being collected can no longer be used and is in excess of that capable of being stored.

More particularly, line 2000 senses the temperature of the high temperature water tank 60 via analog input A-4, a thermistor sensing the water temperature within the high tank. If this temperature is greater than 185° F., it will cause the first exit specification to be satisfied and the exiting from line 2000 to line 2010. Drum line 2010 provides for the dumping of excess heat by activating output driver 19 which closes damper 85 as shown by arrow 90 and turns off outputs 24 through 27 which insures that electric heating coils of the electric boiler 74, that is coils E1 through E5, are in the OFF state.

Drum line 2010 also turns on internal memory bit 11 which indicates to the other drums of the controller that the external system is in a dumping excess energy mode.

The exit statement for drum line 2010 is that the controller executes this line for at least 45 seconds at which time it will then next execute line 2011. This pause of 45 seconds is to allow damper 85 to fully actuate before going to line 2011.

At line 2011, drivers 16 and 22 are turned ON which energizes pump 76 and fan 84. This causes the high water temperature from the high tank 60 to flow through the heat exchanger 80 and for the fan to blow air past this heat exchanger to the outside.

The first exit condition for line 2011 is for the temperature of analog input 4 to be less than 180° in which case, it is no longer necessary to dump excess heat to the outside. If this occurs, the first exit condition causes the controller to next execute line 2012. However, if the temperature in the high tank continues to rise and if it does rise above 190°, the controller will exit to line 2010 to re-execute all of the driver conditions and thereby make sure that they have been properly actuated.

Once the water temperature has fallen below 180°, the controller executes line 2012 which turns OFF driver 16 and thereby pump 76 as well as to de-energize damper 85 and fan 22. After 45 seconds, control is transferred to drum line 2000.

At drum line 2000, if the water temperature in the high tank is less than 120° and if the number 2 internal memory bit is ON, the controller will next execute drum line 2001. This second exit specification for line 2000 basically represents that the heating system is operating and that the water temperature in the high tank is below a value which can provide sufficient heat for the two heating zones. Therefore, line 2001 activates drivers 24 and 25 which energize two stages of heating (E1 and E2) of the electric boiler 74 to raise the temperature of the water. Drum line 2001 also turns on internal memory bit 10 which indicates to the other drums that the auxiliary heating system is being utilized. The first exit specification causes the controller to next execute line 2002 if the temperature of the water in the high tank exceeds 131°. The second exit specification also causes control to go to line 2002 if internal memory bit No. 2 is OFF, indicating that the system is not in a heating cycle (not heating the two zones) and also if the water temperature in the high tank is less than 131°.

At drum line 2002, heaters E1 through E5 are turned off by turning off output drivers 24 through 27. The exit condition for this line is to have the controller transfer control to line 2000 on the next control cycle and to restart the heating control cycle.

Drum 3, which is defined by drum lines 3000, 3002, 3003, and 3004 basically defines the heating mode algorithm for providing heat into the house. The controller starts at line 3000 where if input 11 representing the closure of the zone 2 thermostat is ON or closed, transfer is given to drum line 3002. Similarly, control is transferred to line 3002 if digital input 17 is ON or closed representing the zone 1 thermostat. In line 3002, dampers 82 and 83 controlling the flow of air in the two zones of heating are opened as shown by arrows 91 and 92 by turning ON output drivers 20 and 21 respectively. Drum line 3002 also turns OFF fan 84 and turns ON internal memory bit 2 so as to inform the other drums that the heating of the zones within the home or building is under way. An exit to drum line 3003 occurs after a time span of 90 seconds to insure the proper activation of the dampers.

At drum line 3003, pump 76 and fan 22 are activated so as to provide hot water to heat exchanger 80 and to pass air over the heat exchanger and thus through the two zones as shown by arrows 93. The exit specification for this line is that the two thermostats (digital inputs 11 and 17) are opened indicating tha the zones have received enough heat and that this condition has existed for at least five seconds (thereby eliminating short time duration transients).

If the exit condition for line 3003 is met, control is transferred to drum line 3004 which turns off pump 76, closes dampers 82 and 83 (to the position shown for these dampers in FIG. 3), and turns OFF fan 22. Furthermore, internal memory bit 2 is turned OFF indicating that the heat cycle for the two zones has been completed. After a time period of 90 seconds, control is transferred to line 3000 for a repeat of the heating cycle whenever either of the two thermostats' digital inputs are closed.

It should be noted that when the programmer first writes his control program, he may use any of the diagnostic commands set forth in Table 5'. As noted therein, these diagnostic commands allows the user to alter an analog value such as analog input 29 representing the external ambient temperature. Other diagnostic commands allow the operator to advance a drum line regardless of the controller satisfying an exit specification for the drum line that it is presently executing (command AV), allow the programmer to clear an internal memory bit (command CB), and also allow the programmer to clear and disable an output driver message (command CH).

In addition, the programmer can clear a digital input (command CI), disable an analog input (DA), disable an internal memory bit (command DB), disable an output driver (DD), disable a digital input (command DI), disable an entire drum (command DM). The programmer can also enable any analog input, any internal memory bit, any output driver, any digital input, all inputs, outputs and memory bits specified by the program, and enable a drum to resume control.

The programmer may also rotate a drum, reset a drum to line zero, set an internal memory bit, set and disable output driver hardware, as well as to set digital inputs. And finally, the programmer may step a drum line incrementally, stop a drum line and also print the time that is represented in the controller.

All these diagnostic commands makes the programming and debugging of the program a relatively simple matter for even the unsophisticated user.

If during the programming, errors are encountered by the controller, a list of 24 error message codes can be printed by the controller to the user via the data communications device 26. These 24 error message codes are also set forth in Table 5' and indicate to the programmer such errors as inputting an invalid line number, having a exit condition specify a drum line which is not within the drum of the presently executed line, and an incorrect value in an analog specification, to name but a few.

Furthermore, the programmer can command the controller to print or display on the data communications device various information stored within the controller. These print commands are also set forth in Table 5' and include such commands as to print the analog values of a specified analog input, to print the state of the internal memory bits, to print the drum line that a drum is presently executing, as well as to punch the control program that has been stored within the controller. Again, these commands can help debug a control program by allowing the user to see exactly what is occurring within the controller.

To further help in diagnosing the condition of a controller, a status display portion of the controller indicates to the user via light-emitting diodes, which digital inputs are ON, which digital outputs are ON, the activity level of the controller (as explained more fully later), the status of the communications interface, and the status of the power supply voltages.

Controller Architecture and Software

As best seen in FIGS. 4 and 4A, the basic block diagram of the programmable sequence controller 20 includes twelve basic components; namely, a central processing unit 100, a data and address bus 101, a read-only memory 102, a random access memory 104, a clock-calendar 106, a communications interface 108, a signal conditioning module 110, a digital input selector 112, a digital output driver selector 114, a multiplex analog input module 116, an eight bit analog to digital converter 118, a analog control module and status generator 120, and a power supply and battery module 122. A 16K byte extension random access memory 136 and various indicators 103, 109, 113, 115, and 123 are also present. FIG. 4A shows more detail of the block diagram modules and interconnections.

As set forth in more detail in FIGS. 5A through 11D, the central processing unit, random access memory, read-only memory, communications interface, digital input interface, digital output driver interface, analog input multiplexer, and analog control module all utilize the Motorola M 6800 microcomputer family of components.

Basically, the controller utilizes a microcomputer (the central processing unit) and has a memory of both a permanent and a random access type. A crystal clock-calendar 106 is part of the internal mechanism of the controller. With appropriate software (discussed later), this calendar is capable of maintaining the day of the week, month, year, etc. It also allows the program to tell the difference between days of the week, such as Monday and Sunday as well as specific dates, holidays, and leap years. Both the memories 102 and 104 as well as the clock-calendar 106 are connected to the power supply and battery module 122 in order not to lose the contents of the memory or the time of the day, month and year due to inadvertent power failure.

The controller further includes the power supply and battery interface with control circuitry for insuring proper power-down and power-up, a communications interface 108 and a control input group designated by the digital input selector 112, a digital output driver selector 114, and the multiplexer analog input section 116.

The communications interface 108 communicates directly with the central processing unit 100 and subsequently the program residual in the read-only memory 102 and random access memory 104 and 136. The communications interface can communicate directly with an interactive terminal 26 or another programmable sequence controller or via modem and telephone equipment to a host computer or other data communications device. All these devices are shown generally as module 26 in FIG. 4. The analog inputs 34, the digital inputs 38, and the digital output drivers 42 are all heavily signal conditioned by signal conditioning module 110 in order to protect the internal workings of the controller and to suppress extraneous signals. As mentioned earlier, there are 32 digital inputs, 32 digital output drivers, and 32 analog inputs. The analog inputs go through a direct multiplexer 116 and into an eight bit analog to digital converter 118. Appropriate controls for the analog digital converter are obtained by the control module 120.

Detailed Circuitry Description

The following detailed circuitry description is illustrated in FIGS. 5A through 17E. In these detailed schematics, the non-discrete components utilized are generally identified by "U" numbers, such as U68 in FIG. 5. These "U" numbers identify an electronic chip which may be one device (e.g. U68 which is as a Motorola MC 6800 microprocessor) or a number of similar devices (e.g. U86—FIG. 5—which represents four logic gates). In the latter case a specific device is referred to by its "U" number, followed by a pin number unique to that device for that chip; e.g. U86-11 refers to the upper left-handmost U86 logic gate shown in FIG. 5.

Discrete components; e.g. crystals, capacitors, some resistors (others are part of chips that package a plurality of resistors), transformers, LED's, switches, etc. are identified by reference characters having a letter prefix identifying the type of discrete component. These prefixes are set forth in Table 6.

TABLE 6

| LETTER | COMPONENT TYPE |
|---|---|
| Y | crystal |
| L | inductor |
| C | capacitor |
| R | resistor |
| T | transformer |

TABLE 6-continued

| LETTER | COMPONENT TYPE |
|---|---|
| CR | LED OR DIODE |
| SW | switch |
| BA | battery |
| Jx | connector |

(x = another letter)

Registers are referred to by a four digit number starting with $\phi$; e.g. $\phi$387 refers to a buffer register for the digital input section of the controller shown in FIG. 8.

In addition, signals are identified by an alphanumeric name; e.g. $\overline{\text{ROM E4}}$ shown in FIGS. 5 and 6. A line over such a signal name indicates that the NOT of the named signal is high if true.

Furthermore, the one digit numbers with a circle around them refer to other FIGURES that the identified signal is transferred to (→) or emenate from (—<). These numbers must have the number "4" added to them to yield the correct FIGURES. Thus, in FIG. 5, signal A9 is transferred to FIG. 6 ((2)+4=6).

The identification of the type of circuit component each non-discrete device is can be ascertained from Table 7. The discrete circuit component values are set forth in the drawings next to the component. Thus, in FIG. 5, R83 is a 1K resistor and Y1 is a 3.6864 MHz crystal.

TABLE 7

| | NON-DISCRETE COMPONENT IDENTIFICATION | | |
|---|---|---|---|
| | Component Reference Number | Part Identification Number | Component Description |
| FIG. 5 | | | |
| | U68 | MC6800 | Microprocessor |
| | U80 | 74LS00 | NAND GATE |
| | U74, U103, U104 | 74LS04 | HEX Inverters |
| | U73 | 74LS08 | AND GATES |
| | U86 | 74LS32 | OR GATES |
| | U94 | 74LS74 | FLIP FLOP |
| | U95 | 74LS93 | Binary Counter |
| | U57, U66, U67 | 74LS138 | Decoder |
| | U87 | 75365 | Driver |
| | U58, U75, U61 | 898-1-R10K | Resistors |
| FIG. 6 | | | |
| | U6, U12, U19, U25, U32, U36, U40, U50 | 2708 (Programmed) | Programmable Read Only Memory |
| FIG. 7 | | | |
| | U78, U85, U92, U101 U108, U110 | 5101L3 | Random Access Memory |
| | U102, U111 | 4040B | Binary Counter/ Div. |
| | U93 | 4060 | Binary Counter/ Divider & Osc. |
| | U91, U100, U107, U109 | 74LS367 | Buffer |
| FIG. 8 | | | |
| | U28, U31, U35, U39, U44, U49, | 80C97 | Non-Inverting Buffer |
| | U27, U30, U34, U38, U43, U48 | 74C914 | HEX Schmitt Trigger |
| FIG. 9 | | | |
| | U104 | 898-1-R180 | Resistors |
| | U106 | 6820 | Peripheral Interface Adaptor |
| | U90 | 6850 | Asynchronous Communications Interface Adaptor |
| | U98 | 5307 | Baud Rate Generator |
| | U97, U99 | 74LS04 | HEX Inverter |
| | U96, U105 | 74LS37 | NAND Buffer |
| | U88 | 1488 | Driver |
| | U89 | 1489A | Receiver |
| FIG. 10 | | | |
| | U59, U76 | 898-1-R180 | Resistors |
| | U60, U77 | 6820 | Peripheral Interface Adaptor |

TABLE 7-continued

NON-DISCRETE COMPONENT IDENTIFICATION

| | Component Reference Number | Part Identification Number | Component Description |
|---|---|---|---|
| | U53, U54, U55, U56, U62, U63, U64, U65, U69, U70, U71, U72, U81, U82, U83, U84 | 75461 | AND GATE |
| FIG. 11 | | | |
| | U24 | 6820 | Peripheral Interface Adaptor |
| | U10 | 4011 | NAND GATE |
| | U3, U9, U16, U23 | 4051 | Multiplexer |
| | U4, U5 | 4104 | Level Shifter |
| | U11 | LM311 | Voltage Comparator |
| | U18 | MC1458 | Dual-Op Amplifier |
| | U17 | DAC 331-8 | D/A Converter |
| | U112 | REF02CJ | 5V Reference Source |
| FIG. 12 | | | |
| | U51 | 4001B | NOR GATE |
| | U45 | 4011B | NAND GATE |
| | U115 | 4082B | AND GATE |
| | U46 | 4538B | Precision One Shot |
| | U41, U114 | 74C914 | HEX Schmitt Trigger |
| | U52 | 74LS04 | HEX Inverter |
| | Q6 | LM323 | 5V Positive Regulator |
| | Q3 | 7812 | 12V Regulator |
| | Q4 | 79M05 | 5V Regulator |
| | Q5 | 79M12 | 12V Regulator |
| | U113 | H11AA1 | Opto Isolator |
| | Q2, Q8, Q9 | MJE2955(K) | Transistor |
| | Q10 | MJE3055(K) | Transistor |
| | FL1 | 1B1 | Filter |
| FIG. 13 | | | |
| | U118 | CA3060E | Operational Trans Conductance Amplifier |
| | U119 | 4011 | NAND GATE |
| | U116, U117 | CA3094 | Programmable Power Switch/ Amplifier |
| | Q11 | 7808C | 8V Regulator |
| | U120 | 74LS04 | HEX Inverter |
| FIG. 16 | | | |
| | U52 | 74LS00 | NAND GATE |
| | U48 | 74LS02 | NOR GATE |
| | U42 | 74LS04 | HEX Inverter |
| | U47 | 74LS10 | NAND GATE |
| | U51 | 74LS20 | NAND GATE |
| | U45 | 74LS139 | Decoder |
| | U53 | 74LS161 | Binary Counter |
| | U57 | 4013 | FLIP FLOP |
| | U62 | 4046 | Phase Lock Loop |
| | U44 | 4104 | Level Shifter |
| | U63 | 4049 | HEX Buffer/ Converter |
| | U55, U59 | 3207 | Driver |
| | U43, U56 | 74C00 | NAND GATE |
| | U46 | 74C02 | NOR GATE |
| | U60 | 74C04 | HEX Inverter |
| | U61 | 74C221 | Multi Vibrator |
| | U58 | 80C97 | HEX Non Inverting Buffer |
| FIG. 17 | | | |
| | U40, U42 | 74LS04 | HEX Inverter |
| | U36 | 74LS374 | FLIP FLOP |
| | U41 | 4024 | Binary Counter |
| | U33, U64, U65 | 74C02 | NOR GATE |
| | U35, U37, U66 | 74C157 | Multiplexer |
| | U34, U38, U39 | 4104 | Level Shifter |
| | U1-U32 | MCM6605A-2 | Random Access Memory |

Referring now to the detailed drawings, FIG. 5, comprising FIGS. 5A-5C, basically illustrates the central processing unit 100 with its inputs and outputs. The microprocessor U68 has data and address lines labeled Dϕ-D7 and Aϕ-A15 forming data and address bus 101.

These outputs do not require buffering since the U68 microprocessor has sufficient power to drive the full array of address devices comprising the controller.

Clocking for the microprocessor U68 as well as for other components throughout the controller is generated by circuitry within section 124. This section includes a crystal Y1 which oscillates at 3.6864 megahertz. The associated circuitry for generating the two timing phases PH1 and PH2 and their inverses include capacitors C71, C72, inductor L1, buffers U103-2,-5,-6, divide by eight circuitry U95, flip-flop U94, logic gates U86-3 and U86-11, U87-2 and U87-7, and U80-3, U80-6, and U80-11. In addition to generating the timing signals PH1 and PH2, the timing circuitry also generates a 307.2 kilohertz signal and a 921.6 kilohertz signal via output pin 8 of U95 and gates U86-8, U80-8, buffer U74, divide by two circuitry U95, and flip-flop U94-9.

Switch SW1 associated with resistor R110, capacitor C187, buffer U38 and U74 are inputted to pin 6 of microprocessor U68 for purposes of manually resetting the microprocessor.

The bus addresses associated with the appropriate drivers of the microprocessor U68 are set forth in Table 8. The power pin connections for the various integrated circuit chips is set forth in Table 9.

As shown in FIG. 5, the microprocessor U68 in association with integrated circuit ship U57 generates the drives for the programmable read-only memory while chip U66 in association with microprocessor U68 generates the drives for the digital inputs module 112. Integrated circuit chip U67 associated with microprocessor U68 and logic gates U73-3, U73-6, U73-8, and U73-11 provide the drive lines for the random access memory 104. The address decoding circuity 105 is shown utilizing multiplexers U57, U66 and U67. Since U68 is a hexadecimal device, it counts from $\phi$ to F (i.e. 16) and therefore letters A, B, C, D, E, and F are numbers 10, 11, 12, 13, 14, 15, and 16 respectively.

TABLE 8

| BUSS ADDRESSES (FIG. 5) | |
|---|---|
| 0000–02FF | 4V RAM |
| 0381–0383 | CLOCK CNTR |
| 0384–0387 | DIGITAL INPUTS |
| 0388–0389 | ACIA |
| 0390–0393 | INT. PIA |
| 0394–0397 | ANALOG PIA |
| 0398–039F | OUTPUTS PIAS |
| 4000–7FFF | 12V RAM |
| E000–FFFF | PROM |

TABLE 9

| | POWER PINS (FIG. 5) | | |
|---|---|---|---|
| +12V | +5V | GND | TYPE |
| — | 14 | 7 | 74LS00, 74LS04, 74LS08 74LS32, 74LS74 |
| — | 16 | 8 | 74LS138 |
| — | 16 | — | 898-1-R10K |
| 9 | 1,16 | 8 | 7,5365 |
| — | 5 | 10 | 74LS93 |
| 15mA | 360mA | — | TOTAL CONSUMPTION MAX |

FIG. 6, comprising FIGS. 6A through 6D, illustrates the read-only memory section 102 of the controller. Components U6, U12, U19, U25, U32, U36, U40, and U50 are all read-only memories, which may be of the programmable type. Component U50 is a programmable read-only memory (PROM) of the eraseable ultraviolet light variety. Each of these memory chips is capable of storing eight thousand bits and therefore, the eight components together are capable of storing eight thousand bytes with each byte representing an 8-bit word. The address and power lines are from the central processing unit illustrated in FIGS. 5A through 5C as well as the power supply and battery module 152. The $\overline{\text{ENABLE}}$ lines of these chips are driven by signals $\overline{\text{ROMEC}}$, $\overline{\text{ROME8}}$, $\overline{\text{ROME4}}$, $\overline{\text{JULIET}}$, $\overline{\text{ROMF}\phi}$, $\overline{\text{ROMF4}}$, $\overline{\text{ROMF8}}$, and $\overline{\text{ROMFC}}$. Data lines D$\phi$ through D7 are outputs from the memory to the microprocessor U68 shown in FIG. 5. Address lines A$\phi$ through A9 are from the outputs of the central processing unit 100 shown in FIG. 5.

The random access memory 104 and clock-calendar 106 are illustrated in FIG. 7, comprising FIGS. 7A–7C. Crystal Y-2 generates a 32.768 kilohertz oscillation in association with capacitor C73 and C74, resistor R86 and R87. Integrated circuit chip U93 counts down this clock to a 2 hertz signal on pin 3 thereof. Components U102 and U111 are also utilized in providing a three byte number on output pins 1 through 7, 9 and 12 through 15 for both chips.

Thus, what is generated is a long binary counter that counts down from the time that the controller is activated. This countdown is continuously inhibited by the clock reset signal shown in FIG. 7A and is thereby only activated during a power-down situation.

The outputs of U102 and U111 are interconnected with a portion of non-volatile random access memory 104 where a number is maintained representing the present as measured from some arbitrary data, typically Jan. 1, 1976. This number is normally incremented by a 60 Hz pulse. However, in a power failure, the number generated in U102 and U111 is continually incremented. After the power failure has ended, this number is added to the previous number in the dedicated portion of memory 104 so that the controller always knows the time.

By noting the difference in the count stored in the random access memory, it is possible through the software associated with the microprocessor U68 to remember any time period, such as the number of hours since the last Thursday, the number of hours since the controller was started, etc. Due to a software algorithm utilized with the microprocessor U68, the current time or any period of time may be calculated based upon the counts stored in the random access memory.

Random access memory 104 comprises six low power memories U78, U85, U92, U101, U108, and U110. These memories are battery powered during utility power outages in order to maintain valid data concerning the count of clock-calendar 106 as well as other data stored therein. These low power chips can store up to 768 eight bit bytes of information.

The power pins for the components of FIG. 7 are set forth in Table 10.

TABLE 10

| | POWER PINS (FIG. 7) | | |
|---|---|---|---|
| +4V | +5V | GND | TYPE |
| 14 | — | 7 | 4001B |
| 22 | — | 8 | 5101L3 |
| — | 14 | 7 | 74LS04 |
| — | 16 | 8 | 74LS367 |

As best seen in FIG. 8, comprising FIGS. 8A through 8D, the digital inputs 38 to the controller are inputed to buffering circuits U27, U30, U34, U38, U43, and U48. Each of these chips represents four Schmitt circuit buffers which receive an input signal from one of the 32 digital inputs via a 100 k resistor U26, U33, U37, and U47. The Schmitt circuit has hysteresis associated with it. The outputs of the Schmitt triggers go to buffers U28, U31, U35, U39, U44, and U49, with each chip representing six buffers.

Also associated with each 100 K resistor is an RC network comprising a 47 K resistor and a 0.1 microfarad capacitor for each of the digital inputs. Also associated with each digital input is a light emitting diode CR 4, 6, 8 . . . to CR 64 and a reverse bias protection diode CR 3, 5, . . . to CR65, to protect the light emitting diode in association with a 1500 ohm resistor in series with the parallel combination of the light emitting diode and the protective diode. These indicators comprise indicator 113 (see FIGS. 4 and 4A) and are displayed on a status panel 21 of the controller.

The output of buffers U28 through U49 are connected to eight of the inputs to the microprocessor U68 on data lines Dφ through D7. The actual inputs which are connected to input lines Dφ through D7 are selected by selection signals SEL4, SEL5, SEL6, and SEL7. Each of these inputs causes eight of the digital inputs, that is IN 1 through IN 8, IN 9 through IN 16, IN 17 through IN 24, and IN 25 through IN 32 to be connected to the input lines Dφ to D7.

The power pin connections for the components shown in FIG. 8 are set forth in Table 11.

TABLE 11

| POWER PINS (FIG. 8) | |
|---|---|
| 80C97 | +5V PIN 16 |
| | GND PIN 8 |
| 74C914 | +5V PIN 14 |
| | GND PIN 7 |

The communications interface 108 is illustrated in FIG. 9, comprising FIGS. 9A through 9D. The communications interface has two basic requirements; (1) to take care of the requirements of a general peripheral interface adapter U106 and (2) to supply the asynchronous serial communications adapter (ACIA) via the EIA ASCII standard through TTY interface U90.

The output of U106 is utilized to energize indicators 103 comprising four light-emitting diodes CR195, CR196, CR197, and CR198 which indicate to the user the various activity levels of the controller. These light-emitting diodes are part of the status display 21 of controller 20. They are labeled CPU 1, 2, 3, and 4 on the status display 21. Indicator CR197 blinks on and off due to a WATCHDOG signal emamating from pin 12 of peripheral interface adapter U106 and indicates to the user that the software has completed a control cycle and is about to execute the next control cycle.

The peripheral interface adapter U106 also has two byte-wide inputs consisting of eight bits each comprising port A, that is, Aφ through A7, and port B comprising lines Bφ through B7. The A port interacts with U99-8, U99-10, U98, and interconnected discrete components to form a baud generator 107 (see FIG. 4A). This generator interrelates with the asynchronous communications interface adapter U90.

The B lines of Port B run the COLD START clock and the clock reset as well as light-emitting diodes CR195 through CR198. Also associated with ports A and B are two flip-flop inputs CA and CB. The B flip-flop is used for clock reset and synchronizing and the A flip-flop is used for power supply interaction. This latter mentioned function is the hand-shaking arrangement between the power supply and battery module 122 and the remainder of the controller. Two signals, namely, a $\overline{\text{GOODBYE}}$ and $\overline{\text{POWER-DOWN}}$ are used to interact with peripheral interface adapter U106. Thus, when a power-down signal is inputed to the peripheral interface adapter U106, the computer via PIA U106 notifies the power supply that it has received the $\overline{\text{POWER-DOWN}}$ signal by generating a $\overline{\text{GOODBYE}}$ signal. Then, the power supply is insured that the remainder of the controller knows of the impending power outage and thereby completes the power shutdown in a manner to provide interlocking between the power supply and the remainder of the controller. In other words, the hardware realizes the impending failure of the power supply and acknowledges this to the power supply via the $\overline{\text{GOODBYE}}$ signal. The power supply preliminarily indicates that a failure is to occur by the $\overline{\text{POWER-DOWN}}$ signal and thereby provides the computer with the necessary time for getting its data registers in order.

Once a power-down has been acknowledged by the controller, it is totally completed before a power-up situation can be resumed. This insures against invalid data being stored in the various registers throughout the controller when there is a transitory power failure on any of the power supply outputs. Therefore, every power-down is either a total power-down or it is not a power-down at all. During the time between acknowledgement of the $\overline{\text{POWER-DOWN}}$ signal and the actual shutdown of the controller, the controller saves particular instructions and status of the operational program in non-volatile random access memory 104. Then, when a power-up signal is received from the power supply and battery module 122, the remainder of the controller can initialize its various registers by clearing or setting its registers to pre-established values determined by the read-only memory 102, and in this manner bring about the resumption of controller operation in a precise, clean manner. This handshaking between the power supply and the remainder of the controller is applicable to any data processing device and is not constricted to a device such as a programmable sequence controller as set forth in this description. Further details of this handshaking arrangement are set forth in the discussion of the power supply module 122. Table 19 gives additional details concerning PIA U106.

The remaining portion of the schematic shown in FIG. 9 comprises the serial communications interface 108. This communications interface has a full duplex configuration namely, that it can transmit and receive information at the same time. The asynchronous communication interface adapter U90 incorporates output signal CTS standing for clear to send, RTS, request to send, RD, received data, and TD, transmit data for communicating with external data communication devices 26. The serial data is automatically converted and presented on data lines Dφ through D7 and then subsequently back to the data input lines of the microprocessor U68 (see FIG. 5). Selection of the particular chip in the central processing unit 100 (see FIG. 5) is performed via chip select lines 8, 9, and 10 of the asynchronous communications interface adapter U90.

Figure 9A:
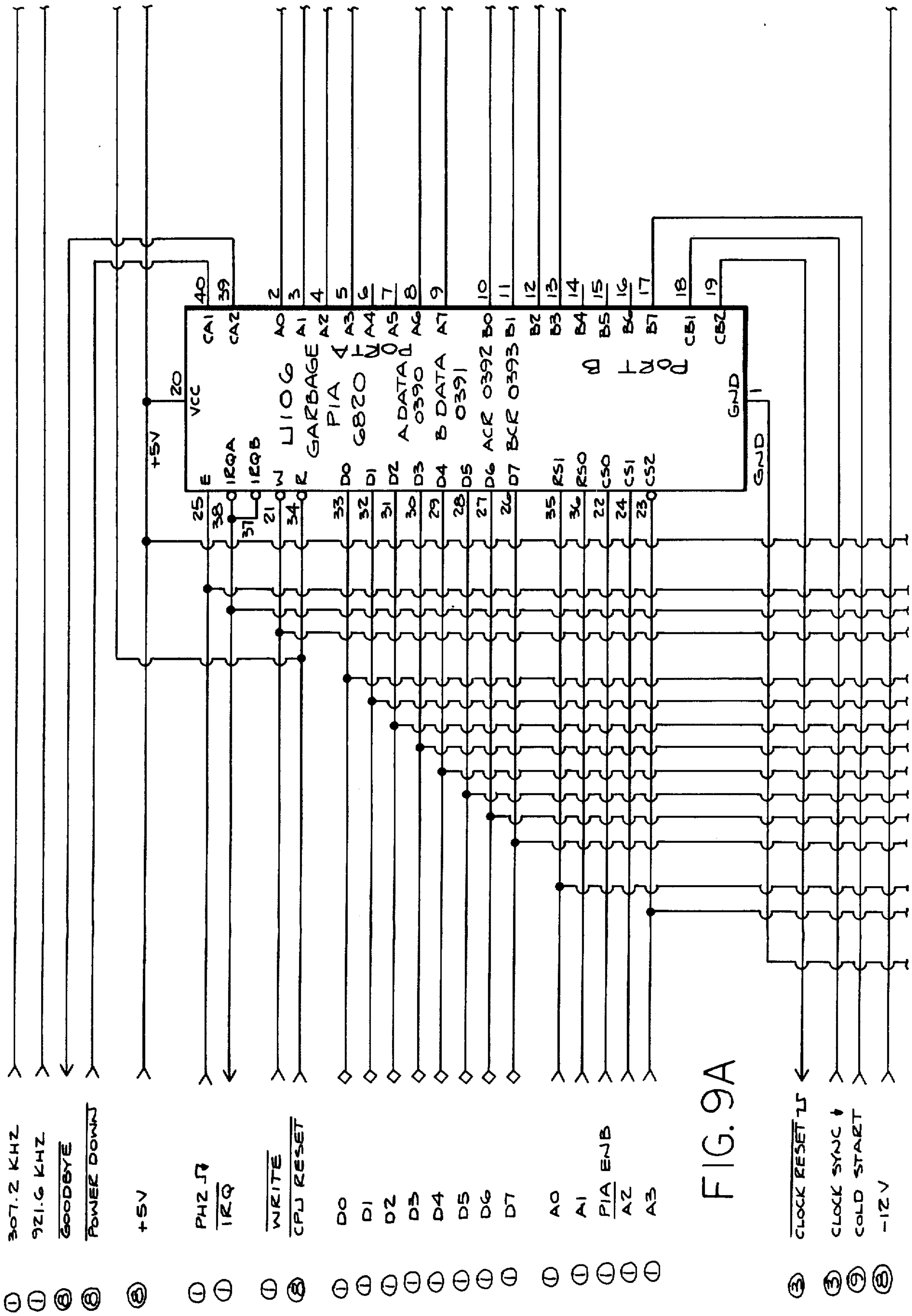
Figure 9B:
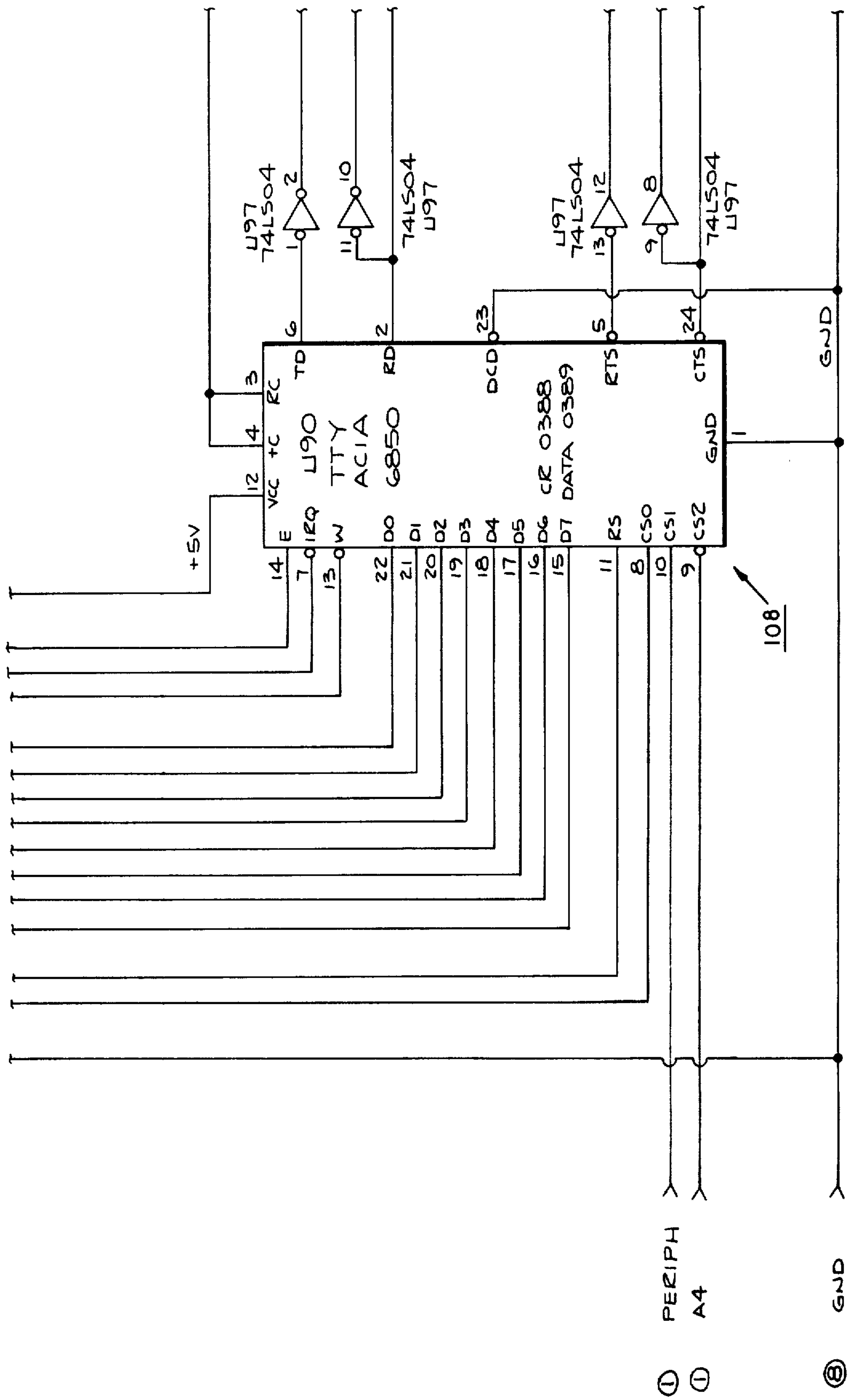
Figure 9C:
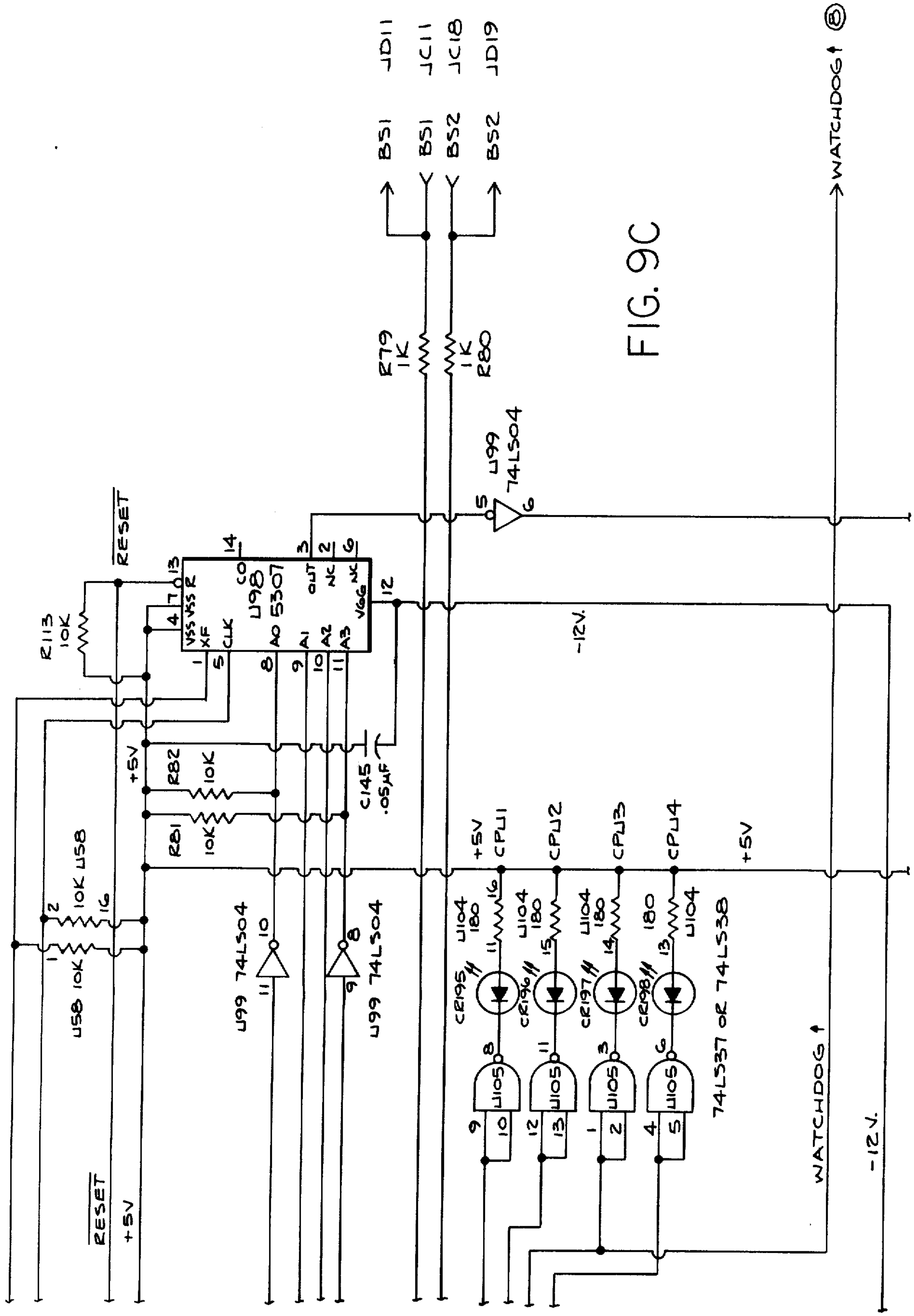
Figure 9D:
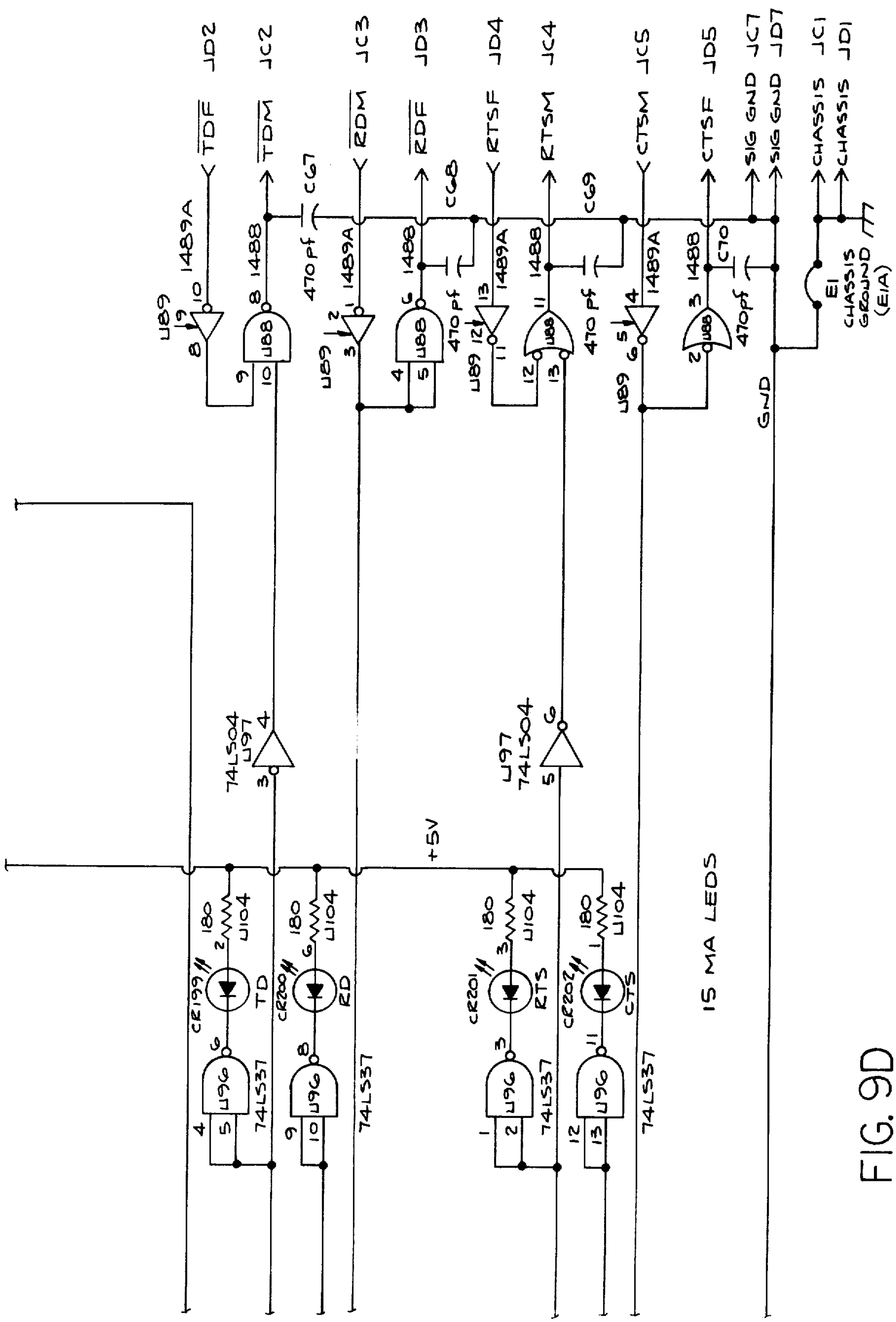
Figure 10A:
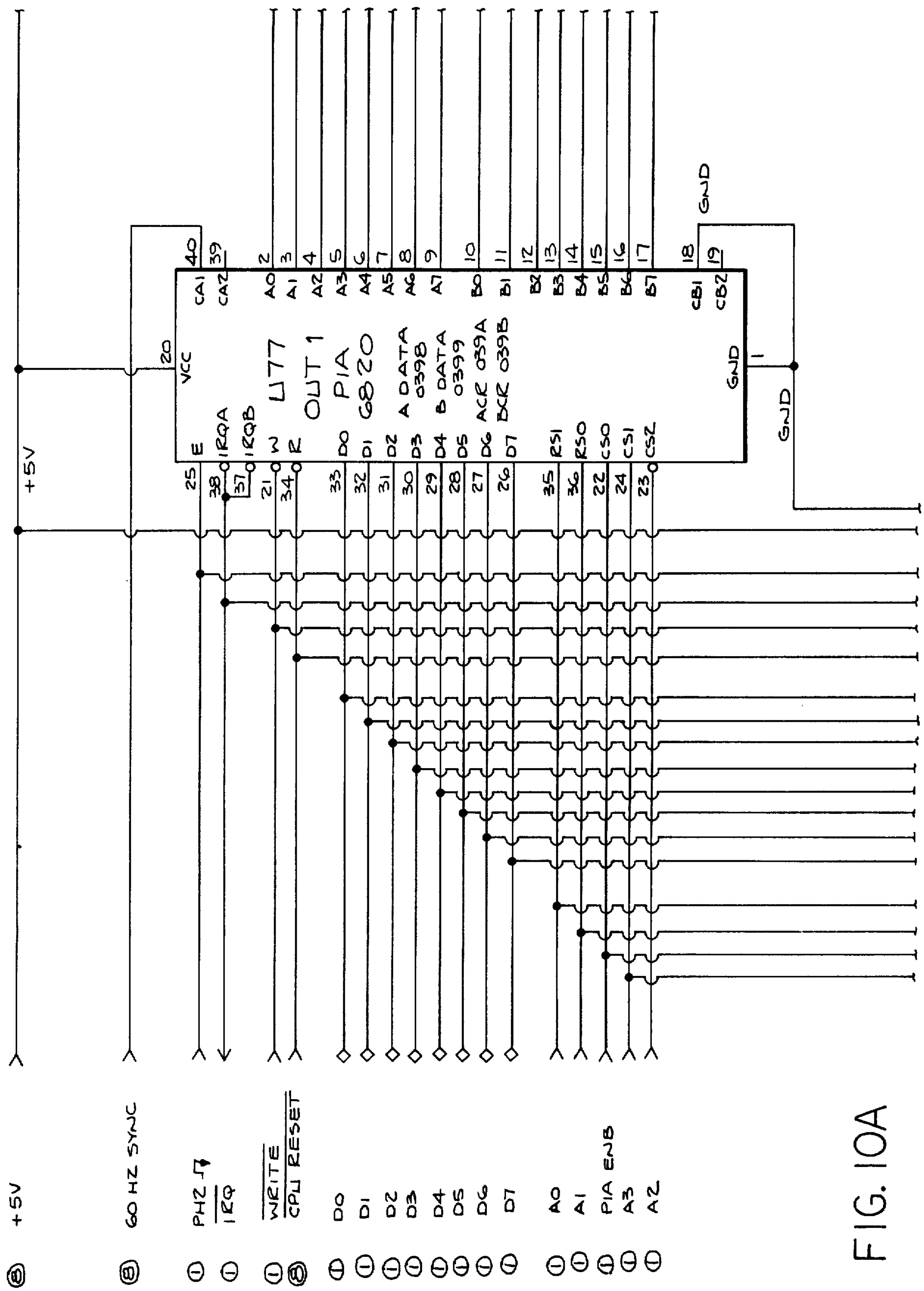
Figure 10B:
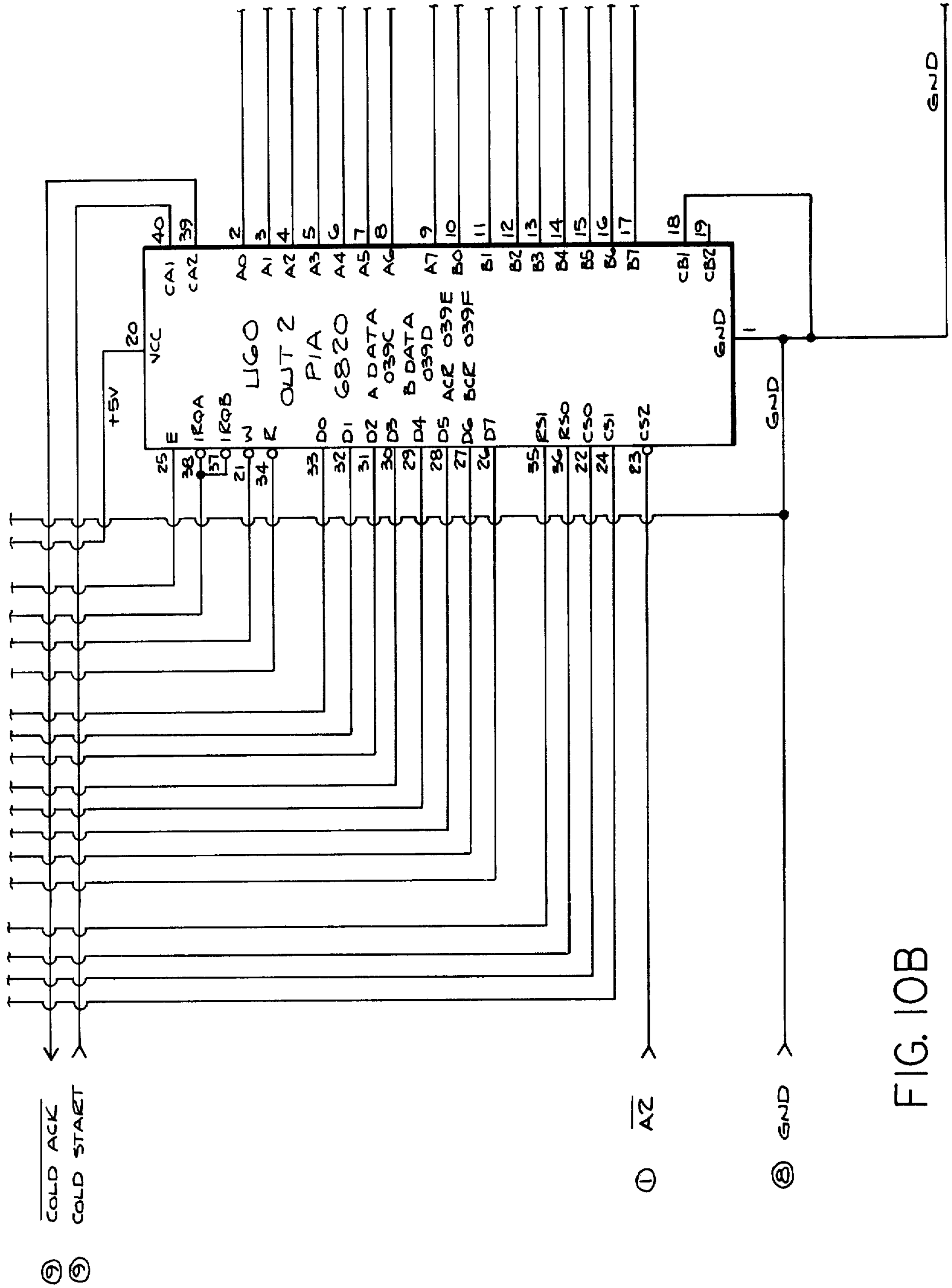
Figure 10C:
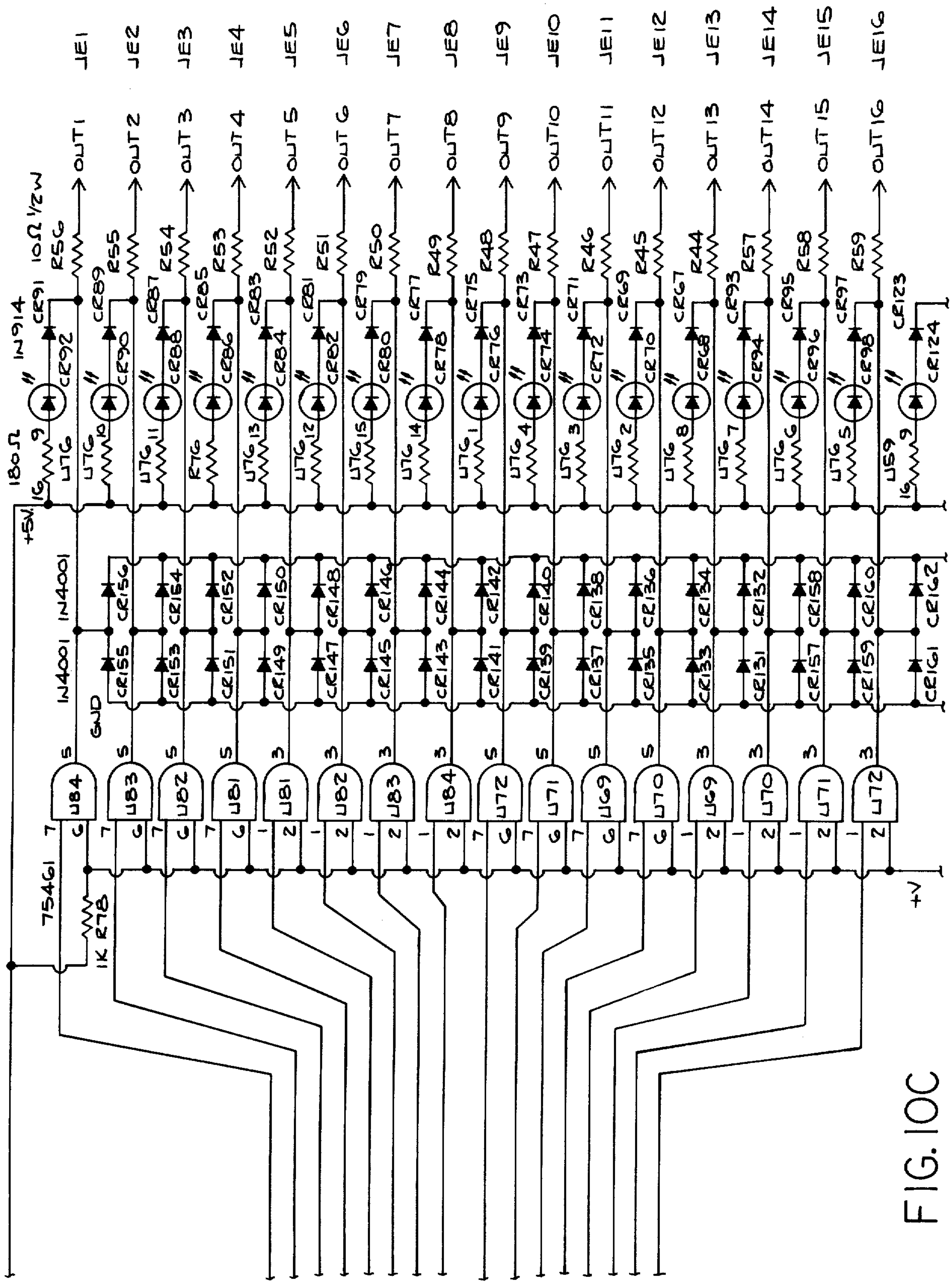
Figure 10D:
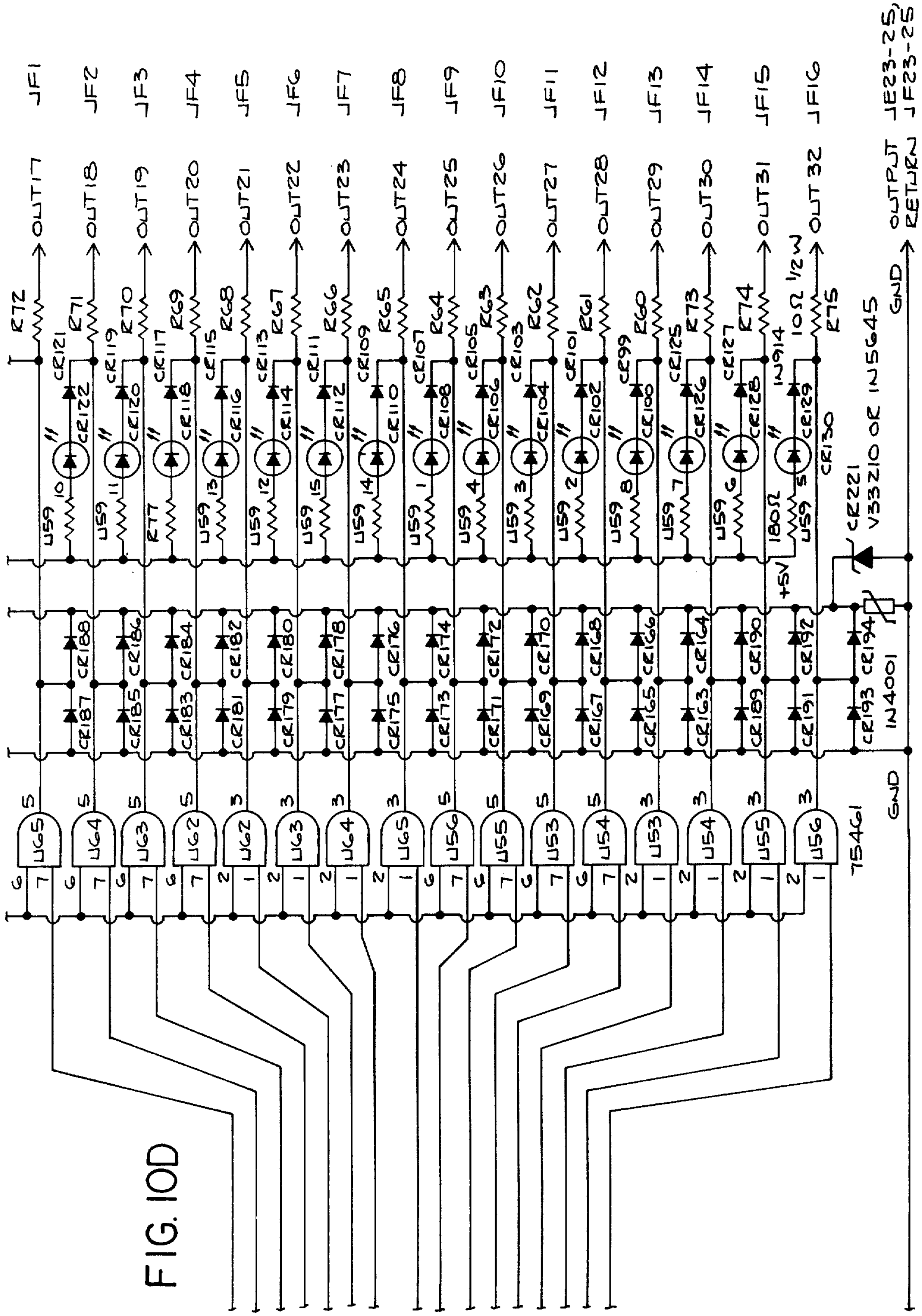

It should be noted that the clear to send, ready to send, received data, and transmit data signals have associated indicators 109 (see FIGS. 4 and 4A) comprising LED's CR202, CR201, CR200, and CR199 respectively, which are displayed on the status display 21 of the controller 20. The output of the communications interface is coupled to connector 30 (see FIG. 1) for receipt of data from the interconnected device as well as connector 32 for transferral of data via cable 28 to a second programmable sequence controller or other digital control device. Thus, transmitted data from the asynchronous communications interface adapter is through OR gate U88 to pin JC2. Received data comes in on pin JC3 through an inverter U89 and then to the asynchronous communications interface adapter U90 on pin 2. The input data coming in on connector 30 also goes through logic gate U88-6 to come out on pin 6 of connector JD3, that is, connector 32. In FIG. 9D, the JC connector is connector 30 and the JD connector is the connector 32. Therefore, received data goes to two places; one to the asynchronous communications interface adapter and subsequently passed out of a series connector to the next controller 20' (see FIG. 1). This makes the daisy-chain interconnection of various controllers easily obtained.

See Table 19 for additional details concerning the operation of U90. The power pin connections for the components in FIG. 9 are set forth in Table 12.

The digital outputs 42 (see FIG. 1) are generated by the digital output module 144 and signal conditioning module 110 in the details set forth in FIG. 10, comprising FIGS. 10A through 10D. These digital output drivers are, in effect, open collector transistors in a single package indicated by U53 through U56, U62 through U65, U69 through U72, and U81 through U84. A 10 ohm resistor for each of the outputs (elements R44 through R75) provide series protection against overloading the outputs of the drivers. There are also two diode clamps so as to prevent the outputs from going below ground or higher than the value of the breakdown voltage of zener diode CR221. This diode clamp is shown by diodes CR131 through CR194.

TABLE 12

| POWER PINS (FIG. 9) | |
|---|---|
| +5V PIN 14, GND PIN 7 | 74LS04, 746S37, 1489A |
| +12V PIN 14, GND PIN 7, −12V PIN 1 | 1488 |

A light-emitting diode indicator is on each of the outputs drivers such that when output driver U84, for instance, is clamped to ground, the light-emitting diode CR92 will ignite. These light-emitting diodes are illustrated by reference numerals CR68, 70 . . . CR130 in conjunction with a series diode CR69, CR71 . . . CR129 and a 180 ohm resistor in resistor packs U59, U76, and R77.

The digital output drivers are driven through peripheral interface adapters U60 and U77. Each peripheral interface adapter has sixteen drive lines in two groups of eight. Selection of the peripheral interface device lines comes from the data lines Dφ through D7 of the microprocessor U68. Also, address lines Aφ, A1, A2, and A3 interconnect with microprocessor U68 in order to select the particular group of outputs generated by the peripheral interface adapters U60 and U77. See Table 19 for additional details of the operation and set up of U60 and U77.

In effect, each of the peripheral interface adapters operates crudely as two rows of eight flip-flops so as to maintain the data supply to it from the microprocessor U68 and transfer this data to the buffering and output driver circuitry for interconnection to the two external machines via cable 42 (see FIG. 1).

Connector 41 is provided for attaching cable 42 to the controller output drive line. This connector is shown in FIG. 10 as having pins JE1 through JE16 and JF1 through JF16. The power pin connections are set forth in Table 13.

TABLE 13

| POWER PINS (FIG. 10) | |
|---|---|
| 75461: | PIN 8 + 5V<br>PIN 4 GND |

The analog input multiplexer 116 and 8-bit analog to digital converter module 118 and portion of the control module 120 for the selection of the analog inputs is best seen in FIG. 11, comprising FIGS. 11A through 11D. As seen therein, the analog inputs are received on connector 39 (see also FIG. 1) comprising pins JH1 through JH16 and JJ1 through JJ16. These inputs are generally considered to be outputs from thermistors having nominal resistance values of 3,000 ohms at 80° C. Each thermistor from an analog input is voltage divided with a 3.3 K resistor U7, U8, and U21. A detail of the operation of the analog input is shown in FIG. 14. There, and as also seen in FIG. 11, the bridge voltage is transmitted to a multiplexer integrated circuit U23, U16, U9, and U3 on input pins 13, 14, 15, 12, 1, 5, 2, and 4 for each chip. There, the bridge voltage measurement is selected by the peripheral interface adapter U24 through gate U10, pins 10, 11, 4, and 3. The particular group of eight analog input values selected is subsequently subselected by pins A, B, and C of each multiplexer unit U23, U16, U9, and U3. A single analog input therefore is selected by the ENABLE line 6 of each multiplexer chip and by the three bits on inputs A, B, and C of each multiplexer chip which is decoded into a one of eight selections for one of the eight analog inputs. These address lines to the multiplexer are generated by a peripheral interface adapter U24, address lines A1, A2, and A3. The selected analog voltage is compared to a voltage represented by a number generated by output lines Bφ to B7 of the peripheral interface adapter U24 via comparator U17. That is, the unknown voltage is measured by determining whether or not it's higher or lower than an 8-bit value which is subsequently converted to an analog voltage via operational amplifier U18 and compared with the unknown voltage at comparator U11. In this manner, any analog voltage can be compared to a preset value as determined by the set point inputed into the control program by the user.

Most of the time, the controller does not determine the actual voltage of the analog input but merely whether or not the voltage of the input exceeds the desired preset value established by the software with regard to the preset value selected by the user. However, an actual value can be determined by literally looking for such as by incrementing the eight bits of the peripheral interface adapter outputs Bφ through B7 until a difference greater than or less than the output of the comparator at U11 is obtained. However, in most applications, such as to turn on the heat in the room if the operating temperature of an analog input thermistor falls below 70°, actual calculation of the analog input voltage is not desired. In this case, the digital to analog converter is set to represent a present value of 70° and it is compared with the analog input voltage obtained on the analog input representing the ambient temperature. If the thermistor has a higher value, that is, if it represents a voltage greater than 70°, the signal will maintain the heater in the OFF state, and vice versa, if the thermistor indicates a temperature below 70°.

The microprocessor program (discussed later) for the central processing unit 100 generates delays and thereby hysteresis into the analog inputs so as to prevent the controller from turning driver outputs ON and OFF for slight voltage variations of analog inputs. Typically, the hysteresis represents a two or three degree Fahrenheit differential.

For comparing two analog input voltages, one of the analog voltages is inputed to the peripheral interface adapter and is used to generate the binary number on outputs Bϕ to B7 so as to represent a preset value. This value is then converted into a voltage which is then compared with the voltage of the other analog input. Furthermore, the analog inputs can be converted into decimal numbers via the peripheral interface adapter and stored in a portion of the random access memory 104 or 136 and thereby used in comparison with each other. One method of determining this actual analog voltage is to take the voltage and compare it with the full scale voltage which, in the present controller, is 5 volts. First, a voltage representing half of the full scale, that is, two and one half volts, is compared with the analog input. If the input is higher than 2½ volts, then half of the difference between 2½ and 5 volts is generated and compared with the analog input, etc. until an 8-bit number having a differential input of one 256th of the total 5 volt full-scale voltage is obtained representing the actual voltage of the analog input. All these voltages are presented to comparator U11 and compared with the analog input voltage. The actual generation of the voltages for comparison with the analog input voltage is generated by software (discussed later) within microprocessor U68.

Further details of the setup of U24 is set forth in Table 19. The power pin connections for the components of FIG. 11 are set forth in Table 14.

TABLE 14

| TYPE | POWER PINS (FIG. 11) 4104 SUPPLY | GND | +12V | −12V |
|---|---|---|---|---|
| MC1458 | — | — | 8 | 4 |
| LM311 | — | 1 | 8 | 4 |
| 4011 | — | 7 | 14 | — |
| 4104 | 15,16 | 8 | 1 | — |

As shown in FIG. 14, the 3.3 K resistor is connected to a reference voltage which is typically 5 volts, and therefore a voltage divider between 5 volts and ground is obtained for use as the analog input. Resistors U2, U13, U15, and U22 as well as capacitors C1 through C32 are coupled to the voltage divided analog input for noise suppression purposes. Furthermore, between the noise suppression circuitry and the voltage divider analog input voltage is a 33 kilohm resistor U1, U8, U14 and U21. Since thermistors have a nonlinear resistance variation with respect to temperature, the highest accuracy of the analog inputs is at the nominal resistance of 3.3 kilohms. Large deviations from the selected operating point degrade the effective resolution of the thermistor analog circuitry to as low as 7° C. for a single bit change in the controller. The actual analog input voltage however is linearized in the software of the microprocessor U68. So, it is only the accuracy that degrades depending upon the operating point of the analog input but not the computation of the value that the analog input represents.

It should also be noted that it is possible to eliminate the thermistor of the analog input and to directly measure an analog voltage source coupled to any analog input and to use this to drive a selected analog input. The only constraint is that the particular analog voltage source be capable of not being appreciably affected by the 3.3 K resistor associated with the input; and if so, the 3.3 K resistor is disconnected from that particular input.

FIG. 12, comprising FIGS. 12A through 12D, is a schematic diagram of the power supply portion of the power supply and battery module 122. The power supply uses a constant voltage transformer T1 which is used to reduce the dissipation in the downstream series regulators such as Q3. The voltage generated by the power supply are +12 VDC, +5 VDC, −12 VDC, and −5 VDC. There is also a raw voltage generated which is essentially unregulated at +24 VDC and +8 VDC. These latter two voltages are not series regulated but merely taken directly from appropriate sources of the constant voltage transformer before passing these voltages through regulators. Each of the four primary voltages, that is, +12 VDC, +5 VDC, −12 VDC, and −5 VDC have light-emitting diode indicators CR214, CR215, CR217 and CR216 (see FIG. 11) respectively, which is shown on status display 21 (see FIG. 1). LED CR225 indicating "5 VOK" and CR226 indicating "ACOK" are not shown on status display 21 (FIG. 1). These LED's are used for diagnostic purposes. Devices FB1 through FB4 are bead ferrite inductors for suppressing high frequency transients. A +4 volt output is generated by ni-cad batteries BA1 on a battery backup basis. Otherwise, it is generated from the +5 voltage source via transistor Q7 and associated circuitry. The ni-cad batteries BA1 detect when the voltage drops and maintain the +4 voltage when a power outage occurs. Power pin set up for the components shown in FIG. 12 is set forth in Table 15.

TABLE 15

| GND | +4V | POWER PINS +5V | TYPE |
|---|---|---|---|
| 7 | 14 | — | 4001, 4011, 4082, 74C914 |
| 8 | 16 | — | 4538 |
| 7 | — | 14 | 74LS04 |

Utility power sensing is performed by a photocouple transistor diode pair U113 which generates pulses when the AC line is being triggered and therefore operating normally. These pulses are sent to an RC network R98, C89 which is transferred to a one-shot multivibrator U46 so as to continually reset the multivibrator if the AC voltage is present. That is, this resetting continually maintains the state of one-shot multivibrator U46 which in the absence of the setting generates the $\overline{\text{POWER-DOWN}}$ signal via logic circuitry U45-3, U45-4, U41, and U52.

As also seen at the inputs of gate U115-1, three other conditions can cause the output of this gate, called "$\overline{\text{UHOH}}$", to go to a low state; namely, a fault in the "5 VOK" signal, a "DEAD CPU", or a $\overline{\text{GOODBYE}}$ high signal. The "5 VOK" signal monitors the generated DC voltage of the power supply module and causes the $\overline{\text{UHOH}}$ to drop if there is a fault in any of the generated DC voltages, regardless of the state of the utility AC.

A "DEAD CPU" signal occurs if the WATCHDOG pulse does not occur, indicating that the controller is not cycling through its software.

The GOODBYE signal dropping also drops UHOH if the STANDBY signal is not true. This forces the setting of the flip-flop formed by U45-4 and U45-11 in those instances where it has not properly been set to turn the STANDBY signal ON; e.g. caused during a transitory utility power outage or a statistical glitch in the flip-flop. This latter occurrence is known in the art as a synchronizer failure.

The normal sequence of events when UHOH has a falling edge is that the POWER-DOWN signal drops, followed by a 200 microsecond time delay formed by RCD group R105, C91, and diode CR220 turning ON the STANDBY signal and turning OFF the STANDBY signal. Until the STANDBY signal becomes true, flipflop U45-4 and U45-11 cannot change state (be set) once it has reset and caused the POWER-DOWN signal to enter the low state. This enabling of the flip-flop is accomplished by feeding the STANDBY signal to U45-1 and ANDING the signal with the UHOH signal. By this arrangement when POWER-DOWN goes down, it cannot go back up until STANDBY true has occurred. This relationship should therefore prevent a momentary drop of UHOH from making POWER-DOWN true when STANDBY is not true. However, this may sometimes happen on a statistical basis as mentioned above.

Normally therefore, when UHOH goes back high - indicating correction of the problem - flip-flop U45-4 and U45-11 will change state causing POWER-DOWN to become high followed, in about ½ a second, by STANDBY going low and STANDBY going high. This time delay is generated by RC combination R104 and C91 and this delay insures that the remaining power supply voltages have settled before the controller comes back on line. The controller resumes operation when STANDBY becomes true and STANDBY becomes false.

The GOODBYE acknowledge signal to U115-1 thus insures a STANDBY high signal following any POWER-DOWN low signal even if a momentary glitch has occurred on flip-flop U45-4 and U45-11. A proper power down sequence is always observed by the controller with the storing of necessary data in non-volatile RAM 104. The controller thus never sees an indication of a power or computer failure without the controller getting its house in order and the power supply entering the standby (or CPU reset) state.

It should be noted that once the STANDBY signal is generated by the power supply and battery module 122, it is transferred to the clock-calendar 106 and random access memory 104 for informing the random access memory as well as the clock-calendar that a power failure has occurred; thereby preventing the inhibition of the counter U93 and allowing it to continue the count along with U102 and U111. Therefore an accurate record of the time is always maintained. The random access memories 104 and 136 cannot have data read or written therefrom until the STANDBY signal is changed to the false state.

As mentioned earlier, this handshaking arrangement insures that the central processing unit as well as the other modules of the controller aside from the power supply and battery module 122 have been able via the software of the microprocessor to insure that data needed to be stored is properly maintained during the power shutdown period as well as to provide the necessary information to the clock-calendar in order for it to continue its count and thereby keep track of time.

Furthermore, as shown in FIG. 12, the watchdog pulse from the peripheral interface adapter U106 is shown in FIG. 9 and is interconnected with a circuit in the power supply and battery module 122 so as to generate a WATCHDOG pulse which in turn is transferred to logic gate U115, resistor R123, R124, diode CR219, and buffer U114 to generate a DEAD CPU signal if the watchdog pulse is present. If the pulse is not received at the rate generated by the peripheral interface adapter U106 the time constant associated with capacitor C192 and resistor R121 disables the WATCHDOG PULSE which in turn disables the DEAD CPU signal which disables the POWER-DOWN signal.

In addition, a 60 hertz synchronizer is generated from output pin 5 of the transformer T1 via resistor 108 and capacitor C192 and associated one-shot multivibrator U46. This insures that the controller only uses a 60 cycle signal and not a 120 cycle signal throughout its circuitry, especially with respect to the clock-calendar 106.

The power pin connections for the circuitry shown in FIG. 12 is set forth in Table 15. The battery supply portion of the power supply and battery module 122 is primarily shown in FIG. 13, comprising FIGS. 13A through 13D. A 12 volt battery is shown by B1 and it is constantly charged by a 13.65 volt voltage regulator 126. This voltage regulator is fed from the +24 VDC unregulated power as shown in FIG. 12. It utilizes a voltage regulator Q11 and associated circuitry for maintaining a +13.65 volt charge across battery B1. The battery voltage is brought out to a +12 volt value via the +12 volt regulator 128.

When there is a power failure, battery B1 is used to generate the +12 volt supply. This same battery can also be used to generate the "Cold Start Bit" as shown by circuitry section 130. The +4 volt signal which is supplied to the +2 volt reference circuitry 132 is from the ni-cad batteries as shown in FIG. 12. The cold start bit circuitry 134 indicates to the controller when battery B1 has been removed from the controller. In such a situation memory within the controller cannot be considered valid. The COLD START bit indicates to the remaining portions of the controller and specifically a peripheral interface adaptor U106 (FIG. 9) and the digital output drivers via peripheral interface adaptor U60 (FIG. 10) that battery B1 has been removed and therefore that all memories may contain invalid data. By the controller receiving the COLD START bit, the memories can be reconditioned in order to have new valid data stored therein. As can be seen in FIG. 10, the peripheral interface adaptor U60 acknowledges the presence of a COLD START via pin 40 which is interconnected with gate U4011-3 and thence to the COLD START bit circuitry 134.

The "2 V reference circuitry 132 provides a reference voltage to the COLD START bit, to the voltage regulators 126 and 128 and to the +5 V sense circuitry 130. This +2 V reference facilitates comparison with other voltages to ascertain if a change in any of these voltages has occurred. Without this reference, it is rather difficult to sense whether power is coming up or down unless the reference stays fixed when the power is going down.

As best seen in FIG. 12, during normal operation of the controller battery BA1 is charged by +5 volt power regulated by transistor Q7, resistors R96 and R97, Schottky diodes CR222 and CR227 and capacitor C88.

In addition to the circuitry illustrated in FIGS. 5A through 13D, a 16 K byte extension non-volatile RAM 136 is interconnected with bus 101 for providing additional memory area for the user program. The circuitry for this RAM is set forth in FIGS. 16A through 17E, and the power pin connections for the components shown therein are respectively set forth in Tables 16 and 17. By this additional memory, the programmable sequence controller 20 can store up to 120 drum lines entered by the user. In this regard it should be noted that although each simulated sequence drum has addressable areas for more than 100 drum lines, the total system, that is all the drums, can only store 120 programmed lines as illustrated in the enclosed schematics, including the extension memory. Of course, it is obvious to one of ordinary skills in the art that additional random access memory can be added to the bus 101 to provide additional memory for user programming and thus if the need for such additional drum lines is realized, they can be easily added.

The complete program listing of the software used by the microprocessor U68 as shown in FIG. 5 is set forth in Table 18. The comment statements made throughout the computer program make the program listing readily understandable to one of ordinary skill in the art. To further describe the interrelationship between the hardware set forth in FIGS. 5A through 17D and the microprocessor program, an appendix set forth as Table No. 19 is presented which, when coupled with the Motorola literature concerning the MC 6800 microcomputer, gives additional information regarding the philosophy and nomenclature used in the program listing.

TABLE 16

POWER PINS (FIG. 16)

| +5V | +12V | +12VB | GND | 4104 Supply | TYPE |
|---|---|---|---|---|---|
| 14 | — | — | 7 | — | 74LSϕϕ,ϕ2,ϕ4,1ϕ,2ϕ |
| 16 | — | — | 8 | — | 74LS139,74LS161 |
| — | — | 14 | 7 | — | 74Cϕϕ,ϕ2,ϕ4;4ϕ13 |
| — | — | 16 | 8 | — | 74C221,8ϕC97,4046 |
| 1 | — | — | 8 | — | 4ϕ49 |
| — | — | 1 | 8 | 15,16 | 41ϕ4 |
| 16 | 1,9 | — | 8 | — | 32ϕ7 |

TABLE 17

POWER PINS (FIG. 17)

| 4104 SUPPLY | −5VB | GND | +5V | +12VB | TYPE |
|---|---|---|---|---|---|
| | — | 7 | 14 | — | 74LS04 |
| | — | 1ϕ | 20 | — | 74LS374 |
| | — | 7 | — | 14 | 74C02,4024 |
| | — | 8 | — | 16 | 74C157 |
| 15,16 | — | 8 | — | 1 | 4104 |
| — | 1 | 3,12 | 11 | 22 | 6605 |

Table 18

```
                         NAM    SUNDRM1

*****************************************************************
                    *
                    * DESCRIPTIONS OF THE ERROR MESSAGE CODES
                    *
                    **
*******************************************************************
********

00003     0001     ERBDCM EQU     1          COMMAND NAME NOT
                                                FOUND OR NOT YET
                                                DONE
00004     0002     ERNOEX EQU     2          FORCED TO TRANSFER TO
                                                NONEXISTENT LINE
00005     0003     ERMNLN EQU     3          REMOVED STOP FROM
                                                NONEXISTENT LINE
00006     0004     ERNOSP EQU     4          DID NOT HAVE SLASH IN
                                                STOP
00007     0005     ERUNDF EQU     5          OUTPUTTED LINE #
                                                REFERS TO
                                                NONEXISTENT LN
00008     0006     ERNOLN EQU     6          ASKED TO FIND
                                                NONEXISTENT LINE #
00009     0007     ERBDRG EQU     7          VALUE OUT OF RANGE IN
                                                COMMAND LINE
00010     0008     ERNOPL EQU     8          OPEN OF NEW LINE BUT
                                                NO LINE NUMBER
00011     0009     ERBDLN EQU     9          LINE NUMBER NOT VALID
00012     000A     ERNEDT EQU     10         EDIT COMMAND
                                                SPECIFIED, BUT NOT
                                                IN EDIT
00013     000B     ERNIPM EQU     11         INPUT SETTINGS
                                                SPECIFIED IN X1 OR
                                                X2 MODE
```

```
000C   ERDDRM EQU   12          X1 OR X2 ADDRESS IS
                                   FOR DIFFERENT DRUM
000D   ERNXTM EQU   13          AX SPECIFIED WHEN NOT
                                   IN X1 OR X2 MODE
000E   ERBDRL EQU   14          UNRECOGNIZEABLE
                                   RELATIONAL IN
                                   ANALOG SPEC
000F   ERBDAV EQU   15          INCORRECT VALUE IN
                                   ANALOG
                                   SPECIFICATION
0010   ERTMNX EQU   16          TOO MANY ANALOG
                                   SPECIFICATIONS FOR
                                   BUFFER
0011   ERNTBL EQU   17          ALPHA ARGUMENT NOT
                                   FOUND IN TABLE
0012   ERNTBG EQU   18          NUMERIC ARGUMENT >
                                   65K
0013   ERBDLM EQU   19          BAD DELIMETER BETWEEN
                                   ARGUMENTS
0014   ERXEBD EQU   20          BAD FIRST DIGIT OF
                                   LINE NUMBER
0015   ERXEME EQU   21          MULTIPLE XE ADDRESSES
                                   FOR SAME DRUM
0016   ERNORM EQU   22          NEW LINE REQUESTED,
                                   BUT MEMORY FULL
0017   ERPUED EQU   23          CAN'T PUNCH WHILE
                                   STILL IN EDIT
0018   ERRTND EQU   24          INVALID DRUM NUMBER

       *******************************************
                                   ******************
                                   *****************
       *
       * MEMORY LOCATION DEFINITIONS
       *
       **
                                   ******************
                                   ******************
                                   ******************
                                   ************

0002   RAMSTR EQU   $2          START OF USABLE RAM
7FFF   RAMEND EQU   $7FFF       END OF THE RAM
0380   DEVSTR EQU   $380        BEGINNING OF DEVICE
                                   LOCATIONS
E000   ROMSTR EQU   $E000       START OF USA[illegible]
7FEB   SPFLAC EQU   RAMEND-20      BEGINNING [illegible]
                                      OF STACK
                                      POINTER
7F9B   DRUMND EQU   $7FFF-100      ENDING ADDRESS OF
                                      DRUM LINE
                                      STORAGE BUFFER

       ********************************************
                                      *******
       *
       * EQUATES TO DEFINE LOWER CORE ADDRESSES
       *
       **
                                      ***************
                                      ***************
                                      ***************
                                      ***************
                                      *****
```

```
0381   CLKMSB EQU   DEVSTR+$1
0382   CLKMDL EQU   DEVSTR+$2
0383   CLKLSB EQU   DEVSTR+$3    POWER PROTECTED
                                   CLOCK @ 1HZ

0384   IN18   EQU   DEVSTR+$4    PIA FOR DIGITAL
                                   INPUTS
0385   IN916  EQU   DEVSTR+$5
0386   IN1724 EQU   DEVSTR+$6
0387   IN2532 EQU   DEVSTR+$7
0388   TTYSTT EQU   DEVSTR+$8    R/W STATUS FOR
                                   ACIA
0389   TTYDAT EQU   DEVSTR+$9    ACIA DATA REGISTER

0390   BAUD   EQU   DEVSTR+$10    R/W BAUD
                                    SELECTION
                                    REGISTER
0391   LITES  EQU   DEVSTR+$11    R/W CONTROLS
                                    LIGHTS. 1=>
                                    ON.
0392   PWRCTL EQU   DEVSTR+$12    R/W CONTROLS
                                    POWER FAIL
                                    NOTIFICATION
0393   CLKCTL EQU   DEVSTR+$13    R/W CONTROLS
                                    OPERATION OF
                                    60HZ CLOCK
                                    INPUT
0394   MUXCMP EQU   DEVSTR+$14    R/W SELECTS
                                    ANALOG INPUT
                                    AND GIVES
                                    COMPARE
0395   DACVAL EQU   DEVSTR+$15    W SETS VALUE OF
                                    DAC FOR
                                    COMPARISON
0396   ANAA   EQU   DEVSTR+$16    CONTROL FOR
                                    MUXCMP
0397   ANAB   EQU   DEVSTR+$17    CONTROL FOR
                                    DACVAL
0398   OU18   EQU   DEVSTR+$18    CONTROL REGISTERS
                                    FOR DRIVER
                                    HARDWARE
0399   OU916  EQU   DEVSTR+$19
039A   OUAA   EQU   DEVSTR+$1A    CONTROL FOR OU18
039B   OUAB   EQU   DEVSTR+$1B    CONTROL FOR OU916
039C   OU1724 EQU   DEVSTR+$1C    DRIVER HARDWARE
039D   OU2532 EQU   DEVSTR+$1D
039E   OUAC   EQU   DEVSTR+$1E    CONTROL FOR
                                    OU1724
039F   OUAD   EQU   DEVSTR+$1F    CONTROL FOR
                                    OU2532

       * DEFINE LIGHTS

0001   EOJLIT EQU   1         FLASHES ONCE PER EOJ
0002   RPTLIT EQU   2         FLASHES ONCE PER
                                INTERRUPT
0004   SECLIT EQU   4         FLASHES ONCE
                                PERSECOND
0008   RUNLIT EQU   8         ON WHEN INTERPRETER
                                RUNNING
```

```
00072 0002                ORG    RAMSTR   START USING RAM FOR
                                             VARIABLES

                    ************************************
                                          ******************
                                          **********
                    *
                    * VARIABLES AND MASKS FOR DIGITAL INPUTS
                    *
                    **
                                          ******************
                                          ******************
                                          ******************
                                          ************

                    *NINPUT EQU 32 NUMBER OF DIGITAL INPUTS
00075       0004    NBIN   EQU    4       BYTES REQUIRED TO
                                             STORE DIGITAL
                                             INPUTS

00077 0002 0004     IHVAL  RMB    NBIN    COPY OF HARDWARE
                                             STATES
00078 0006 0004     IHDBNC RMB    NBIN    DEBOUNCE REGISTER
00079 000A 0004     IHDAT  RMB    NBIN    DEBOUNCED DIGITAL
                                             INPUT DATA
00080 000E 0004     IHMSK  RMB    NBIN    DIGITAL INPUT CHANGE
                                             MASK
00081 0012 0004     OHMSK  RMB    4
00082 0016 0004     MYMSK  RMB    4
00083 001A 0004     AHMSK  RMB    4
00084 001E 0004     IHDRM  RMB    NBIN    DIGITAL INPUT STATES
                                             SEEN BY DRUM
00085 0022 0004     IHCHG  RMB    NBIN    BIT MASK SHOWING
                                             INPUTS WHICH
                                             CHANGED

                    *********************************
                                          ******************
                    *
                    * STORAGE FOR OUTPUT DRIVER STATES AND MASKS
                    *
                    **
                                          ******************
                                          ******************
                                          ******************
                                          ************

                    *NOTPUT EQU 32 NUMBER OF OUTPUT DRIVERS
00088       0004    NBOT   EQU    4       BYTES NEEDED TO STORE
                                             OUTPUT DRIVERS

00090 0026 0004     OHVAL  RMB    NBOT    STATES COPIED TO
                                             OUTPUT HARDWARE
00091 002A 0004     OHDRM  RMB    NBOT    DRIVER STATES
                                             COMMANDED BY DRUMS
00092 002E 0004     OHCHG  RMB    NBOT    BIT MASK SHOWING
                                             WHICH DRIVERS HAVE
                                             CHANGED

                    *********************************
                                          ***************
```

```
             *
             * STORAGE NEEDED FOR INTERNAL MEMORIES
             *
             **
                                               ******************
                                               ******************
                                               ******************
                                               ************

             *NMRY EQU 32 NUMBER OF INTERNAL MEMORY BITS
00095      0004   NBMY    EQU    4         BYTES NEEDED FOR
                                             INERNAL MEMORY

00097 0032 0004   MYVAL   RMB    NBMY      STORAGE FOR STATES
                                             SET BY DRUMS
00098 0036 0004   MYDRM   RMB    NBMY      VALUES SEEN BY DRUMS
00099 003A 0004   MYCHG   RMB    NBMY      BIT MASK SHOWING
                                             WHICH MEMORIES
                                             HAVE CHANG

             **************************************
                                               *************
             *
             * STORAGE FOR  VALUES FROM DISABLED DRUMS
             *
             **
                                               ******************
                                               ******************
                                               ******************
                                               ************

             *DDRMDR RMB NBOT DRIVER STORAGE FOR DISABLED
                                               DRUMS
             *DDRMMY RMB NBMY MEMORY STORAGE FOR DISABLED
                                               DRUMS

             *******************************
                                               *******************
                                               **
             *
             * WORK AREA FOR DEALING WITH DRUMS AND
                                               TESTING EXITS
             * NOTE-  THESE FIELDS MUST CHANGE IF SIZES
                                               CHANGE
             *
             **
                                               ******************
                                               ******************
                                               ******************
                                               ************

00104 003E 0004   WDMWCH RMB    4          MASK INDICATING WHICH
                                             VARIABLES ARE SET
00105 0042 0004   WDMHOW RMB    4          MASK SAYING HOW THE
                                             VARIABLES ARE SET

             ****************************************
                                               *******************
                                               **
             *
             * STORAGE FOR ANALOG INPUTS
```

```
                        *
                        **
                                           ******************
                                           ******************
                                           ******************
                                           ************

00108      0010   ANLGSZ EQU    16        BYTES IN AN ANALOG
                                             SPECIFICATION
00109      0020   NANIN  EQU    32        NUMBER OF ANALOG
                                             INPUTS
00110      0004   NBAN   EQU    4         BYTES NEEDED FOR
                                             MASKS
00111      0018   TMPEND EQU    24        CURRENT END OF ANALOG
                                             TEMPERATURE INPUTS

00113 0046 0020   AHVAL  RMB    NANIN     STORAGE FOR VALUES
                                             FORM HARDWARE
00114      0008   NDRMS  EQU    8         NUMBER OF DRUMS IN
                                             SYSTEM
00115 0066 0008   DRMSTT RMB    NDRMS     STATUS FOR EACH DRUM
                                             (8-1)
00116 006E 0020   AHDRM  RMB    NANIN     STORAGE FOR VALUES
                                             SEEN BY DRUMS

00118 008E 0001          RMB    1
00119 008F 0001   WHCANA RMB    1         ADDRESS OF ANALOG FOR
                                             CURRENT SCAN

                  ***********************************
                                           ******************
                                           ****
                  *
                  * STORAGE FOR DRUM CONTROL INFORMATION
                  * FOR PROPER INITIALIZATION, 'LINCNT',
                                           'EMGNUM',
                  * 'LINLST' AND 'ZROTBL' MUST REMAIN IN ORDER
                                           AND STAY ADJACENT
                  *
                  **
                                           ******************
                                           ******************
                                           ******************
                                           ************

00122 0090 0010   LINLST RMB    NDRMS+NDRMS   >CURRENT LINE
                                                 FOR EACH DRUM
                                                 (1-8)
00123 00A0 0010   ZROTBL RMB    NDRMS+NDRMS   >BEGINNING LINES
                                                 FOR EACH DRUM
                                                 (1-8)
00124 00B0 0001   LINCNT RMB    1         NUMBER OF DRUM LINES
00125 00B1 0001   EMGNUM RMB    1         NUMER OF EMERGENCY
                                             LINES
00126 00B2 0001   CDMSTT RMB    1         STATUS OF CURRENT
                                             DRUM
00127 00B3 0002   CDMADR RMB    2         ADDRESS OF CURRENT
                                             LINE OF CURRENT
                                             DRUM
00128 00B5 0001   CDNQM  RMB    1         STATUS OF LAST TEST.
                                             0 => TEST FAILED
```

```
00129 00B6 0001       CDMDNO RMB     1        CURRENT DRUM BEING
                                                 PROCESSED (NDRMS
                                                 TO 1)

                      ********************************
                                                 ******************

                      *
                      * VARIABLES TO CONTROL TELEPHONE HANGUP
                      *
                      **
                                                 ********************
                                                 ********************
                                                 ********************
                                                 ************

00132 00B7 0001       CANECO RMB     1        0 => CANNOT ECHO
                                                 CHARACTERS
00133 00B8 0001       BRKING RMB     1        0 => NOT SENDING A
                                                 'BREAK'
00134 00B9 0001       CTSWAT RMB     1        0 => NOT WAITING FOR
                                                 CTS TO DROP

                      ****************************************
                                                 ********************
                                                 ******

                      *
                      * STORAGE FOR SYSTEM CLOCK VALUES
                      *
                      **
                                                 ********************
                                                 ********************
                                                 ********************
                                                 ************

00137 00BA 0001       PWRFAL RMB     1        0 => POWER FAIL HAS
                                                 NOT HAPPENED
00138 00BB 0001       INPWFL RMB     1        0 => NOT PROCESSING A
                                                 POWER FAILURE
00139 00BC 0003       TIME   RMB     3        SECONDS PASSED WHILE
                                                 NON COMPOS MENTIS
00140 00BF 0001       INC60  RMB     1        ACCUMULATES 60THS OF
                                                 A SECOND

00142 00C0 0001       SYSTEN RMB     1        ACCUMULATES TENTHS OF
                                                 A SECOND
00143 00C1 0001       SYSSEC RMB     1        ACCUMULATES SECONDS
00144 00C2 0001       SYSMIN RMB     1        ACCUMULATES MINUTES

00146      0004       SYSTNO EQU     4        NUMBER OF SYSTEM
                                                 TIMERS USED BY
                                                 LINES
00147      00C3       SYSTRS EQU     *        ORG LOCATION FOR
                                                 SYSTEM TIMERS
00148 00C3 0001       SYSHR  RMB     1        ACCUMULATES HOURS
                                                 (0-23)
00149 00C4 0001       SYSWKD RMB     1        DAY OF WEEK (0-6)
00150 00C5 0001       SYSDAY RMB     1        ACCUMULATES DAYS IN
                                                 CURRENT MONTH FROM
                                                 0
00151 00C6 0001       SYSMO  RMB     1        NUMBER OF CURRENT
                                                 MONTH (0-11)
```

```
00152 00C7 0001--   SYSMDY RMB     1        NUMBER OF DAYS IN
                                               CURRENT MONTH
00153 00C8 0001     SYSYR  RMB     1        YEARS SINCE 1975
00155 4000                 ORG     $4000    REMEDY GROSS CROCK

                    ****************************************
                                               ******************
                                               ******************
                                               ***
                    *
                    * STORAGE FOR DRUM TIMERS
                    * CLEARED WHENEVER DRUM LINE NUMBER CHANGES
                    * DRUM NUMBER GOES ACROSS, TIMER NUMBER GOES
                                               DOWN
                    * SAME IS TRUE OF COUNTERS.  TIMERS AND
                                               COUNTERS MUST NOT
                    * REPEAT NOT BE SEPARATED.
                    *
                    **
                                               ******************
                                               ******************
                                               ******************
                                               ************

00158      0005     DRMTNO EQU     5        NUMBER OF TIMERS PER
                                               DRUM
00159 4000 0008     DRMTNT RMB     NDRMS    TENTHS OF SECONDS
00160 4008 0008     DRMSEC RMB     NDRMS    SECONDS
00161 4010 0008     DRMMIN RMB     NDRMS    MINUTES
00162 4018 0008     DRMHR  RMB     NDRMS    HOURS
00163 4020 0008     DRMDAY RMB     NDRMS    DAYS

00165      0004     DRMCNO EQU     4        NUMBER OF COUNTERS
                                               PER DRUM
00166 4028 0008     DRMCT1 RMB     NDRMS
00167 4030 0008     DRMCT2 RMB     NDRMS
00168 4038 0008     DRMCT3 RMB     NDRMS
00169 4040 0008     DRMCT4 RMB     NDRMS

00171 4048 0002     DRMLOG RMB     2        START OF LINE BEING
                                               PROCESSED
00172 404A 0002     EMGWCH RMB     2        WHICH EMERGENCY LINE
                                               BEING WORKED ON
00173 404C 0002     TEMP   RMB     2        SCRATCH LOCATION
00174 404E 0001     FRAG   RMB     1        SAVE BYTE TYPE
00175 404F 0001     VAF1   RMB     1        SAVES FIRST VALUE FOR
                                               COMPUTATION
00176 4050 0002     CUANS  RMB     2        >CURRENT ANALOG
                                               STRING LOCATION
00177 4052 0001     ANYMO  RMB     1        0 => NO MORE ANALOG
                                               QUANTITIES
00178 4053 0001     USED   RMB     1        COUNTS ANALOG NUMBERS
                                               (16-0)

00180 4054 0001     RUNING RMB     1        0 => NOT SCANNING
                                               DRUM LINES

                    ********************************
                                               ******************
                                               **********
                    *
```

```
                         * BUFFER FOR TEXT INPUT AND OUTPUT
                         *
                         **
                                                 ********************
                                                 ********************
                                                 ********************
                                                 ************

00183 4055 0002     PULPUN RMB    2          LAST LINE PUNCHED
00184 4057 0002     PUNPUN RMB    2          NEXT LINE TO BE
                                                PUNCHED
00185 4059 0002     PMMXLN RMB    2          MAXIMUM LINE TO PRINT
                                                FOR DRUM
00186 405B 0002     PUNDX  RMB    2          POINTS TO NEXT SEARCH
                                                LINE
00187 405D 0001     RCVING RMB    1          0 => NOT RECEIVING A
                                                LINE
00188 405E 0001     SNDING RMB    1          0 => NOT SENDING A
                                                LINE
00189 405F 0001     TTYGOS RMB    1          TELETYPE LOCKOUT
                                                DEADMAN COUNTER

00191 4060 0001     DONOUT RMB    1          0 => OUTPUT OF A LINE
                                                WAS JUST COMPLETED
00192 4061 0001     DONINR RMB    1          0 => CARRIAGE RETURN
                                                JUST CAME IN

00194 4062 0002     TXTPTR RMB    2          >NEXT BYTE TO BE
                                                TAKEN FROM BUFFER
00195 4064 0002     TXTEND RMB    2          >CARRIAGE RETURN IN
                                                BUFFER
00196 4066 0002     TXTOUT RMB    2          >NEXT FREE OUTPUT
                                                CHARACTER
00197 4068 0002     PRTRTN RMB    2          > RETURN FROM
                                                PRINTING ROUTINE
00198 406A 0001     MUSPIN RMB    1          0 => DO NOT PREPARE
                                                FOR INPUT AFTER
                                                OUTPUT
00199 406B 0001     SKPEND RMB    1          0 => MORE INPUT
                                                PARAMETERS EXIST
00200      0004     NUMNUL EQU    4          NUMBER OF NULLS
                                                NEEDED TO PAD
                                                MESSAGE
00201 406C 0055     TXTBFR RMB    80+NUMNUL+1   BUFFER ITSELF
00202      40C1     TXTBND EQU    *          FLAG FOR END OF
                                                BUFFER

                    **********************************
                                                 ********************
                                                 ****************
                    *
                    * COMMAND PROCESSOR VARIABLE STORAGE
                    *
                    **
                                                 ********************
                                                 ********************
                                                 ********************
                                                 ************

00203 40C1 0002     RSTEMP RMB    2          SAVE TEMPORARY
                                                POINTER
```

```
00206 40C3 0001        DIGF    RMB     1        FLAG FOR TEMPERATURE
                                                   TABLE LOOKUP
00207 40C4 0002        SAVONE  RMB     2        SAVEAREA
00208 40C6 0001        RSLVQM  RMB     1        0 => ALL LINE NUMBERS
                                                   WERE RESOLVED
00209 40C7 0002        LNSVAL  RMB     2        LINE NUMBER BEING
                                                   SOUGHT IN LIST
00210 40C9 0002        LNSNDX  RMB     2        >LINE BEING LOOKED AT
                                                   DURING LINE SEARCH
00211 40CB 0001        LNSCNT  RMB     1        LINE COUNTER FOR LINE
                                                   SEARCH
00212 40CC 0001        RELFLG  RMB     1        FLAG TO SUPPRESS
                                                   OUTPUT DURING
                                                   RELOAD

00214 40CD 0001        RESCNT  RMB     1        COUNTER FOR LINES
                                                   BEING RESOLVED
00215 40CE 0002        RESIDX  RMB     2        >LINE WHOSE EXITS ARE
                                                   BEING RESOLVED
                       *RESTMP RMB 2 SCRACCH FOR LINE RESOLVER

00217      40D0        TIMWRK  EQU     *
00218 40D0 0002        ST1PTR  RMB     2        >FIRST STRING
00219 40D2 0002        ST2PTR  RMB     2
00220 40D4 0001        MVCCNT  RMB     1        HALFWORD COUNT FOR
                                                   MVC

00222 40D5 0001        CLRCNT  RMB     1        COUNT USED BY
                                                   CLEARING
                                                   SUBROUTINES

                       ***************************************
                                                ******************
                                                *
                       *
                       * WORK AREAS FOR AX, X1, X2, AND XE COMMANDS
                       *
                       **
                                                ******************
                                                ******************
                                                ******************
                                                *************
00225      40D6        X12MSK  EQU     *        HOLDS RESET BYTE FOR
                                                   RESOLVED FLAG
00226 40D6 0001        AXCNT   RMB     1        HOLDS COUNT OF BUFFER
                                                   POSITIONS USED
00227      40D7        AXSAVE  EQU     *        SAVE AREA FOR TEST
                                                   VALUE
00228 40D7 0001        XEMASK  RMB     1        BIT MASK OF DRUM
                                                   ADDRESSES FOUND
00229      40D8        X12NDX  EQU     *        HOLDS POINTER TO
                                                   PROPER LINE NO
00230 40D8 0002        AXNDX   RMB     2        HOLDS POINTER TO NEXT
                                                   BUFFER POSITION

                       ***************************************
                                                ******************
                                                **
                       *
                       * WORK AREAS FOR EXTRACT AND EVAL
```

```
          *
          **
                                                  ******************
                                                  ******************
                                                  ******************
                                                  ************

00233 40DA 0002     XTRVAL RMB     2          VALUE OBTAINED BY
                                                 EXTRACT ROUTINE
00234 40DC 0001     XTRDGT RMB     1          HOLDS HIGH ORDER
                                                 DECIMAL DIGIT FROM
                                                 XTRACT
00235 40DD 0001     XTRDSH RMB     1          DASH PROCESSING
                                                 INDICATOR
00236 40DE 0001     EVADGT RMB     1          DIGIT FROM EVAL
00237 40DF 0002     XTRSAV RMB     2          SAVED VALUE FOR DASH
                                                 PROCESSING
00238 40E1 0002     XTREND RMB     2          FINAL VALUE FOR DASH
                                                 PROCESSING

                    ***********************************
                                                  ******************
                                                  ********
                    *
                    * WORK AREAS FOR CONVERT TO BINARY
                    *
                    **
                                                  ******************
                                                  ******************
                                                  ******************
                                                  ************

00241 40E3 0002     CVBTMP RMB     2          BINARY NUMBER OUTPUT
                                                 FROM CVB

                    ***********************************
                                                  ******************
                                                  *********
                    *
                    * WORK AREAS FOR CONVERT TO DECIMAL
                    *
                    **
                                                  ******************
                                                  ******************
                                                  ******************
                                                  ************

00244 40E5 0002     CVDTMP RMB     2          HOLDS NUMBER TO BE
                                                 CONVERTED TO
                                                 DECIMAL
00245 40E7 0002     CVDPTR RMB     2          POINTER STORAGE AREA
00246 40E9 0001     CVDTRN RMB     1          TRUNCATION COUNT

                    *****************************************
                                                  ******************
                                                  ******************
                                                  ***
                    *
                    * WORK AREAS FOR LOOKUP
                    *
                    **
```

```
                                    ******************
                                    ******************
                                    ******************
                                    ***********

00249 40EA 0001   LKPVAL RMB   1    RETURNED VALUE FROM
                                       LOOKUP
00250 40EB 0002   LKPNDX RMB   2    INDEX TEMPORARY
                                       STORAGE

                  *******************************
                                    ******************
                                    ****************
                  *
                  * WORK AREAS FOR BIT STRING TO ASCII
                                    CONVERTER
                  *
                  **
                                    ******************
                                    ******************
                                    ******************
                                    *******

00253 40ED 0002   BTANDX RMB   2    INDEX STORAGE AREA
00254 40EF 0001   BTAVL1 RMB   1    FIRST VALUE SAVED
00255 40F0 0001   BTAVL2 RMB   1    SECOND VALUE SAVED
00256 40F1 0001   BTACSV RMB   1    SAVE AREA FOR COUNT
                  * FIELDS USED BY BIT SETTING AND CLEARING
                                    ROUTINES
00257 40F2 0001   BITFL1 RMB   1    CONTROL CHARACTER FOR
                                       FIRST BIT FIELD
00258 40F3 0001   BITFL2 RMB   1    CONTROL CHARACTER FOR
                                       SECOND BIT FIELD

                  ****************************************
                                    ******************
                                    *
                  *
                  * WORK AREAS FOR PRINT DRUM LINE ROUTINES
                  *
                  **
                                    ******************
                                    ******************
                                    ******************
                                    ***********

00261 40F4 0001   FIRBLK RMB   1    COUNT OF INITIAL
                                       BLANKS TO OUTPUT
                                       BEFORE LINE
00262 40F5 0001   PLBLCT RMB   1    WORK AREA FOR INITIAL
                                       BLANK OFFSET
00263 40F6 0001   WZNEG  RMB   1    0 => PREVIOUS
                                       DELIMINITER WAS
                                       NOT MINUS
00264 40F7 0001   DRMVAL RMB   1    DRUM NUMBER USED TO
                                       CALCULATE DRUM
                                       LINE NOS
00265 40F8 0001   PLCNT  RMB   1    COUNT USED TO [illegible]
                                       VARIOUS FIELDS
00266 40F9 0001   PLEMG  RMB   1    INDICATES WHETHER WE
                                       [illegible] WORKING ON
```

```
                                        EMERGENCY LINE
00267 40FA 0001    PLFGB  RMB    1      FLAG BYTE FROM
                                        CURRENT LINE
00268 40FB 0001    PLCHAR RMB    1      HOLDS SECOND
                                        CHARACTER OF FIELD
                                        NAME
00269 40FC 0001    PSUPFG RMB    1      FLAG TO SUPPRESS
                                        COMMA FIRST TIME
00270 40FD 0002    PLVAL  RMB    2      CURRENT LINE NUMBER
                                        BEING PRINTED
00271 40FF 0002    PLNDX  RMB    2      POINTER TO DATA BEING
                                        PRINTED
00272 4101 0002    PLRTNP RMB    2      FIRST LEVEL RETURN
                                        POINTER SAVED
                                        BETWEEN LINES
00273 4103 0002    PLRTP1 RMB    2      MIDDLE LEVEL RETURN
                                        POINTER SAVED
                                        BETWEEN LINES
00274 4105 0002    PLRTP2 RMB    2      SECOND LEVEL RETURN
                                        POINTER SAVED
                                        BETWEEN LINES
00275 4107 0002    PLRTP3 RMB    2      THIRD LEVEL RETURN
                                        POINTER SAVED
                                        BETWEEN LINES
00276 4109 0002    ZMLNNO RMB    2      LOWEST LINE NUMBER
                                        FOR ZAP LINE
00277 410B 0002    ZMMXLN RMB    2      LOWEST NUMBER OF LINE
                                        FOLLOWING ZAPPED
                                        ONE

                   ********************************
                                        ***************
                   *
                   * LINE COUNTERS AND LINE ORIGINS
                   *
                   **
                                        *******************
                                        *******************
                                        *******************
                                        ************

00280 410D 0002    EMGFIR RMB    2      >FIRST EMERGENCY LINE
00281 410F 0002    EMGLST RMB    2      POINTER TO LAST
                                        EMERGENCY LINE
00282 4111 0002    FIRLIN RMB    2      >FIRST LINE IN SYSTEM
00283 4113 0002    LSTLIN RMB    2      > LAST LINE IN SYSTEM

                   *********************************************
                                        *******************
                                        ******************
                   *
                   * EDITING BUFFER.  LINE TO BE EDITED IS
                                        COPIED HERE
                   * AND THEN RETURNED TO PLACE
                   *
                   **
                                        *******************
                                        *******************
                                        *******************
                                        ************
```

```
      0028   TSTLTH EQU   40         NUMBER OF BYTES IN AN
                                       EXIT TEST
      0067   LINLGT EQU   103        SPACE NEEDED FOR A
                                       LINE
      0034   LINMLT EQU   LINLGT+1/2   NUMBER OF
                                          HALFWORDS IN
                                          LINE
      003B   EMGLGT EQU   3+TSTLTH+NDRMS+NDRMS   LENGTH
                                                   OF
                                                   EMERG
                                                   ENCY
                                                   LINE
      001E   EMGMLT EQU   EMGLGT+1/2   NUMBER OF
                                          HALFWORDS IN
                                          EMERGENCY
4115 0001    EDTEMG RMB   1          0 => NOT EDITING
                                       EMERGENCY LINE
4116 0001    EDTING RMB   1          0 => NOT EDITING
4117 0001    EDTNEW RMB   1          0 => EDITHNG OLD LINE
4118 0001    EDTMOD RMB   1          CURRENT MODE OF EDIT.
                                       NEGATIVE =>
                                       SETTINGS
             *    0 => X1, POSITIVE => X2
4119 0002    EDTWHR RMB   2          >CORE LOCATION FOR
                                       THIS LINE
411B 0068    EDTBUF RMB   LINLGT+1     RESERVE THE SPACE
      4183   EDTBFE EQU   *          POINT AT END OF
                                       BUFFER
411B                ORG   EDTBUF     RESERVE EDIT BUFFER
                                       OFFSETS
411B 0001    EDTFGB RMB   1          FLAG BYTE
411C 0002    EDTLNO RMB   2          EXTERNAL LINE NUMBER

      411E   EDTLIN EQU   *
411E 0004    EDTDRE RMB   4          DRIVER SETTING ENABLE
                                       BITS
4122 0004    EDTDRS RMB   4          DRIVER SETTING VALUES
4126 0004    EDTMYE RMB   4          MEMORY SETTING ENABLE
                                       BITS
412A 0004    EDTMYS RMB   4          MEMORY SETTING VALUES

      412E   EDTST1 EQU   *          FIRST EXIT TEST
412E 0004    EDTDE1 RMB   4          FIRST DRIVER TEST
                                       ENABLE BITS
4132 0004    EDTDS1 RMB   4          FIRST DRIVER TEST
                                       VALUES
4136 0004    EDTME1 RMB   4          FIRST MEMORY TEST
                                       ENABLE BITS
413A 0004    EDTMS1 RMB   4          FIRST MEMORY TEST
                                       VALUES
413E 0004    EDTIE1 RMB   4          FIRST INPUT TEST
                                       ENABLE BITS
4142 0004    EDTIS1 RMB   4          FIRST INPUT TEST
                                       VALUES
4146 0010    EDTAT1 RMB   16         FIRST ANALOG TEST
                                       CONDITIONS
4156 0002    EDTAX1 RMB   2          EXIT LINE ADDRESS FOR
                                       FIRST ANALOG TEST

      4158   EDTST2 EQU   *          SECOND EXIT TEST
4158 0004    EDTDE2 RMB   4          SECOND DRIVER TEST
```

```
                                                        ENABLE BITS
00320 415C 0004    EDTDS2 RMB    4          SECOND DRIVER TEST
                                                VALUES
00321 4160 0004    EDTME2 RMB    4          SECOND MEMORY TEST
                                                ENABLE BITS
00322 4164 0004    EDTMS2 RMB    4          SECOND MEMORY TEST
                                                VALUES
00323 4168 0004    EDTIE2 RMB    4          SECOND INPUT TEST
                                                ENABLE BITS
00324 416C 0004    EDTIS2 RMB    4          SECOND INPUT TEST
                                                VALUES
00325 4170 0010    EDTAT2 RMB    16         SECOND ANALOG TEST
                                                CONDITIONS
00326 4180 0002    EDTAX2 RMB    2          EXIT LINE ADDRESS FOR
                                                SECOND ANALOG TEST
00327 4182 0001    EDTDGT RMB    1          FIRST DIGIT OF LINE
                                                NUMBER
                   * EMERGENCY LINE OFFSETS
00328 411E                ORG    EDTLIN
00329      411E    EDTELN EQU    *
00330 411E 0004    EDTEDE RMB    4          EMERGENCY DRIVER
                                                TEST ENABLE BITS
00331 4122 0004    EDTEDS RMB    4          EMERGENCY DRIVER TEST
                                                VALUES
00332 4126 0004    EDTEME RMB    4          EMERGENCY MEMORY TEST
                                                ENABLE BITS
00333 412A 0004    EDTEMS RMB    4          EMERGENCY MEMORY TEST
                                                VALUES
00334 412E 0004    EDTEIE RMB    4          EMERGENCY INPUT TEST
                                                ENABLE BITS
00335 4132 0004    EDTEIS RMB    4          EMERGENCY INPUT TEST
                                                VALUES
00336 4136 0010    EDTEAT RMB    16         EMERGENCY ANALOG TEST
                                                CONDITIONS
00337 4146 0010    EDTEAX RMB    16         EMERGENCY EXIT
                                                ADDRESSES
00338 4183                ORG    EDTBFE     RESET TO END OF EDIT
                                                BUFFER

                   *********************************
                                                ******************
                                                ************

                   *
                   * VARIABLES NEEDED FOR DATA LOGGING AND
                                                PRINTING

                   *
                   **
                                                ******************
                                                ******************
                                                ******************
                                                ************

00341      0022    AVLLEN EQU    34         BYTES NEEDED PER LOG
                                                LINE
00342      0010    AVVVNO EQU    16         NUMBER OFVARIABLES
                                                LOGGED
                   *
00343 4183 0002    WHRLIN RMB    2          ;AVERAGE LINE FOR
                                                NEXT LOGGING
                                                PERIOD
00344 4185 0002    WHCHPT RMB    2          ;AVERAGE LINE BEING
```

```
                                                    PRINTED
00345 4187 0002     WHCSTG RMB     2           >BIT STRING
                                                    INDICATING LOGGED
                                                    DATA
00346 4189 0002     WHCVAL RMB     2           >BIT STRING
                                                    CONTAINING VALUES
                                                    TO BE LOGGED
                    *
                    *PEDHIS RMB 1 0 => NOT PRINTED HISTORY YET
00347 418B 0001     RPHZRO RMB     1            0 => PRINT REQUEST
                                                    BIT HAS GONE TO
                                                    ZERO
                    *
00348 418C 0001     ACPLHI RMB     1            HI PART OF VALUE TO
                                                    BE LOGGED
00349 418D 0001     ACPLLO RMB     1            LOW PART OF LOGGED
                                                    VALUE
00350 418E 0002     SPOT   RMB     2           >PLACE WHERE CURRENT
                                                    DATUM IS TO BE
                                                    AVERAGED
                    *
00351 4190 0002     XKDVND RMB     2            DIVIDEND
00352 4192 0002     XKQUOT RMB     2            QUOTIENT
00353 4194 0001     XKDVSR RMB     1            DIVISOR
00354 4195 0001     XKDSPL RMB     1

                    ******************************
                                                ******************
                                                ******************
                                                *************
                    *
                    * ACCUMULATOR FOR AVERAGING
                    *
                    **
                                                ******************
                                                ******************
                                                ******************
                                                ************

00357      4196     ACCUMU EQU     *
00358 4196 0001     ACCSTH RMB     1            STARTING HOUR FOR
                                                    AVERAGE
00359 4197 0001     ACCSTM RMB     1            STARTING MINUTE
00360 4198 0020     ACCVLS RMB    AVVVNO+AVVVNO     AVERAGING
                                                      SPACE
00361      41B8     ACCUND EQU     *
                    *
00362 41B8 0001     LOGING RMB     1            0 => NOT LOGGING DATA
00363 41B9 0001     ACCUTM RMB     1            TIME PERIODS OF
                                                    AVERAGING TO GO
00364 41BA 0001     ACCCNT RMB     1            COUNTER FOR VARIABLES
                                                    BEING LOGGED
00365 41BB 0001     WHCBIT RMB     1            WHICH BIT BEING
                                                    LOOKED AT IN FIELD
00366 41BC 0001     GDBLOW RMB     1            COUNTER FOR PRINTED
                                                    LINES
00367 41BD 0001     BITCNT RMB     1            COUNTER OF BITS
                                                    EXTRACTED FROM A
                                                    FIELD
                    *
00368 41BE 0001     DFOFGS RMB     1            FLAGBYTES FOR [illegible]
```

```
                                                      OLNE
00369 41BF 0002      DLINNO RMB    2
00370 41C1 0008      DLOUT  RMB    8          OUTPUT BYTE LOGGING
                                                SPECITIFCATION
00371 41C9 0008      DLMMY  RMB    8          MEMORY
00372 41D1 0008      DLINH  RMB    8
00373 41D9 0010      DLAXH  RMB    16         ANALOGS
00374 41E9 0010      DLXNO  RMB    16         ANALOGGES
                     *
00375 41F9 0440      AVGARA RMB    AVLLEN*32
00376      4639      AVGARE EQU    *          END OF BUFFER
00377      4600      AVVAR  EQU    AVGARE/256*256
00378      4639      DRUMST EQU    *
00380 E000                  ORG    ROMSTR     START USING ROM FOR
                                                PROGRAM
00381 E000 44        CODID  FCC    'DEN1'     LOGON PASSWORD
      E001 45
      E002 4E
      E003 31

                     ****************************************
                                                ******************
                                                ******************
                                                *
                     *
                     * INTERRUPT PROCESSOR
                     *
                     **
                                                ******************
                                                ******************
                                                ******************
                                                ***********

00384 E004 B6 039A RUPTS  LDA A  OUAA       SEE IF CLOQUE
                                              INTERRUPTS
00385 E007 2A 06          BPL    NO60PP
00386 E009 7D 0398        TST    OU18
00387 E00C 7C 00BF        INC    INC60      COUNT IT

00389 E00F B6 0392 NO60PP LDA A  PWRCTL
00390 E012 2A 05          BPL    NOPWR
00391 E014 7F 0392        CLR    PWRCTL     ZERO BIT 3 TO
                                              ACKNOWLEDGE POWER
                                              FAILURE
00392 E017 20 FE          BRA    *          WAIT FOREVER, MORE OR
                                              LESS

00394 E019 B6 0388 NOPWR  LDA A  TTYSTT     SEE IF TTY GAVE A
                                              CHARACTER
00395 E01C 2A 30          BPL    RPTEXT
00396 E01E B6 405E        LDA A  SNDING     SEE IF SENDING ONE
00397 E021 27 32          BEQ    NRCV       BZ

00399 E023 B6 40F4        LDA A  FIRBLK     SEE IF ANY
                                              INITIALBLANKS TO
                                              GO OUT
00400 E026 27 07          BEQ    NBKFS
00401 E028 7A 40F4        DEC    FIRBLK
00402 E02B 86 20          LDA A  #$20       GENERATE AN OUTPUT
                                              BLANK
00403 E02D 20 0E          BRA    ZPHCOT

00405 E02F FE 4062 NBKFS  LDX    TXTPTR
```

```
E032 BC 4066          CPX     TXTOUT
E035 27 0A            BEQ     ZAPXMT
E037 A6 00            LDA A   0,X
E039 08               INX
E03A FF 4062          STX     TXTPTR
E03D B7 0389  ZPHCOT  STA A   TTYDAT    PUT CHARACTER IN TTY
                                          OUTPUT BUFFER
E040 3B               RTI

E041 86 01    ZAPXMT  LDA A   #1
E043 B7 4060          STA A   DONOUT
E046 7F 405E          CLR     SNDING    RESET SENDING FLAG
E049 86 09    ZAPTTY  LDA A   #$9
E04B B7 0388          STA A   TTYSTT
E04E B6 0393  RPTEXT  LDA A   CLKCTL
E051 7D 0391          TST     LITES
E054 3B               RTI

E055 B6 405D  NRCV    LDA A   RCVING
E058 27 F4            BEQ     RPTEXT    BZ
E05A FE 4064          LDX     TXTEND
E05D B6 0389          LDA A   TTYDAT
E060 84 7F            AND A   #$7F
E062 27 EA            BEQ     RPTEXT    IGNORE NULLS
E064 91 0A            CMP A   $0A       SEE IF LINE FEED
E066 27 E6            BEQ     RPTEXT    IF SO, IGNORE
E068 81 7F            CMP A   #$7F      SEE IF RUBOUT
E06A 26 0A            BNE     STCHAR    NO--STORE CHARACTER
E06C 8C 406C          CPX     #TXTBFR    BEGINNING OF BUFFER?
E06F 27 10            BEQ     NOCHAR    IGNORE CHARACTER
E071 09               DEX               ERASE LAST CHARACTER
E072 A6 00            LDA A   0,X
E074 20 03            BRA     NOCHAX
     E076     STCHAR  EQU     *
E076 A7 00            STA A   0,X
E078 08               INX
E079 7D 00B7  NOCHAX  TST     CANECO    SEE IF HAVE BEEN
                                          LOGGED ONTO
E07C 27 03            BEQ     NOCHAR    BYPASS ECHOING
E07E B7 0389          STA A   TTYDAT
E081 FF 4064  NOCHAR  STX     TXTEND
E084 81 0D            CMP A   #$D       SEE IF CARRIAGE
                                          RETURN
E086 27 05            BEQ     ENLN
E088 8C 40C1          CPX     #TXTBND
E08B 26 C1            BNE     RPTEXT
E08D 09       ENLN    DEX
E08E FF 4064          STX     TXTEND
E091 86 01            LDA A   #1
E093 B7 4061          STA A   DONINR
E096 7F 405D          CLR     RCVING    RESET RECEIVING FLAG
E099 20 AE            BRA     ZAPTTY
              ***********************************************
                                        ******************
                                        ******************
                                        *
              *
              * INITIALIZE EVERYTHING AFTER COLD START
              *
              **
                                        ******************
                                        ******************
                                        ******************
                                        ************
```

```
00457      E09B     INITR   EQU    *
00458 E09B CE 0000          LDX    #0        CLEAR ALL OF CORE IN
                                                SYSTEM
00459 E09E 6F 00    ZEX00   CLR    0,X       EVEN ATTEMPT TO CLEAR
                                                PROMS
00460 E0A0 08               INX
00461 E0A1 26 FB            BNE    ZEX00
00462 E0A3 8E 7FEB          LDS    #SPPLAC
00463 E0A6 BD F766          JSR    EDINIT
00464 E0A9 BD FCB7          JSR    SETMKS
00465 E0AC BD FC99          JSR    SETCLK
00466 E0AF CE 41F9          LDX    #AVGARA    INITIALIZE HISTORY
                                                STORAGE
00467 E0B2 FF 4183          STX    WHRLIN

                    ***********************************
                                                *****************
                                                *************
                    *
                    * HANDLE POWER COMING UP
                    *
                    **
                                                *****************
                                                *****************
                                                *****************
                                                ***************

00470 E0B5 8E 7FEB PWRON   LDS    #SPPLAC

                    *****************************************
                    *
                    * RESTORE HARDWARE TO FUNCTIONING STATE,
                                                THEN SET RECOVERY
                                                FLAG
                    *
                    **
                                                *****************
                                                *****************
                                                *****************
                                                ***************

00473 E0B8 BD FD2E          JSR    SETTTY
00474 E0BB BD FC6F          JSR    SETANA
00475 E0BE BD FCC0          JSR    SETOUT
00476 E0C1 86 [illegible]    LDA A  #[illegible]   INDICATE HAD A [illegible]
                                                [illegible]
00477 [illegible]3 B7 0392  STA A  PWRCTL     REENABLE POWER [illegible]
                                                INTERRUPTS
00478 E0C6 97 EA            STA A  PWRFAL
00479 E0C8 4F               CLR A
00480 E0C9 0E               CLI

                    ***********************************
                                                *****************
                                                ********
                    *
                    * MAIN PROCESSING LOOP.  ENTERED ONCE PER
                                                SCAN.
                    *
                    * PROCESSES COMMUNICATIONS AFTER HANDLING
                                                DRUMS
```

```
                    *
                    **
                                                   ******************
                                                   ******************
                                                   ******************
                                                   ************

00483 E0CA B6 0391 EOJ     LDA A  LITES
00484 E0CD 88 01           EOR A  #EOJLIT
00485 E0CF B7 0391         STA A  LITES     FLASH EOJ LITE
00486 E0D2 BD E12E         JSR    PWRFIX    RECOVER IF POWER
                                               FAILURE

00488 E0D5 BD E1D0         JSR    DRUMS     DO THE DRUMTHING

                    ******************************************
                                                   ******************
                                                   ******************
                                                   *****
                    *
                    * PROCESS COMMUNICATIONS
                    *
                    **
                                                   ******************
                                                   ******************
                                                   ******************
                                                   ************

00492 E0D8 B6 4060         LDA A  DONOUT    SEE IF FINSIHED
                                               OUTPUTTING A LINE
00493 E0DB 27 0E           BEQ    DNNIN
00494 E0DD 7F 4060         CLR    DONOUT    CPREVENT REPEATING IT
00495 E0E0 CE 406C         LDX    #TXTBFR    RESET BUFFER OUTPUT
                                               POINTER
00496 E0E3 FF 4066         STX    TXTOUT

00498 E0E6 FE 4068         LDX    PRTRTN    RETURN TO CALLER OF
                                               OUTPUT ROUTINE
00499 E0E9 6E 00           JMP    0,X

00501 E0EB B6 406A DNNIN   LDA A  MUSPIN    SEE IF SHOULD TURN
                                               DEVICE AROUND
                                               AGAIN
00502 E0EE 27 06           BEQ    NOPRPX
00503 E0F0 7F 406A         CLR    MUSPIN
00504 E0F3 BD FD41         JSR    STTYIN    PREPARE DEVICE FOR
                                               INPUT
00505 E0F6 B6 4061 NOPRPX  LDA A  DONINR    SEE IF FINISHED
                                               INPUTTING A LINE
00506 E0F9 27 16           BEQ    LOGQM     IF NOT RECYCLE
00507 E0FB B6 0388         LDA A  TTYSTT    SEE IF OUTPUT FINAL
                                               CHARACTER YET
00508 E0FE 84 02           AND A  #2
00509 E100 27 C8           BEQ    EOJ       IF NOT, WAIT TO DO
                                               ANYTHING ABOUT IT
00510 E102 7F 4061         CLR    DONINR
                   * PUT OUT NULLS
00511 E105 CE 40BB         LDX    #TXTBND-NUMNUL-2
00512 E108 FF 4062         STX    TXTPTR
00513 E10B BD FDFA         JSR    BOUFNY
00514 E10E 7E E6D3         JMP    CMDSRC    GO LOOK FOR COMMAND
```

```
E111 86 1E   LOGQM  LDA A  #30
E113 CE 0035        LDX    #MYDRM-1
E116 BD E42A        JSR    BITVNC
E119 E4 00          AND B  0,X
E11B 26 05          BNE    SEEPT
E11D F7 418B        STA B  RPHZRO
E120 20 A8          BRA    EOJ
             *
E122 7D 418B SEEPT  TST    RPHZRO
E125 26 A3          BNE    EOJ
E127 F7 418B        STA B  RPHZRO
E12A 7E EE8A        JMP    CMDPH

             **
                                         ******************
                                         ******************
                                         ******************
                                         ************
             *
             * RECOVER FROM POWER FAILURE.  SORT OF
                                         REENTRANT.
             *
             **
                                         ******************
                                         ******************
                                         ******************
                                         ************

E12D 39      PWRAOK RTS
E12E 96 DA   PWRFIX LDA A  PWRFAL   SEE IF HAD ONE
E130 27 FB          BEQ    PWRAOK
E132 B6 0391        LDA A  LITES    MAKE SURE CLOCK IS
                                         NOT AVAILABE
E135 B6 0393 CLKONN LDA A  CLKCTL
E138 2A FB          BPL    CLKONN
E13A 7F 00BF        CLR    INC60    ACCUMULATE 60'THS OF
                                         A SECOND AGAIN

E13D 96 BB          LDA A  INPWFL   SEE IF ALREADY IN ONE
E13F 26 09          BNE    LETACU
E141 7F 00BC        CLR    TIME
E144 7F 00BD        CLR    TIME+1
E147 7F 00BE        CLR    TIME+2

E14A B6 0383 LETACU LDA A  CLKLSB
E14D 9B BE          ADD A  TIME+2
E14F 97 BE          STA A  TIME+2
E151 B6 0382        LDA A  CLKMDL
E154 99 BD          ADC A  TIME+1
E156 97 BD          STA A  TIME+1
E158 B6 0381        LDA A  CLKMSB
E15B 99 BC          ADC A  TIME
E15D 97 BC          STA A  TIME

E15F BD FC99        JSR    SETCLK   RESET TIMERS AND
                                         POWER FAILURES

             ******************************************
                                         ******************
                                         ********
             *
             * HAVE ACCUMULATED 3 BYTE DEAD SECONDS IN
                                         TIME
             *
             **
```

```
                                      *******************
                                      *******************
                                      *******************
                                      ************

E162 86 01                 LDA A   #1
E164 97 BB                 STA A   INPWFL
E166 B7 40D0               STA A   TIMWRK
E169 CE 5180   DAYLP       LDX     #$5180     SET UP TO COUNT DAYS
E16C BD E1A7               JSR     CKTIME     COUNT
E16F 25 05                 BCS     NODAYX
E171 BD E4C8               JSR     ADDDAY     COUNT A DAY
E174 20 F3                 BRA     DAYLP      ANOTHER DAY, ANOTHER
                                                 86400 SECONDS
                                                 X'15180'

          **********************************
                                      *****************
          *
          * ACCUMULATE HOURS OF DEAD TIME
          *
          **
                                      *******************
                                      *******************
                                      *******************
                                      ************

E176 7F 40D0   NODAYX      CLR     TIMWRK
E179 CE 0E10               LDX     #$E10
E17C BD E1A7               JSR     CKTIME
E17F 25 05                 BCS     NOOURX
E181 BD E4B4               JSR     ADDOUR
E184 20 F0                 BRA     NODAYX

E186 CE 003C   NOOURX      LDX     #$3C
E189 BD E1A7               JSR     CKTIME
E18C 25 05                 BCS     NOMINX
E18E BD E49D               JSR     ADDMIN
E191 20 F3                 BRA     NOOURX

E193 7D 00BE   NOMINX      TST     TIME+2
E196 27 08     NOMINY      BEQ     NOSECX
E198 BD E47D               JSR     ADDSEC
E19B 7A 00BE               DEC     TIME+2
E19E 20 F6                 BRA     NOMINY

E1A0 7F 00BB   NOSECX      CLR     INPWFL
E1A3 7F 00BA               CLR     PWRFAL
E1A6 39                    RTS

E1A7 FF 40D1   CKTIME      STX     TIMWRK+1
E1AA 96 BC                 LDA A   TIME
E1AC B1 40D0               CMP A   TIMWRK
E1AF 25 1E                 BCS     CKTMEX
E1B1 96 BD                 LDA A   TIME+1
E1B3 D6 BE                 LDA B   TIME+2
E1B5 CE 40D1               LDX     #TIMWRK+1
E1B8 BD F75F               JSR     COMP16
E1BB 25 12                 BCS     CKTMEX
E1BD F0 40D2               SUB B   TIMWRK+2
E1C0 B2 40D1               SBC A   TIMWRK+1
E1C3 97 BD                 STA A   TIME+1
E1C5 D7 BE                 STA B   TIME+2
```

```
00602 E1C7 96 BC                 LDA A   TIME
00603 E1C9 B2 40D0               SBC A   TIMWRK
00604 E1CC 97 BC                 STA A   TIME
00605 E1CE 0C                    CLC
00606 E1CF 39           CNTMEX   RTS

                        ***********************************
                        *
                        * ROUTINE TO PROCESS THE DRUM SPECIFICATION
                        *
                        **
                                                                 *******************
                                                                 *******************
                                                                 *******************
                                                                 ************

00607 E1D0 BD E446      DRUMS    JSR     CLKFIX     UPDATE CLOCK
00610 E1D3 BD E35E               JSR     REDDIN     READ DIGITAL INPUTS
00611 E1D6 BD E3B7               JSR     REDAIN     READ ANALOG INPUT
00612 E1D9 B6 4054               LDA A   RUNING     SEE IF SCANNING DRUMS
                                                       OR NOT
00613 E1DC 27 65                 BEQ     ENDRUM     SKIP THE DRUMS IF NOT
                                                       SCANNING
00614 E1DE BD E25F               JSR     EMERG      PROCESS ANY PENDING
                                                       EMERGENCIES

                        *********************************  *****
                                                                 *******************
                                                                 **********
                        *
                        * PROCESS DRUM LINES
                        *
                        **
                                                                 *******************
                                                                 *******************
                                                                 *******************
                                                                 ************

00617 E1E1 86 03                 LDA A   #NDRMS     INITIALIZE DRUM
                                                       COUNTER AND FLG
00618 E1E3 97 B6                 STA A   CDMDNO     SAVE NUMBER FOR OTHER
                                                       ROUTINES
00619 E1E5 CE 008E               LDX     #LINLST-2    POINT TO FIRST
                                                         DRUM LINE
                                                         ADDRESS
00620 E1E8 FF 404A               STX     EMGWCH     SAVE POINTER FOR
                                                       LATER

00622 E1EB 96 B6        DDMMLO   LDA A   CDMDNO     NUMBER OF DRUM BEING
                                                       PROCESSED
00623 E1ED B7 404D               STA A   TEMP+1
00624 E1F0 7F 404C               CLR     TEMP
00625 E1F3 FE 404C               LDX     TEMP
00626 E1F6 09                    DEX
00627 E1F7 A6 66                 LDA A   DRMSTT,X     GET STATUS BYTE FOR
                                                         CURRENT DRUM
00628 E1F9 97 B2                 STA A   CDMSTT     PLACE IN CURRENT DRUM
                                                       STATUS LOCATION

00630 E1FB FE 404A               LDX     EMGWCH     >>DRUM LINE
00631 E1FE 08                    INX
00632 E1FF 08                    INX
00633 E200 FF 404A               STX     EMGWCH     PUT IT BACK FOR NEXT
                                                       TIME
```

```
00634 E203 EE 00              LDX    0,X      [illegible] LINE
00635 E205 27 37              BEQ    BRN[illegible]  IF NO LINE FOR THAT
                                                  DRUM, SKIP
00636 E207 FF 4048            STX    DRMLOG   STORAGE FOR CURRENT
                                                  DRUM LINE ADDRESS

00638 E20A BD E565            JSR    DMOTST   SET OUTPUTS AS CALLED
                                                  FOR IN LINE
00639 E20D FE 4048            LDX    DRMLOG   RESTORE [illegible] POINTER
00640 E210 BD E583            JSR    DMMYST   SET INTERNAL MEMORY
                                                  AS CALLED FOR IN
                                                  DRUM
00641 E213 FE 4048            LDX    DRMLOG
00642 E216 09                 DEX
00643 E217 09                 DEX
00644 E218 A6 00              LDA A  0,X      GET STOP FLAG
00645 E21A 2B 22              BMI    BRNDDD

00647 E21C FE 4048            LDX    DRMLOG
00648 E21F BD E5F4            JSR    ADD16    SKIP OUTPUT
                                                  SPECIFICATIONS
00649 E222 FF 4048            STX    DRMLOG
00650 E225 BD E2EE            JSR    ASKDRM   SEE IF FIRST EXEUENT
                                                  CONDITION IS MET
00651 E228 96 B5              LDA A  CDMQM    TEST
00652 E22A 26 1B              BNE    BRNCHD   IF NONZERO, BRANCH

00654 E22C FE 4048            LDX    DRMLOG   GET POINTER BACK
00655 E22F BD E2E4            JSR    SKPTST
00656 E232 08                 INX
00657 E233 08                 INX
00658 E234 FF 4048            STX    DRMLOG
00659 E237 BD [illegible]     JSR    [illegible]  SEE IF SECOND [illegible]
                                                  [illegible]
00660 E23A 96 B5              LDA A  [illegible]
00661 E23C 26 [illegible]     BNE    BRNCHD
00663 E23E 7A 00D6 BRNDDD DEC    CDMDNO   DECREMENT DRUM [illegible]
00664 E241 26 A8              BNE    DDMMLO
00665 E243 BD E335 ENDRUM JSR    OUTDOT   UPDATE OUTPUT DRIVER
                                                  HARDWARE
00666 E246 39                 RTS

                        ***********************************
                                                  *******************
                                                  ****
                        *
                        * BRANCH THE CURRENT DRUM LINE
                        *
                        **
                                                  *******************
                                                  *******************
                                                  *******************
                                                  ************

00669 E247 FE 4048 BRNCHD LDX    DRMLOG   >CURRENT BOOKMARK
00670 E24A BD E2E4            JSR    SKPTST   SKIP OVER EXIT
                                                  SPECIFICATION
00671 E24D A6 00              LDA A  0,X      GET FIRST BYTE OF NEW
                                                  LINE
00672 E24F 27 ED              BEQ    BRNDDD   IF NO ADDRESS, TEST
                                                  IS NULL
00673 E251 E6 01              LDA B  1,X      GET SECOND BYTE
00674 E253 FE 404A            LDX    EMGWCH   >BEYOND THIS DRUM
                                                  POINTER
```

```
00675 E256 A7 00            STA A  0,X       HIGH ORDER PART
00676 E258 E7 01            STA B  1,X       PUT IN LOW ORDER PART
00677 E25A BD E319          JSR    DRMDNO    CLEAR TIMERS AND
                                                COUNTERS FOR THIS
                                                DRUM
00678 E25D 20 DF            BRA    BRNDDD

                  ***************************
                                                ******************
                  *
                  * UPDATE ALL CONUTERS.  EXAMINE BITS WHICH
                                                HAVE CHANGED
                  * WHICH DRIVE COUNTERS AND CHANGE THE VALUES
                                                IN THE ARRAY.
                  *
                  **
                                                ******************
                                                ******************
                                                ******************
                                                ************

                  ************************************
                  *
                  * EXAMINE EMERGENCY SPECIFICATIONS FOR
                                                EMERGENCY
                                                CONDITIONS
                  *
                  **
                                                ******************
                                                ******************
                                                ******************
                                                ************

00682 E25F 7F 00B6 EMERG    CLR    CDMDNO    ALL EMERGENCY
                                                CONDITIONS SEE DRUM
                                                0 CNTS
00683 E262 96 B1            LDA A  EMGNUM    GET NUMBER OF
                                                EMERGENCY LINES
00684 E264 27 70            BEQ    POPALL    SKIP IF NO
                                                EMERGENCIES
00685 E266 B7 404A          STA A  EMGWCH
00686 E269 FE 410D          LDX    EMGFIR    >FIRST EMERGENCY
                                                CONDITION
00687 E26C FF 4048          STX    DRMLOG    PRETEND THAT IT IS A
                                                DRUM LINE
00688 E26F C6 FF            LDA B  #$FF
00689 E271 37               PSH B            PUT A FLAG ON THE
                                                STACK

00691 E272 FE 4048 EMLP     LDX    DRMLOG    >EMERGENCY LINE
00692 E275 BD E2EE          JSR    ASKDRM    SEE IF CONDITION IS
                                                MET OR NO
00693 E278 96 B5            LDA A  CDNQM
00694 E27A 27 3F            BEQ    NOEMG     IF ZERO, CONDITION
                                                NOT MET
00695 E27C FE 4048          LDX    DRMLOG    FIND POINTER TO LINE
00696 E27F BD E2E4          JSR    SKPTST    SKIP OVER TEST
                                                SPECIFICATION
00697 E282 FF 404C          STX    TEMP      >NEW DRUM LINES
00698 E285 CE 00C0          LDX    #LINLST   >LIST OF CURRENT
                                                DRUM LINES
00699 E288 FF 4050          STX    CUANS     >WHERE NEW LINE
                                                NUMBERS GO
```

```
      [illegible] C6 [illegible]          LDA B  #NDRMS     COUNT DRUMS
      [illegible] F7 [illegible]          STA B  FRAG
      [illegible] 86 01                   LDA A  #1         INITIAL [illegible]
      [illegible] B7 [illegible]          STA A  VAF1

                       **************************************
                                                   *******************
                                                   *******************
                                                   *****

                       *
                       * COPY SET OF NEW LINE NUMBERS TO DRUM LINE
                                                   TABLE.
                       * OMIT ANY WHICH ARE ZERO
                       *
                       **
                                                   ******************
                                                   ******************
                                                   ******************
                                                   ***********

E295 FE 404C EMMLP   LDX     TEMP     SOURCE OF NEW LINE
                                         NUMBERS
E298 A6 00           LDA A   0,X      GET HIGH BYTE OF NEW
                                         LINE ADDRESS
E29A 27 3B           BEQ     NOZAP    IF ZERO, DON'T UPDATE
                                         LINE ADDRESS
E29C F6 404F         LDA B   VAF1     RECORD DRUM NUMBER TO
                                         ZAP COUNTERS
E29F 37              PSH B
E2A0 08              INX
E2A1 E6 00           LDA B   0,X      GET LO BYTE OF NEW
                                         LINE ADDRESS
E2A3 08              INX
E2A4 FF 404C         STX     TEMP
E2A7 FE 4050         LDX     CUANS
E2AA A7 00           STA A   0,X
E2AC 08              INX
E2AD E7 00           STA B   0,X
E2AF 08      FZZZP   INX
E2B0 FF 4050         STX     CUANS
E2B3 7C 404F         INC     VAF1     GO TO NEXT DRUM
E2B6 7A 404E         DEC     FRAG
E2B9 26 DA           BNE     EMMLP    MOVE ALL THE NEW LINE
                                         NUMBERS

E2BB 86 3B   NOEMG   LDA A   #EMGLGT   GET LENGTH OF
                                          EMERGENCY LINE
E2BD BB 4049         ADD A   DRMLOG+1   MOVE LOW ORDER PART
                                           OF NUMBER
E2C0 24 03           BCC     NLEZ
E2C2 7C 4048         INC     DRMLOG
E2C5 B7 4049 NLEZ    STA A   DRMLOG+1
E2C8 7A 404A         DEC     EMGWCH
E2CB 26 A5           BNE     EMLP     DO ALL THE
                                         EMERGENCIES

                       **********************************
                                                   ******************
                                                   ******************
                                                   *

                       *
                       * MUST NOW POP OFF THE DRUM NUMBERS AND ZAP
                                                   THEIR COUNTERS
                       *
                       **
                                                   ******************
```

```
                                        *******************
                                        *******************
                                        ************
00734 E2CD 32      PPLLPP PUL A                   GET DRUM LINE OR
                                                     FENCE
00735 E2CE 81 FF          CMP A  #$FF             SEE IF POPPED THE
                                                     FENCE
00736 E2D0 27 04          BEQ    POPALL
00737 E2D2 8D 43          BSR    DRMDLT           CLEAR TIMERS AND
                                                     COUNTERS FOR THIS
                                                     DRUM
00738 E2D4 20 F7          BRA    PPLLPP
00739 E2D6 39      POPALL RTS

                   ******************************
                                        *******************
                   *
                   * HANDLE CONDITION WHERE EMERGENCY DOES NOT
                                        AFFECT A DRUM
                   *
                   **

                                        *******************
                                        *******************
                                        *******************
                                        ************
00742 E2D7 08      NOZAP  INX                     SKIP REST OF LINE
                                                     SPECIFICATION
00743 E2D8 08             INX
00744 E2D9 FF 404C        STX    TEMP
00745 E2DC FE 4050        LDX    CUANS
00746 E2DF 08             INX
00747 E2E0 20 CD          BRA    PZZZP
                   ****************************************
                                        *******************
                                        **********
                   *
                   * ROUTINE TO SKIP OVER A TEST.
                   * MUST BE CHANGED IF SPECIFICATIONS CHANGE
                   *
                   **

                                        *******************
                                        *******************
                                        *******************
                                        ************
00750 E2E2 08      ADD42  INX
00751 E2E3 08             INX
00752 E2E4 BD E5F9 SKPTST JSR    ADD8
00753 E2E7 BD E5F4        JSR    ADD16
00754 E2EA BD E5F4        JSR    ADD16
00755 E2ED 39             RTS
                   ***************************************
                   *
                   * GENERAL ROUTINE TO SEE IF EXIT
                                        SPECIFICATIO MET
                   *
                   **

                                        *******************
                                        *******************
                                        *******************
                                        ************
```

```
00758 E2EE 86 01    ASKDRM LDA A   #1        SET DRUM EXIT FLAG
                                               NONZERO
00759 E2F0 97 B5           STA A   CDMQM
00760 E2F2 FE 4048         LDX     DRMLOG
00761 E2F5 BD E5B9         JSR     DMOTQM    SEE IF OUTPUTS ARE
                                               KOSHER
00762 E2F8 96 B5           LDA A   CDMQM
00763 E2FA 27 1A           BEQ     ZOUT
00764 E2FC FE 4048         LDX     DRMLOG
00765 E2FF BD E5CE         JSR     DMMYQM    SEE IF MEMORY IS
                                               KOSHER
00766 E302 96 B5           LDA A   CDMQM
00767 E304 27 10           BEQ     ZOUT
00768 E306 FE 4048         LDX     DRMLOG
00769 E309 BD E5E1         JSR     DMINQM    SEE IF INPUT IS
                                               KOSHER
00770 E30C 96 B5           LDA A   CDMQM
00771 E30E 27 06           BEQ     ZOUT
00772 E310 FE 4048         LDX     DRMLOG
00773 E313 BD E603         JSR     TSTAXT    TEXT ANALOG
                                               SPECIFICATION
00774 E316 39       ZOUT   RTS

                    ****************************************
                                             ********************
                                             **************
                    *
                    * ROUTINE TO CLEAR COUNTERS AND TIMERS FOR A
                                             DRUM
                    * DRUM NUMBER IN A FOR FIRST ENTRY, IN

                                             CDMDNO FOR OTHERS
                    *
                    **
                                             ********************
                                             ********************
                                             ********************
                                             ************

00777 E317 97 B6    DRMDLT STA A   CDMDNO    STASH THE DRUM NUMBER
00778 E319 CE 3FF8  DRMDNO LDX     #DRMTNT-NDRMS    START OF
                                                      TIMERS
00779 E31C 86 00           LDA A   #0
00780 E31E BD E6AB         JSR     DMADT     ADDRESS FIRST COUNTER
                                               IN DRUM
00781 E321 6F 00           CLR     0,X       ZAPPIT
00782 E323 86 08           LDA A   #DRMTNO-1+DRMCNO    NUMBER OF
                                                         TIMERS
                                                         AND
                                                         COUNTERS
00783 E325 B7 404F         STA A   VAF1      REMAINING TO DO

00785 E328 86 01    AA1    LDA A   #1        INDICATE ADD DRUM
                                               NUMBER ONCE
00786 E32A BD E6BD         JSR     BLAP
00787 E32D 6F 00           CLR     0,X
00788 E32F 7A 404F         DEC     VAF1      COUNT TIMERS AND
                                               COUNTERS
00789 E332 26 F4           BNE     AA1
00790 E334 39              RTS

                    ************************************
                                             ********************
                                             ****************
```

```
*
* SET DIGITAL OUTPUTS FROM MASKED DRUM
                                    VALUES
* COPY TO HARDWARE CONTROL REGISTER ALSO
*
**
                                    ******************
                                    ******************
                                    ******************
                                    ***********

00793 E335 CE 0004 OUTDOT LDX   #NBOT     BYTES NEEDED TO STORE
                                            DRIVER DATA
00795 E338 A6 29   BOTLP  LDA A OHDRM-1,X  OBTAIN PART OF
                                             DRUM OUTPUT
                                             REGISTER
00796 E33A A8 25          EOR A OHVAL-1,X  1 => VALUE OF
                                             OUTPUT
                                             DIFFERENT FROM
                                             DRUM
00797 E33C A4 11          AND A OHMSK-1,X  1 => DIFFERENT AND
                                             ALLOWED TO
                                             CHANGE
00798 E33E A8 25          EOR A OHVAL-1,X  CHANGE OUTPUT
                                             VALUE REGISTER
00799 E340 A7 25          STA A OHVAL-1,X  PUT BACK IN PLACE
00801 E342 09 --- ...     DEX             COUNT BYTES IN OUTPUT
                                            DATA
00802 E343 26 F3          BNE   BOTLP

                   ******************************
                                    ******************
                                    ******************
                                    *
*
* NOTE- THIS CODE MUST BE CHANGED IF NUMBER
                                    OF DRIVERS
* IS CHANGED.
*
**
                                    ******************
                                    ******************
                                    ******************
                                    ************

00805 E345 96 26          LDA A  OHVAL
00806 E347 43             COM A
00807 E348 B7 0398        STA A  OU18
00808 E34B 96 27          LDA A  OHVAL+1
00809 E34D 43             COM A
00810 E34E B7 0399        STA A  OU916
00811 E351 96 28          LDA A  OHVAL+2
00812 E353 43             COM A
00813 E354 B7 039C        STA A  OU1724
00814 E357 96 29          LDA A  OHVAL+3
00815 E359 43             COM A
00816 E35A B7 039D        STA A  OU2532
00817 E35D 39             RTS
```

```
                    ***************************************
                    *
                    * READ DIGITAL INPUTS AND CHANGE THOSE WHICH
                                                   CAN
                    *
                    **
                                                   ******************
                                                   ******************
                                                   ******************
                                                   ************

E35E B6 0384 REDDIN LDA A  IN18
E361 43             COM A
E362 97 02          STA A  IHVAL
E364 B6 0385        LDA A  IN916
E367 43             COM A
E368 97 03          STA A  IHVAL+1
E36A B6 0386        LDA A  IN1724
E36D 43             COM A
E36E 97 04          STA A  IHVAL+2
E370 B6 0387        LDA A  IN2532
E373 43             COM A
E374 97 05          STA A  IHVAL+3
E376 CE 0004        LDX    #NBIN     NUMBER BYTES IN DATA
                                       FIELDS

E379 A6 01   BINLP  LDA A  IHVAL-1,X   BYTE OF INPUT
                                         VALUE
E37B 16             TAB              SAVE FOR LATER USE
E37C A8 05          EOR A  IHDBNC-1,X   1 => NOT =
                                          DEBOUNCE
                                          REGISTER
E37E 43             COM A            1 => = DEBOUNCE
                                       REGISTER
E37F B7 404C        STA A  TEMP      SAVE. CAN'T DO RR OPS
                                       IN THIS .$,#
                                       MACHINE
E382 17             TBA              GET SWITCH IMAGE BACK
E383 A8 09          EOR A  IHDAT-1,X   1 => NOT = DATA
E385 B4 404C        AND A  TEMP      1 => NOT = DATA AND =
                                       DEBOUNCE
E388 A8 09          EOR A  IHDAT-1,X   CHANGE BITS WHICH
                                         MUST CHANGE
E38A A7 09          STA A  IHDAT-1,X   PUT BACK IN PLACE
E38C E7 05          STA B  IHDBNC-1,X   SETUP DEBOUNCE
                                          REGISTER FOR
                                          NEXT TIME

E38E A8 1D          EOR A  IHDRM-1,X   1 => NOT = DRUM
                                         VALUE
E390 A4 0D          AND A  IHMSK-1,X   1 => DIFFERENT AND
                                         CAN CHANGE
E392 A7 21          STA A  IHCHG-1,X   PLACE CHANGE BITS
                                         IN CHANGE MASK
E394 A8 1D          EOR A  IHDRM-1,X   CHANGE THOSE WHICH
                                         MUST CHANGE
E396 A7 1D          STA A  IHDRM-1,X   PUT BACK IN PLACE

E398 09             DEX
E399 26 DE          BNE    BINLP
E39B 39      WAZOO  RTS
```

```
***********************************************
                                  ***************
                                  ***************
                                  *****
*
* PROCESS ANALOG DATA.  ENTRY POINT IS
                                  BELOW.
*
**
                                  ***************
                                  ***************
                                  ***************
                                  ***************
                                  *****

00857 E39C 4A       DCLINE DEC A             DECREASE COMPARISON
                                                VOLTAGE
00858 E39D 27 0E           BEQ    IZON       PREVENT ZERO- ILLEGAL
                                                VALEE
00859 E39F B7 0395         STA A  DACVAL     SET AS DAC VOLTAGE
00860 E3A2 8D F7           BSR    WAZOO
00861 E3A4 8D F5           BSR    WAZOO      STALLLLLLLL
00862 E3A6 F6 0394         LDA B  MUXCMP     SEE HOW IT COMPARES
00863 E3A9 2A F1           BPL    DCLINE     IF SILL, GO ON
00864 E3AB 20 3D           BRA    PUTIT      CHECK FOR GOODNESS
                                                AND USE

00866 E3AD 4C       IZON   INC A             MAKE NONZERO
00867 E3AE 20 3A           BRA    PUTIT      IS TOO SMALL

************************************
                           ******************
                           ******************
                           *********
*
* ENTRY POINT FOR FOR ANALOG INPUT PROCESSOR
*
**
                           ******************
                           ******************
                           ******************
                           ***********

00870 E3B0 77 404C FUN8    ASR    TEMP
00871 E3B3 76 404D         ROR    TEMP+1
00872 E3B6 39              RTS

00874 E3B7 96 8F    REDAIN LDA A  WHCANA     SEE WHICH ANALOG
                                                INPUT TO HANDLE
00875 E3B9 B7 0394         STA A  MUXCMP     SEE UP MUX VALUE
00876 E3BC 86 08           LDA A  #8         NUMBER TO AVERAGE
00877 E3BE 7F 008E         CLR    WHCANA-1
00878 E3C1 B7 404F         STA A  VAF1
00879 E3C4 7F 404C         CLR    TEMP
00880 E3C7 7F 404D         CLR    TEMP+1     CLEAR ACCUMULATOR

00882 E3CA DE 8E    AVANLP LDX    WHCANA-1   [illegible]
                                                [illegible]
00883 E3CC A6 46           LDA A  ANVAL,X    GET VALUE OF CURRENT
                                                ANALOG VARIABLE
00884 E3CE B7 0395         STA A  DACVAL     SEE IF UP OR DOWN
```

```
00885 E3D1 8D C8  . ..    BSR    WAZOO
00886 E3D3 8D C6          BSR    WAZOO     STALLLLLLLL
00887 E3D5 F6 0394        LDA B  MUXCMP
00888 E3D8 2A C2          BPL    DCLINE    GUESSED TOO BIG, GO
                                              RECUDE GUESS

00890 E3DA 4C      ASCEND INC A            INCREASE THE GUESS
00891 E3DB 27 0C          BEQ    IZFF      PREVENT OVERFLOWING
00892 E3DD B7 0395        STA A  DACVAL
00893 E3E0 8D B9          BSR    WAZOO
00894 E3E2 8D B7          BSR    WAZOO     STALLLLLLLL
00895 E3E4 F6 0394        LDA B  MUXCMP    SEE HOW IT DID
00896 E3E7 2B F1          BMI    ASCEND
00897 E3E9 4A      IZFF   DEC A            OVERFLOW

00899 E3EA BB 404D PUTIT  ADD A  TEMP+1    ACCUMULATE INTO
                                              SUMFOR AVERAGE
00900 E3ED 24 03          BCC    NANA1
00901 E3EF 7C 404C        INC    TEMP
00902 E3F2 B7 404D NANA1  STA A  TEMP+1
00903 E3F5 7A 404F        DEC    VAF1      COUNT TRIES
                                              FORAVERAGE
00904 E3F8 26 D0          BNE    AVANLP    DO IT ENOUGH

00906 E3FA 8D B4          BSR    FUN8
00907 E3FC 8D B2          BSR    FUN8
00908 E3FE 8D B0          BSR    FUN8

00910 E400 F6 404D        LDA B  TEMP+1    GET VINAL AVERAGED
                                              VALUE
00911 E403 DE 8E          LDX    WHCANA-1

                   *********************************
                                              ******************
                                              **************
                   *
                   * ACCEPT ANALOG VALUE
                   *
                   **
                                              ******************
                                              ******************
                                              ******************
                                              ************

00914 E405 E7 46          STA B  AHVAL,X    STASH THE ACCEPTED
                                              VALUE

00916 E407 96 8F          LDA A  WHCANA    GET NUMBER BACK TO
                                              CHECK MASK BIT
00917 E409 CE 0019        LDX    #AHMSK-1   POINT AT FIRST MASK
                                              BYTE
00918 E40C 8D 1C          BSR    BITVNC    GET BIT MASK INTO B,
                                              SET INDEX

00920 E40E E4 00          AND B  0,X       AND MASK WITH BYTE
00921 E410 27 06          BEQ    DECANA    DO NOT UPDATE DRUM
                                              IMAGE UNLESS SET

00923 E412 DE 8E          LDX    WHCANA-1
00924 E414 A6 46          LDA A  AHVAL,X
00925 E416 A7 6E          STA A  AHDRM,X
```

```
---  ***********************************************
                                   *****************
                                   ****
*
* SET TO GO TO NEXT ANALOG INPUT ON NEXT
                                   PASS
*
**
                                   ******************
                                   ******************
                                   ******************
                                   ************

00928 E418 7A 008F DECANA DEC    WHCANA   GO TO NEXT ANALOG
                                            INPUT
00929 E41B 2A 04          BPL    NSTO
00930 E41D 86 1F          LDA A  #NANIN-1  PRESET TO GOOD
                                              VALUE
00931 E41F 97 8F          STA A  WHCANA
00932 E421 39      NSTO   RTS

00934 E422 01      MBYTS  FCB    1,2,4,8,16,32,64,128
      E423 02
      E424 04
      E425 08
      E426 10
      E427 20
      E428 40
      E429 80

       ************************************
                                   ****************
                                   ****************
                                   *
*
* ROUTINE TO RETURN BIT MASK AND SETUP INDEX
                                   REGISTER.
* CALLED WITH BIT NUMBER IN A, IDX >START OF
                                   FIELD - 1.
* RETURNS MASK IN B, IDX >RIGHT BYTE IN
                                   FIELD.
*
**
                                   ****************
                                   ****************
                                   ****************
                                   ****************
                                   *

00937 E42A FF 40C1 BITVNC STX    RSTEMP   SAVE INDEX OF BYTE
                                            FIELD
00938 E42D 16      BITVNS TAB
00939 E42E C4 07          AND B  #7       SELECT MASQUE
00940 E430 5C             INC B           ACCOMMODATE
                                            SUBOPTIMAL CPU
                                            DESIGN
00941 E431 CE E421        LDX    #MBYTS-1

00943 E434 08      IDY    INX
00944 E435 5A             DEC B
00945 E436 26 FC          BNE    IDY
```

```
00947 E438 E6 00 . . .    LDA B   0,X      GET MASK INTO B
00948 E43A 44             LSR A
00949 E43B 44             LSR A
00950 E43C 44             LSR A
00951 E43D 4C             INC A
00952 E43E FE 40C1        LDX     RSTEMP   RESTORE POINTER TO
                                              BYTE FIELD
00953 E441 08        IAY  INX
00954 E442 4A             DEC A
00955 E443 26 FC          BNE     IAY
00956 E445 39             RTS

                     ************************************
                                                 ******************
                                                 **********
                     *
                     * CLOCK PROCESSING ROUTINES
                     *
                     **
                                                 ******************
                                                 ******************
                                                 ******************
                                                 ************

00959 E446 86 06   CLKFIX LDA A   #6       SEE IF A TENTH OF A
                                              SECOND HAS PASSED
00960 E448 91 BF          CMP A   INC60    BY CHECKING AGAINST
                                              60TH SEC COUNTER
00961 E44A 2E 0E          BGT     NOTNT    IF NOT ENOUGH, DON'T
                                              UPDATE COUNERS
00962 E44C 8D 0D          BSR     ADDTNT   ADD A TENTH TO ALL
                                              COUNTERS
00963 E44E 01             NOP
00964 E44F 0F             SEI
00965 E450 96 BF          LDA A   INC60    GET THE THING
00966 E452 80 06          SUB A   #6       THE TENTH TAKES 6 OF
                                              THESE
00967 E454 97 BF          STA A   INC60
00968 E456 01             NOP
00969 E457 0E             CLI
00970 E458 20 EC          BRA     CLKFIX   SEE IF THERE ARE ANY
                                              MORE
00971 E45A 39      NOTNT  RTS

                   ********************************
                                                 ******************
                                                 *************
                   *
                   * ADD A TENTH OF A SECOND TO ALL THE TENTH
                                                 SECOND COUNTERS
                   *
                   **
                                                 ******************
                                                 ******************
                                                 ******************
                                                 ************

00974 E45B B6 0393 ADDTNT LDA A   CLKCTL
00975 E45E 84 34          AND A   #$3C-8
00976 E460 B7 0393        STA A   CLKCTL
00977 E463 8A 08          ORA A   8
00978 E465 B7 0393        STA A   CLKCTL   HAVE RESET SECOND
                                              ACCUMULATOR
```

```
00979 E468 CE 4000        LDX     #DRMTNT   POINT TO DRUM .1 SEC
                                              COUNTERS
00980 E46B BD E512        JSR     DMTMAD    UPDATE THEM
00981 E46E 7C 00C0        INC     SYSTEN    ADD .1 TO SYSTEM
                                              CLOCQUE
00982 E471 86 0A          LDA A   #10
00983 E473 91 C0          CMP A   SYSTEN    SEE IF ENOUGH TENTHS
                                              OF SECOND
00984 E475 22 05          BHI     NOSEC
00985 E477 8D 04          BSR     ADDSEC
00986 E479 7F 00C0        CLR     SYSTEN
00987 E47C 39      NOSEC  RTS

                   *************************************
                                              ******************
                                              ********
                   *
                   * ADD A SECOND TO ALL THE TIMERS
                   *
                   **
                                              ********************
                                              ********************
                                              ********************
                                              ************

00990 E47D B6 0391 ADDSEC LDA A   LITES     FLASH SECONDS LIGHT
00991 E480 88 04          EOR A   #SECLIT
00992 E482 B7 0391        STA A   LITES
00993 E485 CE 4008        LDX     #DRMSEC   UPDATE DRUM SECONDS
                                              COUNTERS
00994 E488 BD E512        JSR     DMTMAD
00995 E48B 7C 00C1        INC     SYSSEC
00996 E48E 86 3C          LDA A   #60
00997 E490 91 C1          CMP A   SYSSEC
00998 E492 22 05          BHI     NOMIN
00999 E494 8D 07          BSR     ADDMIN
01000 E496 7F 00C1        CLR     SYSSEC
01001 E499 BD E51F NOMIN  JSR     TTYLIV
01002 E49C 39             RTS

                   *************************************
                                              ******************
                                              ***********
                   *
                   * ADD A MINUTE TO ALL COUNTERS
                   *
                   **
                                              ******************
                                              ******************
                                              ******************
                                              ***************

01005 E49D CE 4010 ADDMIN LDX     #DRMMIN
01006 E4A0 8D 70          BSR     DMTMAD
01007 E4A2 7C 00C2        INC     SYSMIN
01008 E4A5 86 3C          LDA A   #60
01009 E4A7 91 C2          CMP A   SYSMIN
01010 E4A9 22 05          BHI     NOOUR
01011 E4AB 8D 07          BSR     ADDOUR
01012 E4AD 7F 00C2        CLR     SYSMIN
01013 E4B0 BD EC9E NOOUR  JSR     DATLOG
```

```
01014 E4B3 39              RTS

                     *****************************************
                     *
                     * UPDATE ALL COUNTERS BY AN HOUR
                     *
                     **
                                                        ******************
                                                        ******************
                                                        ******************
                                                        ***************
01017 E4B4 CE 4018 ADDOUR LDX     #DRMHR
01018 E4B7 8D 59          BSR     DMTMAD
01019 E4B9 7C 00C3        INC     SYSHR
01020 E4BC 86 18          LDA A   #24
01021 E4BE 91 C3          CMP A   SYSHR
01022 E4C0 22 05          BHI     NODAY
01023 E4C2 8D 04          BSR     ADDDAY
01024 E4C4 7F 00C3        CLR     SYSHR
01025 E4C7 39      NODAY  RTS

                     *****************************************
                     *
                     * ADD A DAY TO ALL COUNTERS
                     * MUST ACCOMMODATE VARYING LENGTH MONTHS
                     *
                     **
                                                        ******************
                                                        ******************
                                                        ******************
                                                        ***************
01028 E4C8 CE 4020 ADDDAY LDX     #DRMDAY
01029 E4CB 8D 45          BSR     DMTMAD
01030 E4CD 7C 00C4        INC     SYSWKD   UPDATE DAY OF WEAQUE
01031 E4D0 86 07          LDA A   #7
01032 E4D2 91 C4          CMP A   SYSWKD
01033 E4D4 22 03          BHI     NOWKRP
01034 E4D6 7F 00C4        CLR     SYSWKD

01036 E4D9 7C 00C5 NOWKRP INC     SYSDAY
01037 E4DC 96 C7          LDA A   SYSMDY   GET NUMBER DAYS IN
                                              THIS MONTH
01038 E4DE 91 C5          CMP A   SYSDAY   SEE IF NEW MONTH
01039 E4E0 22 05          BHI     NOMON
01040 E4E2 8D 04          BSR     ADDMON   GO TO NEW MONTH
01041 E4E4 7F 00C5        CLR     SYSDAY
01042 E4E7 39      NOMON  RTS

                     *****************************************
                                                        ******************
                                                        ******************
                                                        *****
                     *
                     * INCREMENT MONTH NUMBER
                     * MUST HANDLE LEEP YEARS
                     * NOT DONE YET
                     *
                     **
                                                        ******************
                                                        ******************
                                                        ******************
                                                        ************
```

```
E4E8 7C 00C6 ADDMON INC      SYSMO
E4EB 86 0C          LDA A    #12
E4ED 91 C6          CMP A    SYSMO
E4EF 22 06          BHI      NONEM
E4F1 7C 00C8        INC      SYSYR
E4F4 7F 00C6        CLR      SYSMO
E4F7 96 C6   NONEM  LDA A    SYSMO
E4F9 FE E505        LDX      MONLST-1
E4FC 4C             INC A
E4FD 08      MLP    INX
E4FE 4A             DEC A
E4FF 26 FC          BNE      MLP
E501 A6 00          LDA A    0,X       GET NUMBER DAYS IN
                                          THIS MONTHE
E503 97 C7          STA A    SYSMDY

             ************************************
                                        ******************
                                        ************
             *
             * IF LEEP YEAR AND MONTH NUMBER IS 1, ADD
                                        ONE TO SYSMDY
             *
             **
                                        ******************
                                        ******************
                                        ******************
                                        ************

E505 39             RTS

E506 1F      MONLST FCB      31,28,31,30,31,30,31,31,30,31,3
E507 1C
E508 1F
E509 1E
E50A 1F
E50B 1E
E50C 1F
E50D 1F
E50E 1E
E50F 1F
E510 1E
E511 1F

             ************************************
             *
             * ROUTINE TO UPDATE ALL DRUM VALUES
             *
             **
                                        ******************
                                        ******************
                                        ******************
                                        ************

E512 86 08   DMTMAD LDA A    #NDRMS    GET NUMBER OF DRUMMES
E514 6C 00   DYTL   INC      0,X       INCREMENT THE VALUES
E516 26 02          BNE      NOTZO     MAKE SURE IS NOT ZERO
E518 6A 00          DEC      0,X       DECREMENT TO FF IF
                                          ZERO
E51A 08      NOTZO  INX
E51B 4A             DEC A
E51C 26 F6          BNE      DYTL
```

```
01074 E51E 39               RTS

                     ******************************
                                                 ******************
                                                 ******************
                                                 *
                     *
                     * ROUTINE TO CHECK FOR DEAD TTY.  IF NO
                                                 INPUT ACTIVITY IN
                     * 5 MINUTES, RESETS TELETYPE FOR INPUT.
                     *
                     **
                                                 ******************
                                                 ******************
                                                 ********************
                                                 ************

01077 E51F 96 B8   TTYLIV LDA A   BRKING    SEE IF TRANSMITTING
                                               'BREAK'
01078 E521 27 10          BEQ     NOTBX
01079 E523 4C             INC A             COUNT ONE MORE
01080 E524 81 65          CMP A   #$65      SEE IF HAVE DONE SO
                                               FOR 5 SECONDS OR
                                               SO
01081 E526 23 08          BLS     NOHIB
01082 E528 86 40          LDA A   #$40      TURN OFF THE BREAK
01083 E52A B7 0388        STA A   TTYSTT
01084 E52D 97 B9          STA A   CTSWAT    MUST WAIT FOR CTS TO
                                               GO AWAY
01085 E52F 4F             CLR A

01087 E530 97 B8   NOHIB  STA A   BRKING
01088 E532 39             RTS

01090 E533 96 B9   NOTBX  LDA A   CTSWAT    SEE IF WATING FOR CTS
                                               TO DROP
01091 E535 27 04          BEQ     N2OTBX
01092 E537 81 46          CMP A   #$46      SEE IF WAITED LOGN
                                               ENOUGH
01093 E539 23 10          BLS     CTWINC    COUNT ANOTHER WAIT
                                               CYCLE

01095 E53B B6 0388 N2OTBX LDA A   TTYSTT    SEE IF CTS IS STILL
                                               THERE
01096 E53E 84 08          AND A   #$08
01097 E540 27 05          BEQ     NOTCOR    IF ZERO, IT IS STILL
                                               THERE
01098 E542 BD FD2E        JSR     SETTTY    RESET TTY ACIA
01099 E545 20 10          BRA     DEDWAT    ACCUMULATE DEAD TIM

01101 E547 96 B9   NOTCOR LDA A   CTSWAT    SEE IF WAITING FOR
                                               CTS TO GO AWAY
01102 E549 27 0C          BEQ     DEDWAT
01103 E54B 4C      CTWINC INC A
01104 E54C 81 55          CMP A   #$55      WAIT FOR 15 SECONDS
01105 E54E 23 04          BLS     NTLGN
01106 E550 BD FD2E        JSR     SETTTY
01107 E553 4F             CLR A
01108 E554 97 B9   NTLGN  STA A   CTSWAT    UPDATE FLAG
01109 E556 39             RTS

01111 E557 7C 405F DEDWAT INC     TTYGOS    INCREMENT FLAG WHICH
                                               IS CLEARED BY
                                               ACTIVITY
```

```
01112 E55A B6 405F          LDA A  TTYGOS
01113 E55D 81 FA            CMP A  #250     SEE IF SILENT FOR 5
                                               MINUTES
01114 E55F 23 03            BLS    FRZ
01115 E561 BD E824          JSR    KILTTY   RESET THE TTY
01116 E564 39        FRZ    RTS
                     *************************************
                                                 *******************
                                                 *******************
                                                 *******
                     *
                     * ROUTINE TO SET OUTPUT DRIVERS AS CALLED
                                                 FOR IN DRUM LINE.
                     * CALLED WITH INDEX REGISTER POINTING TO
                                                 START OF LINE
                     *
                     **
                                                 *******************
                                                 *******************
                                                 *******************
                                                 ************
01119 E565 BD E5AA DMOTST JSR    DMMOV    MOVE DRUM DATA TO
                                             WORK AREA
01120 E568 CE 0004          LDX    #NBOT    BYTES FOR DRIVERS
01121 E56B 96 B2            LDA A  CDMSTT   SEE IF DRUM IS
                                             DISABLED
01122 E56D 2B 13            BMI    DBZPTS   IF SO, HANDLE
                                             DIFFERENTLY

01124 E56F A6 41     ZPTST  LDA A  WDMHOW-1,X   SEE WHAT DRUM
                                                 REGISTER IS
                                                 SET TO
01125 E571 A8 29            EOR A  OHDRM-1,X   SEE WHICH BITS IN
                                                DRUM REG ARE
                                                DIFFERENT
01126 E573 A4 3D            AND A  WDMWCH-1,X   1 => DIFFERENT
                                                 AND MUST BE
                                                 CHANGED
01127 E575 16               TAB
01128 E576 A8 29            EOR A  OHDRM-1,X   CHANGE BITS WHICH
                                                CHANGE
01129 E578 A7 29            STA A  OHDRM-1,X   PUT NEW VALUES IN
                                                PLACE

01131 E57A EA 2D            ORA B  OHCHG-1,X   ADD CHANGED BITS
                                                TO CHANGE
                                                REGISTER
01132 E57C E7 2D            STA B  OHCHG-1,X

01134 E57E 09               DEX
01135 E57F 26 EE            BNE    ZPTST
01136 E581 39               RTS

                     *************************************
                                                   ****************
                                                   ***
                     *
                     * HANDLE CASE OF DISABLED DRUM.  OUTPUTS
                                                   VECTORED TO
                                                   DIFFERENT
                     * BUFFER, AND CANNOT DRIVE COUNTERS
                     *
```

```
                                              ***************
                                              ***************
                                              ***************
                                              ***************
                                              *****
*DBZPTS LDAA WDMHOW-1,X GET DRUM
                                              SPECIFICATION
                                              FROM DRUM LINE
* EORA DDRMDR-1,X CHECK AGAINST DUMMY DATA
* ANDA WDMWCH-1,X 1 => DIFFERENT AND MUST
                                              SET
* EORA DDRMDR-1,X
* STAA DDRMDR-1,X
* SPC
* DEX
* BNE DBZPTS
01139 E582 39       DBZPTS RTS

                    ************
                                              ***************
                                              ***************
                                              ***************
                                              **********
*
* ROUTINE TO SET THE INTERNAL MEMORY BITS AS
                                              CALLED FOR
* BY THE DRUM LINE.  CALLED WITH THE INDEX
                                              REGISTER > DRUM
                                              LINE
* OPERATION SAME AS ROUTINE FOR SETTING
                                              OUTPUT DRIVERS,
* SEE IT FOR COMMENTARY
*
**
                                              ***************
                                              ***************
                                              ***************
                                              ***************
                                              *****

01142 E583 BD E5F9 DMMYST JSR    ADD8       MOVE TO POINT TO
                                              MEMORY
                                              SPECIFICATION
01143 E586 8D 22           BSR    DMMOV      MOVE DATA TO WORK
                                              AREA
01144 E588 CE 0004         LDX    #NBMY
01145 E58B 96 B2           LDA A  CDMSTT     SEE IF DRUM IS
                                              DISABLED
01146 E58D 2B 1A           BMI    DBZPTM

01148 E58F A6 41    ZPTSTM LDA A  WDMHOW-1,X
01149 E591 A8 31           EOR A  MYVAL-1,X
01150 E593 A4 3D           AND A  WDMWCH-1,X   1 => DIFFERENT
                                              AND DRIVEN
01151 E595 16              TAB
01152 E596 A8 31           EOR A  MYVAL-1,X   DETERMINE NEW
                                              VALUES
01153 E598 A7 31           STA A  MYVAL-1,X   PLACE IN VALUE
                                              REGISTER
```

```
01154 [illegible] 46            AND B  [illegible]     SEE IF [illegible]
                                                         CHANGE
01155 E59C 17                   TBA
01156 E59D A8 35                EOR A  MYDRM-1,X    SEE IF DIFFERENT
                                                         FROM VALUE
                                                         ALLOWED TO CHG
01157 E59F A7 35                STA A  MYDRM-1,X    REPLACE IN VALUE
                                                         REGISTER
01159 E5A1 EA 39                ORA B  MYCHG-1,X    ACCUMULATE CHANGED
                                                         MEMORY BITS
01160 E5A3 E7 39                STA B  MYCHG-1,X

01162 E5A5 09                   DEX
01163 E5A6 26 E7                BNE    ZPTSTM
01164 E5A8 39                   RTS

                        ****************************************
                                                         ****************
                                                         *********
                        *
                        * HANDLE MEMORY CHANGES FOR DISABLED DRUMS
                        *
                        **
                                                         ***************
                                                         ***************
                                                         ***************
                                                         ***************
                                                         *****

01167 E5A9 39           DBZPTM RTS

                        ***********************************
                        *
                        * ROUTINE TO COPY DRUM SPECIFICATION TO
                                                         WORKAREA
                        *
                        **
                                                         ***************
                                                         ***************
                                                         ***************
                                                         ***************
                                                         *****

01170 E5AA FF 40D0 DMMOV  STX    ST1PTR
01171 E5AD CE 003E        LDX    #WDMWCH
01172 E5B0 FF 40D2        STX    ST2PTR
01173 E5B3 86 04          LDA A  #4
01174 E5B5 BD F9A2        JSR    MVCP
01175 E5B8 39             RTS
                        ***********************************
                        *
                        * ROUTINE TO ANALYZE EXIT SPECIFICATION OF
                                                         DRUM LINE TO
                                                         SEE
                        * IF ALL OUTPUTS ARE IN THE RIGHT STATE
                        *
                        **
                                                         ***************
                                                         ***************
                                                         ***************
                                                         ***************
                                                         *****
```

```
01178 E5B9 8D EF   DMOTQM BSR    DMMOV
01179 E5BB CE 0004        LDX    #NBOT

01181 E5BE A6 41   DTTST  LDA A  WDMHOW-1,X  SEE HOW SHOULD BE
01182 E5C0 A8 29          EOR A  OHDRM-1,X  CHECK AGAINST
                                              SPECIFICATION
                                              OF DRUM VALUES
01183 E5C2 A4 3D          AND A  WDMWCH-1,X  SEE IF MUST BE
                                              SAME
01184 E5C4 26 04          BNE    TOBAD
01185 E5C6 09             DEX
01186 E5C7 26 F5          BNE    DTTST
01187 E5C9 39             RTS

01189 E5CA 7F 00B5 TOBAD  CLR    CDMQM
01190 E5CD 39             RTS

                  ***********************************
                                              ***************
                                              ***************
                                              *****
                  *
                  * ROUTINE TO TEST INTERNAL MEMORY AGAINST
                                              SPECIFICATION
                                              IN
                  * EXIT SPECIFICATION.
                  *
                  **
                                              ***************
                                              ***************
                                              ***************
                                              ***************
                                              *********

01193 E5CE 8D 29   DMMYQM BSR    ADD8
01194 E5D0 8D D8          BSR    DMMOV
01195 E5D2 CE 0004        LDX    #NBMY

01197 E5D5 A6 41   MTTST  LDA A  WDMHOW-1,X  GET HOW IT SHOULD
                                              BE
01198 E5D7 A8 35          EOR A  MYDRM-1,X
01199 E5D9 A4 3D          AND A  WDMWCH-1,X
01200 E5DB 26 ED          BNE    TOBAD
01201 E5DD 09             DEX
01202 E5DE 26 F5          BNE    MTTST
01203 E5E0 39             RTS
01205 E5E1 8D 14   DMINQM BSR    ADD16
01206 E5E3 8D C5          BSR    DMMOV
01207 E5E5 CE 0004        LDX    #NBIN

01209 E5E8 A6 41   ITTST  LDA A  WDMHOW-1,X  GET HOW IT SHOULD
                                              BE
01210 E5EA A8 1D          EOR A  IHDRM-1,X  CHECK WITH INPUT
                                              DRUM SEES
01211 E5EC A4 3D          AND A  WDMWCH-1,X
01212 E5EE 26 DA          BNE    TOBAD
01213 E5F0 09             DEX
01214 E5F1 26 F5          BNE    ITTST
01215 E5F3 39             RTS

                  ***************************************
                                              ***************
                                              *************
```

```
                    *
                    * ROUTINES TO ADD TO THE INDEX REGISTER
                    *
                    **
                                                            ***************
                                                            ***************
                                                            ***************
                                                            ***************
                                                            *****

E5F4 8D 03     ADD16  BSR    ADD8
E5F6 8D 01            BSR    ADD8
E5F8 39               RTS

E5F9 08        ADD8   INX
E5FA 08               INX
E5FB 08               INX
E5FC 08               INX
E5FD 08        ADD4   INX
E5FE 08        ADD3   INX
E5FF 08               INX
E600 08               INX
E601 39               RTS
                    ***********************************
                    *
                    * ROUTINE TO TEST AN ANALOG EXIT
                                                SPECIFICATION
                    *
                    **
                                                            ***************
                                                            ***************
                                                            ***************
                                                            ***************
                                                            *****
E602 39        ALFASS RTS
E603 8D EF     TSTAXT BSR    ADD16     MOVE BEYOND OTHER
                                          TESTS
E605 8D F2            BSR    ADD8
E607 FF 4050          STX    CUANS     SAVE > CURRENT ANALOG
                                          SPECIFICATION
E60A A6 00            LDA A  0,X       SEE IF THERE ARE ANY
                                          AT ALL
E60C 27 F4            BEQ    ALFASS    LEAVE IF NONE
E60E 86 10            LDA A  #ANLGSZ    NUMBER OF BYTES IN
                                          ANALOG
                                          SPECIFICATION
E610 B7 4053          STA A  USED      INITIALIZE BYTE
                                          COUNTER
E613 B7 4052          STA A  ANYMO     SET FLAG TO INDICATE
                                          STILL ARE ANALOG
                                          VALU

E616 B6 4052 TSTX1    LDA A  ANYMO     SEE IF STILL ANALOG
                                          VALUES TO LOOK AT
E619 27 E7            BEQ    ALFASS    IF ZERO, FINISHED,
                                          ALL PASSED
E61B 8D 52            BSR    GTVAL     OBTAIN VALUE OF NEXT
                                          PARAMETER AND
                                          FLAGS
E61D B7 404F SBENT    STA A  VAF1      SAVE VALUE FOR LATER
                                          COMPARES
E620 BD E658          JSR    GBYTE     OBTAIN COMPARAND
                                          MAYBE, COULD BE
                                          SUBTRACT
```

```
01248 E623 16               TAB
01249 E624 B6 404E          LDA A   FRAG      GET BITS FOR FLAGGING
01250 E627 84 C0            AND A   #$C0      ELIMINATE VALUE BITS
01251 E629 27 10            BEQ     GRTR      IF ZERO, COMPARE FOR
                                                 >
01252 E62B 81 C0            CMP A   #$C0      IF EQUAL, SUBTRACT
01253 E62D 27 1C            BEQ     SUBTRC
01254 E62F 81 80            CMP A   #$80
01255 E631 27 10            BEQ     NOTEQL

01257 E633 F1 404F LESS     CMP B   VAF1      COMPARE, TRUE IF VAF1
                                                 < B
01258 E636 22 DE            BHI     TSTX1
01259 E638 7E E5CA          JMP     TOBAD

01261 E63B F1 404F GRTR     CMP B   VAF1      CHECK OTHER WAY
01262 E63E 23 D6            BLS     TSTX1
01263 E640 7E E5CA          JMP     TOBAD
01265 E643 F1 404F NOTEQL   CMP B   VAF1
01266 E646 27 CE            BEQ     TSTX1     IF EQUAL, ALL IS WELL
01267 E648 7E E5CA          JMP     TOBAD

01269 E64B 17      SUBTRC   TBA
01270 E64C 8D 23            BSR     SUBXY     RECOVER VALUE AND
                                                 OBTAIN VALUE
01271 E64E 16               TAB
01272 E64F B6 404F          LDA A   VAF1      OBTAIN ORIGINAL VALEE
01273 E652 10               SBA
01274 E653 2A C8            BPL     SBENT     ALLOW POSITIVE
                                                 DIFFERENCES ONLY
01275 E655 4F               CLR A
01276 E656 20 C5            BRA     SBENT     RE-ENTER MAIN LINE OF
                                                 COMPUTATION

                   *************************************
                                                 ******************
                                                 ********

                   *
                   * ROUTINE TO RETURN NEXT BYTE FROM ANALOG
                                                 STRING
                   *
                   **
                                                 ******************
                                                 ******************
                                                 ******************
                                                 ************

01279 E658 FE 4050 GBYTE    LDX     CUANS     OBTAIN CURRENT INDEX
01280 E65B A6 00            LDA A   0,X       GET THE VALUE
01281 E65D 08               INX
01282 E65E FF 4050          STX     CUANS     RESTORE INDEX
01283 E661 7A 4053          DEC     USED      COUNT THIS BYTE
01284 E664 27 05            BEQ     ALUSED
01285 E666 E6 00            LDA B   0,X       LOOK AT THE NEXT BYTE
01286 E668 27 01            BEQ     ALUSED
01287 E66A 39               RTS

01289 E66B 7F 4052 ALUSED   CLR     ANYMO
01290 E66E 39               RTS

                   *******************************************
                                                 ******************
                                                 ******************
                                                 **
```

```
*
* ROUTINE TO RETURN VALUE OF ANALOG
                                    PARAMETER
                                    ADDRESSED
* BY NEXT BYTE OF THE ANALOG STRING
*
**
                                      ******************
                                      ******************
                                      ******************
                                      ************

01293 E66F 8D E7   GTVAL  BSR    GBYTE     PUT NEXT STRING BYTE
                                              IN A
01294 E671 B7 40[illegible] SUBXY  STA A  FRAG      SAVE THE FLAG BITS
01295 E674 84 3F     • •  AND A  #$3F      ZAP THE FLAGS
01296 E676 16             TAB              SAVE FOR LATER
                                              MANGLING
01297 E677 4A             DEC A            SUBTRACT TO START
                                              NUMBER FROM 0
01298 E678 81 20          CMP A  #NANIN    SEE IF > ANALOG
                                              NUMBER.
01299 E67A 2D 2A          BLT    ANALOG
01300 E67C 81 24          CMP A  #NANIN+SYSTNO   SEE IF BEYOND
                                                    TIMRS
01301 E67E 2D 14          BLT    SYSTMP
01302 E680 81 29          CMP A  #NANIN+SYSTNO+DRMTNO
01303 E682 2D 08          BLT    DRMTMR

01305 E684 80 29   DRMCTR SUB A  #NANIN+SYSTNO+DRMTNO
01306 E686 CE 4020        LDX    #DRMCT1-NDRMS   START FOR
                                                    INDEXING
01307 E689 8D 20          BSR    DMADT     GO GET THE VALUE FROM
                                              ARRAY
01308 E68B 39      NONCMX RTS

01310 E68C 80 24   DRMTMR SUB A  #NANIN+SYSTNO
01311 E68E CE 3FF8        LDX    #DRMTNT-NDRMS
01312 E691 8D 18          BSR    DMADT
01313 E693 39             RTS

01315 E694 80 20   SYSTMP SUB A  #NANIN    COMPUTER TIMER NMBER
01316 E696 CE 00C2        LDX    #SYSTRS-1   POINT AT TIMERS
01317 E699 4C      ADDAZ  INC A
01318 E69A 08      AADDLL INX
01319 E69B 4A             DEC A
01320 E69C 26 FC          BNE    AADDLL
01321 E69E A6 00          LDA A  0,X       GET FINALLY ADDRESSED
                                              VALUE
01322 E6A0 C1 18          CMP B  #TMPEND   SEE IF THERMOUSETER
01323 E6A2 22 E7          BHI    NONCMX    RETURN IF NOT
01324 E6A4 43             COM A            MAKE IT GO THE
                                              RIGHTWAY
01325 E6A5 39             RTS

01327 E6A6 CE 006D ANALOG LDX    #AHDRM-1
01328 E6A9 20 EE          BRA    ADDAZ

***********************************
                                      ******************
                                      ******************
                                      ***
```

```
*
* ROUTINE TO PULL APPROPRIATE COUNTER OR
                              TIMER VALUE
* OUT OF DRUM VALUE ARRAY
* CURRENT DRUM IS ACROSS, VALUE IN A IS
                              DOWN.
* IDX > NDRMS BEFORE START OF FIRST ARRAY.
*
**
                              ********************
                              ********************
                              ********************
                              ************
01331 E6AB FF 404C DMADT  STX    TEMP     SAVE INDEX
01332 E6AE D6 B6          LDA B  CDMDNO   OBTAIN CURRENT DRUM
                                            NUMBER
01333 E6B0 5A             DEC B           DRUM NUMBER IS ONE
                                            TOO BIG
01334 E6B1 FB 404D        ADD B  TEMP+1   ADD TO LOWER BYTE
01335 E6B4 24 03          BCC    ZGD      CHECK FOR OVERLOW
01336 E6B6 7C 404C        INC    TEMP     COUNT OVERFLEWS
01337 E6B9 F7 404D ZGD    STA B  TEMP+1
01338 E6BC 4C             INC A           ALWAYS ADD ONE, EVEN
                                            IF ZERO.
01340 E6BD C6 08   BLAP   LDA B  #NDRMS   FAKE MULTIPLICATION
01341 E6BF FB 404D        ADD B  TEMP+1
01342 E6C2 24 03          BCC    ZOOG     CHECK FOR OVERFLOW
01343 E6C4 7C 404C        INC    TEMP
01344 E6C7 F7 404D ZOOG   STA B  TEMP+1
01345 E6CA 4A             DEC A
01346 E6CB 26 F0          BNE    BLAP
01347 E6CD FE 404C        LDX    TEMP     GET THE FINAL INDEX
                                            VALUE
01348 E6D0 A6 00          LDA A  0,X      GET THE LONG SOUGHT
                                            VALUE
01349 E6D2 39             RTS
                  ***********************************
                              ********************
                              ****************
                  *
                  * COMMAND DISPATCH ROUTINE.  BRANCHED TO
                              WHEN 'CR' IS FOUND
                  * IN INPUT STREAM.  RETURNS TO 'EOJ'.
                  * SETS UP POINTERS SO THAT 'XTRACT' CAN BE
                              CALLED BY ANY
                  * COMMAND PROCESSOR.
                  *
                  **
                              ********************
                              ********************
                              ********************
                              ************
01352 E6D3 7F 406B CMDSRC CLR    SKPEND   INDICATE NOT AT END
                                            OF ARGUMENT STRING
01353 E6D6 CE 406E        LDX    #TXTBFR+2 POINT AT FIRST NON
                                            COMMAND CHAR
01354 E6D9 FF 4062        STX    TXTPTR
01355 E6DC BD FCF1        JSR    SKPDLM   SETUP FOR EXTRACT
                                            ROUTINE
01356 E6DF FF 4066        STX    TXTOUT   INITIALIZE OUTPUT
                                            POINTER AS WELL
```

```
01358 E6E2 CE 406C          LDX     #TXTBFR   >BEGINNING OF THE
                                                 COMMAND
01359 E6E5 A6 00            LDA A   0,X       PICK UP FORST LETTER
                                                 OF COMMAND

01361 E6E7 E6 01            LDA B   1,X       GET SECOND LETTER
01362 E6E9 CE E71D          LDX     #CMDLIS   >COMMAND NAME LIST

01364 E6EC A1 00     SCSLP  CMP A   0,X       CHECK FISST CHARACTER
01365 E6EE 26 04            BNE     ENLP      REJECT IF MATCHES NOT

01367 E6F0 E1 01            CMP B   1,X       CHECK SECOND LETTRE
01368 E6F2 27 0E            BEQ     GOTF

01370 E6F4 08        ENLP   INX
01371 E6F5 08               INX
01372 E6F6 08               INX
01373 E6F7 08               INX
01374 E6F8 8C E805          CPX     #CMLND    SEE IF > END OF LIST
                                                 YET
01375 E6FB 26 EF            BNE     SCSLP
01376 E6FD 86 01     NCMD   LDA A   #ERBDCM    INDICATE UNFOUND
                                                 COMMAND
01377 E6FF 7E FD8C          JMP     YELL      COMPLAIN BITTERLY

                     *****************************************
                                                 ******************
                                                 ******************
                                                 *****
                     *
                     * BRANCH THROUGH TABLE TO RIGHT PLACE
                     *
                     **
                                                 ******************
                                                 ******************
                                                 ******************
                                                 ************

01380 E702 EE 02     GOTF   LDX     2,X       >COMMAND ROUTINE
01381 E704 27 F7            BEQ     NCMD      IF NONEXISTENT,
                                                 SKIPPIT
01382 E706 7F 405F          CLR     TTYGOS    LEGITIMATE COMMAND
                                                 RESETS TIMER

01384 E709 B6 406C          LDA A   TXTBFR    LOOK AT FIRST
                                                 CHARACTER OF
                                                 COMMMAND
01385 E70C 81 26            CMP A   #'&
01386 E70E 27 0B            BEQ     ANYWAY
01387 E710 7D 00B7          TST     CANECO    SEE IF OTHERS ARE
                                                 LEGITIMATE
01388 E713 26 06            BNE     ANYWAY
01389 E715 BD FD41          JSR     STTYIN
01390 E718 7E E0CA          JMP     EOJ

01392 E71B 6E 00     ANYWAY JMP     0,X       >GO THERE

                     ********************************
                                                 ******************
                                                 ******************
                                                 *********
```

```
                        *
                        * COMMAND LIST
                        *
                        **
                                                          ******************
                                                          ******************
                                                          ******************
                                                          ***********
01395       E71D        CMDLIS EQU    *
01396 E71D  26                 FCC    '&N'     LOGON COMMAND
      E71E  4E
01397 E71F  E805               FDB    CMDON
01398 E721  26                 FCC    '&G'     LOGOFF COMMAND
      E722  47
01399 E723  E81F               FDB    CMDOG
01400 E725  41                 FCC    'AA'     ALTER ANALOG VALUE
      E726  41
01401 E727  E83A               FDB    CMDAA
                        * FCC 'AC' ALTER COUNTER
                        * FDB CMDAC
                        * FCC 'AT' ALTER TIMER
                        * FDB CMDAT
01402 E729  41                 FCC    'AV'     ADVANCE DRUM LINE
      E72A  56
01403 E72B  E86A               FDB    CMDAV
01404 E72D  41                 FCC    'AX'     ANALOG EXIT
                                                  SPECIFICATION
      E72E  58
01405 E72F  E8B9               FDB    CMDAX
                        * FCC 'BG' GO TO DEBUGGER
                        * FDB BRMBUG
01406 E731  43                 FCC    'CB'     CLEAR BIT
      E732  42
01407 E733  E984               FDB    CMDCB
01408 E735  43                 FCC    'CD'     CLEAR DRIVER
      E736  44
01409 E737  E990               FDB    CMDCD
01410 E739  43                 FCC    'CH'     CLEAR AND DISABLE
                                                 DRIVER HARDWARE
      E73A  48
01411 E73B  E996               FDB    CMDCH
01412 E73D  43                 FCC    'CI'     CLEAR INPUT
      E73E  49
01413 E73F  E9A2               FDB    CMDCI
01414 E741  43                 FCC    'CL'     CLOSE LINE BEING
                                                 EDITED
      E742  4C
01415 E743  E9AE               FDB    CMDCL
                        * FCC 'CT' DEFINE COUNTERS FOR ENTIRE
                                                 FROGAAM
                        * FDB CMDCT
01416 E745  44                 FCC    'DA'     DISABLE ANALOG
      E746  41
01417 E747  EA35               FDB    CMDDA
01418 E749  44                 FCC    'DB'     DISABLE BIT
      E74A  42
01419 E74B  EA3B               FDB    CMDDB
                        * FCC 'DC' DISABLE COUNTER
                        * FDB CMDDC
01420 E74D  44                 FCC    'DD'     DISABLE DRIVER
      E74E  44
01421 E74F  EA41               FDB    CMDDD
```

```
01422 E751 44               FCC     'DI'     DISABLE INPUT
      E752 49
01423 E753 EA47             FDB     CMDDI
01424 E755 44               FCC     'DM'     DISABLE DRUM
      E756 4D
01425 E757 EA4D             FDB     CMDDM
                 * FCC 'DT' DISABLE TIMER
                 * FDB CMDDT
01426 E759 45               FCC     'EA'     ENABLE ANALOG
      E75A 41
01427 E75B EA6E             FDB     CMDEA
01428 E75D 45               FCC     'EB'     ENABLE BIT
      E75E 42
01429 E75F EA74             FDB     CMDEB
                 * FCC 'EC' ENABLE COUNTER
                 * FDB CMDEC
01430 E761 45               FCC     'ED'     ENABLE DRIVER
      E762 44
01431 E763 EA7A             FDB     CMDED
01432 E765 45               FCC     'EI'     ENABLE INPUT
      E766 49
01433 E767 EA80             FDB     CMDEI
01434 E769 45               FCC     'EL'     ENABLE ALL
      E76A 4C
01435 E76B EA86             FDB     CMDEL
01436 E76D 45               FCC     'EM'     ENABLE DRUM
      E76E 4D
01437 E76F EA94             FDB     CMDEM
                 * FCC 'ET' ENABLE TIMER
                 * FDB CMDET
01438 E771 46               FCC     'FB'     BITS WHICH ARE OFF
      E772 42
01439 E773 EA9E             FDB     CMDFB
01440 E775 46               FCC     'FD'     DRIVERS WHICH ARE OFF
01441 E776 EAA6             FDB     CMDFD
01442 E778 46               FCC     'FI'     INPUTS WHICH ARE OFF
      E779 49
01443 E77A EAAE             FDB     CMDFI
01444 E77C 4E               FCC     'NS'     REMOVE DRUM LINE STOP
01445 E77D EABA             FDB     CMDNS
01446 E77F 4F               FCC     'OB'     BITS WHICH ARE ON
      E780 42
01447 E781 EAE8             FDB     CMDOB
01448 E783 4F               FCC     'OD'     DRIVERS WHICH ARE ON
      E784 44
01449 E785 EAF0             FDB     CMDOD
01450 E787 4F               FCC     'OI'     INPUTS WHICH ARE ON
      E788 49
01451 E789 EAF8             FDB     CMDOI
01452 E78B 4F               FCC     'OP'     OPEN A DRUM LINE FOR
                                               EDIT
      E78C 50
01453 E78D EB04             FDB     CMDOP
01454 E78F 50               FCC     'PA'     PRINT ANALOG
      E790 41
01455 E791 EC05             FDB     CMDPA
01456 E793 50               FCC     'PB'     PRINT THE BIT MEMORY
      E794 42
01457 E795 EC74             FDB     CMDPB
                 * FCC 'PC' PRINT COUNTER
                 * FDB CMDPC
01458 E797 50               FCC     'PD'     PRINT DRIVERS
      E798 44
```

```
01459 E799 EC93          FDB    CMDPD
01460 E79B 50            FCC    'PH'      PRINT HISTORY FILE
      E79C 48
01461 E79D EE8A          FDB    CMDPH
01462 E79F 50            FCC    'PI'      PRINT DIGITAL INPUTS
      E7A0 49
01463 E7A1 EED1          FDB    CMDPI
01464 E7A3 50            FCC    'PL'      PRINT DRUM LINE
      E7A4 4C
01465 E7A5 EEDD          FDB    CMDPL
01466 E7A7 50            FCC    'PM'      PRINT DRUM
      E7A8 4D
01467 E7A9 F1A5          FDB    CMDPM
01468 E7AB 50            FCC    'PP'      PRINT  CURRENT DRUM
                                             POSITION
      E7AC 50
01469 E7AD F1EB          FDB    CMDPP
                   * FCC 'PT' PRINT TIMER
                   * FDB CMDPT
01470 E7AF 50            FCC    'PU'      PUNCH THE PROGRAM
      E7B0 55
01471 E7B1 F209          FDB    CMDPU
01472 E7B3 50            FCC    'PX'      PRINT DISABLED
      E7B4 58
01473 E7B5 F2C7          FDB    CMDPX
01474 E7B7 52            FCC    'RL'      RELOAD THE DRUM LINE
01475 E7B8 F306          FDB    CMDRL
01476 E7BA 52            FCC    'RM'      ROTATE THE DRUM
      E7BB 4D
01477 E7BC F317          FDB    CMDRM
                   *• FCC 'RS' RESET TO LINES ZERO
                   * FDB CMDRS
01478 E7BE 52            FCC    'RU'      RUN THE PROGRAM
      E7BF 55
01479 E7C0 F348          FDB    CMDRU
01480 E7C2 53            FCC    'SA'      STOPAT.  DRUM BREAK
                                             POINT
      E7C3 41
01481 E7C4 F359          FDB    CMDSA
01482 E7C6 53            FCC    'SB'      SET MEMORY BIT
      E7C7 42
01483 E7C8 F362          FDB    CMDSB
01484 E7CA 53            FCC    'SH'      SET AND DISABLE
                                             OUTPUT DRIVER
                                             HARDWARE
      E7CB 48
01485 E7CC F374          FDB    CMDSH
01486 E7CE 53            FCC    'SI'      SET DIGITAL INPUTS
      E7CF 49
01487 E7D0 F380          FDB    CMDSI
01488 E7D2 53            FCC    'SD'      SET DRIVERS
      E7D3 44
01489 E7D4 F36E          FDB    CMDSD
01490 E7D6 53            FCC    'SL'      STEP A DRUM LINE
      E7D7 4C
01491 E7D8 F386          FDB    CMDSL
01492 E7DA 53            FCC    'SP'      STOP
      E7DB 50
01493 E7DC F395          FDB    CMDSP
01494 E7DE 53            FCC    'ST'      SET TIME
      E7DF 54
01495 E7E0 F3B4          FDB    CMDST
01496 E7E2 54            FCC    'TI'      PRINT TIME
      E7E3 49
```

```
E7E4 F3ED                FDB    CMDTI
E7E6 58                  FCC    'X1'       FIRST EXIT
                                              SPECIFICATION
E7E7 31
E7E8 F41E                FDB    CMDX1
E7EA 58                  FCC    'X2'       SECOND EXIT
                                              SPECIFICATION
E7EB 32
E7EC F468                FDB    CMDX2
E7EE 58                  FCC    'XE'       EMERGENCY EXIT
                                              SPECIFICATION
E7EF 45
E7F0 F47B                FDB    CMDXE
E7F2 58                  FCC    'XX'       GET OUT OF EDIT
                                              WITHOUT CLOSING
E7F3 58
E7F4 F4EB                FDB    CMDXX
E7F6 5A                  FCC    'ZH'       CLEAR HISTORY FILE
E7F7 48
E7F8 F4F1                FDB    CMDZH
E7FA 5A                  FCC    'Z&'       REINITIALIZE ENTIRE
                                              SYSTEM
E7FB 26
E7FC E09B                FDB    INITR
E7FE 5A                  FCC    'ZM'       ZAP DRUM LINE
E7FF 4D
E800 F4FF                FDB    CMDZM
-    E802       CMLND    EQU    *
                ****************************************
                                                   **********************
                                                   **********************
                                                   *********
                *
                * LOGON COMMAND.  TAKES 4 CHARACTER
                                                   PASSWORD,
                * AND SETS ECHO ENABLE IF CORRECT.
                *
                **
                                                   *******************
                                                   *******************
                                                   *******************
                                                   ************

E805 FE 406E    CMDON    LDX    TXTBFR+2  FIRST HALF OF PASSWORD
E808 BC E000             CPX    CODID     SEE IF HITS
E80B 26 0F               BNE    BBADID
E80D FE 4070             LDX    TXTBFR+4
E810 BC E002             CPX    CODID+2
E813 26 07               BNE    BBADID
E815 86 01               LDA A  #1
E817 97 B7      B2BB     STA A  CANECO    ALLOW ECHOING AND
                                             COMMAND PROCESSING
E819 7E FDA5             JMP    EXIT

E81C 4F         BBADID   CLR A            RESET ALLOWANCLE TO
                                             TALK
E81D 20 F8               BRA    B2BB

                ********************************
                                                   *******************
                                                   ****************
```

```
                                  *
                                  * LOGOFF COMMAND. DROPS RTS AND SENDS BREAK
                                  *
                                  **
                                                          ******************
                                                          ******************
                                                          ******************
                                                          ************

01529 E81F 8D 03   CMDOG  BSR    KILTTY   KILL THE TERMINAL
01530 E821 7E ECCA        JMP    EOJ

01532 E824 7D 00B7 KILTTY TST    CANECO   SEE IF HAD CONTROL
01533 E827 27 0B          BEQ    NOBREK   DO NOT SEND BREAK IF
                                             NOT
01534 E829 7F 00B7        CLR    CANECO   CANNOT TALK IN ANY
                                             CASE
01535 E82C 86 60          LDA A  #$60     SEND BREAK
01536 E82E 97 B8          STA A  BRKING
01537 E830 B7 0388 STJTY  STA A  TTYSTT
01538 E833 39             RTS

01540 E834 86 40   NOBREK LDA A  #$40     DROP RTS
01541 E836 97 B9          STA A  RTSWAT
01542 E838 20 F6          BRA    STJTY
                                  *******************************
                                                          ******************
                                                          ******************
                                                          *******
                                  *
                                  * AA. TWO NUMBERS AS INPUT.  CHANGES
                                                          SPECIFIED ANALOG
                                                          VALUE
                                  * TO SPECIFIED NUMBER.  NO SCALING.
                                  *
                                  **
                                                          ******************
                                                          ******************
                                                          ******************
                                                          ************

01545 E83A BD F7DA CMDAA  JSR    XTRACT   GET FIRST ARGUMENT-
                                             ANALOG NUMBER
01546 E83D BD FD79        JSR    RANG32   CLIP TO 32
01547 E840 FE 40DA        LDX    XTRVAL   GET VALUE FROM
                                             EXTRACT
01548 E843 09             DEX
01549 E844 FF 40C4        STX    SAVONE   SAVE FOR LATER
                                             REFERENCE
01550 E847 BD F7DA        JSR    XTRACT   GET ANOTHER ARGUMENT-
                                             VALUE
01551 E84A B6 40C5        LDA A  SAVONE+1  GET NUMBER
01552 E84D 81 18          CMP A  #TMPEND   COMPARE IT WITH LAST
                                             TEMP INPUT
01553 E84F 24 09          BCC    NOMUG
01554 E851 BD F930        JSR    MANGLE   MUNCHIT
01555 E854 B6 40DB        LDA A  XTRVAL+1
01556 E857 43             COM A           REVERSE IT AGAIN
01557 E858 20 08          BRA    USEFNA

01559 E85A C6 FF   NOMUG  LDA B  #$FF
01560 E85C BD FD7B        JSR    RANGLO
01561 E85F B6 40DB        LDA A  XTRVAL+1  GET VALUE FOR
                                             CHANGED ANALOG
```

```
01562 E862 FE 40C4 USEFNA LDX    SAVONE   RESTORE NUMBER
01563 E865 A7 6E          STA A  AHDRM,X
01564 E867 7E FDA8        JMP    OVRRDY   LEAVE

                 *****************************
                                          ******************
                                          ******************
                                          **************
                 *
                 * AC  ALTER COUNTER. CHANGES SPECIFIED
                                          COUNTER. #, VALUE.
                 *
                 **
                                          ******************
                                          ******************
                                          ******************
                                          ***********

                 *CMDAC JMP NCMD

                 ***************

                 *                        *******************
                                          *******************
                                          ****************
                 *
                 * AT. ALTER TIMER.  CHANGES SPECIFIED DRUM
                                          TIMER. #, NAME.
                 *
                 **
                                          ******************
                                          ******************
                                          ******************
                                          ************

                 *CMDAT JMP NCMD

                 ****************
                                          *******************
                                          *******************
                                          ****************
                 *
                 * AV.  ADVANCE DRUM LINE.  SATISFIES EXIT
                                          TEST.  DRM #, TST
                                          #.
                 *
                 **
                                          *******************
                                          *******************
                                          *******************
                                          ***********

01571 E86A BD FB67 CMDAV  JSR    RSVOYL   MAKE SURE KOSHERNESS
                                             IS RAMPANT
01572 E86D BD F7DA        JSR    XTRACT   LEARN WHICH DRUM IT
                                             IS
01573 E870 BD FB9A        JSR    SELDRM   TEMP >>DRUM LINE
01574 E873 86 01          LDA A  #1       INDICATE FIRST EXIT
01575 E875 B7 40DB        STA A  XTRVAL+1
01576 E878 B6 406B        LDA A  SKPEND   SEE IF A EXIT
                                             SELECTION VALUE
01577 E87B 26 03          BNE    NOX
01578 E87D BD F7DA        JSR    XTRACT   LEARN WHICH TEST TO
                                             APPLY
```

```
01579 E880 FE 4010 NOX     LDX    ST1PTR     >> DRUM LINE
01580 E883 EE 00           LDX    0,X        >DRUM LINE
01581 E885 BD E5F4         JSR    ADD16
01582 E888 BD E2E4         JSR    SKPTST
01583 E88B B6 40DB         LDA A  XTRVAL+1    SEE IF SECOND ONE
01584 E88E 81 02           CMP A  #2         SEE IF SELECTED
                                               SECOND ONE
01585 E890 26 05           BNE    ON11
01586 E892 08              INX
01587 E893 08              INX
01588 E894 BD E2E4         JSR    SKPTST
01589 E897 EE 00    ON11   LDX    0,X        >NEW LINE
01590 E899 26 05           BNE    GITIT
01591 E89B 86 02           LDA A  #ERNOEX
01592 E89D 7E FD8C         JMP    YELL

01594 E8A0 FF 40C9 GITIT   STX    LNSNDX
01595 E8A3 FE 40D0         LDX    ST1PTR     >>DRUM LINE LOCATION
                                               IN TABLE
01597 E8A6 8D 03           BSR    DMVZAP     MOVE POINTER AND
                                               CLEAR DRUM
01598 E8A8 7E FDA5         JMP    EXIT

01600 E8AB B6 40C9 DMVZAP  LDA A  LNSNDX     HIGH HALF OF NEW
                                               POINTER
01601 E8AE A7 00           STA A  0,X
01602 E8B0 B6 40CA         LDA A  LNSNDX+1
01603 E8B3 A7 01           STA A  1,X
01604 E8B5 BD E319         JSR    DRMDNO     CLEAR COUNTERS ET AL
01605 E8B8 39              RTS

                   ********************************************
                                               ******************
                                               ******************
                                               *

                   *
                   * AX. ANALOG EXIT.  EDIT ONLY.  SPECIFIES
                                               ANALOG EXIT SPEC.
                   *
                   **

                                               ********************
                                               ********************
                                               ********************
                                               ***********

01608      E8B9    CMDAX   EQU    *
01609 E8B9 BD F665         JSR    CKEDIT     MAKE SURE IN EDIT
                                               MODE
01610 E8BC 7D 4115         TST    EDTEMG     SEE IF EDITING
                                               EMERGENCY
01611 E8BF 26 15           BNE    CMAXXE     POINT AT XE AREA
01612 E8C1 7D 4118         TST    EDTMOD     CHECK EDIT MODE
01613 E8C4 27 06           BEQ    CMDAX1     POINT AT X1 AREA
01614 E8C6 2A 09           BPL    CMDAX2     POINT AT X2 AREA
01615 E8C8 86 0D           LDA A  #ERNXTM     SAY WRONG MODE FOR
                                               EXIT SPEC
01616 E8CA 20 64           BRA    AXYELL
01617 E8CC CE 4146 CMDAX1  LDX    #EDTAT1
01618 E8CF 20 08           BRA    CMDAXC
01619 E8D1 CE 4170 CMDAX2  LDX    #EDTAT2
01620 E8D4 20 03           BRA    CMDAXC
01621 E8D6 CE 4136 CMAXXE  LDX    #EDTEAT
01622 E8D9 FF 40D8 CMDAXC  STX    AXNDX      SAVE BUFFER POINTER
```

```
01623 E8DC 86 10              LDA A  #16        GET MAX COUNT
01624 E8DE B7 40D6            STA A  AXCNT
01625 E8E1 BD F860            JSR    ZERNIN     BLANK THE EXIT BUFFER
01626 E8E4 7D 406B            TST    SKPEND     SEE IF ANY ARGUMENTS
01627 E8E7 27 03              BEQ    AXEVAL     IF SO, PROCESS THEM
01628 E8E9 7E E975            JMP    CMDAXE     IF NOT, CLEAR ANALOG
                                                   EXIT CONDITIONS

01630 E8EC 7F 40F6 AXEVAL CLR    WZNEG      INIDICATE WAS'OT
                                                   NEGATIVE
01631 E8EF BD F78F AXEVA2 JSR    EVAL       GET NEXT ARGUMENT
01632 E8F2 E6 00              LDA B  0,X        GET RELATIONAL
01633 E8F4 08                 INX               UPDATE TEXT POINTER
01634 E8F5 FF 4062            STX    TXTPTR
01635 E8F8 CE E97[illegible]            LDX    #RELTBL    POINT AT RELATIONALS
                                                   TABLE
01636 E8FB E1 00   AXCREL CMP B  0,X        TEST FOR RELATIONAL
01637 E8FD 27 0A              BEQ    AXADBL     GO ADD RELATIONAL TO
                                                   VALUE
01638 E8FF 08                 INX
01639 E900 8C E980            CPX    #RELVAL    SEE IF AT END OF
                                                   TABLE
01640 E903 26 F6              BNE    AXCREL     NO---GO CHECK NEXT
01641 E905 86 0E              LDA A  #ERBDRL    SAY NO RELATION
01642 E907 20 27              BRA    AXYELL
01643      E909       AXADBL EQU    *
01644 E909 B6 40DB            LDA A  XTRVAL+1   GET VALUE
01645 E90C 81 2D              CMP A  #NANIN+SYSTNO+DRMTNO+4
01646 E90E 22 43              BHI    AXBDAV     BITCH ABOUT BAD VALUE
01647 E910 7D 40DA            TST    XTRVAL     ENSURE NOT TOO LARGE
01648 E913 26 3E              BNE    AXBDAV
01649 E915 4D                 TST A             ZERO IS A NO NO
01650 E916 27 3B              BEQ    AXBDAV
01651 E918 84 3F              AND A  #$3F       STRIP TO 6 BITS
01652 E91A B7 40D7            STA A  AXSAVE     SAVE TO DECIDE ABOUT
                                                   MANGULATION
01653 E91D 16                 TAB
01654 E91E AA 04              ORA A  4,X        OR IN PROPER VALUE
                      * CMPB #TMPEND
                      * BHI AXSTA NOT COMPLIMENT IF NOT
                      * CMPA #$30
                      * BCC AXSTA
                      * EORA #$40
01655 E920 FE 40D8 AXSTA  LDX    AXNDX      GET POINTER TO BUFFER
01656 E923 A7 00              STA A  0,X        SAVE BYTE
01657 E925 08                 INX               POINT AT NEXT BUFFER
                                                   POSITION
01658 E926 FF 40D8            STX    AXNDX      SAVE
01659 E929 7A 40D6            DEC    AXCNT      REDUCE BYTE COUNT
01660 E92C 26 05              BNE    AXNXT
01661 E92E 86 10   AXTMNY LDA A  #ERTMNX     SAY TOO MANY EXIT
                                                   ARGUMENTS
01662 E930 7E FD8C AXYELL JMP    YELL
01663 E933 81 C0   AXNXT  CMP A  #$C0       SEE IF MINUS WAS
                                                   RELATIONAL
01664 E935 25 05              BCS    AXWZNM     IF MINUS, ANOTHER
                                                   RELATIONAL FOLLOWS
01665 E937 B7 40F6            STA A  WZNEG      INDICATE MINUS
                                                   RELATIONAL
01666 E93A 20 B3              BRA    AXEVA2
01667 E93C BD F7DA AXWZNM JSR    XTRACT     GET VALUE FOLLOWING
                                                   RELATIONAL
01668 E93F F6 40D7            LDA B  AXSAVE     SEE IF HAVE TO
                                                   MANGULATE
```

```
E942 C1 18              CMP B  #TMPEND
E944 22 08              BHI    AXTVAL
E946 7D 40F6            TST    WZNEG      SEE IF SHOULD REALLY
                                             ANGLE OR NOT
E949 26 03              BNE    AXTVAL
E94B BD F930            JSR    MANGLE     PLACE NEAT COOLNESS
                                             IN XTRVAL+1
E94E 7D 40DA AXTVAL TST    XTRVAL     VALUE CAN'T EXCEED
                                             255
E951 27 01              BEQ    AXVALU     OK--GO HANDLE IT
E953 86 0F   AXBDAV LDA A  #ERBDAV     SAY BAD ANALOG VALUE
E955 20 D9              BRA    AXYELL
E957 B6 40DB AXVALU LDA A  XTRVAL+1    GET VALUE
E95A FE 40D8            LDX    AXNDX      POINT AT NEXT BYTE IN
                                             BUFFER
E95D A7 00              STA A  0,X        STORE VALUE
E95F 08                 INX               INCREMENT BUFFER
                                             POINTER
E960 FF 40D8            STX    AXNDX      SAVE BUFFER POINTER
E963 FE 4062            LDX    TXTPTR     GET TEXT POINTER
E966 7D 406B            TST    SKPEND     SEE IF THAT WAS LAST
                                             BYTE
E969 2B 0D              BMI    AXBDEL     BAD DELIMETER--BITCH
E96B 26 08              BNE    CMDAXE     YES--EXIT
E96D 7A 40D6            DEC    AXCNT      SEE IF BUFFER FULL
E970 27 BC              BEQ    AXTMNY     GO YELL ABOUT TOO
                                             MANY ARGUMENTS
E972 7E E8EC            JMP    AXEVAL

E975 7E FDA5 CMDAXE JMP    EXIT
E978 86 13   AXBDEL LDA A  #ERBDLM
E97A 20 B4              BRA    AXYELL
E97C 3E      RELTBL FCC    '><=-'
E97D 3C
E97E 3D
E97F 2D
E980 00      RELVAL FCB    $00,$40,$80,$C0
E981 40
E982 80
E983 C0

             ***************************************
                                 ******************
                                 ******
             *
             * CB.  CLEARS SPECIFIED MEMORY BIT OR BITS.
             *
             **
                                 ******************
                                 ******************
                                 ******************
                                 ************

E984 CE 0031 CMDCB  LDX    #MYVAL-1
E987 FF 40D0        STX    ST1PTR
E98A CE 0035        LDX    #MYDRM-1
E98D 7E FBF4        JMP    CLRAN2

             ***************************************
             *
             * CD. CLEAR DRIVER.  CLEARS SPECIFIED DRIVER
                                 OR DRIVES.
             *
             **
```

```
                                                  ******************
                                                  ******************
                                                  ******************
                                                  ************
01704 E990 CE 0029 CMDCD  LDX   #OHDRM-1
01705 E993 7E FEE2        JMP   CLRAN1

                  * [illegible]
                  *
                  * CH.  CLEAR AND DISABLE [illegible]
                  *
                  **
                                                  ******************
                                                  ******************
                                                  ******************
                                                  ************
01708 E996 CE 0011 CMDCH  LDX   #OHMSK-1    ADDRESS ENABLE MASK
01709 E999 FF 40D0        STX   ST1PTR
01710 E99C CE 0025        LDX   #OHVAL-1    ADDRESS VALUES
01711 E99F 7E FBF4        JMP   CLRAN2
                  *************************************
                                                  *****************
                                                  *****************
                                                  *********
                  *
                  * CI. CLEAR INPUT.  CLEARS SPECIFIED INPUT
                                                  OR INPUTS.
                  *
                  **
                                                  *****************
                                                  *****************
                                                  *****************
                                                  *****************
                                                  *
01714 E9A2 CE 0009 CMDCI  LDX   #IHDAT-1
01715 E9A5 FF 40D0        STX   ST1PTR
01716 E9A8 CE 001D        LDX   #IHDRM-1
01717 E9AB 7E FBF4        JMP   CLRAN2
                  ***************************
                  *
                  * CL.  CLOSE.  ENDS EDIT.  IF RUNNING & NOT
                                                  NEW LINE,
                                                  RESOLVES
                  * ALL DRUM LINES.  IF FAIL, DOES NOT CLOSE.
                  * NEW LINE MAY ALWAYS CLOSE.
                  *
                  **
                                                  *****************
                                                  *****************
                                                  *****************
                                                  *****************
                                                  *
01720 E9AE BD F665 CMDCL  JSR   CKEDIT   MAKE SURE IN EDIT
                                                  MODE
01721 E9B1 7F 40CC        CLR   RELFLG   SET OUTPUT ON
01722 E9B4 8D 03          BSR   CLOSLN
01723 E9B6 7E FDA5        JMP   EXIT
```

```
01725 E9B9 7D 4117 CLOSLN TST    EDTNEW   SEE IF NEW LINE
01726 E9BC 26 08          BNE    CLSNRS   YES--NO RESOLVE
                                            NEEDED
01727 E9BE 7D 4054        TST    RUNING   SEE IF CURRENTLY
                                            RUNNING
01728 E9C1 27 03          BEQ    CLSNRS   NO RUNNING, SO NO
                                            NEED TO RESOLVE
                                            NOW
01729 E9C3 BD F567        JSR    RSVOYL   RESOLVE OR YELL
01730      E9C6    CLSNRS EQU    *
01731 E9C6 FE 4119        LDX    EDTWHR   PREPARE POINTERS FOR
                                            MOVE
01732 E9C9 09             DEX
01733 E9CA 09             DEX
01734 E9CB 09             DEX
01735 E9CC FF 40D2        STX    ST2PTR
01736 E9CF CE 411B        LDX    #EDTBUF
01737 E9D2 FF 40D0        STX    ST1PTR
01738 E9D5 FE 4119        LDX    EDTWHR   GET ADDRESS OF NEW
                                            LINE
01739 E9D8 7D 4115        TST    EDTEMG   SEE IF EDITING
                                            EMERGENCY
01740 E9DB 26 11          BNE    CLEMG
01742 E9DD 7D 4117        TST    EDTNEW   SEE IF A NEW LINE
01743 E9E0 27 08          BEQ    CLSTQO   IF OLD, DON'T CHANGE
                                            POINTERS
01744 E9E2 2B 06          BMI    CLSTQO   IF RECYCLED LINE,
                                            DON'T UPDATE PTR
01745 E9E4 FF 4113        STX    LSTLIN
01746 E9E7 7C 00B0        INC    LINCNT   INCREMENT COUNT OF
                                            LINES
01747 E9EA 86 67   CLSTQO LDA A  #LINLGT  GET COUNT FOR MOVE
01748 E9EC 20 11          BRA    CLMVLN   GO MOVE LINE
01749 E9EE 2A 0D   CLEMG  BPL    CLSTSU   IF DATA LINE, SKIP
                                            EMERGENCY
                                            PROCESSING
01750 E9F0 7D 4117        TST    EDTNEW   SEE IF A NEW LINE
01751 E9F3 27 08          BEQ    CLSTSU
01752 E9F5 2B 06          BMI    CLSTSU   IF RECYCLED
                                            EMERGENCY, DON'T
                                            UPDATE PTR
01753 E9F7 FF 410D        STX    EMGFIR
01754 E9FA 7C 00B1        INC    EMGNUM   INCREMENT COUNT OF
                                            EMERGENCY LINES
01755 E9FD C6 3B   CLSTSU LDA A  #EMGLGT  GET COUNT FOR MOVE
01756      E9FF    CLMVLN EQU    *
01757 E9FF BD F9A3        JSR    MVCPP    MOVE LINE TO DRUM
                                            BUFFER
01758 EA02 B6 4182        LDA A  EDTDGT   GET FIRST DIGIT OF
                                            LINE NO
01759 EA05 81 39          CMP A  #$39     SEE IF EMERGENCY LINE
01760 EA07 27 28          BEQ    CLNTZR   IF SO, SKIP
01761 EA09 81 44          CMP A  #'D      SEE IF DATA LINE
01762 EA0B 27 24          BEQ    CLNTZR   GO AWAY ON THIS ONE,
                                            TOO
01763 EA0D 84 0F          AND A  #$0F
01764 EA0F B7 40F7        STA A  DRMVAL   SAVE DRUM NUMBER
01765 EA12 4A             DEC A
01766 EA13 CE 00A0        LDX    #ZROTBL
01767 EA16 BD FEAE        JSR    SLDMPT
01768 EA19 BD F657        JSR    CALDLN
01769 EA1C CE 411C        LDX    #EDTLNO  SEE IF THIS IS ZERO
                                            LINE
```

```
[illegible] EA1F BD F75F         JSR    [illegible]
[illegible] EA22 26 0D           BNE    CLNTZR
[illegible] EA24 FE [illegible]  LDX    STIPTR    YES POINT AT PROPER
                                                  ENTRY
01773 EA27 B6 4119 .             LDA A  EDTWHR    GET POINTER TO [illegible]
                                                  LINE
01774 EA2A F6 411A               LDA B  EDTWHR+1
01775 EA2D A7 00                 STA A  0,X
01776 EA2F E7 01                 STA B  1,X
01777 EA31 BD F786 CLNTZR        JSR    SMLEDC    GET OUT OF EDIT
01778 EA34 39                    RTS

                          ****************************************
                                                  *******************
                                                  *******************
                          *
                          * CT.   DEFINES COUNTER FOR ENTIRE SYSTEM.
                          *
                          **
                                                  ********************
                                                  ********************
                                                  ********************
                                                  ************

                          *CMDCT JMP NCMD

                          ****************
                                                  ********************
                                                  ********************
                                                  *****************
                          *
                          * DA.   DISABLE ANALOG.  FORBIDS CHANGE FOR
                                                  SPECIFIED
                                                  ANALOG(S)
                          *
                          **
                                                  ********************
                                                  ********************
                                                  ********************
                                                  ************

01783 EA35 CE 0019 CMDDA  LDX    #ANMSK-1
01784 EA38 7E FBE2        JMP    CLRAN1

                          ****************************************
                          *
                          * DB.   DISABLE BIT.  FORBIDS CHANGES FOR
                                                  SPECIFIED BIT(S).
                          *
                          **
                                                  ********************
                                                  ********************
                                                  ********************
                                                  ************
01787 EA3B CE 0015 CMDDB  LDX    #MYMSK-1
01788 EA3E 7E FBE2        JMP    CLRAN1

                          ****************************************
                          *
                          * DC.   DISABLE COUNTER. FORBIDS CHANGE [illegible]
                                                  SPECIFIED
                                                  COUNTER(S)
                          *
                          **
```

```
                                   *******************
                                   *******************
                                   *******************
                                   ************

*CMDDC JMP NCMD

***************
                                   *******************
                                   *******************
                                   *****************
*
* DD.  DISABLE DRIVER.  FORBIDS CHANGES FOR
                          SPECIFIED
                          DRIVER(S)
*
**
                                   *******************
                                   *******************
                                   *******************
                                   ************

EA41 CE 0011 CMDDD  LDX    #DHMSK-1
EA44 7E FBE2        JMP    CLRAN1

*************************************
*
* DI.  DISABLE INPUT.  FORBIDS CHANGES FOR
                          SPECIFIED INPUT(S)
*
**
                                   *******************
                                   *******************
                                   *******************
                                   ************

EA47 CE 000D CMDDI  LDX    #IMMSK-1
EA4A 7E FBE2        JMP    CLRAN1

*************************************
*
* DM.  DISABLE DRUM.  ROUTES OUTPUTS FOR
                          SPECIFIED DRUM TO
* FAKE OUTPUT AND MEMORY AREA
*
**
                                   *******************
                                   *******************
                                   *******************
                                   ************

EA4D 8D 07    CMDDM  BSR    FWAG
EA4F 8A 80           ORA A  #$80     SET FLAG BIT
EA51 A7 66           STA A  DRMSTT,X   RESTORE DRUM STATUS
EA53 7E EA4D         JMP    CMDDM

EA56 BD [illegible] FWAG  JSR  XTRACT   GET DRUM NUMBER FOR
                                         [illegible]
[illegible] BD [illegible]   JSR  [illegible]   [illegible]
                                         NUMBER
[illegible]                  LDA A  [illegible]
EA5F 40 [illegible]          NEG A            STATII ARE STORED
                                         BACKWARDS
```

```
01810 EA60 8B 08              ADD A   #NDRMS     PERFORM REFLECTION
01811 EA62 B7 40D1            STA A   ST1PTR+1     TRANSFER TO INDEX
                                                   REGISTER
01812 EA65 7F 40D0            CLR     ST1PTR
01813 EA68 FE 40D0            LDX     ST1PTR
01814 EA6B A6 66              LDA A   DRMSTT,X
01815 EA6D 39                 RTS

                    ***********************************
                                                   ****************
                                                   ************
                    *
                    * DT.   DISABLE TIMER.  INHIBITS COUNTS FOR
                                                   SPECIFIED
                                                   TIMER(S)
                    *
                    **
                                                   ****************
                                                   ****************
                                                   ****************
                                                   ****************
                                                   *

                    *CMDDT JMP NCMD
                    ****************
                                                   ****************
                                                   ****************
                                                   ****************
                                                   ****
                    *
                    * EA.   ENABLE ANALOG.  PERMITS CHANGES FOR
                                                   SPECIFIED
                                                   ANALOG(S)
                    *
                    **
                                                   ****************
                                                   ****************
                                                   ****************
                                                   ****************
                                                   *

01820 EA6E CE 0019 CMDEA      LDX     #AHMSK-1
01821 EA71 7E FBD8            JMP     SETAN1

                    ******************************
                    *
                    * EB.   ENABLE BIT.  PERMITS CHANGES FOR
                                                   SPECIFIED BIT(S)
                    *
                    **
                                                   ****************
                                                   ****************
                                                   ****************
                                                   ****************
                                                   *

01824 EA74 CE 0015 CMDEB      LDX     #MYMSK-1
01825 EA77 7E FBD8            JMP     SETAN1

                    ******************************
                    *
                    * EC.   ENABLE COUNTER.  PERMITS CHANGES FOR
                                                   SPECIFIED
                                                   COUNTER(S)
```

```
*
**
                                    *****************
                                    *****************
                                    *****************
                                    *****************
                                    *
*FMDEC JMP NCMD

****************
                                    *****************
                                    *****************
                                    *****************
                                    ****
*
* ED.  ENABLE DRIVER.  PERMITS CHANGES FOR
                                    SPECIFIED
                                    DRIVER(S).
*
**
                                    *****************
                                    *****************
                                    *****************
                                    *****************
                                    *

01830 EA7A CE 0011 CMDED  LDX    #DHMSK-1
01831 EA7D 7E FBD8        JMP    SETAN1

                   ******************************
                   *
                   * EI.  ENABLE INPUT.  PERMITS CHANGES IN
                                    SPECIFIED
                                    INPUT(S).
                   *
                   **
                                    *****************
                                    *****************
                                    *****************
                                    *****************
                                    *

01834 EA80 CE 000D CMDEI  LDX    #IHMSK-1
01835 EA83 7E FBD8        JMP    SETAN1

                   ******************************
                   *
                   * EL.  ENABLE ALL.  REMOVES ALL DISABLES
                                    FROM EVERYWHERE.
                   *
                   **
                                    *****************
                                    *****************
                                    *****************
                                    *****************
                                    *

01838 EA86 BD FCB7 CMDEL  JSR    SETMKS   ONES IN ALL ENABLING
                                    MASKS
01839 EA89 CE 0065        LDX    #DRMST-1  POINT TO DRUM
                                    STATUS
                                    REGISTERS
```

```
01840 EA8C 86 08          LDA A  #NDRMS    NUMBER OF DRUMS
01841 EA8E BD F05F        JSR    ZEROES
01842 EA91 7E EA8F        JMP    NSALL     CLEAR STOP CONDITIONS
                                           ALSO

          ********************************************************
          *
          * EM.  ENABLE DRUM.  PERMITS SPECIFIED
                                           DRUM(S) TO CHANGE
                                           DATA.
          *
          **

01845 EA94 BD EM56 CMBEM  JSR    FWAO
01846 EA97 84 7F          AND A  #$7F      TURN OFF DISABLE BIT
01847 EA99 A7 66          STA A  DRMSTT,X
01848 EA9B 7E EA94        JMP    CMDEM

          ********************************************************
          *
          * ET.  ENABLE TIMER.  PERMITS CHANGES IN
                                           SPECIFIED TIMER(S)
          *
          **

          *CMDET JMP NCMD

          ***************
          *
          * FB.  EDIT ONLY.  SPECIFIES BITS TO BE OFF.
          *
          **

01853        EA9E  CMDFB  EQU    *
01854 EA9E BD F665        JSR    CKEDIT    SEE IF IN EDIT MODE
01855 EAA1 BD F7DF        JSR    PICKMB
01856 EAA4 20 0E          BRA    CMDFCM

          ********************************************************
          *
          * FD.  EDIT ONLY.  SPECIFIES DRIVERS TO BE
                                           OFF.
```

```
*
**
                                              *******************
                                              *******************
                                              *******************
                                              ************

01059        EAA6    CMDFD   EQU     *
01060 EAA6 BD F665           JSR     CKEDIT    SEE IF IN EDIT MODE
01061 EAA9 BD FA09           JSR     PICKDB
01062 EAAC 20 06             BRA     CMDFCM

               ******************************************************
                                              *******************
                                              *******************
*
* FI.  EDIT ONLY.  INPUTS WHICH MUST BE ON.
*
**
                                              *******************
                                              *******************
                                              *******************
                                              ************

01065        EAAE    CMDFI   EQU     *
01066 EAAE BD F665           JSR     CKEDIT    SEE IF IN EDIT MODE
01067 EAB1 BD FA14           JSR     PICKIB

01069 EAB4 BD F694 CMDFCM    JSR     CLROFB    CLEAR ALL EXISTING
                                                  OFF BITS
01070 EAB7 7E FC00           JMP     STCLEN    SET VALUE TO ZERO AND
                                                  ENABLE

******************************
                                              *******************
                                              **********
*
* NS.  REMOVE STOP FROM DRUM LINE(S)
*
**
                                              *******************
                                              *******************
                                              *******************
                                              ************

01073 EABA BD F8EB CMDNS     JSR     IZSLSH    SEE IF SLASH TO DO
                                                  ALL
01074 EABD 26 06             BNE     NZAL
01075 EABF BD F9CD NSALL     JSR     FFGCLR    CLEAR ALL THE STOP
                                                  BITS
01076 EAC2 7E FDA5           JMP     EXIT

01078 EAC5 8D 06    NZAL     BSR     RDYST     PREPARE TO ZAP A BIT
01079 EAC7 84 7F             AND A   #$7F      ZAP FLAG BIT
01080 EAC9 A7 00             STA A   0,X
01081 EACB 20 F8             BRA     NZAL

01083 EACD BD F7DA RDYST     JSR     XTRACT    GET LINE NUMBER
01084 EAD0 FE 40DA           LDX     XTRVAL
01085 EAD3 FF 40C7           STX     LNSVAL
01086 EAD6 BD F863           JSR     FIND
01087 EAD9 FE 40C7           LDX     LNSNDX    DRUM LINE TO BE NOT
                                                  STOPPED
```

```
01088 EADC 26 05              BNE     NSLT
01089 EADE 86 03              LDA A   #ERMNER
01090 EAE0 7E FD8C            JMP     YELPOF

01092 EAE3 09         NSLT    DEX
01093 EAE4 09                 DEX
01094 EAE5 A6 00              LDA A   0,X       GET FLAGS
01095 EAE7 39                 RTS

                      ********************************************************
                      *
                      * OB.  EDIT ONLY.  BITS WHICH MUST BE ON.
                      *
                      **
                      ********************************************************

01898       EAE8      CMDOB   EQU     *
01899 EAE8 BD F665            JSR     CKEDIT    SEE IF IN EDIT MODE
01900 EAEB BD F9DF            JSR     PICKMB
01901 EAEE 20 0E              BRA     CMDOCM

                      ********************************************************
                      *
                      * OD.  EDIT ONLY.  DRIVERS WHICH MUST BE ON.
                      *
                      **
                      ********************************************************

01904       EAF0      CMDOD   EQU     *
01905 EAF0 BD F665            JSR     CKEDIT    SEE IF IN EDIT MODE
01906 EAF3 BD FA09            JSR     PICKDB    SET POINTERS
01907 EAF6 20 06              BRA     CMDOCM

                      ********************************************************
                      *
                      * OI.  EDIT ONLY.  INPUTS WHICH MUST BE ON.
                      *
                      **
                      ********************************************************

01910       EAF8      CMDOI   EQU     *
01911 EAF8 BD F665            JSR     CKEDIT    SEE IF IN EDIT MODE
01912 EAFB BD FA14            JSR     PICKIB    SET POINTERS
01913 EAFE BD F670    CMDOCM  JSR     CLRONB    CLEAR ALL  EXISTING
                                                  ON BITS
```

```
01914 EB01 7E FBEE        JMP    SETN2N   SET VALUE TO ONE AND
                                          ENABLE

                   ******************************
                                          ********************
                                          ************
                   *
                   * OP.  OPEN A DRUM LINE FOR EDITING.  MOVES
                                          DRUM LINE TO EDIT
                   * BUFFER OR CLEARS BUFFER.  PERMITS EDITING
                                          COMMANDS.
                   *
                   **
                                          ********************
                                          ********************
                                          ********************
                                          ************

01917      EB04    CMDOP  EQU    *
01918 EB04 7D 406B        TST    SKPEND   SEE IF ARGUMENT
01919 EB07 27 0D          BEQ    OPGTLN   YES--GO GET IT
01920 EB09 7D 4116        TST    EDTING   SEE IF EDITING
01921 EB0C 26 05          BNE    OPSTBG   YES--GO RESET TO
                                            BEGINNING OF LINE
01922 EB0E 86 06          LDA A  #ERNOLN   NO LINE NUMBER AT
                                             START OF
                                             EDIT--YELL
01923 EB10 7E FD8C        JMP    YELL
01924 EB13 7E EBFC OPSTBG JMP    OPSETB

01926      EB16    OPGTLN EQU    *
01927 EB16 FE 4062        LDX    TXTPTR   POINT AT ARGUMENT
01928 EB19 A6 00          LDA A  0,X      GET IT
01929 EB1B 81 44          CMP A  #'D      SEE IF DATA LOGGING
                                            LINE
01930 EB1D 26 0B          BNE    OPNRLN   NO--GO DO NORMAL LINE
01931 EB1F FE FE30        LDX    LNNOTP   CALL IT LINE 10000
01932 EB22 FF 40DA        STX    XTRVAL
01933 EB25 B7 40DC        STA A  XTRDGT   SAVE D AS EDIT DIGIT
01934 EB28 20 06          BRA    OPCKSM   SKIP NORMAL CHECKING
01935      EB2A    OPNRLN EQU    *
01936 EB2A BD F7DA        JSR    XTRACT   GET LINE NUMBER
01937 EB2D BD FD59        JSR    RANGLN   SEE IF WITHIN RANGE
01938 EB30 7D 4116 OPCKSM TST    EDTING   SEE IF PREVIOUS LINE
01939 EB33 27 03          BEQ    OPNCLS   NO--PROCEED
01940 EB35 BD E9B9        JSR    CLOSLN   ATTEMPT TO CLOSE
                                            PREVIOUS LINE
01941      EB38    OPNCLS EQU    *
01942 EB38 FE 40DA        LDX    XTRVAL   SAVE LINE NUMBER FOR
                                            FIND
01943 EB3B FF 40C7        STX    LNSVAL
01944 EB3E F6 40DC        LDA B  XTRDGT   GET FIRST DIGIT OF
                                            LINE NUMBER
01945 EB41 CE 411B        LDX    #EDTBUF   POINT MOVE AT EDIT
                                             BUFFER
01946 EB44 FF 40D2        STX    ST2PTR
01947 EB47 86 34          LDA A  #LINMLT   GET REGULAR LINE
                                             LENGTH
01948 EB49 C1 44          CMP B  #'D      SEE IF DATA LOGGING
                                            LINE
01949 EB4B 27 09          BEQ    OPDATL
01950 EB4D C1 39          CMP B  #$39     SEE IF EMERGENCY LINE
01951 EB4F 26 0A          BNE    OPNEMG   NO
```

```
01952 EB51 73 4115          COM    EDTEMG    YES--SET EDIT
                                                EMERGENCY FLAG
01953 EB54 20 03            BRA    OPSEML    GO SPECIFY EMERGENCY
                                                LENGTH
01954       EB56    OPDATL  EQU    *
01955 EB56 7C 4115          INC    EDTEMG    SPECIFY DATA LOGGING
                                                LINE
01956       EB59    OPSEML  EQU    *
01957 EB59 86 1E            LDA A  #EMGNLT    SET FOR EMERGENCY
                                                 LINE LENGTH
01958       EB5B    OPNEMG  EQU    *
01959 EB5B B7 40D4          STA A  MVCCNT    SAVE FOR MOVE
01960 EB5E 8D 3D            BSR    WCHFND    GO DO APPROPRIATE
                                                FIND
01961 EB60 FE 40C9          LDX    LNSNDX    GET ADDRESS FROM FIND
01962 EB63 27 03            BEQ    OPFNVC    IF ZERO,SEE IF
                                                VACANCY TO FILL
01963 EB65 7E EBDE          JMP    OPOLD
01964       EB68    OPFNVC  EQU    *
01965 EB68 CE 0000          LDX    #$0       NEW LINE--SEE IF
                                                VACANT BUFFER
                                                SPACE
01966 EB6B FF 40C7          STX    LNSVAL    TELL FIND TO LOOK FOR
                                                VACANCIES
01967 EB6E 8D 2D            BSR    WCHFND    GO DO APPROPRIATE
                                                FIND
01968 EB70 FE 40C9          LDX    LNSNDX    EXAMINE RESULTS
01969 EB73 26 5E            BNE    OPNEW     FOUND VACANCY
01970 EB75 7C 4117          INC    EDTNEW    SAY COMPLETELY NEW
                                                BUFFER
01971 EB78 7D 4115          TST    EDTEMG    SEE IF EDITING
                                                EMERGENCY
01972 EB7B 26 38            BNE    OPFLEM
01973 EB7D 4F               CLR A
01974 EB7E C6 67            LDA B  #LINLGT    GET LENGTH OF LINE
                                                 IN EMERGENCY
                                                 BUFFER
01975 EB80 FB 4114          ADD B  LSTLIN+1   ADD TO CURRENT LAST
                                                  LINE
01976 EB83 B9 4113          ADC A  LSTLIN
01977 EB86 B7 40C9          STA A  LNSNDX    SAVE NEW ADDRESS
01978 EB89 F7 40CA          STA B  LNSNDX+1
01979 EB8C CB 67            ADD B  #LINLGT    POINT AT END OF LINE
01980 EB8E 89 00            ADC A  #$0
01981 EB90 CE 410D          LDX    #ENDOFIR   SEE IF OVERLAP
01982 EB93 BD F75F          JSR    COMP16
01983 EB96 23 3E            BLS    OPNEW2    NO--PROCEED
01984 EB98 86 16    OPNRYL  LDA A  #ERNORM    SAY NO MORE ROOM
01985 EB9A 7E FD8C          JMP    YELL

01987       EB9D    WCHFND  EQU    *
01988 EB9D 7D 4115          TST    EDTEMG
01989 EBA0 26 05            BNE    WCHEFD
01990 EBA2 BD F863          JSR    FIND
01991 EBA5 20 0D            BRA    WCHFXT
01992       EBA7    WCHEFD  EQU    *
01993 EBA7 2B 08            BMI    WCHEMG    NORMAL EMERGENCY
01994 EBA9 CE 41C1          LDX    #DLOUT    POINT AT DATA LOG
                                                LINE
01995 EBAC FF 40C9          STX    LNSNDX    FAKE OUT OPEN
01996 EBAF 20 03            BRA    WCHFXT
01997       EBB1    WCHEMG  EQU    *
01998 EBB1 BD F8AB          JSR    FINEMG
```

```
01?99 EBB4 39        WCHFXT RTS

[illegible]  EBB5    [illegible] EQU   *
[illegible]  [illegible]          LDA A  [illegible]   [illegible]
                                                        [illegible]
[illegible]  F6 410E             LDA B  [illegible]
02004 EBBB C0 3B                 SUB B  #EMGLGT
02005 EBBD 82 00                 SBC A  #$0       SUBTRACT LINE LENGTH
02006 EBBF B7 40C9               STA A  LNSNDX    SAVE NEW ADDRESS
02007 EBC2 F7 40CA               STA B  LNSNDX+1
02008 EBC5 C0 67                 SUB B  #LINLGT    POINT ONE LINE
                                                      LENGTH BELOW
02009 EBC7 82 00                 SBC A  #$0
02010 EBC9 CE 4113               LDX    #LSTLIN
02011 EBCC BD F75F               JSR    COMP16
02012 EBCF 25 C7                 BCS    OPNRYL    NO MORE ROOM--YELL
02013 EBD1 20 03                 BRA    OPNEW2
02014      EBD3      OPNEW       EQU    *
02015 EBD3 73 4117               COM    EDTNEW    SAY RECYCLED LINE
                                                     BUFFER

02017 EBD6 FE 40DA OPNEW2        LDX    XTRVAL    SAVE LINE NUMBER
02018 EBD9 FF 40C7               STX    LNSVAL
02019 EBDC 20 09                 BRA    OPNCPY    COPY NEEDED DATA

02021 EBDE 09        OPOLD       DEX
02022 EBDF 09                    DEX
02023 EBE0 09                    DEX
02024 EBE1 FF 40D0               STX    ST1PTR    SAVE MOVE DESTINATION
                                                     POINTER
02025 EBE4 BD F99F               JSR    MVC       MOVE THINGS INTO EDIT
                                                     BUFFER

02027 EBE7 FE 40C9 OPNCPY        LDX    LNSNDX    GET LINE ADDRESS
02028 EBEA FF 4119               STX    EDTWHR    SAVE IN EDIT
                                                     LOCATION.
02029 EBED FE 40C7               LDX    LNSVAL    GET LINE NUMBER
02030 EBF0 FF 411C               STX    EDTLNO    SAVE IN EDIT BUFFER
02031 EBF3 F6 40DC               LDA B  XTRDGT    SAVE FIRST DIGIT OF
                                                     LINE NUMBER
02032 EBF6 F7 4182               STA B  EDTDGT
02033 EBF9 73 4116               COM    EDTING
02034      EBFC      OPSETB      EQU    *
02035 EBFC 7F 4118               CLR    EDTMOD    SET EDIT MODE TO
                                                     BEGINNING OF LINE
02036 EBFF 73 4118               COM    EDTMOD
02037 EC02 7E FDA5               JMP    EXIT      LEAVE
                     ***************************
                                                  ******************
                                                  ******************
                                                  ****************

                     *
                     * PA.  PRINTS VALUES OF SPECIFIED ANALOG(S).
                                                  NO SCALING.
                     *
                     **
                                                  *******************
                                                  *******************
                                                  *******************
                                                  ***********

02040 EC05 7F 4057 CMDPA         CLR    PUNPUN
02041 EC08 86 01                 LDA A  #1
```

```
02042 EC0A B7 4058           STA A  FUNFUN+1
02043 EC0D B7 4055           STA A  FULFUN   ONLY DO ONE

02045 EC10 BD F8EB           JSR    IZCLSH   SEE IF DO ALL
02046 EC13 26 07             BNE    ONNYA
02047 EC15 86 20             LDA A  #NANIN   NUMBER TO DO
02048 EC17 B7 4055           STA A  FULFUN
02049 EC1A 20 0C             BRA    MNNYA

02051 EC1C BD F7DA ONNYA     JSR    XTRACT
02052 EC1F BD FD79           JSR    RANG32   CLIP TO ANALOG
                                               ADDRESS
02053 EC22 FE 40DA           LDX    XTRVAL
02054 EC25 FF 4057           STX    FUNFUN   WHICH TO DO

02056 EC28 FE 4057 MNNYA     LDX    FUNFUN
02057 EC2B FF 40E5           STX    CVDTMP
02058 EC2E CE 406E           LDX    #TXTBFR+2
02059 EC31 BD F69F           JSR    SPCOUT
02060 EC34 BD F6F0           JSR    CVDZ

02062 EC37 BD F6A3           JSR    DSHOUT
02063 EC3A FE 4057           LDX    FUNFUN   GET WHICH ONE
02064 EC3D A6 6D             LDA A  ANDRM-1,X   GET DRUM VALUE
02065 EC3F 8D 15             BSR    ANNNOT
02066 EC41 FE 4057           LDX    FUNFUN
02067 EC44 A6 [illegible]    LDA A  ANVAL-1,X
02068 EC46 8D 0E             BSR    ANNNOT
02069 EC48 BD FDD5           JSR    BUTCLF   PUT OUT THE LINE
02070 EC4B 7C 4058           INC    FUNFUN+1
02071 EC4E 7A 4055           DEC    FULFUN
02072 EC51 26 D5             BNE    MNNYA    DOAS MANY AS REQUIRED
02073 EC53 7E FDA5           JMP    EXIT

02075 EC56 7F 40E5 ANNNOT    CLR    CVDTMP
02076 EC59 B7 40E6           STA A  CVDTMP+1
02077 EC5C F6 4058           LDA B  FUNFUN+1   SEE IF MANGLABLE
02078 EC5F C1 18             CMP B  #TMPEND
02079 EC61 22 07             BHI    NFUM1
02080 EC63 43                COM A             REVERSE IT
02081 EC64 B7 40E6           STA A  CVDTMP+1
02082 EC67 BD F96C           JSR    UNMGLE
02083 EC6A FE 40[illegible] NFUM1 LDX TXTOUT
02084 EC6D BD [illegible]    JSR    CVD
02085 EC70 BD F69F           JSR    SPCOUT
02086 EC73 39                RTS
                   ************************************
                                                   ******************
                                                   ******************
                                                   ******************
                   *
                   * PB.  PRINT STATES OF SPECIFIED BIT(S).
                   *
                   **
                                                   ******************
                                                   ******************
                                                   ******************
                                                   ************

02089 EC74 CE 0036 CMDPB     LDX    #MYDRM
02090 EC77 FF 40D0           STX    ST1PTR
02091 EC7A CE 0032           LDX    #MYVAL
```

```
EC7D FF 40D2 GENPBT STX    ST2PTR
EC80 BD F8EB        JSR    I2SLSH
EC83 26 05          BNE    NOEXT
EC85 FE 40D2        LDX    ST2PTR
EC88 20 03          BRA    DASTRG

EC8A FE 40D0 NOEXT  LDX    ST1PTR
EC8D BD F5AA DASTRG JSR    BONCT1    PRINT THEON BITS
EC90 7E FDB3        JMP    BUTRDY    PUT OUT THE LINE

                  ************************************
                                          ******************
                                          ******************
                                          *****
                  *
                  * PC.  PRINT VALUE IN SPECIFIED COUNTER(S).
                  *
                  **
                                          ******************
                                          ******************
                                          ******************
                                          ************

                  *CMDPC JMP NCMD

                  ****************
                                          ******************
                                          ******************
                                          ****************
                  *
                  * PD.  PRINTS STATES OF SPECIFIED DRIVERS.
                  *
                  **
                                          ******************
                                          ******************
                                          ******************
                                          ************

EC93 CE 002A CMDPD  LDX    #OHDRM
EC96 FF 40D0        STX    ST1PTR
EC99 CE 0026        LDX    #ONVAL
EC9C 20 DF          BRA    GENPBT
                  ************************************
                  *
                  * DATA LOGGING PROGRAM
                  *
                  **
                                          ******************
                                          ******************
                                          ******************
                                          ************

EC9E B6 41B8 DATLOG LDA A  LOGING    SEE IF LOGGING DATA
                                       AT ALL
ECA1 26 2B          BNE    INALOG
ECA3 86 1F          LDA A  #31       CHECK LOGGING BIT TO
                                       SEE IF SHOULD
                                       START
ECA5 CE 0035        LDX    #MYDRM-1
ECA8 BD E42A        JSR    BITVNC
ECAB E4 00          AND B  0,X       IF SET, START LOGGING
ECAD 26 01          BNE    STRLOG
ECAF 39      NOLOG  RTS
```

```
                    *
ECB0 7D 41EA STRLOG TST     DLXNO+1    SEE IF ANY LOGGING
                                         INTERVAL
ECB3 27 FA          BEQ     NOLOG
                    *
ECB5 F7 41B8        STA B   LOGING     INDICATE LOGGING DATA
                                         NOW
ECB8 CE 4196        LDX     #ACCUMU    CLEAR ACCUMULATION
                                         AREA
ECBB 6F 00   CACMU  CLR     0,X
ECBD 08             INX
ECBE 8C 41B8        CPX     #ACCUND
ECC1 26 F8          BNE     CACMU
                    *
ECC3 B6 41EA        LDA A   DLXNO+1    OBTAIN AVERAGING
                                         PERIOD
ECC6 B7 41B9        STA A   ACCUTM
ECC9 DE C2          LDX     SYSMIN
ECCB FF 4196        STX     ACCSTH     PRESERVE STARTING
                                         TIME
                    *
ECCE 8D 5C   INALOG BSR     COUNAK     INITIALIZE AVERAGING
                                         COUNTER
ECD0 CE 41C0        LDX     #DLOUT-1
ECD3 FF 4187        STX     WHCSTG
ECD6 CE 0029        LDX     #OHDRM-1
ECD9 BD ED94        JSR     BINACU     ACCUMULATE BINARY
                                         AVERAGES IF ANY
ECDC CE 41C8        LDX     #DLAMY-1     BITS
ECDF FF 4187        STX     WHCSTG
ECE2 CE 0035        LDX     #MYDRM-1
ECE5 BD ED94        JSR     BINACU
ECE8 CE 41D0        LDX     #DLINH-1
ECEB FF 4187        STX     WHCSTG
ECEE CE 001D        LDX     #IHDRM-1
ECF1 BD ED94        JSR     BINACU
[illegible]
[illegible]
ECF7 CE 41D7        LDX     #DLAXM
ECFC FF 4050        STX     SCAN
ECFF 86 10          LDA A   #ANLGSZ    NUMBER OF ANALOG
                                         BYTES
ED01 B7 4053        STA A   USED
ED04 B7 4052        STA A   ANYMO
                    *
ED07 B6 4052 XXAG   LDA A   ANYMO
ED0A 27 1A          BEQ     OUTAAV
ED0C BD E66F        JSR     GTVAL
ED0F 7F 40E5        CLR     CVDTMP
ED12 B7 40E6        STA A   CVDTMP+1   PREPARE TO OUTPUT
                                         THE VALUE
ED15 B6 404E        LDA A   FRAG       SEE IF MUST BE
                                         ALTERED
ED18 84 3F          AND A   ##3F
ED1A 81 18          CMP A   #TMPEND    SEE IF A TEMPERATURE
ED1C 22 03          BHI     NMTAV
ED1E BD F96C        JSR     UNMGLE
ED21 BD EDF3 NMTAV  JSR     ANAACU
ED24 20 E1          BRA     XXAG
                    *
ED26 7A 41B9 OUTAAV DEC     ACCUTM     SEE IF ACCUMULATED
                                         ENOUGH TIME
                                         PERIODS
```

```
ED29 27 07          BEQ    FIXATE
ED2B 39             RTS
                *
ED2C 86 10   COUMAK LDA A  #AVVVNO
ED2E B7 41BA        STA A  ACCCNT
ED31 39             RTS
                *
ED32 7F 41B8 FIXATE CLR    LOGING    NO LONGER LOGGING
ED35 8D F5          BSR    COUMAK
                *
ED37 BD EDFC FIXLAV JSR    SPTTGT    FIX SPOT TO POINT
ED3A EE 00          LDX    0,X       OBTAIN VALUE
ED3C FF 4190        STX    XKDVND
ED3F B6 41EA        LDA A  DLXNO+1    TIME PERIODS
ED42 B7 4194        STA A  XKDVSR
ED45 BD EE15        JSR    DVDRTN
ED48 FE 4183        LDX    WHRLIN    SEE WHERE AVERAGE IS
                                       TO GO
ED4B BD EDFF        JSR    SPTMOV    UPDATE IT
ED4E B6 4192        LDA A  XKQUOT
ED51 A7 00          STA A  0,X
ED53 B6 4193        LDA A  XKQUOT+1   INSTALL AVERAGE
ED56 A7 01          STA A  1,X
ED58 7A 41BA        DEC    ACCCNT
ED5B 26 DA          BNE    FIXLAV    COUNT
                *
ED5D FE 4183        LDX    WHRLIN    UPDATE LINE POTER
ED60 B6 4196        LDA A  ACCSTH
ED63 A7 01          STA A  1,X
ED65 B6 4197        LDA A  ACCSTM
ED68 A7 00          STA A  0,X
                *
ED6A 8D 04          BSR    SPTVDX
ED6C FF 4183        STX    WHRLIN
ED6F 39             RTS
                *
ED70 FF 418E SPTVDX STX    SPOT      SAVE VALUE TO BE
                                       UPDATED
ED73 86 22          LDA A  #AVLLEN
ED75 BB 418F        ADD A  SPOT+1
ED78 24 03          BCC    NSXE1
ED7A 7C 418E        INC    SPOT
ED7D B7 418F NSXE1  STA A  SPOT+1
ED80 86 46          LDA A  #AVGARE/256
ED82 C6 39          LDA B  #AVGARE-AVVAR
ED84 CE 418E        LDX    #SPOT
ED87 BD F75F        JSR    COMP16    SEE IF OUT OF RANGE
ED8A 22 04          BHI    NFXPT
ED8C CE 41F9        LDX    #AVGARA
ED8F 39             RTS
                *
ED90 FE 418E NFXPT  LDX    SPOT
ED93 39             RTS
                *
ED94 86 20   BINACU LDA A  #32       NUMBER OF BITS
ED96 FF 4189        STX    WHCVAL
ED99 B7 41BD        STA A  BITCNT
ED9C 7F 41BB        CLR    WHCBIT
                *
ED9F B6 41BB INVSLP LDA A  WHCBIT
EDA2 FE 4187        LDX    WHCSTG
EDA5 BD E42A        JSR    BITVNC    SEE IF IT IS LIT
EDA8 E4 00          AND B  0,X
```

```
02217 EDAA 26 09                BNE     ACVIT
02218 EDAC 7C 41BB NAZZ         INC     WHCBIT
02219 EDAF 7A 41BD              DEC     BITCNT
02220 EDB2 26 EB                BNE     INVSLF
02221 EDB4 39                   RTS
                   *
02222 EDB5 B6 41BB ACVIT        LDA A   WHCBIT
02223 EDB8 FE 4189              LDX     WHCVAL     SEE IF IT IS ON
02224 EDBB BD E42A              JSR     BITVNC
02225 EDBE E4 00                AND B   0,X
02226 EDC0 26 07                BNE     NAZZX
02227 EDC2 7A 41BA              DEC     ACCCNT
02228 EDC5 26 E5                BNE     NAZZ
02229 EDC7 20 25                BRA     NOMA2
                   *
02230 EDC9 4F      NAZZX        CLR A
02231 EDCA C6 64                LDA B   #100
02232 EDCC 8D 02                BSR     ACCAVL
02233 EDCE 20 DC                BRA     NAZZ
                   *
02234 EDD0 B7 418C ACCAVL       STA A   ACPLHI     SHAVE HIGH HALF OF
                                                     VALUE
02235 EDD3 F7 418D              STA B   ACPLLO
02236 EDD6 8D 24                BSR     SPTTGT     SET SPOT>RIGHT ONE
02237 EDD8 F6 418D              LDA B   ACPLLO
02238 EDDB B6 418C              LDA A   ACPLHI
02239 EDDE EB 01                ADD B   1,X
02240 EDE0 A9 00                ADC A   0,X
02241 EDE2 A7 00                STA A   0,X
02242 EDE4 E7 01                STA B   1,X
02243 EDE6 7A 41BA              DEC     ACCCNT
02244 EDE9 27 01                BEQ     NOMACL     SEE IF FILLED
                                                     ACCUMULATOR
02245 EDEB 39                   RTS
                   *
02246 EDEC 32      NOMACL       PUL A
02247 EDED 32 ---  • •          PUL A
02248 EDEE 32      NOMA2        PUL A
02249 EDEF 32                   PUL A
02250 EDF0 7E ED26              JMP     OUTAAV
                   *
02251 EDF3 B6 40E5 ANAACU       LDA A   CVDTMP
02252 EDF6 F6 40E6              LDA B   CVDTMP+1
02253 EDF9 8D D5                BSR     ACCAVL
02254 EDFB 39                   RTS

                   **                              ******************
                                                   ******************
                                                   ******************
                                                   ************
                   *
                   * POINTER MANIPULATION ROUTINES
                   *
                   **                              ******************
                                                   ******************
                                                   ******************
                                                   ************

02257 EDFC CE 4196 SPTTGT LDX   #ACCVLS-2   START OF BUFFER
02258 EDFF FF 418E SPTMOV STX   SPOT
```

```
EE02 B6 41BA          LDA A  ACCCNT
EE05 48               ASL A
EE06 BB 418F          ADD A  SPOT+1     MOVE TO RIGHT
                                          VAIRABLE
EE09 24 03            BCC    NSS1
EE0B 7C 418E          INC    SPOT
EE0E B7 418F NSS1     STA A  SPOT+1
EE11 FE 418E          LDX    SPOT       >RIGHT VARIABLE IN
                                          AVERAGE LINE
EE14 39               RTS
                *
EE15 C6 08   DVDRTN   LDA B  #8
EE17 7F 4192          CLR    XKQUOT
EE1A 7F 4193          CLR    XKQUOT+1
EE1D 5C      DVDLP0   INC B
EE1E C1 10            CMP B  #16
EE20 2E 3A            BGT    DVDERR
EE22 78 4194          ASL    XKDVSR
EE25 24 F6            BCC    DVDLP0
EE27 F7 4195          STA B  XKDSPL
EE2A 76 4194          ROR    XKDVSR
EE2D B6 4190          LDA A  XKDVND
EE30 B1 4194 DVDLP1   CMP A  XKDVSR
EE33 25 0F            BCS    DVNSUB
EE35 0D      DVDLP2   SEC
EE36 79 4193          ROL    XKQUOT+1
EE39 79 4192          ROL    XKQUOT
EE3C B0 4194          SUB A  XKDVSR
EE3F B7 4190          STA A  XKDVND
EE42 20 07            BRA    DVSHFT
                *
EE44 0C      DVNSUB   CLC
EE45 79 4193          ROL    XKQUOT+1
EE48 79 4192          ROL    XKQUOT
EE4B 5A      DVSHFT   DEC B
EE4C 27 14            BEQ    DVDEND
EE4E 0C               CLC
EE4F 79 4191          ROL    XKDVND+1
EE52 79 4190          ROL    XKDVND
EE55 B6 4190          LDA A  XKDVND
EE58 25 DB            BCS    DVDLP2
EE5A 20 D4            BRA    DVDLP1
                *
EE5C CE FFFF DVDERR   LDX    #$FFFF
EE5F FF 4192          STX    XKQUOT
EE62 F6 4195 DVDEND   LDA B  XKDSPL
EE65 C0 09            SUB B  #9
EE67 C1 04            CMP B  #4
EE69 25 02            BCS    DVDLP3
EE6B C0 04            SUB B  #4
EE6D F7 4195 DVDLP3   STA B  XKDSPL
EE70 39               RTS
                *
EE71 FE 4185 WHX      LDX    WHCHPT     SAVES ONE BYTE FOR
                                          USE
EE74 39               RTS
                *
EE75 FF 40E5 OUTX     STX    CVDTMP
EE78 20 06            BRA    XXCDV
EE7A 7F 40E5 OUTB     CLR    CVDTMP
EE7D F7 40E6          STA B  CVDTMP+1
EE80 FE 4066 XXCDV    LDX    TXTOUT
EE83 BD F6F4          JSR    CVD3
```

```
02314 EE86 BD F69F         JSR    SPCOUT
02315 EE89 39              RTS

                    **
                                               ******************
                                               ******************
                                               ******************
                                               ************
                    *
                    * PRINT HISTORY FILE, IGNORING BLANKS
                    *
                    **
                                               ******************
                                               ******************
                                               ******************
                                               ************

02318 EE8A 7D 00B7 CMDPH   TST    CANECO
02319 EE8D 27 3F           BEQ    NOOHIS    SKIP IF CANNOT ECHO

02321 EE8F CE 406C         LDX    #TXTBFR
02322 EE92 FF 4066         STX    TXTOUT
02323 EE95 FE 4183         LDX    WHRLIN    PRINT OLDEST LINE
                                              FIRST
02324 EE98 86 20           LDA A  #32
02325 EE9A B7 41BC         STA A  GDBLOW
02326 EE9D FF 4185 LOGLLL  STX    WHCHFT
02327 EEA0 EE 00           LDX    0,X       SEE IF USED
02328 EEA2 27 20           BEQ    DDLBG
02329 EEA4 8D CB           BSR    WHX
02330 EEA6 E6 00           LDA B  0,X
02331 EEA8 8D D0           BSR    OUTB
02332 EEAA 8D C5           BSR    WHX
02333 EEAC E6 01           LDA B  1,X
02334 EEAE 8D CA           BSR    OUTB
02335 EEB0 BD ED2C         JSR    COUMAK    INITIALIZE COUNTER
                    *
02336 EEB3 8D BC   XXAVLP  BSR    WHX
02337 EEB5 BD EDFF         JSR    SPTMOV
02338 EEB8 EE 00           LDX    0,X
02339 EEBA 8D B9           BSR    OUTX
02340 EEBC 7A 41BA         DEC    ACCCNT
02341 EEBF 26 F2           BNE    XXAVLP
02342 EEC1 BD FDD5         JSR    BUTCLF    PUT OUT THE LINE OF
                                              AVERAGE DATA
                    *
02343 EEC4 8D AB   DDLBG   BSR    WHX
02344 EEC6 BD ED70         JSR    SPTVDX
02345 EEC9 7A 41BC         DEC    GDBLOW
02346 EECC 26 CF           BNE    LOGLLL
02347 EECE 7E FDA5 NOOHIS  JMP    EXIT

                    **
                                               ******************
                                               ******************
                                               ******************
                                               ************
                    *
                    * PI.  PRINT STATES OF SPECIFIED INPUT(S)
                    *
                    **
                                               ******************
                                               ******************
```

```
                                             *******************
                                             ************

EED1 CE 001E CMDPI   LDX    #IHDRM
EED4 FF 40D0         STX    ST1PTR
EED7 CE 0002         LDX    #IHVAL
EEDA 7E EC7D         JMP    GENPBT
                     *************************************
                     *
                     * PL.  PRINT TEXT OF SPECIFIED DRUM LINE.
                                               IF OPEN, PRINTS
                     * CONTENTS OF LINE EDIT BUFFER.
                     *
                     **
                                             *******************
                                             *******************
                                             *******************
                                             ************

     EEDD    CMDPL   EQU    *
EEDD 7F 40F9         CLR    PLEMG     CLEAR EMERGENCY
                                         INDICATOR
EEE0 7D 406B         TST    SKPEND    SEE IF ARGUMENT
EEE3 26 2B           BNE    PLEDBF    NO--GET LINE FROM
                                         EDIT BUFFER
EEE5 BD F7DA         JSR    XTRACT    GET ARGUMENT
EEE8 BD FD59         JSR    RANGLN    SEE IF VALID LINE
                                         NUMBER
EEEB FE 40DA         LDX    XTRVAL    SAVE LINE NUMBER
EEEE FF 40C7         STX    LNSVAL    SAVE LINE NUMBER FOR
                                         FIND
EEF1 FF 40FD         STX    PLVAL
EEF4 F6 40DC         LDA B  XTRDGT    SAVE FIRST DIGIT OF
                                         LINE NUMBER
EEF7 C1 39           CMP B  #$39      SEE IF EMERGENCY LINE
EEF9 27 05           BEQ    PLFEMG    YES--GO FIND
                                         EMERGENCY
EEFB BD F863         JSR    FIND      GO FIND LINE
EEFE 20 06           BRA    PLCKFN    SEE IF FOUND
     EF00    PLFEMG  EQU    *
EF00 BD F8AB         JSR    FINEMG    GO FIND EMERGENCY
                                         LINE
EF03 73 40F9         COM    PLEMG     SAY PRINTING
                                         EMERGENCY LINE
     EF06    PLCKFN  EQU    *
EF06 FE 40C9         LDX    LNSNDX    SEE IF LINE ADDRESS
                                         RETURNED
EF09 26 19           BNE    PLLNFD
EF0B 86 06   PLYELL  LDA A  #ERNOLN   SAY LINE NUMBER NOT
                                         FOUND
EF0D 7E FD8C         JMP    YELL
     EF10    PLEDBF  EQU    *
EF10 7D 4116         TST    EDTING
EF13 27 F6           BEQ    PLYELL    IF NOT EDITING, NO
                                         GOOD
EF15 FE 411C         LDX    EDTLNO    GET CURRENT LINE
                                         NUMBER
EF18 FF 40FD         STX    PLVAL
EF1B B6 4115         LDA A  EDTEMG    SET EMERGENCY FLAG
                                         FROM EDIT
EF1E B7 40F9         STA A  PLEMG
EF21 CE 411E         LDX    #EDTLIN   POINT AT EDIT LINE
                                         BUFFER
```

```
02386      EF24    PLLNFD EQU    *
02387 EF24 BD EF2A        JSR    PTDRLN    GO PRINT DRUM LINE
02388 EF27 7E FDA5        JMP    EXIT      GO AWAY

02390      EF2A    PTDRLN EQU    *
02391 EF2A 32             PUL A            SAVE RETURN POINTER
                                             FOR POSTERIT.
02392 EF2B B7 4101        STA A  PLRTNP
02393 EF2E 32             PUL A
02394 EF2F B7 4102        STA A  PLRTNP+1
02395 EF32 FF 40FF        STX    PLNDX     SAVE POINTER TO LINE
02396 EF35 09             DEX
02397 EF36 09             DEX
02398 EF37 09             DEX
02399 EF38 A6 00          LDA A  0,X       GET FLAG BYTE FROM
                                             LINE
02400 EF3A B7 40FA        STA A  PLFGB     SAVE
02401 EF3D CE 4F50        LDX    #'0*256+'P   'OP'
02402 EF40 BD F699        JSR    TWOOUT    PUT IN BUFFER AND SET
                                             POTER
02403 EF43 FE 40FD        LDX    PLVAL     CONVERT LINE NUMBER
                                             TO ASCII
02404 EF46 FF 40E5        STX    CVDTMP
02405 EF49 7F 40F5        CLR    PLBLCT    SET OPEN OFFSET TO
                                             ZERO
02406 EF4C BD F005        JSR    PLDMPT    GO PRINT DRIVER AND
                                             MEMORY DATA
                   * LDX TXTOUT
                   * JSR SPCOUT
                   * JSR BUTCLF
02407 EF4F 7D 40F9        TST    PLEMG     SEE IF EDITING
                                             EMERGENCY
02408 EF52 26 24          BNE    PLPEMG    YES--GO DO SPECIAL
                                             END
02409 EF54 FE 40FF        LDX    PLNDX
02410 EF57 EE 28          LDX    EDTAX1-EDTST1,X   PICK UP
                                                     VALUE
                                                     FROM X1
02411 EF59 B6 40FA        LDA A  PLFGB     GET FLAG BYTE
02412 EF5C C6 31          LDA B  #'1
02413 EF5E 85 80          BIT A  #$80      SEE IF RESOLVED
                                             ADDRESS
02414 EF60 BD EFE1        JSR    PLDMIA
02415 EF63 FE 40FF        LDX    PLNDX
02416 EF66 08             INX              POINT AT NEXT EXIT
                                             FIELD
02417 EF67 08             INX
02418 EF68 FF 40FF        STX    PLNDX
02419 EF6B EE 28          LDX    EDTAX2-EDTST2,X   GET VALUE
                                                     FROM X2
02420 EF6D B6 40FA        LDA A  PLFGB     GET FLAG BYTE
02421 EF70 C6 32          LDA B  #'2
02422 EF72 85 40          BIT A  #$40      SEE IF RESOLVED
                                             ADDRESS
02423 EF74 8D 6B          BSR    PLDMIA
02424 EF76 20 4E          BRA    PLXIT2
02425      EF78    PLPEMG EQU    *
02426 EF78 BD F02E        JSR    PLIATP
02427 EF7B BD F15D        JSR    TAB5      SET XE OFFSET TO 5
02428 EF7E C6 45          LDA B  #'E
02429 EF80 BD EFD3        JSR    PLSTCX    GO STORE 'XE' IN
                                             OUTPUT BUFFER
02430 EF83 86 08          LDA A  #13       PRINT EMERGENCY [illegible]
```

```
02431 EF85 B7 40F8          STA A  FLCNT
02432 EF88 FE 40FF          LDX    FLNDX     POINT AT EMERGENCY
                                                EXITS
02433 EF8B 4F               CLR A
02434 EF8C 43               COM A
02435 EF8D B7 40FC          STA A  PSUFFG    SET SUPPRESS FLAG
02436      EF90      FLNXEX EQU    *
02437 EF90 EE 00            LDX    0,X       GET EXIT ADDRESS
02438 EF92 27 20            BEQ    FLCTEX    IF ZERO, SKIP TO NEXT
02439 EF94 78 40FA          ASL    FLFGB     SEE IF RESOLVED
02440 EF97 24 04            BCC    FLEXRS    NOT RESOLVED--GOT
                                                LINE NUMBER
02441 EF99 09               DEX
02442 EF9A 09               DEX
02443 EF9B EE 00            LDX    0,X       GET LINE NUMBER OF
                                                RESOLVED
02444      EF9D      FLEXRS EQU    *
02445 EF9D FF 40E5          STX    CVDTMP    SAVE LINE NUMBER FOR
                                                CONVERSION
02446 EFA0 FE 4066          LDX    TXTOUT
02447 EFA3 7D 40FC          TST    PSUFFG
02448 EFA6 26 03            BNE    FLEXNC
02449 EFA8 BD F6A7          JSR    CMAOUT
02450      EFAB      FLEXNC EQU    *
02451 EFAB 7F 40FC          CLR    PSUFFG
02452 EFAE BD F6F8          JSR    CVD4
02453 EFB1 FF 4066          STX    TXTOUT
02454 EFB4 7A 40F8   FLCTEX DEC    FLCNT     COUNT NUMBER OF
                                                ADDRESSES
02455 EFB7 27 0A            BEQ    FLEXIT
02456 EFB9 FE 40FF          LDX    FLNDX     GET POINTER BACK
02457 EFBC 08               INX
02458 EFBD 08               INX
02459 EFBE FF 40FF          STX    FLNDX
02460 EFC1 20 CD            BRA    FLNXEX    CHECK NEXT ADDRESS
02461      EFC3      FLEXIT EQU    *
02462 EFC3 BD FDD5          JSR    BUTCLF
02463      EFC6      FLXIT2 EQU    *
                     * LDX TXTOUT
                     * JSR SPCOUT
                     * JSR BUTCLF
02464 EFC6 FE 4101          LDX    FLRTNP    SET UP RETURN
02465 EFC9 6E 00            JMP    0,X

02467      EFCB      FLSTCF EQU    *
02468 EFCB 86 46            LDA A  #'F
02469 EFCD 20 06            BRA    FLSTCM
02470      EFCF      FLSTCO EQU    *
02471 EFCF 86 4F            LDA A  #'O
02472 EFD1 20 02            BRA    FLSTCM
02473      EFD3      FLSTCX EQU    *
02474 EFD3 86 58            LDA A  #'X
02475      EFD5      FLSTCM EQU    *
02476 EFD5 FE 4066          LDX    TXTOUT
02477 EFD8 A7 00            STA A  0,X
02478 EFDA 08               INX
02479 EFDB E7 00            STA B  0,X
02480 EFDD 08               INX
02481 EFDE 7E F69F          JMP    SPCOUT    GO INSERT SPACE

02483      EFE1      FLDMIA EQU    *
02484 EFE1 27 04            BEQ    FLLNRS    NOT RESOLVED--LINE
                                                NUMBER SET
02485 EFE3 09               DEX
```

```
EFE4 09                    DEX
EFE5 EE 00                 LDX     0,X       PICK UP LINE NUMBER
                                                FOR X1 OR X2
     EFE7        FLLNRS    EQU     *
EFE7 FF 40E5               STX     CVDTMP    SAVE LINE NUMBER
EFEA BD EFD3               JSR     FLSTCX    GO STORE 'X1' OR 'X2'
                                                IN OUTPUT BUFFER
EFED 32                    PUL A             SAVE RETURN POINTER
EFEE B7 4103               STA A   FLRTP1
EFF1 32                    PUL A
EFF2 B7 4104               STA A   FLRTP1+1
EFF5 86 05                 LDA A   #5        SET X1 AND X2 OFFSETS
                                                TO 5
EFF7 B7 40F5               STA A   FLBLCT
EFFA BD F005               JSR     FLDMPT    GO PRINT X1 OR X2
                                                DRIVER AND MEMORY
                                                DATA
EFFD BD F02E               JSR     FLIATP    GO PRINT INPUT AND
                                                ANALOG DATA
F000 FE 4103               LDX     FLRTP1    RECOVER RETURN
                                                POINTER
F003 6E 00                 JMP     0,X

     F005        FLDMPT    EQU     *
                 * PRINTS AN INITIAL LINE CONTAINING A LINE
                                                NUMBER, EITHER
                 * 'OP', 'X1', OR 'X2'.  CALLS FLBITS TO
                                                PRINT ON AND OFF
                 * FOR DRIVER AND MEMORY BITS
F005 32                    PUL A             SAVE RETURN POINTER
                                                FOR POSTERITY
F006 B7 4105               STA A   FLRTP2
F009 32                    PUL A
F00A B7 4106               STA A   FLRTP2+1
F00D FE 4066               LDX     TXTOUT
F010 BD F6F8               JSR     CVD4
F013 FF 4066               STX     TXTOUT    SAVE OUTPUT POINTER
F016 B6 40F5               LDA A   FLBLCT    PICK UP OFFSET
F019 B7 40F4               STA A   FIRBLK    SAVE FOR TTY ROUTINE
F01C BD FDD5               JSR     BUTCLF    WRITE LINE
F01F C6 44                 LDA B   #'D       GO STORE 'DD' IN
                                                OUTPUT BUFFER
F021 BD F16A               JSR     FLBITS
F024 C6 42                 LDA B   #'B
F026 BD F16A               JSR     FLBITS
F029 FE 4105     PL2XIT    LDX     FLRTP2    RECOVER LONG-LOST
                                                RETURN POINTER
F02C 6E 00                 JMP     0,X

     F02E        FLIATP    EQU     *
F02E 32                    PUL A             SAVE RETURN POINTER
                                                FOR POSTERITY
F02F B7 4105               STA A   FLRTP2
F032 32                    PUL A
F033 B7 4106               STA A   FLRTP2+1
F036 C6 49                 LDA B   #'I
F038 BD F16A               JSR     FLBITS
F03B 86 10                 LDA A   #$10      PREPARE TO COUNT
F03D B7 40F0               STA A   FLCNT
F040 86 41                 LDA A   #'A
F042 C6 58                 LDA B   #'X
```

```
F044 BD EFD5  • • •  JSR    FLSTCM     GO STORE 'AX' IN
                                         OUTPUT BUFFER
F047 7F 40EA         CLR    LKPVAL     RESET VALUE
F04A FE 40FF         LDX    FLNDX
F04D 4F              CLR A             RESET PRINT SUPPRESS
                                         FLAG
F04E 43              COM A
F04F B7 40FC         STA A  PSUPFG
F052 7F 40F6         CLR    WZNEG      INDICATE NOT MINUS
                                         SIGN
     F055     PLATVL EQU    *
F055 A6 00           LDA A  0,X
F057 26 03           BNE    PLAVL2     IF ZERO, NO MORE
F059 7E F129         JMP    FLIATX
     F05C     PLAVL2 EQU    *
F05C 84 3F           AND A  #$3F
F05E CE FE32         LDX    #LKPTBL     POINT AT LOOKUP
                                         TABLE
F061 FF 40EB         STX    LKPNDX     SAVE IT
F064 B7 40EA         STA A  LKPVAL     SAVE VALUE FOR LATER
F067 FE 4066         LDX    TXTOUT     POINT AT OUTPUT
                                         BUFFER
F06A 7D 40FC         TST    PSUPFG     SEE IF FIRST TIME
F06D 26 08           BNE    FLANCM     YES--NO COMMA
F06F 7D 40F6         TST    WZNEG      SEE IF PRECEDING
                                         MINUE
F072 26 03           BNE    FLANCM     IF SO, NO COMMA
F074 BD F6A7         JSR    CMAOUT     PUT COMMA IN BUFFER
     F077     PLANCM EQU    *
F077 7F 40FC         CLR    PSUPFG     RESET SUPPRESS FLAG
F07A F6 40EA         LDA B  LKPVAL     GET VALUE BACK
F07D C1 20           CMP B  #NANIN     SEE IF SYMBOLIC VALUE
F07F 23 07           BLS    FLANBR     NO--CONVERT TO NUMBER
F081 C0 21           SUB B  #NANIN+1    CONVERT TO OFFSET
F083 BD F13F         JSR    FLLKUP     GO LOOK UP SYMBOL
F086 20 0C           BRA    FLCKRL     GO DO RELATIONAL
     F088     PLANBR EQU    *
F088 F7 40E6         STA B  CVDTMP+1    CONVERT FIRST VALUE
                                         TO ASCII
F08B 7F 40E5         CLR    CVDTMP
F08E FE 4066         LDX    TXTOUT
F091 BD F6EC         JSR    CVD1
F094 FF 4066  PLCKRL STX    TXTOUT
F097 FE 40FF         LDX    FLNDX
F09A A6 00           LDA A  0,X        GET VALUE AND
                                         RELATIONAL AGAIN
F09C FE 4066         LDX    TXTOUT     POINT AT TEXT BUFFER
F09F 81 C0           CMP A  #$C0
F0A1 25 08           BCS    FLATNM     NOT MINUS--LOOK FOR
                                         VALUE
F0A3 B7 40F6         STA A  WZNEG      INDICATE MINUS
F0A6 BD F6A3         JSR    DSHOUT     OUTPUT MINUS SIGN
F0A9 20 6C           BRA    FLANXT
     F0AB     PLATNM EQU    *
F0AB 81 80           CMP A  #$80       SEE IF EQUALS
F0AD 25 04           BCS    FLATNE     NOT EQUALS--LOOK FOR
                                         LESS T@AN
F0AF 86 3D           LDA A  #'=
F0B1 20 0D           BRA    FLRLOT     GO OUTPUT RELATIONAL
F0B3 16       FLATNE TAB
F0B4 C4 3F           AND B  #$3F       ISOLATE VALUE
```

```
                        *, CMPB #TMPEND
                        * BHI PLATLT
                        * EORA #$40
F0B6 81 40     PLATLT   CMP A  #$40        SEE IF LESS THAN
F0B8 25 04              BCS    PLATGT      MUST BE GREATER THAN
F0BA 86 3C              LDA A  #'<
F0BC 20 02              BRA    PLRLOT
     F0BE      PLATGT   EQU    *
F0BE 86 3E              LDA A  #'>
     F0C0      PLRLOT   EQU    *
F0C0 BD F6A9            JSR    ANYOUT      OUTPUT RELATIONAL
                                             (EXCEPT MINUS)
F0C3 7A 40F8            DEC    PLCNT       REDUCE COUNT
F0C6 FE 40FF            LDX    PLNDX       POINT AT NEXT BYTE
F0C9 08                 INX                POINT AT VALUE
F0CA FF 40FF            STX    PLNDX
F0CD E6 00              LDA B  0,X
F0CF B6 40EA            LDA A  LKPVAL      GET VALUE FOR PRIOR
                                             SYMBOLIC
F0D2 81 20              CMP A  #NANIN
F0D4 23 23              BLS    PLANB2      NOT SYMBOLIC--DO
                                             NUMERIC CONVERSION
F0D6 81 22              CMP A  #NANIN+2     SEE IF DAY OF WEEK
F0D8 27 0D              BEQ    PLWKTB      YES
F0DA 81 24              CMP A  #NANIN+4     SEE IF MONTH OF
                                               YEAR
F0DC 26 1B              BNE    PLANB2      NO--DO NUMERIC
                                             CONVERSION
F0DE C1 0B              CMP B  #11         SEE IF VALID MONTH
                                             NUMBER
F0E0 22 17              BHI    PLANB2      IF NOT, DO AS NUMERIC
F0E2 CE FE72            LDX    #MONTBL      POINT AT MONTH TABLE
F0E5 20 07              BRA    PLSTLK      GO DO LOOKUP
     F0E7      PLWKTB   EQU    *
F0E7 C1 06              CMP B  #6          SEE IF VALID DAY
                                             NUMBER
F0E9 22 0E              BHI    PLANB2      IF NOT, DO AS NUMERIC
F0EB CE FE56            LDX    #WKTBL      POINT AT DAY OF WEEK
                                             TABLE
     F0EE      PLSTLK   EQU    *
F0EE FF 40EB            STX    LKPNDX
F0F1 FE 4066            LDX    TXTOUT
F0F4 BD F13F            JSR    PLLKUP
F0F7 20 1B              BRA    PLANRS      GO DO NEXT SET
F0F9 F7 40E6   PLANB2   STA B  CVDTMP+1     CONVERT VALUE TO
                                               ASCII
F0FC 7F 40E5            CLR    CVDTMP
F0FF 81 18              CMP A  #TMPEND
F101 22 08              BHI    PLNTMP
F103 7D 40F6            TST    WZNEG       SEE IF MINUS SIGN
F106 26 03              BNE    PLNTMP
F108 BD F96C            JSR    UNMGLE
F10B 7F 40F6   PLNTMP   CLR    WZNEG       MINUS GOOD ONCE ONLY
F10E FE 4066            LDX    TXTOUT
F111 BD F6EC            JSR    CVD1
F114 7F 40EA   PLANRS   CLR    LKPVAL      RESET
                                             RELATIONAL MODE
F117 FF 4066   PLANXT   STX    TXTOUT
F11A 7A 40F8            DEC    PLCNT
F11D 27 0A              BEQ    PLIATX      IF AT END, LEAVE
F11F FE 40FF            LDX    PLNDX       POINT AT NEXT BYTE
```

```
02630 F122 08               INX              POINT AT NEXT
                                                EXPRESSION
02631 F123 FF 40FF          STX    PLNDX
02632 F126 7E F055          JMP    PLATVL    GO DO IT
02633      F129      PLIATX EQU    *
02634 F129 FE 40FF          LDX    PLNDX     POINT BEYOND ANALOG
                                                DATA
02635      F12C      PLIASX EQU    *
02636 F12C 08               INX              UPDATE INDEX
02637 F12D 7A 40F8          DEC    PLCNT     SEE IF AT END
02638 F130 27 02            BEQ    PLIAND
02639 F132 2A F8            BPL    PLIASX
02640 F134 FF 40FF   PLIAND STX    PLNDX
02641 F137 8D 28            BSR    ADD3B     OFFSET LINE FURTHER
02642 F139 BD FDD5          JSR    BUTCLF    WRITE LINE
                     * LDX TXTOUT
                     * JSR SPCOUT
                     * JSR BUTCLF
02643 F13C 7E F029          JMP    PL2XIT    RECOVER RETURN
                                                POINTER AND SPLIT

02645      F13F      PLLKUP EQU    *
02646 F13F 4F               CLR A            SET UP FOR
                                                CALCULATION
02647 F140 58               ASL B
02648 F141 49               ROL A
02649 F142 58               ASL B
02650 F143 49               ROL A
02651 F144 FB 40EC          ADD B  LKPNDX+1
02652 F147 B9 40EB          ADC A  LKPNDX
02653 F14A B7 40D0          STA A  ST1PTR    GET READY FOR MOVE TO
                                                PRINT BUFFER
02654 F14D F7 40D1          STA B  ST1PTR+1
02655 F150 FF 40D2          STX    ST2PTR
02656 F153 86 02            LDA A  #$2       MOVE FOUR CHARACTERS
02657 F155 BD F9A2          JSR    MVCP
02658 F158 FE 40D2          LDX    ST2PTR    GET END POINTER FROM
                                                MOVE
02659 F15B 09               DEX              BACK UP TO KILL EXTRA
                                                CHARACTER
02660 F15C 39               RTS

02662 F15D 86 05     TABS   LDA A  #5        PICK UP OFFSET OF 5
02663 F15F 20 05            BRA    STPBL
02664 F161 86 05     ADD3B  LDA A  #5        PICK UP OFFSET OF 5
02665 F163 BB 40F5          ADD A  PLBLCT    ADD TO PREVIOUS
                                                OFFSET
02666 F166 B7 40F4   STPBL  STA A  PIRBLK    SAVE
02667 F169 39               RTS

                     ****************************
                                                 *******************
                                                 *******************
                                                 *********
                     *
                     * PRINTS 'ON' AND 'OFF' SETTINGS FOR ONE SET
                                                OF BITS.
                     * ADVANCES PLNDX AND INDEX REGISTER PAST
                                                CURRENT BITS AFTER
                     * PROCESSING
                     *
```

```
                                          *************************************
                                          ************
      F16A   PLBITS EQU     *
F16A F7 40FB        STA B  PLCHAR    SAVE LINE LABELING
                                        CHARACTER
F16D 32             PUL A            SAVE RETURN POINTER
                                        FOR POSTERITY
F16E B7 4107        STA A  PLRTP3
F171 32             PUL A
F172 B7 4108        STA A  PLRTP3+1
F175 F6 40FB        LDA B  PLCHAR    GO STORE 'ON' COMMAND
                                        IN OUTPUT BUFFER
F178 BD EFCF        JSR    PLSTCO
F17B FE 40FF        LDX    PLNDX
F17E BD F5CA        JSR    BONCT2    GO OUTPUT BIT
                                        SETTINGS
F181 8D DE          BSR    ADD3B
F183 BD FDD5        JSR    BUTCLF    WRITE LINE
F186 F6 40FB        LDA B  PLCHAR    GO STORE 'OFF'
                                        COMMAND IN OUTPUT
                                        BUFFER
F189 BD EFCB        JSR    PLSTCF
F18C FE 40FF        LDX    PLNDX
F18F BD F5AF        JSR    BOFCT2    GO OUTPUT BIT
                                        SETTINGS
F192 8D CD          BSR    ADD3B
F194 BD FDD5        JSR    BUTCLF    WRITE LINE
F197 FE 40FF        LDX    PLNDX
F19A BD E5F9        JSR    ADD8      POINT PAST THESE BITS
F19D FF 40FF        STX    PLNDX
F1A0 FE 4107        LDX    PLRTP3    RECOVER LONG-LOST
                                        RETURN POINTER
F1A3 6E 00          JMP    0,X

                    *******************************************************
                    ******
                    *
                    * PM PRINT ENTIRE DRUM LINE
                    *
                    **
                                          ****************************************************
                                          *****************
      F1A5   CMDPM  EQU     *
F1A5 7D 4116        TST    EDITING
F1A8 26 64          BNE    PUYELL    SAY CAN'T BE IN EDIT
F1AA 7D 406B        TST    SKPEND    SEE IF ARGUMENT
F1AD 26 37          BNE    PMYELL
F1AF BD F7DA        JSR    XTRACT    GET DRUM NUMBER
F1B2 7D 40DA        TST    XTRVAL
F1B5 26 2F          BNE    PMYELL    SAY BAD DRUM NUMBER
F1B7 B6 40DB        LDA A  XTRVAL+1
F1BA 27 2A          BEQ    PMYELL
F1BC 7F 40F9        CLR    PLEMG     SET TO GO NORMAL
```

```
                                                LINES
F1BF 81 09                 CMP A   #9
F1C1 22 23                 BHI     PMYELL
F1C3 25 03                 BCS     PMNEMG
F1C5 73 40F9               COM     PLEMG      SET TO PRINT ALL
                                                EMERGENCIES
           F1C8   PMNEMG   EQU     *
F1C8 B7 40F7               STA A   DRMVAL     SAVE DRUM LINE NUMBER
F1CB BD F657               JSR     CALDLN     CALCULATE BEGINNING
                                                LINE NUMBER
F1CE C0 01                 SUB B   #1         DROP ONE BELOW FIRST
                                                NO OF LINE
F1D0 82 00                 SBC A   #0
F1D2 B7 4055               STA A   PULPUN     SET LAST PUNCHED
                                                IMMEDIATELY BELOW
F1D5 F7 4056               STA B   PULPUN+1     REQUIRED LINE
F1D8 7C 40F7               INC     DRMVAL     SPECIFY NUMBER TO ADD
F1DB BD F659               JSR     ADDDLN     CALCULATE LAST LINE
                                                TO PUNCH
F1DE B7 4059               STA A   PMMXLN     SAVE MAX POINTER
F1E1 F7 405A               STA B   PMMXLN+1
F1E4 20 3E                 BRA     PUSRCH     GO PRETEND NORMAL
                                                PUNCH

           F1E6   PMYELL   EQU     *
F1E6 86 18                 LDA A   #ERRTND
F1E8 7E FD8C               JMP     YELL
                  ******************************
                                                ******************
                                                ***************
                  *
                  * PP.  PRINT POINTER.  TELLS WHICH LINE ON
                  *
                  **
                                                ******************
                                                ******************
                                                ******************
                                                ************

F1EB BD F7DA CMDPP         JSR     XTRACT     FIND OUT WHICH DRUM
                                                IS INTERESTING
F1EE BD FB9A               JSR     SELDRM     IDX >> DRUM LINE
F1F1 EE 00                 LDX     0,X        >DRUM LINE ITSELF
                                                FROM LINE TABLE
F1F3 27 11                 BEQ     FLAD       SKIP IT IF THE DRUM
                                                IS NOWHERE
F1F5 09                    DEX
F1F6 09                    DEX                >HIGH BYTE OF ITS
                                                LINE NUMBER
F1F7 A6 00                 LDA A   0,X        GET HI BYTE OF LINE
                                                NUMBER AND FLAGS
F1F9 84 3F                 AND A   #$3F
F1FB B7 40E5               STA A   CVDTMP     PUT IN BINARY TO
                                                DECIMAL VALUE
F1FE A6 01                 LDA A   1,X
F200 B7 40E6               STA A   CVDTMP+1
F203 BD EC6A               JSR     NPUM1      OUTPUT IT
F206 7E FDB3 FLAD          JMP     BUTRDY     PRINT MESSAGE AND
                                                READY

                  ******************************
```

```
                                  ******************
                                  ************
*
* PT.  PRINTS VALUE OF SPECIFIED TIMER(S)
*
**
                                  ******************
                                  ******************
                                  ******************
                                  ************

*CMDPT JMP NCMD

****************
                                  ******************
                                  ******************
                                  ****************
*
* PU.  PUNCH THE ENTIRE DRUM LINE PROGRAM.
*
**
                                  ******************
                                  ******************
                                  ******************
                                  ************

     F209    CMDPU  EQU    *
F209 7D 4116        TST    EDTING    SEE IF EDITING
F20C 27 05          BEQ    PUCNTU    NO--OK
F20E 86 17   PUYELL LDA A  #ERPUED   SAY CAN'T BE IN EDIT
F210 7E FD8C        JMP    YELL      SAY CAN'T BE IN EDIT
F213 7F 4055 PUCNTU CLR    PULPUN    CLEAR LAST PUNCHED
                                       NUMBER
F216 7F 4056        CLR    PULPUN+1
F219 7F 40F9        CLR    PLEMG     SET TO PRINT REGULAR
                                       LINES
F21C 4F             CLR A
F21D 43             COM A
F21E B7 4059        STA A  PMMXLN
F221 B7 405A        STA A  PMMXLN+1
F224 4F      PUSRCH CLR A            SET NEXT PUNCHED TO
                                       MAX
F225 43             COM A
F226 B7 4057        STA A  PUNPUN
F229 B7 4058        STA A  PUNPUN+1
F22C FE 4111        LDX    FIRLIN    POINT AT FIRST DRUM
                                       LINE
F22F 7D 40F9        TST    PLEMG     SEE IF DOING
                                       EMERGENCIES
F232 27 03          BEQ    PUSRDY
F234 FE 410D        LDX    EMGFIR    POINT AT FIRST
                                       EMERGENCY LINE
     F237    PUSRDY EQU    *
F237 FF 405B        STX    PUNDX     SET INDEX TO PROPER
                                       POINT
     F23A    PUCKLN EQU    *
F23A FE 405B        LDX    PUNDX     POINT AT NEXT LINE
F23D 09             DEX
F23E 09             DEX
F23F A6 00          LDA A  0,X       GET LINE NUMBER
```

```
F241 27 1E          BEQ    PUCNXT    SKIP EMPTY SLOTS
F243 E6 01          LDA B  1,X
F245 CE 4055        LDX    #PULPUN
F248 BD F75F        JSR    COMP16    COMPARE TO LAST LINE
                                       PUNCHED
F24B 23 14          BLS    PUCNXT    LESS--LOOK AT NEXT
F24D CE 4057        LDX    #PUNPUN
F250 BD F75F        JSR    COMP16    COMPARE TO CURRENT
                                       BEST NEXT
F253 24 0C          BCC    PUCNXT    GREATER--THERE IS
                                       BETTER TO BE HAD
F255 B7 4057        STA A  PUNPUN    SAVE NEW BEST
F258 F7 4058        STA B  PUNPUN+1
F25B FE 405B        LDX    PUNDX
F25E FF 40FF        STX    PLNDX
F261 B6 405B PUCNXT LDA A  PUNDX     GET LINE POINTER
F264 F6 405C        LDA B  PUNDX+1
F267 CE 4113        LDX    #LSTLIN    SEE IF LAST LINE
                                       PROCESSED
F26A 7D 40F9        TST    PLEMG     SEE IF DOING
                                       EMERGENCIES
F26D 27 03          BEQ    PLCKND
F26F CE 410F        LDX    #EMGLST
     F272    PLCKND EQU    *
F272 BD F75F        JSR    COMP16
F275 24 15          BCC    PUPNCH    YES--GO PUNCH CURRENT
                                       LINE
F277 7D 40F9        TST    PLEMG     SEE IF DOING
                                       EMERGENCIES
F27A 27 04          BEQ    PLADLN
F27C CB 3B          ADD B  #EMGLGT    POINT AT NEXT LINE
F27E 20 02          BRA    PLADDA
     F280    PLADLN EQU    *
F280 CB 67          ADD B  #LINLGT
     F282    PLADDA EQU    *
F282 89 00          ADC A  #$0
F284 B7 405B        STA A  PUNDX
F287 F7 405C        STA B  PUNDX+1
F28A 20 AE          BRA    PUCKLN
     F28C    PUPNCH EQU    *
F28C B6 4057        LDA A  PUNPUN    SEE IF AT END
F28F F6 4058        LDA B  PUNPUN+1
F292 CE 4059        LDX    #PMMXLN
F295 BD F75F        JSR    COMP16    SEE IF EXCEEDED DRUM
                                       MAX
F298 22 08          BHI    PUCLOS
F29A 43             COM A
F29B 26 18          BNE    PUNCH
F29D 7D 40F9        TST    PLEMG     SEE IF AT END OF
                                       EMERGENCIES
F2A0 27 0D          BEQ    PUSTEM    SET EMERGENCY
                                       INDICATOR AND GO
F2A2 86 43   PUCLOS LDA A  #'C       DO FINAL CLOSE
F2A4 C6 4C          LDA B  #'L
F2A6 BD EFD5        JSR    PLSTCM
F2A9 7F 40F4        CLR    FIRBLK    SAY NO BLANKS BEFORE
                                       LINE
F2AC 7E FDB3        JMP    BUTRDY

F2AF 73 40F9 PUSTEM COM    PLEMG     SET EMERGENCY
                                       INDICATOR
```

```
F2B2 7E F224  ..      JMP    PUSRCH
      F2B5   PUNCH   EQU    *
F2B5 FE 4057          LDX    PUNPUN
F2B8 FF 4055          STX    PULPUN
F2BB FF 40FD          STX    PLVAL
F2BE FE 40FF          LDX    PLNDX     GET POINTER TO LINE
F2C1 BD EF2A          JSR    PTDRLN
F2C4 7E F224          JMP    PUSRCH

                     ****************************************
                                              ******************
                                              ******************
                                              *
                     *
                     * PX.  PRINT LIST OF DISABLED THINGS
                     *
                     **
                                              ******************
                                              ******************
                                              ******************
                                              ***********

F2C7 CE 4441 CMDPX   LDX    #'D*256+'A
F2CA BD F699         JSR    TWOOUT
F2CD CE 001A         LDX    #AHMSK
F2D0 BD F59D         JSR    BOFCT1
F2D3 BD FDD5         JSR    BUTCLF

F2D6 CE 4442         LDX    #'D*256+'B
F2D9 BD F699         JSR    TWOOUT
F2DC CE 0016         LDX    #MYMSK
F2DF BD F59D         JSR    BOFCT1
F2E2 BD FDD5         JSR    BUTCLF

F2E5 CE 4444         LDX    #'D*256+'D
F2E8 BD F699         JSR    TWOOUT
F2EB CE 0012         LDX    #JHMSK
F2EE BD F59D         JSR    BOFCT1
F2F1 BD FDD5         JSR    BUTCLF

F2F4 CE 4449         LDX    #'D*256+'I
F2F7 BD F699         JSR    TWOOUT
F2FA CE 000E         LDX    #IHMSK
F2FD BD F59D         JSR    BOFCT1
F300 BD FDD5         JSR    BUTCLF
F303 7E FDA5         JMP    EXIT
                     ****************************************
                     *
                     * RL.  RELOAD DRUM LINES FROM INPUT MEDIUM.
                                              DELAYS CLOSING
                     * ANYTHING UNTIL TRIES TO RUN.
                     *
                     **
                                              ******************
                                              ******************
                                              ******************
                                              ************

F306 BD F8EB CMDRL   JSR    IZSLSH    MAKE SURE REALLY
                                              MEANT IT
F309 27 03           BEQ    DOARL
F30B 7E F3A8         JMP    DONSP
F30E BD F766 DOARL   JSR    EDINIT    GET RID OF ALL DRUM
                                              LINES
```

```
02861 F311 73 40CC       COM    RELFLG   SET FLAG ON TO
                                            SUPPRESS OUTPUT
02862 F314 7E F39A       JMP    STPENT   WAIT FOR INPUT

                   ***************************************
                                            ******************
                                            ******************
                                            *****
                   *
                   * RM.  ROTATE SPECIFIED DRUM TO SPECIFIED
                                            LINE.
                   *
                   **
                                            ******************
                                            ******************
                                            ******************
                                            ************

02865 F317 BD FB67 CMDRM JSR    RSVOYL   SEE IF CAN ROTATE
02866 F31A BD FBC1       JSR    SELLIN   >LINE NUMBER IN
                                            LNSNDX
02867 F31D BD FB9A       JSR    SELDRM   RETURN IDX >> DRUM
                                            LINE BASED ON
                                            XTRACT
02868 F320 BD E8AB       JSR    DMVZAP   MOVE POINTER AND
                                            CLEAR OUT DRUM
02869 F323 20 F2         BRA    CMDRM

                   ******************************************
                                            ******************
                                            ********
                   *
                   * RS.  RESET ALL DRUM LINES TO DRUM LINE
                                            ZERO.
                   *
                   **
                                            ******************
                                            ******************
                                            ******************
                                            ************

02872 F325 BD FB67 CMDRS JSR    RSVOYL   SEE IF CAN [illegible]
02873 F328 CE 00A0       LDX    #ZROTBL   POINT TO LINE [illegible]
                                             NUMBERS
02874 F32B FF 40D0       STX    ST1PTR
02875 F32E CE 0090       LDX    #LINLST
02876 F331 FF 40D2       STX    ST2PTR
02877 F334 86 08         LDA A  #NDRMS
02878 F336 BD F9A2       JSR    MVCP
02879 F339 86 08         LDA A  #NDRMS
02880 F33B 97 B6         STA A  CDMDNO
02881 F33D BD E319 ZXEDL JSR    DRMDNO
02882 F340 7A 00B6       DEC    CDMDNO
02883 F343 26 F8         BNE    ZXEDL
02884 F345 7E FDA5       JMP    EXIT

                   ***************************************
                                             ******************
                                             *************
                   *
                   * RU.  RUN THE PROGRAM.  RUN CHECKS TO MAKE
                                             SURE ALL LINE
```

```
                        * NUMBERS ARE RESOLVED, DOES NOT RUN UNLESS
                                                THEY ARE.
                        *
                        **
                                                ******************
                                                ******************
                                                ******************
                                                **************

02887 F348 BD FB67 CMDRU  JSR    RSVOYL   RESOLVE ALL DRUM
                                            LINES OR YELL
02888 F34B 86 08          LDA A  #RUNLIT   GET A NONZERO
02889 F34D B7 4054        STA A  RUNING
02890 F350 BA 0391        ORA A  LITES    TELL USER WE'RE
                                            RUNNING
02891 F353 B7 0391        STA A  LITES
02892 F356 7E F325        JMP    CMDRS

                        *********************************
                                                *******************
                                                ****************
                        *
                        * SA.  SETS STOP AT DRUM LINE.  DRUM CANNOT
                                                LEAVE LINE, MSG
                        * GENERATED WHEN DRUM GETS THERE.
                        *
                        **
                                                *******************
                                                *******************
                                                *******************
                                                ************

02895 F359 BD EACD CMDSA  JSR    RDYST    GET READY TO INDICATE
                                            A STOP
02896 F35C 8A 80          ORA A  #$80     SET STOP BIT
02897 F35E A7 00          STA A  0,X
02898 F360 20 F7          BRA    CMDSA

                        *************************************
                                                *******************
                                                *******************
                                                *********
                        *
                        * SB.  SETS MEMORY BIT(S) TO ON
                        *
                        **
                                                *******************
                                                *******************
                                                *******************
                                                ************

02901 F362 CE 0031 CMDSB  LDX    #MYVAL-1
02902 F365 FF 40D0        STX    ST1PTR
02903 F368 CE 0035        LDX    #MYDRM-1
02904 F36B 7E FBEB        JMP    SETAN2

                        ***************************************
                        *
                        * SD.  SETS SPECIFIED DRIVER(S) TO ON
                        *
                        **
                                                *******************
                                                *******************
```

```
                                            ******************
                                            ************

02907 F36E CE 0029 CMDSD  LDX    #OHDRM-1
02908 F371 7E FBD8        JMP    SETAN1

                          ***********************************
                          *
                          * SH.  SET HARDWARE AND DISCONNECT FROM
                                                DRUMS
                          *
                          **
                                            ******************
                                            ******************
                                            ******************
                                            ************

02911 F374 CE 0025 CMDSH  LDX    #OHVAL-1  >HARDWARE VALUES
02912 F377 FF 40D0        STX    ST1PTR
02913 F37A CE 0011        LDX    #OHMSK-1
02914 F37D 7E FBFD        JMP    ST1CL2

                          ***************************************
                                              ****************
                                              ****************
                                              *
                          *
                          * SI.  SETS SPECIFIED INPUT(S) TO ON.
                          *
                          **
                                              ****************
                                              ****************
                                              ****************
                                              ****************
                                              *

02917 F380 CE 001D CMDSI  LDX    #IHDRM-1
02918 F383 7E FBD8        JMP    SETAN1    NO POINT SETTING
                                            INPUT STATES
                          ***********************************
                                            ******************
                                            **********
                          *
                          * SL.  STEP A DRUM LINE.  PROCESSES OUTPUT
                                                    SPECIFICATION.
                          *
                          **
                                            ******************
                                            ******************
                                            ******************
                                            ************

02921 F386 BD FBC1 CMDSL  JSR    SELLIN    SETUP LNSNDX >DRUM
                                             LINE IN COMMAND
02922 F389 BD E565        JSR    DMOTST
02923 F38C FE 40C9        LDX    LNSNDX    >LINE AGAIN
02924 F38F BD E583        JSR    DMMYST
02925 F392 7E F386        JMP    CMDSL

                          *********************************
                                            ******************
```

```
                                                    ******************
                                                    *********
                    *
                    * SP.  STOPS DRUM EXECUTION.  NO CHANGES IN
                                                    DRIVERS.  MUST
                    * HAVE ARGUMENT '/' AS PASSWORD.
                    *
                    **
                                                    ******************
                                                    ******************
                                                    ******************
                                                    ************

F395 BD F5EB CMDSP  JSR    IZSLSH   SEE IF SHASH FOLLOWS
F398 26 0E          BNE    DONSP
F39A 7F 4054 STPENT CLR    RUNING
F39D B6 0391        LDA A  LITES    SAY NOT RUNNING
F3A0 84 F7          AND A  #$FF-RUNLIT
F3A2 B7 0391        STA A  LITES
F3A5 7E FDA5        JMP    EXIT
F3A8 86 04   DONSP  LDA A  #ERNOSP
F3AA 7E FD8C        JMP    YELL

                    ************************************
                                                    ******************
                                                    ******************
                                                    *****
                    *
                    * ST.  SET TIME.  MM/DD/YY HH:MM/SS /P MAKES
                                                    IT PRECISE.
                    *
                    **
                                                    ******************
                                                    ******************
                                                    ******************
                                                    ***********

F3AD BD [illegible] MYXTR  JSR    XTRACT
F3B0 B6 40DB  ..    LDA A  XTRVAL+1
F3B3 39             RTS

F3B4 8D F7   CMDST  BSR    MYXTR
F3B6 97 C8          STA A  SYSYR
F3B8 8D F3          BSR    MYXTR
F3BA 97 C6          STA A  SYSMO
                    *
F3BC 4C             INC A
F3BD CE E505        LDX    #MONLST-1
F3C0 08      RUBMON INX
F3C1 4A             DEC A
F3C2 26 FC          BNE    RUBMON
F3C4 A6 00          LDA A  0,X
F3C6 97 C7          STA A  SYSMDY
F3C8 8D E3          BSR    MYXTR
F3CA 4A             DEC A
F3CB 97 C5          STA A  SYSDAY
F3CD 8D DE          BSR    MYXTR
F3CF 97 C4          STA A  SYSWKD
F3D1 8D DA          BSR    MYXTR
F3D3 97 C3          STA A  SYSHR
F3D5 8D D6          BSR    MYXTR
F3D7 97 C2          STA A  SYSMIN
```

```
02964 F3D9 8D D2          BSR    MYXTR
02965 F3DB 97 C1          STA A  SYSSEC

02967 F3DD 7E FDA5        JMP    EXIT

                   **
                                                     ******************
                                                     ******************
                                                     ******************
                                                     ************
                   ;

                   *
                   * TI.  PRINTS TIME.
                   *
                   **
                                                     ******************
                                                     ******************
                                                     ******************
                                                     ************

02970 F3E0 FF 40EB FYGGV  STX    LKPNDX
02971 F3E3 FE 4066        LDX    TXTOUT
02972 F3E6 BD F13F        JSR    PLLKUP
02973 F3E9 BD F69F        JSR    SPCOUT
02974 F3EC 39             RTS
                   *
02975 F3ED CE 406E CMDTI  LDX    #TXTBFR+2
02976 F3F0 BD F69F        JSR    SPCOUT   BLANK
02977 F3F3 96 C8          LDA A  SYSYR
02978 F3F5 8D 22          BSR    FWOUT
02979 F3F7 D6 C6          LDA B  SYSMO
[illegible] [illegible] CE F172 LDX #[illegible]
[illegible] [illegible] 8D E2     BSR    F[illegible]
02982 F3FE 96 C5          LDA A  SYSDAY
02983 F400 4C             INC A
02984 F401 8D 16          BSR    FWOUT
02985 F403 D6 C4          LDA B  SYS[illegible]D
02987 F408 8D D6          BSR    FYGGV
02989 F40A 96 C3          LDA A  SYSHR
02990 F40C 8D 0B          BSR    FWOUT
02991 F40E 96 C2          LDA A  SYSMIN
02992 F410 8D 07          BSR    FWOUT
02993 F412 96 C1          LDA A  SYSSEC
02994 F414 8D 03          BSR    FWOUT
02995 F416 7E FDB3        JMP    BUTRDY

02997 F419 16      FWOUT  TAB
02998 F41A BD EE7A        JSR    OUTB
02999 F41D 39             RTS

                  ******************************
                                                  ******************
                                                  ******************
                                                  ***************
                  *
                  * X1.  EDIT ONLY.  SPECIFIES LINE NUMBER FOR
                                                  FIRST EXIT,
                  * FOLLOWING BIT AND ANALOG SPECIFICATIONS
                                                  PERTAIN TO FIRST
```

```
* EXIT CONDITION.  WITH LINE NUMBER CHANGES
                              LINE #, W/O,
* MERELY DIRECTS FOLLOWING CHANGES TO THAT
                              EXIT
                              SPECIFICATION.
*
**
                              ******************
                              ******************
                              ******************
                              ************

F41E CE 4156 CMDX1  LDX     #EDTAX1   POINT AT X1 LINE
                                        NUMBER
F421 FF 40D8        STX     X12NDX
F424 86 7F          LDA A   #$FF-$80   SAVE RESOLVED FLAG
                                        RESET BYTE
F426 B7 40D6        STA A   X12MSK
F429 8D 03          BSR     X12COM    DO COMMON PROCESSING
F42B 7E FDA5        JMP     EXIT

F42E BD F665 X12COM JSR     CKEDIT    MAKE SURE IN EDIT
                                        MODE
F431 7D 406B        TST     SKPEND    SEE IF ARGUMENT
F434 26 29          BNE     X12CXT    NO--GO SET MODE FOR
                                        EDIT
F436 BD F7DA        JSR     XTRACT    GET ARGUMENT
F439 FE 40DA        LDX     XTRVAL    ZERO IS VALID LINE
                                        NUMBER FOR X1 AND
                                        X2
F43C 27 0B          BEQ     X12STV
F43E BD FD59        JSR     RANGLN    VERIFY PROPER LINE
                                        NUMBER
F441 B6 40DC        LDA A   XTRDGT    MAKE SURE SAME DRUM
                                        NUMBER
F444 B1 4182        CMP A   EDTDGT
F447 26 1A          BNE     XDNOYL    DIFFERENT DRUM--YELL
     F449    X12STV EQU     *
F449 FE 40D8        LDX     X12NDX    GET POINTER TO LINE
                                        NUMBER
F44C B6 40DA        LDA A   XTRVAL    RELOAD FIRST BYTE OF
                                        LINE NO
F44F F6 40DB        LDA B   XTRVAL+1   RELOAD SECOND BYTE
                                        OF LINE NO
F452 A7 00          STA A   0,X       STORE LINE NUMBER IN
                                        EDIT BUFFER
F454 E7 01          STA B   1,X
F456 F6 40D6        LDA B   X12MSK    RESET RESOLVED FLAG
F459 F4 411B        AND B   EDTFGB    SAVE NEW RESOLVED
                                        FLAGS
F45C F7 411B        STA B   EDTFGB
     F45F    X12CXT EQU     *
F45F 7F 4118 • ·    CLR     EDTMOD    SET MODE TO X1
F462 39             RTS

F463 86 0C   XDNOYL LDA A   #ERDDRM    SAY DRUM NUMBER
                                        DIFFERENT
F465 7E FD8C        JMP     YELL

*************************************
                              ******************
                              *******
```

```
*
* X2.  EDIT ONLY.  SPECIFIES LINE NUMBER FOR
                                        SECOND EXIT,
* FOLLOWING BIT AND ANALOG SPECIFICATIONS
                                        PERTAIN TO SECOND
* EXIT CONDITION.  WITH LINE NUMBER CHANGES
                                        LINE #, W/O,
* MERELY DIRECTS FOLLOWING CHANGES TO THAT
                                        EXIT
                                        SPECIFICATION.
*
**
                                        *****************
                                        *****************
                                        *****************
                                        **************

03036      F468    CMDX2  EQU    *
03037 F468 CE 4180        LDX    #EDTAX2   POINT AT X2 LINE
                                              NUMBER
03038 F46B FF 40D8        STX    X12NDX
03039 F46E 86 BF          LDA A  #$FF-$40   SAVE RESOLVED FLAG
                                              RESET BYTE
03040 F470 B7 40D6        STA A  X12MSK
03041 F473 8D B9          BSR    X12COM   MAKE SURE IN EDIT
                                              MODE
03042 F475 7C 4118        INC    EDTMOD   SET MODE TO X2
03043 F478 7E FDA5        JMP    EXIT

                   ***************************************
                                        ******************
                                        ******************
                                        ****
*
* XE.  EDIT ONLY.  SPECIFIES LINE NUMBERS
                                        FOR EMERGENCY
* EXIT.  MUST HAVE EIGHT ARGUMENTS,
* ONE FOR EACH EXISTING DRUM LINE.
*
**
                                        ******************
                                        ******************
                                        ******************
                                        ***********

03046 F47B BD F665 CMDXE  JSR    CKEDIT   MAKE SURE IN EDIT
03047 F47E 7D 4115        TST    EDTEMG   SEE IF EDITING
                                              EMERGENCY
03048 F481 27 5F          BEQ    [illegible]   IF NOT, YELL
03049 F483 CE 4146        LDX    #EDTEAX
03050 F486 86 0A          LDA A  #10      GET COUNT TO CLEAR
03051 F488 BD F860        JSR    ZERNIN
03052 F48B 7F 40D7        CLR    XEMASK
03053 F48E 7F 411B        CLR    EDTFGB   SAY NOBODY RESOLVED
03054      F491    XEXTR  EQU    *
03055 F491 BD F7DA        JSR    XTRACT
03056 F494 7D 4115        TST    EDTEMG   SEE IF DATA LINE
03057 F497 2A 31          BPL    XEFKNO   IF SO, ANY NUMBER
                                              GOES
03058 F499 BD FD59        JSR    RANGLN
03059 F49C B6 40DC        LDA A  XTRDGT
03060 F49F 84 0F          AND A  #$0F     MAKE INTO NUMBER
03061 F4A1 27 3F          BEQ    XEBDGT
```

```
03062 F4A3 81 08            CMP A   #$8
03063 F4A5 22 3B            BHI     XEBDGT
03064 F4A7 B7 40DC          STA A   XTRDGT    SAVE NUMBER OF DRUM
03065 F4AA CE E421          LDX     #MBYTS-1
03066      F4AD     XEGMSK  EQU     *
03067 F4AD 08               INX
03068 F4AE 4A               DEC A
03069 F4AF 26 FC            BNE     XEGMSK
03070 F4B1 B6 40D7          LDA A   XEMASK
03071 F4B4 A5 00            BIT A   0,X
03072 F4B6 26 2E            BNE     XEMXIT    ALREADY HAVE ONE FOR
                                                 THIS DRUM
03073 F4B8 AA 00            ORA A   0,X
03074 F4BA B7 40D7          STA A   XEMASK
03075 F4BD B6 40DC          LDA A   XTRDGT    GET COUNT BACK
03076 F4C0 CE 4146 XELDAD   LDX     #EDTEAX    POINT AT EXIT
                                                  ADDRESS FIELDS
03077 F4C3 4A      XEFSLT   DEC A             COUNT DOWN TO ZERO
03078 F4C4 27 10            BEQ     XESTAD    GO STORE ADDRESS
03079 F4C6 08               INX
03080 F4C7 08               INX               POINT AT NEXT SLOT
03081 F4C8 20 F9            BRA     XEFSLT    TRY AGAIN
03082 F4CA 7C 40D7 XEFKNO   INC     XEMASK    USE MASK FOR COUNT
03083 F4CD B6 40D7          LDA A   XEMASK
03084 F4D0 81 08            CMP A   #8        MAKE SURE NOT TOO
                                                 MANY ARGUMENTS
03085 F4D2 22 12            BHI     XEMXIT
03086 F4D4 20 EA            BRA     XELDAD
03087      F4D6    XESTAD   EQU     *
03088 F4D6 B6 40DA          LDA A   XTRVAL
03089 F4D9 F6 40DB          LDA B   XTRVAL+1
03090 F4DC A7 00            STA A   0,X
03091 F4DE E7 01            STA B   1,X
03092 F4E0 20 AF            BRA     XEXTR
03093 F4E2 86 14   XEBDGT   LDA A   #ERXEBD     BAD INITIAL DIGIT OF
                                                   ARGUMENT
03094 F4E4 20 02            BRA     XEYELL
03095 F4E6 86 15   XEMXIT   LDA A   #ERXEME     TWO EXITS SPECIFIED
                                                   INTO SAME DRUM
03096 F4E8 7E FD8C XEYELL   JMP     YELL

                   ******************************************
                                                 **************
                   *
                   * EMERGENCY EXIT FROM EDITING.  QUITS
                                                 WITHOUT A CLOSE.
                   *
                   **
                                                 *****************
                                                 *****************
                                                 *****************
                                                 **************

03099 F4EB BD F786 CMDXX    JSR     SMLEDC
03100 F4EE 7E FDA5          JMP     EXIT

                   ******************************************
                   *
                   * ERASE HISOTRICAL DATA
                   *
                   **
```

```
                                                 ******************
                                                 ******************
                                                 ******************
                                                 ***************

F4F1 CE 41F9 CMDZH   LDX    #AVGARA   >HISTORY FILE
F4F4 6F 00   ZHZH    CLR    0,X       ZAP
F4F6 08              INX
F4F7 8C 4639         CPX    #AVGARE
F4FA 26 F8           BNE    ZHZH
F4FC 7E FDA5         JMP    EXIT
                     **************************
                                               *******************
                                               *******************
                                               ****************

                     *
                     * ZM.  ZAP DRUM.  PURGE ALL OF DRUM AND ANY
                                               REFERENCES TO IT
                     *
                     **
                                               *******************
                                               *******************
                                               *******************
                                               **********

     F4FF    CMDZM   EQU    *
F4FF BD F7DA         JSR    XTRACT    GET DRUM NUMBER
F502 7D 40DA         TST    XTRVAL    CHECK FOR VALID DRUM
                                        NO
F505 27 03           BEQ    ZMCNTU
F507 7E F569         JMP    ZMYELL
     F50A    ZMCNTU  EQU    *
F50A B6 40DB         LDA A  XTRVAL+1
F50D 27 5A           BEQ    ZMYELL
F50F 81 09           CMP A  #9
F511 27 59           BEQ    ZMZNG
F513 22 54           BHI    ZMYELL
F515 B7 40F7         STA A  DRMVAL    CALCULATE FIRST LINE
                                        NO
F518 BD FB9A         JSR    SELDRM    GET POINTER INTO
                                        CURRENT DRUM TABLE
F51B 8D 47           BSR    ZMCLRX    CLEAR CURRENT DRUM
                                        POINTER
F51D BD E5F4         JSR    ADD16
F520 6F 00           CLR    0,X       CLEAR ZERO DRUM
                                        POINTER
F522 6F 01           CLR    1,X
F524 BD F657         JSR    CALDLN
F527 B7 4109         STA A  ZMLNNO    SAVE
F52A F7 410A         STA B  ZMLNNO+1
F52D 7C 40F7         INC    DRMVAL
F530 BD F659         JSR    ADDDLN    CALCULATE FIRST OF
                                        NEXT LINE
F533 B7 410B         STA A  ZMMXLN    SAVE
F536 F7 410C         STA B  ZMMXLN+1
F539 BD FA2E         JSR    LSPREP    POINT AT BEGINNING OF
                                        LINES
F53C 09              DEX
F53D 09              DEX
F53E FF 40CE         STX    RESIDX
     F541    ZMLINE  EQU    *
```

```
03139 F541 27 34          BEQ    ZMPTRK   AT END, GO PURGE
                                            POINTERS TO DRUM
03140 F543 FE 40CE        LDX    RESIDX
03141 F546 A6 00          LDA A  0,X
03142 F548 E6 01          LDA B  1,X
03143 F54A CE 4107        LDX    #ZMLNNO
03144 F54D BD F75F        JSR    COMP16   SEE IF IN DRUM
03145 F550 25 0D          BCS    ZMNXLN
03146 F552 CE 410B        LDX    #ZMMXLN
03147 F555 BD F75F        JSR    COMP16
03148 F558 24 05          BCC    ZMNXLN
03149 F55A FE 40CE        LDX    RESIDX   POINT AT LINE NUMBER
03150 F55D 8D 05          BSR    ZMCLRX   CLEAR LINE NUMBER OF
                                            DRUM LINE
03151      F55F   ZMNXLN  EQU    *
03152 F55F BD FA4B        JSR    LSPINC   POINT AT NEXT LINE
03153 F562 20 DD          BRA    ZMLINE
03154 F564 6F 00  ZMCLRX  CLR    0,X
03155 F566 6F 01          CLR    1,X
03156 F568 39             RTS
03157 F569 7E F1E6 ZMYELL JMP    PMYELL
03158      F56C   ZMEMG   EQU    *
03159 F56C CE 7F9F        LDX    #DRUMND+4   RESET FIRST
                                               EMERGENCY
                                               POINTER
03160 F56F FF 410D        STX    EMGFIR
03161 F572 7F 00B1        CLR    EMGNUM   MAKE THEM ALL GO AWAY
03162 F575 20 23          BRA    ZMEXIT
03163      F577   ZMPTRK  EQU    *
03164 F577 96 B1          LDA A  EMGNUM   GET COUNT OF
                                            EMERGENCY LINES
03165 F579 27 1F          BEQ    ZMEXIT
03166 F57B B7 40CD        STA A  RESCNT
03167 F57E FE 410D        LDX    EMGFIR   POINT AT EMERGENCY
                                            LINES
03168 F581 27 17          BEQ    ZMEXIT
03169 F583 BD E2E4        JSR    SKPTST   POINT AT EXIT TABLE
03170 F586 B6 40DB        LDA A  XTRVAL+1   GET DRUM NUMBER
03171 F589 4A             DEC A           REDUCE FOR OFFSET
03172 F58A BD FBAE        JSR    SLDMPT   POINT AT PROPER TABLE
                                            ENTRY
03173 F58D FF 40CE        STX    RESIDX
03174 F590 FE 40CE ZMCLEM LDX    RESIDX
03175 F593 8D CF          BSR    ZMCLRX   CLEAR POINTER TO DRUM
                                            IN EMERGENCIES
03176 F595 BD FAB4        JSR    EMGINC   POINT AT NEXT
03177 F598 26 F6          BNE    ZMCLEM   IF NOT DONE, DO NEXT
03178      F59A   ZMEXIT  EQU    *
03179 F59A 7E FBAD        JMP    EXIT
               *******************************************
                                    ***********************
                                    ******************
               *
               * SUBROUTINES NEEDED BY COMMAND PROCESSORS
               *
               **
                                    ******************
                                    ******************
                                    ******************
                                    ************
               ********************************************
```

```
*
* BONCT1,BONCT2,BOFCT1,BOFCT2 DISPLAY THE
                                   BITS SET EITHER ON
                                   OR
* OFF IN A GIVEN FIELD.  THE 1 ENTRIES DEAL
                                   ONLY
* WITH A GIVEN 4-BYTE FIELD POINTED TO ...
* THE 2 ENTRIES ASSUME AN 8 BYTE FIELD OF
                                   ENABLE
* BITS FOLLOWED BY VALUE BITS, AND PRINT
                                   ONLY ENABLED
* VALUES OF THEIR RESPECTIVE TYPE.  THE
                                   ABOVE ENTRIES
* PROCESS THE FIELD AND PASS CONTROL TO
                                   BTACVT,
* WHICH EXAMINES THE BITS AND PLACES THE
                                   ASCII NUMBERS
* CORRESPONDING   TO THEIR POSITION IN THE
                                   TEXT BUFFER
*
**
                                   ******************
                                   ******************
                                   ******************
                                   ************

      F59D     BOFCT1 EQU   *
F59D BD E5AA          JSR   DMMOV    MOVE BITS TO WORK
                                       AREA
F5A0 CE 0004          LDX   #$4
F5A3 63 3D     BOFCX1 COM   WDMWCH-1,X
F5A5 09               DEX
F5A6 26 FB            BNE   BOFCX1
F5A8 20 27            BRA   BTACVT

      F5AA     BONCT1 EQU   *
F5AA BD E5AA          JSR   DMMOV    MOTE BITS TO WORK
                                       AREA
F5AD 20 22            BRA   BTACVT

      F5AF     BOFCT2 EQU   *
F5AF 7F 40F2          CLR   BITFL1
      F5B2     BTCCHN EQU   *
F5B2 BD E5AA          JSR   DMMOV    MOVE BITS TO WORK
                                       AREA
F5B5 CE 0004          LDX   #$4
F5B8 A6 41     BOFCX2 LDA A WDMWCH+3,X  GET VALUE BITS
F5BA 7D 40F2          TST   BITFL1   SEE IF TESTING ON OR
                                       OFF
F5BD 26 02            BNE   BONCX2
F5BF A8 3D            EOR A WDMWCH-1,X
      F5C1     BONCX2 EQU   *
F5C1 A4 3D            AND A WDMWCH-1,X
F5C3 A7 3D            STA A WDMWCH-1,X
F5C5 09               DEX
F5C6 26 F0            BNE   BOFCX2
F5C8 20 07            BRA   BTACVT

      F5CA     BONCT2 EQU   *
F5CA 4F               CLR A
F5CB 43               COM A
F5CC B7 40F2          STA A BITFL1   SAY TESTING ON BITS
F5CF 20 E1            BRA   BTCCHN
```

```
       F5D1    BTACVT EQU    *
F5D1 7F 40FC          CLR    FSUPFG     SET SUPPRESS FLAG
F5D4 73 40FC          COM    FSUPFG
F5D7 CE 0000          LDX    #$0
F5DA FF 40ED          STX    BTANDX     SAVE INDEX ZERO
F5DD 5F               CLR B
F5DE 7F 40EF          CLR    BTAVL1
F5E1 7F 40F0          CLR    BTAVL2
F5E4 20 0A            BRA    BTAXND
       F5E6    BTATBT EQU    *
F5E6 C5 07            BIT B  #$7
F5E8 26 06            BNE    BTAXND
F5EA 08               INX
F5EB 8C 0004          CPX    #$4
F5EE 27 1E            BEQ    BTAXIT
       F5F0    BTAXND EQU    *
F5F0 5C               INC B             GET NUMBER OF NEXT
                                          BIT
F5F1 64 3E            LSR    WDMWCM,X
F5F3 25 04            BCS    BTARCD
F5F5 8D 17            BSR    BTADSP
F5F7 20 ED            BRA    BTATBT

       F5F9    BTARCD EQU    *
F5F9 7D 40F0          TST    BTAVL2
F5FC 27 0B            BEQ    BTAST2
F5FE 7D 40EF          TST    BTAVL1
F601 26 06            BNE    BTAST2
F603 B6 40F0          LDA A  BTAVL2     GET SECOND VALUE
F606 B7 40EF          STA A  BTAVL1
       F609    BTAST2 EQU    *
F609 F7 40F0          STA B  BTAVL2
F60C 20 D8            BRA    BTATBT

       F60E    BTAXIT EQU    *
       F60E    BTADSP EQU    *
F60E 7D 40F0          TST    BTAVL2
F611 27 43            BEQ    BTANVL
F613 FF 40ED          STX    BTANDX
F616 F7 40F1          STA B  BTACSV
F619 FE 4066          LDX    TXTOUT
F61C 7D 40FC          TST    FSUPFG     SEE IF FIRST TIME
F61F 26 03            BNE    BTANCM
F621 BD F6A7          JSR    [illegible]OUT
       F624    BTANCM EQU    *
F624 7F 40FC  ••      CLR    FSUPFG     RESET SUPPRESS FLAG
F627 7D 40EF          TST    BTAVL1
F62A 27 12            BEQ    BTA1VL
F62C 7F 40E5          CLR    CVDTMP
F62F B6 40EF          LDA A  BTAVL1
F632 B7 40E6          STA A  CVDTMP+1
F635 7F 40EF          CLR    BTAVL1
F638 BD F6EC          JSR    CVD1
F63B BD F6A3          JSR    BSHOUT
       F63E    BTA1VL EQU    *
F63E 7F 40E5          CLR    CVDTMP
F641 B6 40F0          LDA A  BTAVL2
F644 B7 40E6          STA A  CVDTMP+1
F647 7F 40F0          CLR    BTAVL2
F64A BD F6EC          JSR    CVD1
F64D FF 4066          STX    TXTOUT
F650 FE 40ED          LDX    BTANDX
```

```
03278 F653 F6 40F1        LDA B  BTACSV
03279 F656 39      BTANVL RTS

                   ***********************************************
                                               *******************
                                               *******************
                                               ******
                   *
                   * CALCULATE LINE NUMBERS CORRESPONDING TO A
                                               DRUM NO
                   *
                   **
                                               ******************
                                               ******************
                                               ******************
                                               **********

03282       F657   CALDLN EQU    *
03283 F657 4F             CLR A
03284 F658 5F             CLR B
03285       F659   ADDDLN EQU    *
03286 F659 FB FE2F        ADD B  DRMLNO+1   ADD 1000
03287 F65C B9 FE2E        ADC A  DRMLNO
03288 F65F 7A 40F7        DEC    DRMVAL   DECREMENT DRUM NUMBER
03289 F662 26 F5          BNE    ADDDLN
03290 F664 39             RTS

                   ***********************************************
                                               ******************
                                               ******************
                   *
                   * VERIFY THAT WE ARE IN EDIT MODE.  YELL IF
                                               NOT
                   *
                   **
                                               ******************
                                               ******************
                                               ******************
                                               ***********

[illegible] F665   CHEDIT EQU    *
[illegible] F665 7D 4115  TST    EDTING   CHECK EDITING FLAG
[illegible] F668 27 01    BEQ    CHEYEL   ZERO [illegible]
[illegible] F66A 39       RTS
03296 F66B C6 0m   CHEYEL LDA A  #ERNEDT   SAY NOT IN EDIT MODE
03297 F66D 7E FD8C        JMP    YELPOP

                   ***********************************************
                                                ******************
                                                **************
                   *
                   * CLRONB AND CLROFB RESET THE ENABLE
                   * BITS FOR A FIELD WHOSE ADDRESS IS PASSED
                   * IN ST1PTR.  CLRONB RESETS BITS ENABLED ON,
                                                CLROFB THOSE
                                                ENABLED OFF.
                   *
                   **
                                                ******************
                                                ******************
                                                ******************
                                                **************
```

```
03302       F670      CLRONB EQU     *
03303 F670 4F                CLR A             SAY RESETTING ON BITS
03304 F671 43                COM A
03305 F672 B7 40F2           STA A  BITFL1
03306       F675      CLBCOM EQU     *
03307 F675 FF 40D2           STX    ST2PTR     SAVE SECOND POINTER
03308 F678 FE 40D0           LDX    ST1PTR     GET POINTER TO FIELD
03309 F67B C6 04             LDA B  #$4        GET COUNT
03310 F67D F7 40D5           STA B  CLRCNT
03311       F680      CLBGO  EQU     *
03312 F680 08                INX
03313 F681 E6 04             LDA B  4,X        GET SETTING BITS
03314 F683 E4 00             AND B  0,X
03315 F685 7D 40F2           TST    BITFL1     SEE IF CLEARING ON OR
                                                  OFF BITS
03316 F688 27 02             BEQ    CLBOFF     CLEARING OFF BITS
03317 F68A E8 00             EOR B  0,X
03318       F68C      CLBOFF EQU     *
03319 F68C E7 00             STA B  0,X
03320 F68E 7A 40D5           DEC    CLRCNT
03321 F691 26 ED             BNE    CLBGO
03322 F693 39                RTS

03324       F694      CLROFB EQU     *
03325 F694 7F 40F2           CLR    BITFL1     SAY RESETTING OFF
                                                  BITS
03326 F697 20 DC             BRA    CLBCOM

                      ******************************
                                                  ******************
                                                  ****************
                      *
                      * ROUTINE TO ADD A COMMA AFTER CALLING CVD.
                      * CVD RETURNS INDEX REGISTER >NEXT FREE
                                                  CHARACTER.
                      *
                      **
                                                  ******************
                                                  ******************
                                                  ******************
                                                  ************
03329 F699 FF 406C TWOOUT STX    TXTBFR     PUT CHARACTERS IN
                                                  BUFFER
03330 F69C CE 406E           LDX    #TXTBFR+2
03331 F69F 86 20      SPCOUT LDA A  #$20       GET SPACE
03332 F6A1 20 06             BRA    ANYOUT
03333 F6A3 86 2D      DSHOUT LDA A  #'-
03334 F6A5 20 02             BRA    ANYOUT

03336 F6A7 86 2C      CMAOUT LDA A  #',        GET A COMMA
03337 F6A9 A7 00      ANYOUT STA A  0,X
03338 F6AB 08                INX
03339 F6AC FF 4066           STX    TXTOUT
03340 F6AF 39                RTS

                      ***********************************
                                                  ******************
                                                  ******************
                                                  *****
                      *
                      * CONVERT TO BINARY
                      * DIGITS ARE PROCESSED UNTIL A NON-NUMERIC
                                                  CHARACTER
```

```
                                  * IS FOUND OR UNTILTHE NUMBER OVERFLOWS
                                  * OVERFLOW CAUSES A RETURNED CONDITION CODE C
                                                             SET
                                  * INPUT:X => FIRST CHARACTER OF A STRING OF
                                                             ASCII DIGITS
                                  * OUTPUT: CVBTMP CONTAINS THE BINARY
                                                             EQUIVALENT
                                  *
                                  **
                                                             ******************
                                                             ******************
                                                             ******************
                                                             ***********
03343          F6B0     CVB     EQU      *
03344 F6B0 7F 40E3              CLR      CVBTMP
03345 F6B3 E6 00                LDA B    0,X        GET FIRST DIGIT
03346 F6B5 C4 0F                AND B    #$0F       REMOVE HIGH-ORDER
                                                       NIBBLE
03347 F6B7 F7 40E4 CVBGET       STA B    CVBTMP+1    SAVE IN BINARY AREA
03348 F6BA 08                   INX                 POINT AT NEXT
                                                       CHARACTER
03349 F6BB BD F9BE              JSR      NUMERC     TEST FOR NUMERIC
03350 F6BE 24 02                BCC      CVBCVT     YES--GO CONVERT
03351 F6C0 0C                   CLC                 CLEAR CARRY TO
                                                       INDICATE NORMAL
                                                       EXIT
03352          F6C1     CVBEXT  EQU      *
03353 F6C1 39                   RTS                 RETURN
03354          F6C2     CVBCVT  EQU      *
03355 F6C2 E6 00                LDA B    0,X        GET CHARACTER
03356 F6C4 C4 0F                AND B    #$0F       REMOVE FIRST NIBBLE
03357 F6C6 4F                   CLR A
03358 F6C7 8D 0D                BSR      CVBDBL     CVBTMP*2
03359 F6C9 8D 14                BSR      CVBADD     SAVE CVBTMP
03360 F6CB 8D 09                BSR      CVBDBL     CVBTMP*4
03361 F6CD 8D 07                BSR      CVBDBL     CVBTMP*8
03362 F6CF 8D 0E                BSR      CVBADD     CVBTMP*10
03363 F6D1 B7 40E3              STA A    CVBTMP     SAVE IN BINARY AREA
03364 F6D4 20 E1                BRA      CVBGET     GO SAVE REST OF
                                                       RESULT AND GET
                                                       NEXT CHARACTER
03366          F6D6     CVBDBL  EQU      *
03367 F6D6 78 40E4              ASL      CVBTMP+1    2*(CVBTMP+1)
03368 F6D9 79 40E3              ROL      CVBTMP     2*CVBTMP
03369 F6DC 25 0A                BCS      CVBOVF     EXIT IF OVERFLOW
03370 F6DE 39                   RTS
03372          F6DF     CVBADD  EQU      *
03373 F6DF FB 40E4              ADD B    CVBTMP+1    SAVE CVBTMP+1
03374 F6E2 B9 40E3              ADC A    CVBTMP     SAVE CVBTMP
03375 F6E5 25 01                BCS      CVBOVF     EXIT IF OVERFLOW
03376 F6E7 39                   RTS
03378          F6E8     CVBOVF  EQU      *
03379 F6E8 32                   PUL A
03380 F6E9 32                   PUL A
03381 F6EA 20 D5                BRA      CVBEXT     EXIT WITH CARRY SET
                                  *************************************
                                                             ******************
                                                             ******************
```

```
                                 *
*
* CONVERT TO DECIMAL
* THE BINARY NUMBER IN CVDTMP IS CONVERTED
                               TO ASCII
* SEPARATE ENTRIES ARE PROVIDED FOR
                               DIFFERENT LENGTH
* RESULTS.  HOWEVER, NUMBERS WHOSE LENGTH IS
* GREATER THAN THE SPECIFIED NUMBER OF
                               DIGITS ARE
* RETURNED WITH THEIR FULL LENGTH
* INPUT:  BINARY NUMBER IN CVDTMP
*  X => AREA TO PUT ASCII CHARACTERS
*
* OUTPUT:  ASCII STRING FOR DECIMAL
                               REPRESENTATION OF
                               NUMBER
*
**
                               ******************
                               ******************
                               ******************
                               ************
      F6EC   CVD1   EQU    *
      F6EC   CVD    EQU    *
F6EC  C6 04         LDA B  #$4       SAY SIZE = 1
F6EE  20 0A         BRA    CVDALL
F6F0  C6 03  CVD2   LDA B  #$3       SAY SIZE = 2
F6F2  20 06         BRA    CVDALL
      F6F4   CVD3   EQU    *
F6F4  C6 02         LDA B  #$2       SAY SIZE = 3
F6F6  20 02         BRA    CVDALL
      F6F8   CVD4   EQU    *
[illegible] C6 01   LDA B  #$1       SAY SIZE = 4

[illegible] F7 40E? CVDALL STA B CVDTRN  [illegible]
F6FD  B6 40E5       LDA A  CVDTMP    GET BINARY NUMBER
F700  F6 40E6       LDA B  CVDTMP+1
F703  FF 40E7       STX    CVDPTR    SAVE OUTPUT POINTER
F706  CE 2710       LDX    #10000    GET 10,000
F709  8D 15         BSR    CVDCNT    COUNT
F70B  CE 03E8       LDX    #1000     GET 1,000
F70E  8D 10         BSR    CVDCNT    COUNT
F710  CE 0064       LDX    #100      GET 100
F713  8D 0B         BSR    CVDCNT    COUNT
F715  CE 000A       LDX    #10       GET 10
F718  8D 06         BSR    CVDCNT    COUNT
F71A  CA 30         ORA B  #$30      MAKE REMAINDER ASCII
                                       DIGIT
F71C  E7 00         STA B  0,X       LAST DIGIT
F71E  08            INX              POINT X BEYOND LAST
                                       CHARACTER
F71F  39            RTS              RETURN
*
      F720   CVDCNT EQU    *
F720  FF 40E5       STX    CVDTMP    SET VALUE TO COUNT
F723  FE 40E7       LDX    CVDPTR    GET OUTPUT POINTER
F726  6F 00         CLR    0,X       CLEAR COUNT
      F728   CVDCMP EQU    *
F728  B1 40E5       CMP A  CVDTMP    SEE IF GREATER THAN
                                       COUNT VALUE
F72B  22 07         BHI    CVDSUB    REGISTER
```

```
                                                HIGH--SUBTRACT
03419 F72D 25 0F            BCS    CVDCXT   REGISTER LOW--EXIT
03420 F72F F1 40E6          CMP B  CVDTMP+1   FIRST EQUAL--CHECK
                                                 LOW-ORDER BYTE
03421 F732 25 0A            BCS    CVDCXT   REGISTER LOW--EXIT
03422      F734     CVDSUB  EQU    *
03423 F734 F0 40E6          SUB B  CVDTMP+1   REDUCE AND COUNT
03424 F737 B2 40E5          SBC A  CVDTMP   ...
03425 F73A 6C 00            INC    0,X      COUNT IN CORE
03426 F73C 20 EA            BRA    CVDCMP   GO TEST AGAIN
03427      F73E     CVDCXT  EQU    *
03428 F73E 6D 00            TST    0,X      SEE IF COUNT ZERO
03429 F740 26 09            BNE    CVDNZR   NO--NO TRUNCATION
                                               ALLOWED
03430 F742 7D 40E9          TST    CVDTRN   TEST TRUNCATION
                                               COUNTER
03431 F745 27 07            BEQ    CVDSVZ   ZERO--FORGET
                                               TRUNCATION
                    * IGNORE LEADING ZERO
03432 F747 7A 40E9          DEC    CVDTRN   REDUCE TRUNCATION
                                               COUNT
03433 F74A 39               RTS             ASK FOR NEXT VALUE
03434      F74B     CVDNZR  EQU    *
03435 F74B 7F 40E9          CLR    CVDTRN   SAY NO MORE
                                               TRUNCATION
03436      F74E     CVDSVZ  EQU    *
03437 F74E B7 40E5          STA A  CVDTMP   SAVE VALUE FROM A
03438 F751 86 30            LDA A  #$30     CONVERT TO ASCII
                                               CHARACTER
03439 F753 AA 00            ORA A  0,X
03440 F755 A7 00            STA A  0,X      REPLACE IN WORK AREA
03441 F757 B6 40E5          LDA A  CVDTMP   RESTORE A VALUE
03442 F75A 08               INX             POINT AT NEXT
                                               CHARACTER
03443 F75B FF 40E7          STX    CVDPTR   SAVE OUTPUT POINTER
03444 F75E 39               RTS             ASK FOR NEXT VALUE
                    ****************************************
                                                ******************
                                                ******************
                                                *******
                    *
                    * COMPARE TWO 16-BIT NUMBERS AND SET
                                                CONDITION CODES
                    * INPUT: ACCA AND ACCB CONTAIN 16-BIT NUMBER
                    *  X => SECOND 16-BIT NUMBER
                    * OUTPUT:  CONDITION CODES SET FROM COMPARE
                    *
                    **
                                                ******************
                                                ******************
                                                ******************
                                                ************
03447      F75F     COMP16 EQU    *
03448 F75F A1 00           CMP A  0,X
03449 F761 26 02           BNE    COMRTN
03450 F763 E1 01           CMP B  1,X
03451 F765 39       COMRTN RTS
                    ****************************************
                    *
                    * INITIALIZE EDIT POINTERS AND INDICATORS
                    *
                    **
```

```
                                         ******************
                                         ******************
                                         ******************
                                         ***********

F766 CE 0090 EDINIT LDX    #LINLST   >BEGINNING OF LINE
                                           TABLE
F769 86 22          LDA A  #NDRMS+NDRMS+NDRMS+NDRMS+2
F76B BD F860        JSR    ZERNIN
F76E CE 463C        LDX    #DRUMST+3    SET BEGINNING LINE
                                              POINTER
F771 FF 4111        STX    FIRLIN
F774 CE 45D5        LDX    #DRUMST-LINLGT+3    SET ENDING
                                                  LINE
                                                  POINTER
F777 FF 4113        STX    LSTLIN
F77A CE 7F9F        LDX    #DRUMND+4
F77D FF 410D        STX    EMGFIR
F780 CE 7F64        LDX    #DRUMND-EMGLGT+4
F783 FF 410F        STX    EMGLST

F786 CE 4115 SMLEDC LDX    #EDTEMG   >FIRST VARIABLE TO
                                          BE ZEROED
F789 86 6E          LDA A  #EDTBFE-EDTEMG    #BYTES TO
                                               CLEAR
F78B BD F860        JSR    ZERNIN   ZAPPO
F78E 39             RTS

                    ****************************
                                         ******************
                                         ******************
                                         ***************
                    *
                    * EVAL
                    * PICKS UP THE TEXT POINTER AND ATTEMPTS TO
                                         OBTAIN EITHER
                    * AN ASCII NUMBER WHICH IT CAN CONVERT TO
                                         BINARY OR A
                    * SYMBOL WHICH IT CAN LOOK UP IN A TABLE.
                    * IF IT FINDS NO NUMBER AND THE SYMBOL IS
                                         NOT
                    * IN THE TABLE, IT YELLS.
                    * OUTPUT:  XTRVAL CONTAINS THE BINARY
                                         EQUIVALENT
                    *   OF THE ARGUMENT PROCESSED
                    *  TXTPTR POINTS AT THE CHARACTER BEYOND THE
                    *  ARGUMENT
                    *
                    **
                                         ******************
                                         ******************
                                         ******************
                                         ***********

     F78F    EVAL   EQU    *
F78F BD F793        JSR    XTEVAL    KEEP BASIC EVAL AT
                                         SAME LEVEL
F792 39             RTS
     F793    XTEVAL EQU    *
F793 FE 4062        LDX    TXTPTR    GET TEXT POINTER
F796 BD F9BE        JSR    NUMERC    GO TEST FIELD FOR
                                         NUMERIC
```

```
F799 24 24           BCC    EVANUM    NUMERIC--CONVERT TO
                                         BINARY
F79B BD F8F3         JSR    LOOKUP
F79E B6 40EA         LDA A  LKPVAL    TEST VALUE RETURNED
F7A1 43              COM A            SEE IF X'FF'
F7A2 26 07           BNE    EVAFND    NOT ZERO--OK
F7A4 86 11           LDA A  #ERNTBL    SAY NOT FOUND IN
                                         TABLE
        F7A6  EVAYEL EQU    *
F7A6 33              PUL B            REMOVE SECONDARY
                                         RETURN POINTER
F7A7 33              PUL B
F7A8 7E FD8C         JMP    YELPOP
        F7AB  EVAFND EQU    *
F7AB FE 4062         LDX    TXTPTR    RECOVER TEXT POINTER
F7AE BD E5FE         JSR    ADD3      POINT 3 AHEAD
F7B1 FF 4062         STX    TXTPTR    SAVE TEXT POINTER
F7B4 7F 40DA         CLR    XTRVAL    CLEAR FIRST BYTE OF
                                         VALUE
F7B7 B6 40EA         LDA A  LKPVAL    SET VALUE TO LOOKUP
                                         RETURN
F7BA B7 40DB         STA A  XTRVAL+1
F7BD 20 16           BRA    EVAXIT
        F7BF  EVANUM EQU    *
F7BF A6 00           LDA A  0,X       NUMERIC--SAVE FIRST
                                         DIGIT
F7C1 B7 40DE         STA A  EVADGT
F7C4 BD F6B0         JSR    CVB       CONVERT TO BINARY
F7C7 25 0D           BCS    EVANTL    SAY NUMBER TOO LARGE
                                         FOR 16 BITS
F7C9 FF 4062         STX    TXTPTR    SAVE TEXT POINTER
F7CC FE 40E3         LDX    CVBTMP    SET VALUE TO CVB
                                         BINARY RETURN
                                         VALUE
F7CF FF 40DA         STX    XTRVAL
F7D2 FE 4062         LDX    TXTPTR    GET TEXT POINTER BACK
F7D5 39       EVAXIT RTS
        F7D6  EVANTL EQU    *
F7D6 86 12           LDA A  #ERNTBG    SAY NUMBER TOO LARGE
F7D8 20 CC           BRA    EVAYEL

              **********************************************
                                        *****************
                                        *****************
              * EXTRACT
              * PICKS UP THE TEXT POINTER AND ATTEMPTS TO
                                        PARSE
              * THE STRING POINTED TO BY IT.  RETURNS ONE
                                        VALUE PER
              * CALL.  CONVERTS ASCII NUMERIC STRINGS TO
                                        BINARY,
              * LOOKS UP ALPHABETIC VALUES, AND RETURNS
                                        DASHED
              * VALUES ONE AT A TIME IN CONSECUTIVE CALLS.
              **********************************************
                                        *****************
                                        *********

        F7DA  XTRACT EQU    *
F7DA 7D 40DD         TST    XTRDSH
F7DD 26 52           BNE    XTRDSP    SEE IF IN DASH
                                         PROCESSING
F7DF 7F 40DC         CLR    XTRDGT
```

```
F7E2 7D 406B          TST    SKPEND   SEE IF WE FINISHED
                                         ALREADY
F7E5 26 66            BNE    XTRXIT   YES--RETURN TO
                                         COMMAND PROCESSOR
F7E7 7F 40DD          CLR    XTRDSH   NO--CLEAR DASH
                                         INDICATOR
F7EA BD F793          JSR    XTEVAL   GET ARGUMENT VALUE
F7ED B6 40DE          LDA A  EVADGT   GET FIRST DIGIT FROM
                                         EVAL
F7F0 B7 40DC          STA A  XTRDGT   PRESENT IT AS
                                         EXTRACT'S VERY OWN
     F7F3     XTRCKD  EQU    *
F7F3 86 2D            LDA A  #$2D     CHECK FOR DASH
                                         FOLLOWING ARGUMENT
F7F5 A1 00            CMP A  0,X
F7F7 26 2C            BNE    XTRSKD   NO DASH GO CHECK FOR
                                         DELIMETER
F7F9 08               INX             POINT AT NEXT
                                         CHARACTER
F7FA FF 4062          STX    TXTPTR   SAVE TEXT POINTER
F7FD FE 40DA          LDX    XTRVAL   GET RETURNED VALUE
F800 FF 40DF          STX    XTRSAV
F803 BD F793          JSR    XTEVAL
F806 B6 40DA          LDA A  XTRVAL
F809 F6 40DB          LDA B  XTRVAL+1
     F80C     XTRCSE  EQU    *
F80C CE 40DF          LDX    #XTRSAV
F80F BD F75F          JSR    COMP16
F812 25 3C            BCS    XTRYEL   END<START--YELL
F814 27 0F            BEQ    XTRSKD   END=START--IGNORE
                                         DASH
F816 73 40DD          COM    XTRDSH   END>START--SET DASH
                                         PROCESSING
F819 B7 40E1          STA A  XTREND   SAVE END VALUE
F81C F7 40E2          STA B  XTREND+1
F81F FE 40DF          LDX    XTRSAV
F822 FF 40DA          STX    XTRVAL
     F825     XTRSKD  EQU    *
F825 FE 4062          LDX    TXTPTR   GET TEXT POINTER BACK
F828 BD FCF1          JSR    SKPDLM   CHECK FOR DELIMETER
                                         OR END
F82B 7D 406B          TST    SKPEND   SEE IF BAD CHARACTER
F82E 2B 20            BMI    XTRYEL   YES--GO YELL
     F830     XTRRTN  EQU    *
F830 39               RTS             RETURN WITH GOODIES
                                         SET
              *
     F831     XTRDSP  EQU    *
F831 FE 40DF          LDX    XTRSAV   GET SAVED VALUE
F834 08               INX             INCREMENT BY 1
F835 FF 40DF          STX    XTRSAV   SAVE NEW VALUE
F838 FF 40DA          STX    XTRVAL   SET RETURN VALUE
F83B B6 40DF          LDA A  XTRSAV   CHECK FOR LAST OF
                                         SERIES
F83E F6 40E0          LDA B  XTRSAV+1
F841 CE 40E1          LDX    #XTREND
F844 BD F75F          JSR    COMP16
F847 25 03            BCS    XTRDSE   MORE TO COME
F849 7F 40DD          CLR    XTRDSH   CLEAR INDICATOR AND
                                         RETURN LAST
     F84C     XTRDSE  EQU    *
F84C 39               RTS
              *
```

```
F84D 7E FDA5 XTRXIT JMP     EXTPOP
F850 86 13   XTRYEL LDA A   #ERBDLM     SAY BAD DELIMETER
F852 7E FD8C        JMP     YELPOP

                    ******************************************
                                                *****************
                                                **************
                    *
                    * ROUTINE TO SCATTER FENCES FROM IDX TO
                                                COUNT IN A
                    *
                    **
                                                *****************
                                                *****************
                                                *****************
                                                **************

F855 08             FENCES INX               POINT AT PROPER FIRST
                                                BYTE .
F856 C6 FF          FENNIN LDA B  #$FF       OBTAIN THE FENTS
F858 E7 00          FENLP  STA B  0,X        STASH THE FENCE
F85A 08                    INX
F85B 4A                    DEC A
F85C 26 FA                 BNE    FENLP
F85E 39                    RTS

F85F 08             ZEROES INX               POINT AT PROPER FIRST
                                                BYTE
F860 5F             ZERNIN CLR B
F861 20 F5                 BRA    FENLP
                    ******************************
                                                ******************
                                                *************
                    *
                    * ROUTINE TO RETURN POINTST TO SPECIFIC
                                                LINE.
                    * INPUT LINE NUMBER IS IN 'LNSVAL', AND
                                                ADDRESS IS OUTPUT
                    * IN LNSNDX IF FOUND, ELSE LSXNDX IS CLEARED
                    *
                    **
                                                ******************
                                                ******************
                                                ******************
                                                ***********

F863 96 B0   FIND   LDA A   LINCNT   NUMBER OF LINES
F865 27 3D          BEQ     CANFNN   CANNOT FIND IT IF
                                        THERE ARE NONE
F867 B7 40CB        STA A   LNSCNT
F86A B6 4116        LDA A   EDTING
F86D 27 16          BEQ     NFED
F86F B6 4115        LDA A   EDTEMG   SEE IF EDITING
                                        EMERGENCY
F872 26 11          BNE     NFED
F874 FE 411E        LDX     EDTLIN
F877 FF 40C9        STX     LNSNDX   SET TO LOOK AT THAT
                                        LINE
F87A 8D 5B          BSR     COMLNO
F87C 26 07          BNE     NFED
F87E FE 4119        LDX     EDTWHR   >CORE LOCATION FOR
                                        LINE BEING EDITED
```

```
03592 F881 FF 40C9          STX     LNSNDX    RETURN WHERE IT WILL
                                                 BE
03593 F884 39               RTS
03594 F885 FE 4111 NFED     LDX     FIRLIN
03595 F888 27 1A            BEQ     CANFNN
03596 F88A FF 40C9          STX     LNSNDX

03598 F88D 8D 48   LRVLP    BSR     COMLNO    SEE IF IT MATCHES
03599 F88F 26 01            BNE     NOTIT
03600 F891 39               RTS

03602 F892 86 67   NOTIT    LDA A   #LINLGT
03603 F894 BB 40CA          ADD A   LNSNDX+1
03604 F897 24 03            BCC     NLD
03605 F899 7C 40C9          INC     LNSNDX
03606 F89C B7 40CA NLD      STA A   LNSNDX+1
03607 F89F 7A 40CB          DEC     LNSCNT
03608 F8A2 26 E9            BNE     LRVLP
03609 F8A4 7F 40C9 CANFNN   CLR     LNSNDX    CLEAR POINTER TO
                                                 INDICATE NOT FOUND
03610 F8A7 7F 40CA          CLR     LNSNDX+1
03611 F8AA 39               RTS

                   ****************************************
                                          ******************
                   *
                   * ROUTINE TO SEARCH FOR SPECIFIC EMERGENCY
                                          LINE
                   * CALLING SEQUENCE SAME AS ROUTINE 'FIND'
                   *
                   **
                                          *******************
                                          *******************
                                          *******************
                                          ************

03614 F8AB 96 B1   FINEMG   LDA A   EMGNUM    NUMBER OF EMERGENCY
                                                 LINES IN SYSTEM
03615 F8AD 27 F5            BEQ     CANFNN    IF NONE, HARD TO FIND
                                                 ONE
03616 F8AF B7 40CB          STA A   LNSCNT    SEARCH COUNTER
03617 F8B2 FE 410D          LDX     EMGFIR    >FIRST EMERGENCY LINE
03618 F8B5 27 ED            BEQ     CANFNN
03619 F8B7 FF 40C9          STX     LNSNDX    INITIALIZE SEARCH
                                                 INDEX
                   *
03620 F8BA 8D 1B   FXLX     BSR     COMLNO    COMPARE LINE >BY
                                                 LNSNDX WITH SOUGHT
                                                 FOR LINE
03621 F8BC 26 01            BNE     NXXE
03622 F8BE 39               RTS
                   *
03623 F8BF 8D 08   NXXE     BSR     FNXEMG    GOT TO NEXT EMERGENCY
                                                 AND TEST
03624 F8C1 7A 40CB          DEC     LNSCNT
03625 F8C4 26 F4            BNE     FXLX
03626 F8C6 7E F8A4          JMP     CANFNN    LEAVE IF CANNOT FIND
                                                 IT

                   ******************************
                                          *******************
                                          ***************

                   *
```

```
                     * ROUTINE TO ADVANCE ONE LINE IN EMERGENCY
                                                  SEARCH
                     *
                     **
                                                  ******************
                                                  ******************
                                                  ******************
                                                  ************

03629 F8C9 86 3B   FNXEMG LDA A  #EMGLGT   LENGTH OF EMERGENCY
                                                   LINE
03630 F8CB BB 40CA        ADD A  LNSNDX+1   INCREMENT LOW PART
                                                    OF LINE ADDRESS
03631 F8CE 24 03          BCC    NXD      GO ON IF NEED BE
03632 F8D0 7C 40C9        INC    LNSNDX
03633 F8D3 B7 40CA NXD    STA A  LNSNDX+1
03634 F8D6 39             RTS

                     ***************************************
                                                  ******************
                                                  ******************
                                                  *******

                     *
                     * ROUTINE TO COMPARE CURRENT LINE # WITH
                                                  SOUGHT FOR LINE
                     *
                     **
                                                  ******************
                                                  ******************
                                                  ******************
                                                  ************

03637 F8D7 FE 40C9 COMLNO LDX    LNSNDX   >LINE
03638 F8DA 09             DEX
03639 F8DB 09             DEX
03640 F8DC A6 01          LDA A  1,X      LOW BYTE OF LINE
                                                  NMMBER
03641 F8DE B1 40C8        CMP A  LNSVAL+1
03642 F8E1 26 07          BNE    NGGRE
03643 F8E3 A6 00          LDA A  0,X
03644 F8E5 84 7F          AND A  #$7F     ZAP FLAGS
03645 F8E7 B1 40C7        CMP A  LNSVAL
03646 F8EA 39      NGGRE  RTS

                     *******************************
                                                  ******************
                                                  ******************
                                                  ************

                     *
                     * ROUTINE TO CHECK TO SEE IF DELIMETER IS A
                                                  SLASH
                     *
                     **
                                                  ******************
                                                  ******************
                                                  ******************
                                                  ************

03649 F8EB FE 4062 IZSLSH LDX    TXTPTR
03650 F8EE A6 00          LDA A  0,X
03651 F8F0 81 2F          CMP A  #'/
03652 F8F2 39             RTS
```

```
**************************************
*
* LOOK UP INPUT VALUES TO DETERMINE MATCHING
                         BINARY NO
* INPUT: X => INPUT STRING
* OUTPUT: LKPVAL = BINARY VALUE (1 BYTE)
*
**
                         ******************
                         ******************
                         ******************
                         ************

03655       F8F3     LOOKUP EQU    *
03656 F8F3 4F               CLR A          SET RETURN TO NOT
                                              FOUND
03657 F8F4 43               COM A
03658 F8F5 B7 40EA          STA A  LKPVAL
03659 F8F8 A6 00            LDA A  0,X     GET FIRST CHARACTER
                                              OF STRING
03660 F8FA E6 02            LDA B  2,X     GET LAST CHARACTER OF
                                              STRING
03661 F8FC CE FE32          LDX    #LKPTBL POINT INDEX AT TABLE
03662       F8FF     LKPTST EQU    *
03663 F8FF 8C FEA2          CPX    #[illegible] SEE IF END OF TABLE
03664 F902 27 2B            BEQ    LKPNTF  IF END, VALUE NOT
                                              FOUND
03665 F904 A1 00            CMP A  0,X     COMPARE FIRST
                                              CHARACTER
03666 F906 27 05            BEQ    LKPCM3  EQUAL--TRY LAST
                                              CHARACTER
03667       F908     LKPNXT EQU    *
03668 F908 BD E5FD          JSR    ADD4    POINT AT NEXT TABLE
                                              ENTRY
03669 F90B 20 F2            BRA    LKPTST  GO TRY IT
03670       F90D     LKPCM3 EQU    *
03671 F90D E1 02            CMP B  2,X     SEE IF LAST CHARACTER
                                              MATCHES
03672 F90F 26 F7            BNE    LKPNXT  NO--TRY NEXT TABLE
                                              ENTRY
03673       F911     LKPCM2 EQU    *
03674 F911 FF 40EB          STX    LKPNDX  SAVE TABLE POINTER
03675 F914 FE 4062          LDX    TXTPTR  GET TEXT POINTER
03676 F917 A6 01            LDA A  1,X     GET MIDDLE CHARACTER
03677 F919 FE 40EB          LDX    LKPNDX  RELOAD TABLE POINTER
03678 F91C A1 01            CMP A  1,X     CHECK SECOND
                                              CHARACTERS
03679 F91E 27 0A            BEQ    LKPFND  MATCH--EXIT
                                              TRIUMPHANTLY
03680 F920 FE 4062          LDX    TXTPTR  GET FIRST CHARACTER
                                              BACK
03681 F923 A6 00            LDA A  0,X
03682 F925 FE 40EB          LDX    LKPNDX
03683 F928 20 DE            BRA    LKPNXT  TRY NEXT TABLE ENTRY
03684       F92A     LKPFND EQU    *
03685 F92A A6 03            LDA A  3,X     GET VALUE FROM TABLE
03686 F92C B7 40EA          STA A  LKPVAL  SET RETURN VALUE
03687 F92F 39        LKPNTF RTS            RETURN

*******************************
                         ******************
```

```
                                                    ******************
                                                    ************
                     *
                     * ROUTINE TO MAP A TEMPERATURE INTO A HEX
                                                    VALUE
                     *
                     **
                                                    ******************
                                                    ******************
                                                    ******************
                                                    ************

F930 86 01     MANGLE LDA A  #1         RANGE CHECK
F932 C6 90            LDA B  #400-256
F934 BD FD7C          JSR    RANGE      MAKE SURE IS 400 OR
                                          LOWER

F937 7F 40C3          CLR    BIGF       INDICATE NOT BIG
F93A CE FECB          LDX    #TEMTB2     GUESS WILL BE SMALL
F93D B6 40DA          LDA A  XTRVAL     IF NONZERO, BIG
F940 27 0D            BEQ    SMALL
F942 73 40C3          COM    BIGF
F945 B6 40DB          LDA A  XTRVAL+1
F948 80 FF            SUB A  #255       ZAPPO!
F94A CE FEA2          LDX    #TEMTBL     >BIG TABLE
F94D 20 03            BRA    CLZIP
F94F B6 40DB   SMALL  LDA A  XTRVAL+1    GET SMALL VALUE
F952 5F        CLZIP  CLR B
F953 A1 00     SMLCP  CMP A  0,X        SEE IF FOUND ONE >=
F955 24 04            BCC    GOTBG
F957 08               INX
F958 5C               INC B
F959 20 F8            BRA    SMLCP

F95B CB 0A     GOTBG  ADD B  #10        FUDGE
F95D B6 40C3          LDA A  BIGF       SEE IF NEED TO FUDGE
                                          SOME MORE
F960 26 02            BNE    OKABV
F962 CB 29            ADD B  #TEMTB2-TEMTBL
F964 53        OKABV  COM B             REVERSE IT TO MAKE
                                          THINGS GO RIGHT
                                          WAY
F965 F7 40DB          STA B  XTRVAL+1
F968 7F 40DA          CLR    XTRVAL     CLEANLINESS IS
                                          ADJACENT TO
                                          GODLINESS
F96B 39               RTS

                     ************************************
                                                    ******************
                                                    ****
                     *
                     * UNDO THE EFFECTS OF A MANGLE
                     *
                     **
                                                    ******************
                                                    ******************
                                                    ******************
                                                    ************

F96C CE FE98   UNMGLE LDX    #TEMTBL-10
F96F FF 40EB          STX    LKPNDX
```

```
03724 F972 7F 40EA          CLR     LKPVAL    ZERO
03725 F975 4F               CLR A
03726 F976 F6 40E6          LDA B   CVDTMP+1
03727 F979 53               COM B             UNREVERSE IT
03728 F97A C1 32            CMP B   #TEMTB2-TEMTBL+9
03729 F97C 22 03            BHI     UNMNCM
03730 F97E 73 40EA          COM     LKPVAL
03731      F981      UNMNCM EQU     *
03732 F981 FB 40EC          ADD B   LKPNDX+1
03733 F984 B9 40EB          ADC A   LKPNDX
03734 F987 F7 40EC          STA B   LKPNDX+1
03735 F98A B7 40EB          STA A   LKPNDX
03736 F98D FE 40EB          LDX     LKPNDX
03737 F990 4F               CLR A
03738 F991 E6 00            LDA B   0,X
03739 F993 FB 40EA          ADD B   LKPVAL
03740 F996 89 00            ADC A   #0
03741 F998 B7 40E5          STA A   CVDTMP
03742 F99B F7 40E6          STA B   CVDTMP+1
03743 F99E 39               RTS

                     ************************************
                                                  ******************
                                                  ******************
                                                  *************
                     *
                     * ROUTINE TO MOVE A FIXED NUMBER OF
                                                  HALFWORDS
                     *
                     **
                                                  ******************
                                                  ******************
                                                  ******************
                                                  ************

03746 F99F B6 40D4 MVC      LDA A   MVCCNT    DOUBLE THE COUNTER
03747 F9A2 48      MVCP     ASL A             DOUBLE IT
03748 F9A3 B7 40D4 MVCPP    STA A   MVCCNT
03749 F9A6 FE 40D0 MVCLP    LDX     ST1PTR
03750 F9A9 A6 00            LDA A   0,X
03751 F9AB 08               INX
03752 F9AC FF 40D0          STX     ST1PTR
03753 F9AF FE 40D2          LDX     ST2PTR
03754 F9B2 A7 00            STA A   0,X
03755 F9B4 08               INX
03756 F9B5 FF 40D2          STX     ST2PTR
03757 F9B8 7A 40D4          DEC     MVCCNT
03758 F9BB 26 E9            BNE     MVCLP
03759 F9BD 39               RTS

                     ************************************
                                                  ******************
                                                  ******************
                                                  *************
                     *
                     * TEST CHARACTER POINTED TO BY INDEX FOR
                                                  NUMERIC
                     * INPUT: X => CHARACTER
                     * OUTPUT:  CONDITION CODE C SET = NOT
                                                  NUMERIC, UNSET =
                                                  NUMERIC
                     *
                     **
```

```
                                               *******************
                                               *******************
                                               *******************
                                               ************
03762      F9BE     NUMERC EQU    *
03763 F9BE 86 30           LDA A  #$30
03764 F9C0 A1 00           CMP A  0,X
03765 F9C2 22 07           BHI    NUMNOT
03766 F9C4 86 39           LDA A  #$39
03767 F9C6 A1 00           CMP A  0,X
03768 F9C8 25 01           BCS    NUMNOT   NOT NUMERIC
03769 F9CA 39              RTS             NUMERIC--RETURN WITH
                                              CARRY CLARED
03770      F9CB     NUMNOT EQU    *
03771 F9CB 0D              SEC             SET CARRY FOR NOT
                                              NUMERIC
03772 F9CC 39              RTS

                    *************************************
                                               *******************
                                               *******************
                                               *
                    *
                    * ROUTINE TO RESET ALL THE PRINT/STOP FLAGS
                                               IN ALL LINES
                    *
                    **
                                               *******************
                                               *******************
                                               *******************
                                               ************
03775 F9CD BD FA2E PFGCLR JSR     LSPREP
03776 F9D0 27 0C          BEQ     OUTV
03777 F9D2 BD FA43 PFLP   JSR     GFLGS
03778 F9D5 84 7F          AND A   #$7F
03779 F9D7 A7 00          STA A   0,X
03780 F9D9 BD FA4B        JSR     LSPINC
03781 F9DC 26 F4          BNE     PFLP
03782 F9DE 39      OUTV   RTS

                   ***************************************
                   *
                   * ROUTINES TO DECIDE WHICH SET OF BITS IS
                                               REQUIRED
                   * BY THE CURRENT EDIT MODE.  ST1PTR AND
                                               ST2PTR ARE THEN
                                               SET TO
                   * THE ENABLE AND VALUE BIT ADDRESSES,
                                               RESPECTIVELY
                   *
                   **
                                               *******************
                                               *******************
                                               *******************
                                               ***********
03785      F9DF    PICKMB EQU     *
03786 F9DF CE 4129        LDX     #EDTMYS-1    POINT AT MEMORY
                                                  SETTING VALUE
                                                  BITS
```

```
03787 F9E2 FF 40D2          STX     ST2PTR
03788 F9E5 CE 4125          LDX     #EDTMYE-1   POINT AT MEMORY
                                                   SETTING VALUE
                                                   BITS

03789 F9E8 8D 09     PICRIT BSR     PICKEM
03790 F9EA FF 40D0          STX     ST1PTR     SAVE NEW VALUE BIT
                                                  ADDRESS
03791 F9ED FE 40D2          LDX     ST2PTR     RELOAD FIRST VALUE
03792 F9F0 8D 01            BSR     PICKEM
03793 F9F2 39               RTS

03795      F9F3      PICKEM EQU     *
03796 F9F3 7D 4115          TST     EDTEMG     IF EDITING EMERGENCY,
                                                  BASIC VALUES OK

03797 F9F6 26 10            BNE     PKMXIT
03798 F9F8 7D 4118          TST     EDTMOD     IF IN 'ON' MODE,
                                                  BASIC GOOD, TOO

03799 F9FB 2B 0B            BMI     PKMXIT
03800 F9FD BD E3F4          JSR     ADD16      POINT AT X1 AREA
03801 FA00 7D 4118          TST     EDTMOD
03802 FA03 27 03            BEQ     PKMXIT
03803 FA05 BD E2E2          JSR     ADD42      POINT AT X2 AREA
03804 FA08 39        PKMXIT RTS

03806      FA09      PICKDB EQU     *
03807 FA09 CE 4121          LDX     #EDTDRS-1    POINT AT DRIVER
                                                    SETTING VALUE
                                                    BITS

03808 FA0C FF 40D2          STX     ST2PTR
03809 FA0F CE 411D          LDX     #EDTDRE-1    POINT AT DRIVER
                                                    SETTING ENABLE
                                                    BITS

03810 FA12 20 D4            BRA     PICRIT

03812      FA14      PICKIB EQU     *
03813 FA14 7D 4115          TST     EDTEMG     EMERGENCIES GET
                                                  INPUTS

03814 FA17 26 05            BNE     PIOK
03815 FA19 7D 4118          TST     EDTMOD     SEE IF IN PROPER MODE
03816 FA1C 2B 0B            BMI     PIYELL     INPUT NOT VALID IN
                                                  THIS MODE

03817      FA1E      PIOK   EQU     *
03818 FA1E CE 4131          LDX     #EDTEIS-1    POINT AT EMERGENCY
                                                    INPUT VALUE
                                                    BITS

03819 FA21 FF 40D2          STX     ST2PTR
03820 FA24 CE 412D          LDX     #EDTEIE-1    POINT AT EMERGENCY
                                                    INPUT ENABLE
                                                    BITS

03821 FA27 20 BF            BRA     PICRIT

03823 FA29 86 0B     PIYELL LDA A   #ERNIPM
03824 FA2B 7E FD8C          JMP     YELL

                     *************************************
                                                   ****************
                                                   ***

                     *
                     * ROUTINES NEEDED IN PROCESS OF SCANNING
                                                   THROUGH ALL
                                                   DRUM LINES

                     *
                     **
```

```
                                                            ***************
                                                            ***************
                                                            ***************
                                                            ***************
                                                            *****

03827 FA2E 96 B0    LSPREF LDA A  LINCNT    GET NUMBER OF LINES
03828 FA30 B7 40CD         STA A  RESCNT    PUT IN COUNTER FOR
                                               RESOLUTION
03829 FA33 B7 40C6         STA A  RSLVQM    INDICATE NOT RESOLVED
03830 FA36 27 06           BEQ    LSNN      EXIT IF THERE ARE NO
                                               LINES
03831 FA38 FE 4111         LDX    FIRLIN    >FIRST DRUM LINE IN
                                               SYSTEM
03832 FA3B FF 40CE         STX    RESIDX    INITIALIZE >LINE
                                               BEING RESOLVED
03833 FA3E 39       LSNN   RTS

03835 FA3F 8D 02    GFLGS1 BSR    GFLGS
03836 FA41 20 04           BRA    GF1
03837 FA43 FE 40CE GFLGS   LDX    RESIDX
03838 FA46 09              DEX
03839 FA47 09       GF1    DEX
03840 FA48 A6 00           LDA A  0,X
03841 FA4A 39              RTS

03843 FA4B 86 67    LSPINC LDA A  #LINLGT    ADD LENGTH OF LINE
                                               TO POINTER
03844 FA4D BB 40CF         ADD A  RESIDX+1
03845 FA50 24 03           BCC    N1S
03846 FA52 7C 40CE         INC    RESIDX
03847 FA55 B7 40CF N1S     STA A  RESIDX+1
03848 FA58 7A 40CD         DEC    RESCNT
03849 FA5B 39              RTS

03851 FA5C FE 40CE IZNEDT  LDX    RESIDX    >CURRENT LINE
03852 FA5F BC 4119         CPX    EDTWHR    SEE IF SAME AS
                                               CONTENT OF BUFFER
03853 FA62 39              RTS

                    ******************************************
                                                    ******************
                                                    ********
                    *
                    * ROUTINE TO RESOLVE ALL DRUM LINE NUMBERS
                                                    TO ADDRESSES
                    * SETS RSLVQM TO ZERO IF SUCCESSFUL
                    * IF FAILS, RESIDX > FAILED LINE
                    *
                    **
                                                    ******************
                                                    ******************
                                                    ******************
                                                    ************

03856 FA63 8D C9    RSOLVE BSR    LSPREF    PREPARE TO SCAN THE
                                               LINES
03857 FA65 27 0A           BEQ    EDTONF    IF NO LINES, BUFFER
                                               ONLY

03859 FA67 8D F3    RLRPX  BSR    IZNEDT    SEE IF UNDER
                                               CONSTRUCTION
```

```
03860 FA69 27 02              BEQ    NORSE     IF SO, DON'T RESOLVE
03861 FA6B 8D 58              BSR    RLRP

03863 FA6D 8D DC   NORSE      BSR    LSPINC    GO TO NEXT DRUM LINE
03864 FA6F 26 F6              BNE    RLRPX
03865 FA71 B6 4116 EDTONF     LDA A  EDTING
03866 FA74 27 0D              BEQ    NERV
03867 FA76 B6 4115            LDA A  EDTEMG    SEE IF EDITING
                                                  EMERGENCY LINE
03868 FA79 26 08              BNE    NERV
03869 FA7B CE 411E            LDX    #EDTLIN
03870 FA7E FF 40CE            STX    RESIDX
03871 FA81 8D 42              BSR    RLRP      RESOLVE LINE BEING
                                                  EDITED

                   ****************************************
                                                      **************************
                                                      ****************
                   *
                   * RESOLVE EMERGENCY LINES
                   *
                   **
                                                      ******************
                                                      ******************
                                                      ******************
                                                      ************

03874 FA83 96 B1   NERV       LDA A  EMGNUM    NUMBER OF EMERGENCY
                                                  LINES
03875 FA85 27 29              BEQ    ALRSV     IF NONE, SKIP
03876 FA87 B7 40CD            STA A  RESCNT

03878 FA8A B6 4116            LDA A  EDTING
03879 FA8D 27 0E              BEQ    NEGOE
03880 FA8F B6 4115            LDA A  EDTEMG
03881 FA92 27 09              BEQ    NEGOE
03882 FA94 CE 411E            LDX    #EDTLIN    >EMERGENCY LINE
                                                  BEING EDITED
03883 FA97 FF 40CE            STX    RESIDX    :>LINE BEING RESOLVED
03884 FA9A BD FB25            JSR    RSVEG     RESOLVE THE EMERGENCY
                                                  LINE

03886 FA9D FE 410D NEGOE      LDX    EMGFIR
03887 FAA0 27 0E              BEQ    ALRSV
03888 FAA2 FF 40CE            STX    RESIDX     >EMERGENCY LINES

03890 FAA5 8D B5   RRLPXY     BSR    IZNEDT    SEE IF UNDER
                                                  CONSTRUCTION
03891 FAA7 27 02              BEQ    NONOZ
03892 FAA9 8D 7A              BSR    RSVEG
03893 FAAB BD FAB4 NONOZ      JSR    EMGINC
03894 FAAE 26 F5              BNE    RRLPXY

03896 FAB0 7F 40C6 ALRSV      CLR    RSLVQM
03897 FAB3 39                 RTS

03899 FAB4 86 3B   EMGINC     LDA A  #EMGLGT    LENGTH OF EMERGENCY
                                                  LINE
03900 FAB6 BB 40CF            ADD A  RESIDX+1
03901 FAB9 24 03              BCC    ZEX
03902 FABB 7C 40CE            INC    RESIDX
03903 FABE B7 40CF ZEX        STA A  RESIDX+1
03904 FAC1 7A 40CD            DEC    RESCNT    SEE IF DONE
```

```
03905 FAC4 39             RTS

                     ***********************************
                                                  ******************
                                                  ******************
                                                  *********
                     *
                     * ROUTINES FOR USE BY RESOLVER
                     *
                     **
                                                  ******************
                                                  ******************
                                                  ******************
                                                  ***********

03908 FAC5 BD FA3F RLRP   JSR     GFLGS1
03909 FAC8 A6 02          LDA A   2,X
03910 FACA AB 01          ADD A   1,X
03911 FACC 27 31          BEQ     FNDD
03912 FACE BD FA3F        JSR     GFLGS1
03913 FAD1 84 80          AND A   #$80
03914 FAD3 26 0F          BNE     SCOTS     IF SO, DO NOT DO IT
                                               AGAIN

03916 FAD5 FE 40CE        LDX     RESIDX
03917 FAD8 BD E5F4        JSR     ADD16     SKIP OUTPUT DRIVERS
03918 FADB BD E2E4        JSR     SKPTST    SKIP THE TEST
03919 FADE 8D 20          BSR     ZAPPO     SUBROUTINE TO SAVE
                                               CORE
03920 FAE0 8A 80          ORA A   #$80
03921 FAE2 A7 00          STA A   0,X

03923 FAE4 BD FA3F SCOTS  JSR     GFLGS1
03924 FAE7 84 40          AND A   #$40      SEE IF FIRST TEST IS
                                               RESOLVED
03925 FAE9 26 14          BNE     FNDD      IF SET, DON'T DO THIS
                                               ONE EITHER
03926 FAEB FE 40CE        LDX     RESIDX
03927 FAEE BD E5F4        JSR     ADD16
03928 FAF1 BD E2E4        JSR     SKPTST
03929 FAF4 BD E2E4        JSR     SKPTST
03930 FAF7 08             INX
03931 FAF8 08             INX
03932 FAF9 8D 05          BSR     ZAPPO     SUBROUTINE TO SAVE
                                               CORE
03933 FAFB 8A 40          ORA A   #$40
03934 FAFD A7 00          STA A   0,X
03935 FAFF 39      FNDD   RTS

03937 FB00 FF 40D0 ZAPPO  STX     ST1PTR    SAVE FOR A WHILE
03938 FB03 EE 00   ZAPP2  LDX     0,X       OBTAIN LINE NUMBER
                                               UNRESOLVED
03939 FB05 27 18          BEQ     NXZ1      IF NO LINE NUMBER,
                                               NULL EXIT
03940 FB07 FF 40C7        STX     LNSVAL    SAVE IN SEARCH VALUE
03941 FB0A BD F863        JSR     FIND      GO LOK FOR IT
03942 FB0D FE 40D0 ADCOPY LDX     ST1PTR    >LINE NUMBER
03943 FB10 B6 40C9        LDA A   LNSNDX    GET ADDRESS
03944 FB13 27 0B          BEQ     MIST      IF ZERO, DID NOT FIND
                                               IT
03945 FB15 A7 00          STA A   0,X
03946 FB17 B6 40CA        LDA A   LNSNDX+1
```

```
FB1A A7 01              STA A   1,X
FB1C BD FA3F            JSR     GFLGS1
FB1F 39         NXZ1    RTS

FB20 32         MIST    PUL A
FB21 32                 PUL A
FB22 32                 PUL A
FB23 32                 PUL A
FB24 39                 RTS

                *****************************
                                                            ******************
                                                            ******************

                *
                * SUBROUTINE TO RESOLVE AN EMERGENCY LINE
                * .
                **
                                                            ******************
                                                            ******************
                                                            ******************
                                                            ************

FB25 BD FA3F RSVEG      JSR     GFLGS1     F>FLAG BYTE
FB28 09                 DEX
FB29 FF 40C1            STX     RSTEMP     SET UP FOR BITVEC
FB2C 86 08              LDA A   #NDRMS     COUNT THEM
FB2E B7 40D2            STA A   ST2PTR
FB31 7F 40D3            CLR     ST2PTR+1     BIT NUMBER
FB34 FE 40CE            LDX     RESIDX     >LINE
FB37 BD E2E4            JSR     SKPTST
FB3A FF 40D0            STX     ST1PTR     SETUP FOR ZAPPO

FB3D B6 40D3 LXXE       LDA A   ST2PTR+1     CURRENT BIT NUMBER
FB40 BD E42D            JSR     BITVNS     GET MASK AND >BYTE
FB43 E4 00              AND B   0,X        1 => ALREADY RESOLVED
FB45 26 0F              BNE     DIDX
FB47 FE 40D0            LDX     ST1PTR     >CURRENT PLACE IN
                                              LINE
FB4A 8D B7              BSR     ZAPP2
FB4C B6 40D3            LDA A   ST2PTR+1     GET BIT NUMBER
                                                AAGAAIN
FB4F BD E42D            JSR     BITVNS
FB52 EA 00              ORA B   0,X        SET THEFLAG BIT
FB54 E7 00              STA B   0,X

FB56 FE 40D0 DIDX       LDX     ST1PTR
FB59 08                 INX
FB5A 08                 INX
FB5B FF 40D0            STX     ST1PTR
FB5E 7C 40D3            INC     ST2PTR+1     GO TO NEXT BIT IN
                                                MASK
FB61 7A 40D2            DEC     ST2PTR
FB64 26 D7              BNE     LXXE
FB66 39                 RTS

                ***********************************
                                                            *****************
                                                            *****************
                                                            *

                *
                * ROUTINE TO EITHER RESOLVE ALL THE LINES OR
                                                            YELL.
```

```
* IF FAILS, OUTS OUT THE LINE WITH THE BAD
                                        LINE NUMBER
* AS WELL AS THE MISSING LINE
*
**
                                        ****************
                                        ****************
                                        ****************
                                        ****************
                                        *

03989 FB67 BD FA63 RSVDYL JSR    RSOLVE   MAKE SURE ALL LINES
                                             ARE THREE
03990 FB6A B6 40C6        LDA A  RSLVCN   CHECK TO MAKE SURE [illegible]
                                             WAS ALL DONE
03991 FB6D 26 01          BNE    STILU
03992 FB6F 39             RTS             RETURN OF THEY ALL
                                             RESOLVED

03994 FB70 BD FA43 STILU  JSR    GFLGS    GET LINE NUMBER OF
                                             OFFENDING LINE
03995 FB73 84 7F          AND A  #$7F     REMOVE THE FLAGS
03996 FB75 B7 40E5        STA A  CVDTMP
03997 FB78 A6 01          LDA A  1,X      GET LO BYTE OF LINE
                                             NUMBER
03998 FB7A B7 40E6        STA A  CVDTMP+1
03999 FB7D FE 4066        LDX    TXTOUT   >INOT OUTPUT UBFFER
04000 FB80 BD F6EC        JSR    CVD      CONVERT TO NUMBER OF
                                             DISPLAY
04001 FB83 BD F6A7        JSR    CMAOUT   ADD A COMMA
04002 FB86 FE 40C7        LDX    LNSVAL   GET LINE NUMBER
                                             SOUGHT FOR
04003 FB89 FF 40E5        STX    CVDTMP
04004 FB8C FE 4066        LDX    TXTOUT
04005 FB8F BD F6EC        JSR    CVD
04006 FB92 BD F69F        JSR    SPCOUT   PUT A SPACE IN THE
                                             OUTPUT LINE
04007 FB95 86 05          LDA A  #ERUNDF.  UNDEFINED LINE
                                             NUMBER IN PROGRAM
04008 FB97 7E FD8C        JMP    YELPOP
                    ******************************************
                                        *****************
                                        *******
*
* ROUTINE TO SETUP >> CURRENT DRUM LINE IN
                                        DRUM LINE TABLE.
* REQUIRES XTRACT TO HAVE PLACED DRUM NUMBER
                                        IN XTRDGT,
* SETS UP ST1PTR AS >> ACTIVE LINE FOR THAT
                                        DRUM.
*
**
                                        *****************
                                        *****************
                                        *****************
                                        **************

04011 FB9A B6 40DC SELDRM LDA A  XTRDGT   GET HIGH ORDER DIGIT
04012 FB9D 84 0F          AND A  #$F
04013 FB9F 81 08          CMP A  #NDRMS
04014 FBA1 23 05          BLS    OKDML
04015 FBA3 86 18          LDA A  #ERRTND
```

```
04016 FBA5 7E FD8C          JMP     YELL
04017 FBA8 97 B6    OKDML   STA A   CDMDNO    SAVE DRUM NUMBER FOR
                                                 CLEARING COUNTERS
04018 FBAA 4A               DEC A             REDUCE FOR RIGHT
                                                 OFFSET
04019 FBAB CE 0090          LDX     #LINLST   >LIST OF DRUM LINES
04020 FBAE FF 40D0  SLDMPT  STX     ST1PTR    >HEAD OF ACTIVE DRUM
                                                 LINE LIST
04021 FBB1 48               ASL A
04022 FBB2 BB 40D1          ADD A   ST1PTR+1
04023 FBB5 24 03            BCC     NZ8
04024 FBB7 7C 40D0          INC     ST1PTR
04025 FBBA B7 40D1  NZ8     STA A   ST1PTR+1
04026 FBBD FE 40D0          LDX     ST1PTR
04027 FBC0 39               RTS

                    ***********************************
                                          *******************
                                          ****

                    *
                    * ROUTINE WHICH TAKES A LINE NUMBER FROM THE
                                          CONNAND BUFFER
                    * AND RETURNS A POINTER TO THE DRUM LINE IN
                                          MEMORY.
                    * DRUN LINE POINTER IS RESTURNED IN LNSNDX.
                    *
                    **
                                          *******************
                                          *******************
                                          *******************
                                          ************

04030 FBC1 BD F7DA  SELLIN  JSR     XTRACT    LEARN LINE NUMBER
04031 FBC4 FE 40DA          LDX     XTRVAL    SEE WHERE TO ROTATE
04032 FBC7 FF 40C7          STX     LNSVAL    SEARCH FOR IT
04033 FBCA BD F863          JSR     FIND
04034 FBCD FE 40C9          LDX     LNSNDX
04035 FBD0 26 05            BNE     FCMDM
04036 FBD2 86 36            LDA A   #ERRSLN
04037 FBD4 7E FD8C- ..      JMP     YELPOP
04038 FBD7 39       FCMDM   RTS

                    ***************************************
                                          *******************
                                          *******************
                                          *******

                    *
                    * ROUTINES TO SET AND CLEAR BITS IN STRINGS.
                    * CALLED WITH IDX POINTING TO BEGIJNING OF
                                          STRING -1,
                    * EXTRACTS ALL VALUES FROM COMMAND LINE,
                                          SETS ALL BITS
                    * IN STRING.
                    *
                    **
                                          *******************
                                          *******************
                                          *******************
                                          ************

04041 FBD8 FF 40D0  SETAN1  STX     ST1PTR    SAVE > MASK
04042 FBDB 8D 7D            BSR     CLBTFG    CLEAR FLAGS
04043 FBDD BD FC6B          JSR     SET1ST    SET FIRST FLAG
```

```
04044 FBE0 20 24            BRA    STCLCM

04046 FBE2 FF 40D2 CLRAN1  STX    ST2PTR
04047 FBE5 8D 73           BSR    CLBTFG   CLEAR FLAGS
04048 FBE7 8D 7B           BSR    CLR2ND   SAY CLEAR SECOND
04049 FBE9 20 1B           BRA    STCLCM

                   ****************************************
                                              ******************
                                              ******************
                                              ***
                   *
                   * ROUTINES WHICH SET OR CLEAR BITS IN TWO
                                              STRINGS.
                   * WALK THROUGH COMMAND LINE VIA XTRACT, DOIG
                                              ALL
                   *
                   **
                                              ******************
                                              ******************
                                              ******************
                                              ************

04052 FBEB FF 40D2 SETAN2  STX    ST2PTR   SAVE SECOND POINTSR
04053 FBEE 8D 6A   SETN2N  BSR    CLBTFG   CLEAR FLAGS
04054 FBF0 8D 76           BSR    SETBTH   SAY SET BOTH STRINGS
04055 FBF2 20 12           BRA    STCLCM

04057 FBF4 FF 40D2 CLRAN2  STX    ST2PTR
04058 FBF7 8D 61   CLRN2N  BSR    CLBTFG   CLEAR FLAGS
04059 FBF9 8D 66           BSR    CLRBTH   SAY CLEAR BOTH
                                              STRINGS
04060 FBFB 20 09           BRA    STCLCM

04062      FBFD    ST1CL2  EQU    *
04063 FBFD FF 40D2         STX    ST2PTR
04064      FC00    STCL2N  EQU    *
04065 FC00 8D 58           BSR    CLBTFG   CLEAR BIT FLAGS
04066 FC02 8D 67           BSR    SET1ST   SAY SET FIRST
04067 FC04 8D 5E           BSR    CLR2ND   SAY CLEAR SECOND
04068      FC06    STCLCM  EQU    *
04069 FC06 BD F8EB         JSR    IZSLSH   SEE IF MUST DO THEM
                                              ALL
04070 FC09 26 24           BNE    SC2G
04071 FC0B FE 40D0         LDX    ST1PTR
04072 FC0E 86 04           LDA A  #4
04073 FC10 7D 40F2         TST    BITFL1   SEE IF SET OR CLEAR
04074 FC13 8D 0D           BSR    SCEVAL   SEE WHETHER TO SET OR
                                              CLEAR
04075 FC15 86 04           LDA A  #4
04076 FC17 FE 40D2         LDX    ST2PTR
04077 FC1A 7D 40F3         TST    BITFL2   SEE IF SET OR CLEAR
04078 FC1D 8D 03           BSR    SCEVAL   SEE WHETHER TO SET OR
                                              CLEAR
04079 FC1F 7E FDA5         JMP    EXIT

04081      FC22    SCEVAL  EQU    *
04082 FC22 2B 07           BMI    ZE04     CLEAR
04083 FC24 27 08           BEQ    SCALXT   IF ZERO, IGNORE
                                              SECOND
04084 FC26 BD F855         JSR    FENCES   SET ALL BITS
04085 FC29 20 03           BRA    SCALXT
```

```
04086 FC2B BD F85F ZE04   JSR     ZEROES
04087 FC2E 39      SCALXT RTS

04089      FC2F    SC2G   EQU     *
04090 FC2F BD F7DA        JSR     XTRACT
04091 FC32 BD FD79        JSR     RANG32
04092 FC35 B6 40DB        LDA A   XTRVAL+1   GET VALUE OF
                                               ARGUMENT
04093 FC38 4A             DEC A
04094 FC39 FE 40D0        LDX     ST1PTR
04095 FC3C 7D 40F2        TST     BITFL1     SEE IF SET OR CLEAR
04096 FC3F 8D 0E          BSR     SCEVBT
04097      FC41    SC2BIT EQU     *
04098 FC41 FE 40D2        LDX     ST2PTR
04099 FC44 B6 40DB        LDA A   XTRVAL+1
04100 FC47 4A             DEC A
04101 FC48 7D 40F3        TST     BITFL2     SEE IF SET OR CLEAR
04102 FC4B 8D 02          BSR     SCEVBT
04103 FC4D 20 E0          BRA     SC2G

04105      FC4F    SCEVBT EQU     *
04106 FC4F 2B 06          BMI     SCC2BT     CLEAR
04107 FC51 27 06          BEQ     SCBTXT     IGNORE
04108 FC53 8D 2D          BSR     SETBIT     SET APPROPRIATE BIT
04109 FC55 20 02          BRA     SCBTXT
04110      FC57    SCC2BT EQU     *
04111 FC57 8D 34          BSR     CLRBIT     CLEAR APPROPRIATE
                                               VALUE BIT
04112      FC59    SCBTXT EQU     *
04113 FC59 39             RTS

04115      FC5A    CLBTFG EQU     *          ZERO BIT FLAGS
04116 FC5A 7F 40F2        CLR     BITFL1
04117 FC5D 7F 40F3        CLR     BITFL2
04118 FC60 39             RTS
04120      FC61    CLRBTH EQU     *          SET BOTH BIT FLAGS TO
                                               CLEAR
04121 FC61 73 40F2        COM     BITFL1
04122 FC64 73 40F3 CLR2ND COM     BITFL2     SET SECOND FLAG TO
                                               CLEAR
04123 FC67 39             RTS

04125      FC68    SETBTH EQU     *
04126 FC68 7C 40F3        INC     BITFL2
04127 FC6B 7C 40F2 SET1ST INC     BITFL1     SET FIRST FLAG TO SET
04128 FC6E 39             RTS

                   ****************************************
                                     ******************
                                     ************
                   *
                   * INITIALIZE ANALOG PIA
                   *
                   **
                                     ******************
                                     ******************
                                     ******************
                                     ***********

04131 FC6F CE 0000 SETANA LDX     #0
04132 FC72 FF 0396        STX     ANAA
04133 FC75 CE 1FFF        LDX     #$1FFF
04134 FC78 FF 0394        STX     MUXCMP
```

```
04135 FC7B CE 3C3C        LDX    #$3C3C
04136 FC7E FF 0396        STX    ANAA
04137 FC81 39             RTS

                   **************************************
                   *
                   * ROUTINES TO SET AND CLEAR BITS.
                   * INPUT BIT NUMBER IN A, IDX > START OF
                                              STRING -1
                   *
                   **
                                              ******************
                                              ******************
                                              ******************
                                              ************

04140 FC82 FF 40C1 SETBIT STX    RSTEMP   SAVE POINTERS
04141 FC85 BD E42D SETBNS JSR    BITVNS
04142 FC88 EA 00          ORA B  0,X
04143 FC8A E7 00          STA B  0,X
04144 FC8C 39             RTS

04146 FC8D FF 40C1 CLRBIT STX    RSTEMP
04147 FC90 BD E42D CLRBNS JSR    BITVNS
04148 FC93 53             COM B
04149 FC94 E4 00          AND B  0,X
04150 FC96 E7 00          STA B  0,X
04151 FC98 39             RTS

                   **************************************
                                              ******************
                                              ******************
                                              *
                   *
                   * SETUP CLOCK CONTROL LOCATIONS
                   *
                   **
                                              ******************
                                              ******************
                                              ******************
                                              ************

04154 FC99 CE 0000 SETCLK LDX    #0
04155 FC9C FF C392        STX    PWRCTL
04156 FC9F CE 3FFF        LDX    #$3FFF
04157 FCA2 FF 0390        STX    BAUD
04158 FCA5 CE 3D3C        LDX    #$3D3C
04159 FCA8 FF 0392        STX    PWRCTL
04160 FCAB 86 0A          LDA A  #$0A
04161 FCAD B7 0390        STA A  BAUD
04162 FCB0 B6 4054        LDA A  RUNING
04163 FCB3 B7 0391        STA A  LITES
04164 FCB6 39             RTS

                   **************************************
                   *
                   * SETUP ENABLING MASKS.  DEFAULT IS ALL
                                              ENABLED
                   *
                   **
                                              ******************
                                              ******************
                                              ******************
                                              ************
```

```
04167 FCB7 86 10   SETMKS LDA A  #NBIN+NBOT+NBMY+NBAN
04168 FCB9 CE 000E        LDX    #IHMSK   POINT AT BEGINNING OF
                                          MASKS
04169 FCBC BD F856        JSR    FENNIN
04170 FCBF 39             RTS

                   ********************************
                                          ******************
                                          ************
                   *
                   * ROUTINE TO INITIALIZE THE OUTPUT DRIVERS
                   *
                   **
                                          ******************
                                          ******************
                                          ******************
                                          ************

04173 FCC0 CE 0404 SETOUT LDX    #$0404
04174 FCC3 FF 039A        STX    OUAA
04175 FCC6 FF 039E        STX    OUAC
04176 FCC9 CE FFFF        LDX    #$FFFF
04177 FCCC FF 0398        STX    OU18
04178 FCCF FF 039C        STX    OU1724
04179 FCD2 CE 0000        LDX    #0
04180 FCD5 FF 039A        STX    OUAA
04181 FCD8 FF 039E        STX    OUAC
04182 FCDB CE FFFF        LDX    #$FFFF
04183 FCDE FF 0398        STX    OU18
04184 FCE1 FF 039C        STX    OU1724
04185 FCE4 CE 3D3C        LDX    #$3D3C
04186 FCE7 FF 039A        STX    OUAA
04187 FCEA CE 3C3C        LDX    #$3C3C
04188 FCED FF 039E        STX    OUAC
04189 FCF0 39             RTS

                   ****************************************
                   *
                   * CHECK FOR VALID DELIMETER AND POINT PAST
                                          IT
                   * VALID DELIMETERS ARE COMMA,BLANK
                   * ALSO RETURNS CODE TO INDICATE END OF DATA
                                          OF SEVERAL TYPES
                   * INPUT:  X => FIRST CHARACTER TO BE
                                          EXAMINED
                   * OUTPUT:  X => FIRST CHARACTER AFTER
                                          DELIMETER(S)
                   *  SKPEND = 0 FOR NORMAL DELIMETER
                   *  SKPEND = FF FOR FIRST CHAR NOT DELIMETER
                   *  SKPEND = 0D FOR CARRIAGE RETURN FOUND IN
                                          TEXT
                   *  SKPEND = 0E FOR INDEX = END OF TEXT
                                          POINTER
                   *  SKPEND = 0F FOR INDEX = END OF TEXT
                                          BUFFER
                   *
                   **
                                          ******************
                                          ******************
                                          ******************
                                          ************
```

```
      FCF1         SKPDLM EQU    *
FCF1 86 20                LDA A  #$20      GET SPACE
FCF3 A1 00                CMP A  0,X       SEE IF CHARACTER
                                             BLANK
FCF5 27 21                BEQ    SKPNXT    YES--GO CHECK NEXT
                                             CHARACTER
FCF7 86 2C                LDA A  #$2C      SEE IF CHARACTER
                                             COMMA
FCF9 A1 00                CMP A  0,X
FCFB 27 1B                BEQ    SKPNXT
FCFD 86 0D                LDA A  #$0D      SEE IF CHARACTER
                                             CARRIAGE RETURN
FCFF A1 00                CMP A  0,X
FD01 27 21                BEQ    SKPNOD    YES--INDICATE END
                                             CONDITION
FD03 BC 4064              CPX    TXTEND    SEE IF AT END OF TEXT
FD06 27 16                BEQ    SKPNOE    YES--TELL THE WORLD
FD08 8C 40C1              CPX    #TXTBND    SEE IF AT BUFFER END
FD0B 27 15                BEQ    SKPNOF    TELL WORLD
FD0D 86 20                LDA A  #$20      SEE IF ALREADY FOUND
                                             DELIMETER
FD0F B1 406B              CMP A  SKPEND
FD12 23 17                BLS    SKPOK     YES--RETURN POINTING
                                             AT CHAR AFTER DLM
FD14 86 FF                LDA A  #$FF      SAY BAD NEWS--NO
                                             DELIMETER
FD16 20 0C                BRA    SKPNOD
      FD18         SKPNXT EQU    *
FD18 B7 406B              STA A  SKPEND    SAY FOUND DELIMETER
FD1B 08                   INX              POINT AT NEXT
                                             CHARACTER
FD1C 20 D3                BRA    SKPDLM    GO TEST IT
      FD1E         SKPNOE EQU    *
FD1E 86 0E                LDA A  #$0E      SAY END OF TEXT
FD20 20 02                BRA    SKPNOD
      FD22         SKPNOF EQU    *
FD22 86 0F                LDA A  #$0F      SAY END OF BUFFER
      FD24         SKPNOD EQU    *
FD24 B7 406B              STA A  SKPEND    SAVE APPROPRIATE
                                             RETURN
FD27 FF 4062              STX    TXTPTR    SAVE NEW TEXT POINTER
FD2A 39                   RTS
FD2B 4F            SKPOK  CLR A            SAY NORMAL RETURN
FD2C 20 F6                BRA    SKPNOD

                   ****************************************
                                                 ******************
                                                 ******************
                                                 ***
                   *
                   * SETUP TTY FOR GROUND STATE
                   *
                   **
                                                 ******************
                                                 ******************
                                                 ******************
                                                 ************

FD2E 86 03         SETTTY LDA A  #3        RESET ACIA
FD30 B7 0300              STA A  TTYSTT
FD33 86 09                LDA A  #9        SET BAUD AT 110
FD35 B7 0300              STA A  TTYSTT
```

```
FD38 7F 0389          CLR      TTYDAT
FD3B 7F 00B8          CLR      BRKING
FD3E 7F 00B9          CLR      CTSWAT

                 ****************************************
                                                   ******************
                                                   ******************
                                                   *********

                 *
                 * PREPARE TELETYPE FOR INPUT
                 *
                 **
                                                   ******************
                                                   ******************
                                                   ******************
                                                   ************

FD41 86 89      STTYIN LDA A   #$89
FD43 B7 0388           STA A   TTYSTT    IF AT FIRST ...
FD46 B7 405D           STA A   RCVING
FD49 7F 405E           CLR     SNDING    USED BY SETTTY ALSO
FD4C CE 406C           LDX     #TXTBFR
FD4F FF 4064           STX     TXTEND
FD52 FF 4066           STX     TXTOUT
FD55 FF 4062           STX     TXTPTR
FD58 39                RTS
                 ****************************************
                                                   ******************
                                                   ******************
                                                   *

                 *
                 * RANGE CHECKING ROUTINE FOR LINE NUMBERS.
                                                   LOOKS AT
                 * OUTPUT OF EXTRACT ROUTINE AND VERIFIES
                                                   THAT LINE NUMBER
                 * LIES BETWEEN 1000 AND 10000
                 *
                 **
                                                   ******************
                                                   ******************
                                                   ******************
                                                   ***************

        FD59    RANGLN EQU     *
FD59 B6 40DA           LDA A   XTRVAL    GET LINE NUMBER FROM
                                            EXTRACT
FD5C F6 40DB           LDA B   XTRVAL+1
FD5F CE FE2E           LDX     #DRMLNO
FD62 BD F75F           JSR     COMP16
FD65 24 05             BCC     RANTOP
        FD67    RANBAD EQU     *
FD67 86 09             LDA A   #ERBDLN   YELL ABOUT BAD LINE
                                            NUMBER
FD69 7E FD8C           JMP     YELPOP

        FD6C    RANTOP EQU     *
FD6C CE FE30           LDX     #LNNOTP   SEE IF > 1000
FD6F BD F75F           JSR     COMP16
FD72 24 F3             BCC     RANBAD
FD74 39                RTS

                 ****************************************
                                                   ******************
```

```
                                                  ***********************
      *
      * RANGE CHECKING ROUTINE.  LOOKS AT OUTPUT OF EXTRACT
      * ROUTINE, AND IF GREATER THAN SPECIFIED RANGE, GENERATES
      * ERROR MESSAGE.  A IS HIGH ORDER REG, B IS LOW ORDER.
      *
      **
                                                  *****************************************************************

FD75 C6 08    RANGE8 LDA B  #8
FD77 20 02           BRA    RANGLO
FD79 C6 20    RANG32 LDA B  #32
FD7B 4F       RANGLO CLR A

FD7C B1 40DA  RANGE  CMP A  XTRVAL     COMPARE WITH HIGH HALF
FD7F 27 03           BEQ    LOW        IF EQUAL, THEN CHECK LOW HALF
FD81 23 07           BLS    ORNG       IF LOWER, THEN OBJECT
FD83 39              RTS

FD84 F1 40DB  LOW    CMP B  XTRVAL+1
FD87 25 01           BCS    ORNG
FD89 39              RTS

FD8A 86 07    ORNG   LDA A  #ERBDRG

      ************************************************************************************
      *
      * YELL OUTPUTS ERROR MESSAGE STORED IN A REGISTER,
      * GENERATES QUESTION MARK RESPONSE.
      * ENTRY YELPOP REMOVES SUBROUTINE RETURN POINTER FROM STACK,
      * ALLOWING YELPOP TO BE BRANCHED TO FROM A SUBROUTINE.
      *
      **
                                                  ****************************************************************

         FD8C  YELPOP EQU   *

FD8C 8E 7FEB  YELL   .LDS   #SPPLAC    DITCH RETURN POINTERS
FD8F B7 40E6         STA A  CVDTMP+1
FD92 7F 40E5         CLR    CVDTMP
FD95 FE 4066         LDX    TXTOUT     >OUTPUT LOCATION
FD98 BD F69F         JSR    SPCOUT
FD9B BD F6F0         JSR    CVD2
```

```
04290 FD9E 86 3F               LDA A  #'?      WOTHEHELL CHARZCTER
04291 FDA0 BD F6A9             JSR    ANYOUT
04292 FDA3 20 20               BRA    SETFIN   PREPARE FOR INPUT

                   ****************************************************************************
                   *
                   * ORDINARY EXIT FORM COMMAND PROCESSOR
                   * GENERATES READY MESSAGE AND PREPARES FOR INPUT.
                   *
                   **
                   ****************************************************************************

04295       FDA5    EXTPOP EQU    *
04296       FDA5    EXIT   EQU    *
04297 FDA5 8E 7FEE         LDS    #SPFLAG  DITCH RETURN POINTERS

04298 FDA8 CE 406C  OVRRDY LDX    #TXTBFR
04299 FDAB FF 4066         STX    TXTOUT   NO OUTPUT

                   ****************************************************************************
                   *
                   * ENTRY BUTRDY OUTPUTS THE ACCUMULATDD MESSAGE AND READIES
                   *
                   **
                   ****************************************************************************

04302 FDAE 7D 40CC         TST    RELFLG   SEE IF OUTPUT ENABLED
04303 FDB1 26 1A           BNE    SETFIX   NO--SIMPLY RETURN

04305 FDB3 BD FDE4  BUTRDY JSR    BUCLGO   OUTPUT THE LINE IF SUCH THERE BE

04306 FDB6 C6 52           LDA B  #'R
04307 FDB8 B6 4116         LDA A  EDTING   SEE IF EDIT MOVE
04308 FDBB 27 02           BEQ    NEIT
04309 FDBD C6 45           LDA B  #'E
04310 FDBF F7 406C  NEIT   STA B  TXTBFR   PUT CHARACTER IN BUFFER

04311 FDC2 CE 406D         LDX    #TXTBFR+1  OUE OUT ONLU
04312 FDC5 FF 4066  SETFIN STX    TXTOUT
04313 FDC8 7F 40FC         CLR    PSUPFG   FORCE UNCONDITIONAL PRINT

04314 FDCB 8D 08           BSR    BUTCLF
04315 FDCD 86 01    SETFIX LDA A  #1       NONZERO => PREPARE FOR INPUT AFTER OUTPUT

04316 FDCF B7 406A         STA A  MUSPIN
                   * SIMULATOR READ A LINE INSERT
```

```
04317 FDD2 7E EOCA        JMP    EOJ       BYPASS SIMULATOR I/O
                                            CODE
                  *FEWEL EQU *
                  * ORG ROMSTR-100
                  *FKSTRT LDX #TXTBFR
                  *INFK .TYI
                  * ANDA #$7F
                  * CMPA #$0A  SEE IF LINE FEE
                  * BEQ INFK  IF SO, IGNORE IT
                  * CMPA #$7F  SEE IF RUBOUT
                  * BNE FKSTOR  GO STORE CHARACTER
                  *FKRBOT CPX #TXTBFR  SEE IF ALREADY AT
                                       BEGINNING
                  * BEQ INFK  IF SO, IGNORE
                  * DEX
                  * BRA INFK  DELETE PREVIOUS CHARACTER
                  *FKSTOR EQU *
                  * STAA 0,X
                  * INX
                  * CMPA #$0D
                  * BNE INFK
                  * DEX
                  * STX TXTBND
                  * JMP CMDSRC
                  ** END OF SIMULATOR READ A LINE INSERT
                  * ORG FEWEL RETURN TO IN-LINE STUFF

                  *************************************
                                        ******************
                                        ***************
                  *
                  * OUT A CARRIAGE REUURN AND LINE FEED ON
                                        MESSAGE, THEN GO
                  * SUBROUTINE WHICH SAVES RETURN POINTER
                                        ELSEWHERE
                  *
                  **
                                        ******************
                                        ******************
                                        ******************
                                        ***********

04320 FDD5 7D 40FC BUTCLF TST    FSUFFG    SEE IF SHOULD FORGET
                                            LINE
04321 FDD8 27 0A          BEQ    BUCLGO    FLAG NOT SET--PRINT
                                            LINE
04322 FDDA 7F 40FC        CLR    FSUFFG    RESET
04323 FDDD CE 406C NOGOOT LDX    #TXTBFR    RESET OUTPUT POINTER
04324 FDE0 FF 4066        STX    TXTOUT
04325 FDE3 39      NTHING RTS

04327 FDE4 FE 4066 BUCLGO LDX    TXTOUT    SEE IF ANYTHING TO GO
                                            OUT
04328 FDE7 8C 406C        CPX    #TXTBFR
04329 FDEA 27 F7          BEQ    NTHING

04331 FDEC CE 406C        LDX    #TXTBFR
04332 FDEF FF 4062        STX    TXTPTR
04333 FDF2 FE 4066        LDX    TXTOUT
04334 FDF5 86 0D          LDA A  #$0D      CR
04335 FDF7 A7 00          STA A  0,X
04336 FDF9 08             INX
```

```
04337 FDFA 86 0A    BOUFNY LDA A  #$0A      LF
04338 FDFC A7 00           STA A  0,X
04339 FDFE 86 04           LDA A  #NUMNUL    SET UP NULLS
04340 FE00 BD F85F         JSR    ZEROES
04341 FE03 FF 4066         STX    TXTOUT
04342 FE06 7D 00B7         TST    CANECO    SEE IF PASSWORDED YET
04343 FE09 27 D2           BEQ    NOGOOT

                    *******************************************
                                              ******************
                                              ******************
                    *
                    * OUTPUT THE BUFFER FULL
                    * SUBROUTINE WHICH ALSO SAVES RETURN POINTER
                    *
                    **
                                              ******************
                                              ******************
                                              ******************
                                              **************

04346 FE0B 32              PUL A
04347 FE0C B7 4068         STA A  PRTRTN    SAVE RETURN POINTER
04348 FE0F 32              PUL A
04349 FE10 B7 4069         STA A  PRTRTN+1
04350 FE13 7F 4060         CLR    DONOUT
04351 FE16 7F 4061         CLR    DONINR
04352 FE19 7F 405D         CLR    RCVING
04353 FE1C 86 01           LDA A  #1
04354 FE1E B7 405E         STA A  SNDING
04355 FE21 7F 0389         CLR    TTYDAT
04356 FE24 86 29           LDA A  #$29
04357 FE26 B7 0388         STA A  TTYSTT
04358 FE29 7E E0CA         JMP    EOJ       SKIP SIMULATOR I/O
                                              CODES

                    *FEWER EQU *
                    * ORG ROMSTR-200
                    *FAKWRT TST FIRBLK  LOOK FOR INITIAL SPACES
                    *CHKBLK BEQ FAKWR2  WHEN NONE, DO REGULAR
                                              LINE
                    * LDAA #$20
                    * .TYO
                    * DEC FIRBLK
                    * BRA CHKBLK
                    *FAKWR2 LDAA TXTBFR GET FIRST CHARACTER
                    * .TYO
                    * LDX TXTPTR
                    *ZEQFK LDAA 0,X
                    * .TYO
                    * INX
                    * CPX TXTOUT
                    * BNE ZEQFK
                    * LDX #TXTBFR  RESTORE TXTOUT POINTER
                    * STX TXTOUT
                    * LDAA #1
                    * STAA DONOUT
                    * LDX PRTRTN RETURN FROM PRINT
                    * JMP 0,X
                    ** END OF SIMULATOR WRITE A LINE INSERT
                    * ORG FEWER
```

```
04361 FE2C 2328    EMGLNO FDB     9000     FIRST EMERGENCY LINE
                                             NUMBER
04362 FE2E 03E8    DRMLNO FDB     1000     FIRST DRUM LINE
                                             NUMBER
04363 FE30 2710    LNNOTP FDB     10000    FIRST NUMBER AFTER
                                             VALID LINE NUMBERS
                   ******************************************
                                             ***************
                   *TABLES FOR LOOKUP
                   *****************
                                             ******************
                                             ******************
                                             ***************

04365      FE32    LKPTBL EQU     *
04366      FE32    PERTBL EQU     *        TIMER PERIODS
04367 FE32 4F             FCC     'OUR'
      FE33 55
      FE34 52
04368 FE35 21             FCB     NANIN+1
04369 FE36 57             FCC     'WKD'
      FE37 4B
      FE38 44
04370 FE39 22             FCB     NANIN+2
04371 FE3A 44             FCC     'DAY'
      FE3B 41
      FE3C 59
04372 FE3D 23             FCB     NANIN+3
04373 FE3E 4D             FCC     'MTH'
      FE3F 54
      FE40 48
04374 FE41 24             FCB     NANIN+4
04375      FE42    PERTBE EQU     *

04377      FE42    TIMTBL EQU     *        TIME SETTINGS
04378 FE42 54             FCC     'T.S'
      FE43 2E
      FE44 53
04379 FE45 25             FCB     NANIN+SYSTNO+1
04380 FE46 54             FCC     'TIS'
      FE47 49
      FE48 53
04381 FE49 26             FCB     NANIN+SYSTNO+2
04382 FE4A 54             FCC     'TIM'
      FE4B 49
      FE4C 4D
04383 FE4D 27             FCB     NANIN+SYSTNO+3
04384 FE4E 54             FCC     'TIH'
      FE4F 49
      FE50 48
04385 FE51 28             FCB     NANIN+SYSTNO+4
04386 FE52 54             FCC     'TID'
      FE53 49
      FE54 44
04387 FE55 29             FCB     NANIN+SYSTNO+5
04388      FE56    TIMTBE EQU     *

04390      FE56    CTRTBL EQU     *
                   * FCC 'CT1'
                   * FCB NANIN+SYSTNO+DAHHNO+1
                   * FCC 'CT2'
```

```
                          * FCB NANIN+SYSTNO+DRMTNO+2
                          * FCC 'CT3'
                          * FCB NANIN+SYSTNO+DRMTNO+3
                          * FCC 'CT4'
                          * FCB NANIN+SYSTNO+DRMTNO+4
04391        FE56         CTRTBE EQU     *

04393        FE56         WKTBL  EQU     *
04394  FE56  4D                  FCC     'MON'
       FE57  4F
       FE58  4E
04395  FE59  00                  FCB     0
04396  FE5A  54                  FCC     'TUE'
       FE5B  55
       FE5C  45
04397  FE5D  01                  FCB     1
04398  FE5E  57                  FCC     'WED'
       FE5F  45
       FE60  44
04399  FE61  02                  FCB     2
04400  FE62  54                  FCC     'THU'
       FE63  48
       FE64  55
04401  FE65  03                  FCB     3
04402  FE66  46                  FCC     'FRI'
       FE67  52
       FE68  49
04403  FE69  04                  FCB     4
04404  FE6A  53                  FCC     'SAT'
       FE6B  41
       FE6C  54
04405  FE6D  05                  FCB     5
04406  FE6E  53                  FCC     'SUN'
       FE6F  55
       FE70  4E
04407  FE71  06                  FCB     6
04408        FE72         WKTBE  EQU     *

04410        FE72         MONTBL EQU     *
04411  FE72  4A                  FCC     'JAN'
       FE73  41
       FE74  4E
04412  FE75  00                  FCB     0
04413  FE76  46                  FCC     'FEB'
       FE77  45
       FE78  42
04414  FE79  01                  FCB     1
04415  FE7A  4D                  FCC     'MAR'
       FE7B  41
       FE7C  52
04416  FE7D  02                  FCB     2
04417  FE7E  41                  FCC     'APR'
       FE7F  50
       FE80  52
04418  FE81  03                  FCB     3
04419  FE82  4D                  FCC     'MAY'
       FE83  41
       FE84  59
04420  FE85  04                  FCB     4
04421  FE86  4A                  FCC     'JUN'
       FE87  55
```

```
      FE88 4E
04422 FE89 05              FCB    5
04423 FE8A 4A              FCC    'JUL'
      FE8B 55
      FE8C 4C
04424 FE8D 06              FCB    6
04425 FE8E 41              FCC    'AUG'
      FE8F 55
      FE90 47
04426 FE91 07              FCB    7
04427 FE92 53              FCC    'SEP'
      FE93 45
      FE94 50
04428 FE95 08              FCB    8
04429 FE96 4F              FCC    'OCT'
      FE97 43
      FE98 54
04430 FE99 09              FCB    9
04431 FE9A 4E              FCC    'NOV'
      FE9B 4F
      FE9C 56
04432 FE9D 0A              FCB    10
04433 FE9E 44              FCC    'DEC'
      FE9F 45
      FEA0 43
04434 FEA1 0B              FCB    11
04435      FEA2     MONTBE EQU    *
04436      FEA2     LKPTBE EQU    *
04437      FEA2     TEMTBL EQU    *
04438 FEA2 8E              FCB    142,137,132,127,122,117,111,106
      FEA3 89
      FEA4 84
      FEA5 7F
      FEA6 7A
      FEA7 75
      FEA8 6F
      FEA9 6A
      FEAA 65
      FEAB 5F
04439 FEAC 5A              FCB    90,84,79,73,68,62,56,51,46,43
      FEAD 54
      FEAE 4F
      FEAF 49
      FEB0 44
      FEB1 3E
      FEB2 38
      FEB3 33
      FEB4 2E
      FEB5 2B
04440 FEB6 29              FCB    41,38,36,33,31,29,27,24,22,20
      FEB7 26
      FEB8 24
      FEB9 21
      FEBA 1F
      FEBB 1D
      FEBC 1B
      FEBD 18
      FEBE 16
      FEBF 14
04441 FEC0 12              FCB    18,16,15,13,11,9,7,6,4,3,1
      FEC1 10
```

```
          FEC2 0F
          FEC3 0D
          FEC4 0B
          FEC5 09
          FEC6 07
          FEC7 06
          FEC8 04
          FEC9 03
          FECA 01
04442          FECB     TEMTB2 EQU    *
04443     FECB FE              FCB    254,253,251,250,248,247,246,244
          FECC FD
          FECD FB
          FECE FA
          FECF F8
          FED0 F7
          FED1 F6
          FED2 F4
          FED3 F3
04444     FED4 F2              FCB    242,240,239,238,236,235,234,233
          FED5 F0
          FED6 EF
          FED7 EE
          FED8 EC
          FED9 EB
          FEDA EA
          FEDB E9
          FEDC E8
          FEDD E6
04445     FEDE E5              FCB    229,228,227,226,225,224,222,221
          FEDF E4
          FEE0 E3
          FEE1 E2
          FEE2 E1
          FEE3 E0
          FEE4 DE
          FEE5 DD
          FEE6 DC
          FEE7 DB
04446     FEE8 DA              FCB    218,217,216,215,214,213,212,211
          FEE9 D9
          FEEA D8
          FEEB D7
          FEEC D6
          FEED D5
          FEEE D4
          FEEF D3
          FEF0 D2
          FEF1 D1
04447     FEF2 D0              FCB    208,207,206,205,204,203,202,202
          FEF3 CF
          FEF4 CE
          FEF5 CD
          FEF6 CC
          FEF7 CB
          FEF8 CA
          FEF9 CA
          FEFA C9
          FEFB C8
[illegible] FEFC C7            FCB    199,198,197,196,195,194,[illegible]
          FEFD C6
```

```
       FEFE C5
       FEFF C4
       FF00 C3
       FF01 C2
       FF02 C2
       FF03 C1
       FF04 C0
       FF05 BF
04449  FF06 BE             FCB     190,189,188,188,187,186,185,184
       FF07 BD
       FF08 BC
       FF09 BC
       FF0A BB
       FF0B BA
       FF0C B9
       FF0D B8
       FF0E B7
       FF0F B7
04450  FF10 B6             FCB     182,181,180,179,178,178,177,176
       FF11 B5
       FF12 B4
       FF13 B3
       FF14 B2
       FF15 B2
       FF16 B1
       FF17 B0
       FF18 AF
       FF19 AE
04451  FF1A AE             FCB     174,173,172,171,170,170,169,168
       FF1B AD
       FF1C AC
       FF1D AB
       FF1E AA
       FF1F AA
       FF20 A9
       FF21 A8
       FF22 A7
       FF23 A6
04452  FF24 A6             FCB     166,165,164,163,163,162,161,160
       FF25 A5
       FF26 A4
       FF27 A3
       FF28 A3
       FF29 A2
       FF2A A1
       FF2B A0
       FF2C 9F
       FF2D 9F
04453  FF2E 9E             FCB     158,157,156,155,155,154,153,152
       FF2F 9D
       FF30 9C
       FF31 9B
       FF32 9B
       FF33 9A
       FF34 99
       FF35 98
       FF36 97
       FF37 97
04454  FF38 96             FCB     150,149,148,147,147,146,145,144
       FF39 95
       FF3A 94
```

```
      FF3B 93
      FF3C 93
      FF3D 92
      FF3E 91
      FF3F 90
      FF40 8F
      FF41 8F
04455 FF42 8E        FCB    142,141,140,139,138,138,137,136
      FF43 8D
      FF44 8C
      FF45 8B
      FF46 8A
      FF47 8A
      FF48 89
      FF49 88
      FF4A 87
      FF4B 86
04456 FF4C 85        FCB    133,133,132,131,127,127,127,126
      FF4D 85
      FF4E 84
      FF4F 83
      FF50 7F
      FF51 7F
      FF52 7F
      FF53 7E
      FF54 7E
      FF55 7E
04457 FF56 7D        FCB    125,124,123,122,121,120,119,118
      FF57 7C
      FF58 7B
      FF59 7A
      FF5A 79
      FF5B 78
      FF5C 77
      FF5D 76
      FF5E 75
      FF5F 74
04458 FF60 73        FCB    115,114,113,112,111,110,109,108
      FF61 72
      FF62 71
      FF63 70
      FF64 6F
      FF65 6E
      FF66 6D
      FF67 6C
      FF68 6B
      FF69 6A
04459 FF6A 69        FCB    105,104,102,101,100,99,98,96,95
      FF6B 68
      FF6C 66
      FF6D 65
      FF6E 64
      FF6F 63
      FF70 62
      FF71 60
      FF72 5F
      FF73 5E
04460 FF74 5D        FCB    93,91,90,89,87,86,84,83,81,80
      FF75 5B
      FF76 5A
      FF77 59
```

```
        FF78 57
        FF79 56
        FF7A 54
        FF7B 53
        FF7C 51
        FF7D 50
04461   FF7E 4E              FCB     78,76,75,73,71,69,67,65,63,61
        FF7F 4C
        FF80 4B
        FF81 49
        FF82 47
        FF83 45
        FF84 43
        FF85 41
        FF86 3F
        FF87 3D
04462   FF88 3A              FCB     58,56,53,50,47,44,41,37,33,28
        FF89 38
        FF8A 35
        FF8B 32
        FF8C 2F
        FF8D 2C
        FF8E 29
        FF8F 25
        FF90 21
        FF91 1C
04463   FF92 17              FCB     23,17,10,1,0
        FF93 11
        FF94 0A
        FF95 01
        FF96 00
04464        FF97    TEMTBE EQU     *


04466 FFF8                   ORG     $FFF8
04467 FFF8 E004              FDB     RUPTS
04468 FFFA E0B5              FDB     PWRON
04469 FFFC E0B5              FDB     PWRON
04470 FFFE E0B5              FDB     PWRON
04471                        END
 AXADR  E939 1643 1637
?AXSTA  E920 1655
 AXTMNY E92E 1661 1688
 AXYELL E930 1662 1613 1642 1677 1693
 AXNXT  E933 1663 1660
 AXWZNM E93C 1667 1664
 AXTVAL E94E 1674 1670 1672
 AXBDAV E953 1676 1646 1648 1650
 AXVALU E957 1678 1675
 AXDBEL E978 1692 1685
 BAUD   0390 0048 4157 4161
 BBADID E81C 1525 1517 1520
 BISF   4003 0206 3694 3698 3713
 BINLP  E379 0834 0853
 BITFL1 40F2 0257 3196 3201 3214 3305 3315 3325 4073 4095
             4116 4121 4127
 BITFL2 40F3 0258 4077 4101 4117 4122 4126
 BITCNT 41BD 0307 2211 2217
 BITVNC E42A 0937 0313 0719 [illegible]16 2215 2224
 BITVNS E42D 0938 3969 3975 4141 4147
 BINACU ED94 2207 2136 2140 2144
 BLAP   E6BD 1340 0786 1346
 BOFCT1 F59D 3183 2834 2840 2846 2852
```

```
BOFCX1 F5A3 3186 3188
BONCT1 F5AA 3191 2100
BOTLP  E338 0795 0802
BOFCT2 F5AF 3195 2685
BOFCX2 F5B8 3200 3208
BONCX2 F5C1 3204 3202
BONCT2 F5CA 3211 2677
BOUFNY FDFA 4337 0513
BRKING 00B8 0133 1077 1087 1536 4233
BRNBDD E23E 0668 0635 0645 0672 0678
BRNCHD E247 0667 0652 0661
BTANDX 40ED 0253 3221 3254 3277
BTAVL1 40EF 0254 3223 3242 3245 3262 3268 3...
BTAVL2 40F0 0255 3224 3240 3244 3247 3252 3272 3274
BTACSV 40F1 0256 3255 3278
BTCCNN F5B2 3197 3215
BTACVT F5D1 3217 3189 3193 3209
BTATBT F5E6 3228 3237 3248
BTAXND F5F0 3232 3225 3228
BTARCD F5F9 3239 3233
BTAST2 F609 3246 3241 3243
BTAXIT F60E 3250 3231
BTABSP F60E 3251 3236
BTANCM F624 3260 3258
BTA1VL F632 3270 3263
BTANVL F656 3279 3253
BUTRDY FDD3 4305 2101 2739 2818 2995
BUTCLF FDD5 4320 2069 2342 2462 2512 2642 2681 2687 2835
       2841 2847 2853 4314
BUCLGO FDE4 4327 4305 4321
CACMU  ECBB 2124 2127
CALBLN F657 3282 1768 2712 3127
CANECO 00B7 0132 0441 1387 1522 1532 1534 2318 4342
CANFNN F6A4 3609 3581 3575 3615 3618 3626
CCIB   E817 1522 1526
CDMSTT 00B2 0126 0628 1121 1145
CDIMAD 00BD 0127
CDMDM  00B5 0128 0651 0680 0693 0757 ... 0768 0770 1107

754 SYMBOLS 6718 POSSIBLE  517 REF 6399 MAX

AADDLL E69A 1318 1320
AA1    E329 0785 0789
ACCUMU 4196 0357 2123
ACCTTH 4176 0358 2131 2187
ACPLHI 418C 0348 2234 2238
ACPLLO 418D 0349 2235 2237
ACCSTM 4197 0359 2189
ACCVLS 4198 0360 2257
ACCUND 41B8 0361 2174
ACCUTM 41B9 0363 2129 2164
ACCCNT 41BA 0364 2168 2184 2227 2243 2259 2340
ADD42  E2E2 0750 3803
ADDTNT E45B 0974 0962
ADDSEC E47D 0990 0581 0985
ADDMIN E49D 1005 0576 0999
ADDOUR E4B4 1017 0570 1011
ADDDAY E4C8 1029 0562 1023
ADDMON E4E9 1045 1040
ADD16  E5F4 1218 0648 0753 0754 1205 1234 1581 3124 3800
       3917 3927
```

```
ADD8    E5F9 1222 0752 1142 1193 1218 1219 1235 2689
ADD4    E5FD 1226 3668
ADD3    E5FE 1227 3490
ADDAZ   E699 1317 1328
ACVIT   EDB5 2222 2217
ACCAVL  EDD0 2234 2232 2253
ADD3B   F161 2664 2641 2680 2686
ADDDLN  F659 3285 2718 3131 3289
?ADCOPY FB0D 3942
AHDRM   006E 0116 0925 1327 1563 2064
AHMSK   001A 0083 0917 1783 1820 2833
AHVAL   0046 0113 0883 0914 0924 2067
ALPASS  F602 1233 1238 1244
ALUSED  E66B 1282 1284 1286
ALRSV   FAB0 3884 3875 3887
ANAA    0396 0054 4130 4136
?ANAB   0397 0055
ANLGSZ  0010 0108 1239 2149
ANYMO   4052 0177 1241 1243 1289 2151 2152
ANALOG  E6A6 1327 1297
ANYWAY  E71B 1392 1386 1388
ANNNOT  EC56 2075 2065 2068
ANAACU  EDF3 2251 2162
ANYOUT  F6A9 3337 2589 3332 3334 4291
ASCEND  E3DA 0890 0896
ASHDRM  E2EE 0758 0650 0659 0692
AVGARA  41F7 0375 0466 2205 3103
AVLLEN  0027 0341 0375 2195
AVGARE  4639 0374 0377 2200 2201 3106
AVVVNO  0010 0342 0360 2167
AVVAR   4600 0377 2201
AVANLP  E3CA 0682 0904
AXCNT   40D6 0226 1624 1659 1687
AXEVAL  E8EE 1650 1627 1689
AXSAVE  40D7 0227 1652 1668
AXNDX   40D8 0230 1622 1655 1656 1677 1682
[illegible] E8EF 1651 1660
[illegible] E8FE 1658 1640

CDMDNO  00D6 0129 0618 0622 0663 0682 0777 1332 2880 2882
             4017
CHEDIT  F665 3293 1609 1720 1854 1860 1866 1899 1905 1911
             3009 3046
CKEYEL  F66D 3298 3295
CKTIME  E1A7 0537 0560 0568 0574
CKTMEX  E1CF 0606 0592 0597
CLEMG   E9EE 1749 1740
CLKMSB  0381 0037 0549
CLKMDL  0382 0038 0546
CLKLSB  0383 0039 0543
CLKCTL  0393 0051 0419 0533 0974 0976 0978
CLRCNT  40D5 0222 3310 3320
CLKONN  E135 0533 0534
CLKFIX  E446 0959 0609 0970
CMISRC  E6D3 1352 0514
CMDLIS  E71D 1395 1362
CMLMD   E805 1512 1374
CMDON   E805 1515 1397
CMDOG   E81F 1529 1399
CMDAA   E83A 1545 1401
CMDAV   E86A 1571 1403
CMDAX   E8B9 1608 1405
CMDAX1  E8CC 1617 1613
```

```
CMDAX2 E8D1 1617 1614
CODID  E000 0381 1516 1519
CMAXXE E8D6 1621 1611
CMDAXD E8D9 1622 1618 1620
CMDAXE E975 1691 1628 1666
CMDCB  E984 1698 1407
CMDCD  E990 1704 1409
CMDCH  E996 1708 1411
CMDCI  E9A2 1714 1413
CMDCL  E9AE 1720 1415
CLOSLN E9B9 1725 1722 1940
CLSNRS E9C6 1730 1726 1728
CLSTQO E9EA 1747 1743 1744
CLSTSU E9FD 1755 1749 1751 1752
CLMVLN E9FF 1756 1748
CLNTZR EA31 1777 1760 1762 1771
CMDDA  EA35 1783 1417
CMDDB  EA3B 1787 1419
CMDDD  EA41 1793 1421
CMDDI  EA47 1797 1423
CMDDM  EA4D 1801 1425 1804
CMDEA  EA6E 1820 1427
CMDEB  EA74 1824 1429
CMDED  EA7A 1830 1431
CMDEI  EA80 1834 1433
CMDEL  EA86 1838 1435
CMDEM  EA94 1845 1437 1848
CMDFB  EA9E 1853 1439
CMDFD  EAA6 1859 1441
CMDFI  EAAE 1865 1443
CMDFIM EAB1 1867 1856 1862
CMDNS  EABA 1873 1445
CMDOB  EAE8 1898 1447
CTCWAT 00D7 0134 1084 1070 1101 1106 1541 [illegible]
CTWINC E54B 1133 1073
CMDOD  EAF[illegible] 1904 1449
CMDOI  EAF8 1910 1451
CUANS  4050 0176 0699 0715 0720 0745 1236 1279 1282 2146
CMDOCM EAFE 1913 1901 1907
CMDOP  EB04 1917 1453
CMDPA  EC05 2040 1455
CMDPB  EC74 2089 1457
CMDPD  EC93 2106 1459
CVBTMP 40E3 0241 3344 3347 3363 3367 3368 3373 3374 3382
CVDTMP 40E5 0244 2057 2075 2076 2081 2155 2156 2201 2202
       2308 2310 2311 2404 2445 2489 2562 2563 2615 2616
       2735 2737 3264 3266 3271 3273 3377 3378 3415 3417
       3420 3423 3424 3437 3441 3726 3741 3742 3996 3998
       4003 4285 4286
CVDPTR 40E7 0245 3379 3414 3443
CVDTRN 40E9 0246 3396 3430 3432 3435
COUNAK EB2C 2167 2132 2171 2335
CMDPH  EE8A 2318 0526 1461
CMDPI  EED1 2350 1463
CMDPL  EEDD 2356 1465
CMDPM  F1A5 2695 1467
CMDPP  F1EB 2727 1469
CMDPU  F209 2745 1471
CMDPX  F2C7 2831 1473
CMDRL  F306 2857 1475
CMDRM  F317 2865 1477 2869
CMDRS  F325 2872 2892
CMDRU  F348 2887 1479
```

```
CMDSA  F359 2895 1481 2898
CMDSB  F362 2901 1483
CMDSD  F36E 2907 1489
CMDSH  F374 2911 1485
CMDSI  F380 2917 1487
CMDSL  F386 2921 1491 2925
CMDSP  F395 2929 1493
CMDST  F3B4 2944 1495
CMDTI  F3ED 2975 1497
CMDX1  F41E 3002 1499
CMDX2  F466 3036 1501
CMDXE  F47B 3046 1503
CMDXX  F4EB 3099 1505
CMDZH  F4F1 3103 1507
DACVAL 0395 0053 0859 0884 0892
CMDZM  F4FF 3110 1511
DASTRG EC8D 2100 2097
DAYLP  E169 0559 0565
DATLOG EC9E 2112 1013
CLRONB F670 3302 1913
CLBCOM F675 3306 3326
CLBGO  F680 3311 3321
CLBOFF F68C 3318 3316
CLROFB F694 3324 1869
DBZPTS E582 1139 1122
DBZPTM E5A9 1167 1146
CMACUT F6A7 3336 2449 2552 3259 4001
DCLINE E39C 0857 0863 0888
CVB    F6B0 3343 3497
CVBSET F6B7 3347 3364
CVBENT F6C1 3352 3381
CVBCVT F6C2 3354 3350
CVBIBL [illegible] [illegible] [illegible] [illegible] [illegible]
DIMPLC E12B 0622 [illegible]
DDLBG  EEC4 2545 [illegible]
CVBAID F6DF--3372 3359 3362
CVBOVF F6E8 3378 3369 3375
CVD1   F6EC 3384 2565 2624 3268 3275
DECANA E418 0928 0921
DEDWAT E557 1111 1099 1102
CVD    F6EC 3385 2084 4000 4005
DEVSTR 0380 0031 0037 0038 0039 0041 0042 0043 0044 0045
            0046 0048 0049 0050 0051 0052 0053 0054 0055 0056
            0057 0058 0059 0060 0061 0062 0063
CVD2   F6F0 3388 2060 4289
CVD3   F6F4 3390 2313
CVD4   F6F8 3393 2452 2508
CVDALL F6FA 3396 3387 3389 3392
?DFOFGS 41BE 0368
CVDCNT F720 3412 3401 3403 3405 3407
CVDCMP F728 3416 3426
CVDSUB F734 3422 3418
CVDCXT F73E 3427 3419 3421
CVDNZR F74B 3434 3429
CVDSVZ F74E 3436 3431
COMP16 F75F 3447 0596 1770 1982 2011 2203 2775 2778 2791
            2808 3144 3147 3534 3557 4252 4260
COMRTN F765 3451 3449
COMLNO FBD7 3637 3589 3598 3620
CLZIP  F952 3705 3702
CLRAN1 FBE2 4046 1705 1784 1788 1794 1798
CLRAN2 FBF4 4057 1701 1711 1717
```

```
?CLRN2N FBF7 4058
 CLBTFG FC5A 4115 4042 4047 4053 4058 4065
 CLRBTH FC61 4120 4059
 DIDX   FB56 3979 3971
 CLR2ND FC64 4122 4048 4067
 CLRBIT FC8D 4146 4111
?CLRBNS FC90 4147
?CTRTBL FE56 4390
?CTRTBE FE56 4391
 DLAXH  41D9 0373 2145 2147
?DLINNO 41BF 0369
 DLOUT  41C1 0370 1994 2133
 DLMMY  41C9 0371 2137
 DLINH  41D1 0372 2141
 DLXNO  41E9 0374 2120 2128 2175
 DMADT  E6AB 1331 0780 1307 1312
 DMMYST E583 1142 0640 2924
 DMOTST E565 1119 0638 2922
 DMTMAD E512 1067 0980 0994 1006 1018 1029
 DMMOV  E5AA 1170 1119 1143 1178 1194 1206 3184 3192 3198
 DMOTQM E5B9 1178 0761
 DMMYQM E5CE 1193 0765
 DMINQM E5E1 1205 0769
 DNNIN  E0EE 0501 0493
 DMVZAP E8AB 1600 1597 2868
 DOARL  F30E 2860 2858
 DONOUT 4060 0171 0415 0492 0494 4350
 DONINR 4061 0172 0452 0505 0510 4351
 DONSP  F3A8 2938 2859 2930
 DRMSTT 0066 0115 0627 1608 1614 1657 1647
 DRMTNO 0005 0158 0762 1302 1305 1640
 DRUMND 7F9B 0034 3137 3461 3465
 DRMTNT 4000 0159 0778 0979 1311
 DRMSEC 4008 0160 0775
 DRMMIN 4010 0161 1005
 DRMHR  4018 0162 1017
 DRMDAY 4020 0163 1028
 DRMCNO 0004 0165 0782
 DRMCT1 4028 0166 1306
?DRMCT2 4030 0167
?DRMCT3 4038 0168
?DRMCT4 4040 0169
 DRMLOG 4048 0171 0636 0639 0641 0647 0649 0654 0658 0669
             0687 0691 0695 0726 0728 0729 0760 0764 0768 0772
 DRMVAL 40F7 0264 1764 2711 2717 3121 3130 3288
 DRUMST 4639 0378 3457 3459
 DRUMS  E1D0 0609 0488
 DRMDLT E317 0777 0737
 DRMDNO E319 0778 0677 1604 2881
 DTTST  E5BE 1181 1186
?DRMCTR E684 1305
 DRMTMR E68C 1310 1303
 DCHOUT F6A3 3333 2062 2573 3269
 DVDRTN EE15 2267 2177
 DVDLP0 EE1D 2270 2274
 DVDLP1 EE30 2278 2296
 DVDLP2 EE35 2280 2295
 DVNSUB EE44 2286 2279
 DVSHFT EE4B 2289 2285
 DVDERR EE5C 2297 2272
 DVDEND EE62 2299 2290
 DVDLP3 EE6D 2304 2302
 DRMLNO FE2E 4362 3286 3287 4251
```

```
 DYTL    E514 1068 1073
 EDINIT  F766 3454 0463 2860 .
 EDTEMG  4115 0291 1610 1739 1952 1955 1971 1988 2363 3047
              3056 3466 3467 3585 3796 3813 3867 3880
 EDTING  4116 0292 1920 1938 2033 2379 2696 2746 3294 3363
              3865 3878 4307
 EDTNEW  4117 0293 1725 1742 1750 1970 2015
 EDTMOD  4118 0294 1612 2035 2036 3029 3042 3798 3801 3815
 EDTWHR  4119 0295 1731 1738 1773 1774 2028 3591 3852
 EDTBUF  411B 0296 0298 1736 1945
 EDTBFE  4183 0297 0338 3467
 EDTFGB  411B 0299 3026 3027 3053
 EDTLNO  411C 0300 1769 2030 2381
 EDTLIN  411E 0302 0328 2385 3567 3869 3882
 EDTDRE  411E 0303 3809
 EDTDRS  4122 0304 3807
 EDTMYE  4126 0305 3788
 EDTMYS  412A 0306 3786
 EDTST1  412E 0308 2410
?EDTDE1  412E 0309
?EDTDS1  4132 0310
?EDTME1  4136 0311
?EDTMS1  413A 0312
?EDTIE1  413E 0313
?EDTIS1  4142 0314
 EDTAT1  4146 0315 1617
 EDTAX1  4156 0316 2410 3002
 EDTST2  4158 0318 2419
?EDTDE2  4158 0317
?EDTDS2  415C 0320
?EDTME2  4160 0321
?EDTMS2  4164 0322
?EDTIE2  4168 0323
?EDTIS2  416C 0324
 EDTAT2  4170 0325 1619
 EDTAX2  4180 0326 2419 3037
 EDTDGT  4182 0327 1758 2032 3017
?EDTELN  411E 0329
?EDTEDE  411E 0330
?EDTEDS  4122 0331
?EDTEME  4126 0332
?EDTEMS  412A 0333
 EDTEIE  412E 0334 3820
 EDTEIS  4132 0335 3818
 EDTEAT  4136 0336 1621
 EDTEAX  4146 0337 3049 3076
 EDTONF  FA71 3865 3857
 EMGNUM  00B1 0125 0683 1754 3161 3164 3614 3874
 EMGWCH  404A 0172 0620 0630 0633 0674 0685 0730
 EMGFIR  410D 0280 0686 1753 1981 2002 2003 2764 3160 3167
              3462 3617 3886
 EMGLST  410F 0281 2789 3464
 EMGLGT  003B 0289 0290 0725 1755 2004 2795 3463 3629 3899
 EMGMLT  001E 0290 1957
 ENDRUM  E243 0665 0613
 ENLN    E08D 0449 0446
 EMERG   E25F 0682 0614
 EMLP    E272 0691 0731
 EMMLP   E295 0706 0723
 ENLP    E6F4 1370 1365
 EMGINC  FAB4 3899 3176 3893
 EOJLIT  0001 0066 0484
 EOJ     E0CA 0483 0509 0522 0524 1390 1530 4317 4358
```

```
?EMGLNO FE2C 4361
 ERBDCM 0001 0003 1376
 ERMNLN 0003 0005 1889
 ERNOEX 0002 0004 1591
 ERNOSP 0004 0006 2936
 ERUNDF 0005 0007 4007
 ERNOLN 0006 0008 1922 2376 4036
 ERBDRG 00C7 0009 4279
?ERNOFL 0008 0010
 ERBILN 0009 0011 4255
 ERNEDT 000A 0012 3298
 ERNIPM 000B 0013 3823
 ERDDRM 000C 0014 3032
 ERNXTM 000D 0015 1615
 ERBDRL 000E 0016 1641
 ERBDAV 000F 0017 1676
 ERTMNX 0010 0018 1661
 ERNTBL 0011 0019 3483
 ERNTBG 0012 0020 3507
 ERBDLM 0013 0021 1692 3563
 ERXEBD 0014 0022 3093
 ERXEME 0015 0023 3095
 ERNORM 0016 0024 1984
 ERPUED 0017 0025 2748
 ERRTND 0018 0026 2724 4015
 EVAPGT 40BE 0236 3478 3517
 EVAL   F78F 3472 1831
 EVAYEL F7A6 3484 3508
 EVAFND F7AB 3488 3482
 EVANUM F7BF 3496 3478
 EVAXIT F7D5 3505 3495
 EVANTL F7D6 3506 3500
 EXIT   FDA5 4296 1523 1598 1691 1723 1876 2037 2073 2347
        2388 2854 2884 2935 2967 3007 3043 3100 3108 3179
        4079
 EXTPOP FDA5 4295 3562
 FCMDM  FBD7 4038 4035
 FENCES F855 3567 4084
 FENNIN F856 3568 4169
 FENLP  F858 3569 3572 3577
 FIRBLK 40F4 0261 0399 0401 2511 2666 2817
 FIRLIN 4111 0282 2761 3458 3594 3831
 FIXATE ED32 2170 2165
 FIXLAV ED37 2172 2185
 FIND   F863 3580 1886 1990 2368 3941 4033
 FINEMG F8AB 3614 1998 2371
 FLAD   F206 2739 2730
 FNDD   FAFF 3935 3911 3925
 FNXEMG F8C9 3629 3623
 FRAG   404E 0174 0701 0722 1249 1294 2157
 FRZ    E564 1116 1114
 FUNB   E3B0 0870 0906 0907 0908
 FWAG   EA56 1806 1801 1845
 FWOUT  F419 2997 2978 2984 2990 2992 2994
 FXLX   F8BA 3620 3625
 FYCCV  F3E0 2970 2981 2987
 FZZZP  E2AF 0719 0747
 GBYTE  E658 1279 1247 1293
 GDBLOW 41BC 0366 2325 2345
 GENPBT EC7D 2093 2109 2353
 GFLGS1 FA3F 3835 3908 3912 3923 3948 3958
 GFLGS  FA43 3837 3777 3835 3994
 GF1    FA47 3839 3836
```

```
 GITIT  E8A0 1594 1590
 GOTF   E702 1380 1368
 GOTBG  F95B 3712 3707
 GRTR   E63B 1261 1251
 GTVAL  E66F 1293 1245 2154
 IAY    E441 0953 0955
 IBY    E434 0943 0945
 IHDBNC 0006 0078 0836 0844
 IHDAT  000A 0079 0840 0842 0843 1714
 IHMSK  000E 0080 0847 1797 1834 2851 4168
 IHVAL  0002 0077 0822 0825 0828 0831 0834 2352
 IHDRM  001E 0084 0846 0849 0850 1210 1716 2143 2350 2917
 IHCHG  0022 0085 0848
 INC60  00BF 0140 0387 0535 0960 0965 0967
 INITR  E09B 0457 1509
 INPWFL 00BB 0138 0537 0557 0585
 INALOG ECCE 2132 2113
 IN18   0384 0041 0820
 IN916  0385 0042 0823
 IN1724 0386 0043 0826
 IN2532 0387 0044 0829
 INVSLP ED9F 2213 2220
 ITTST  E5E8 1209 1214
 IZFF   E3E9 0877 0891
 IZON   E3AD 0866 0858
 IZSLCH F8EB 3649 1873 2045 2074 2057 2727 4069
 IZNEDT FACC 3851 3859 3890
 KILTTY E824 1532 1115 1529
?LES6   E633-1257..
 LETACU E14A 0543 0538
 LINLST 0090 0122 0619 0698 2875 3454 4019
 LITES  0391 0049 0420 0483 0485 0532 0990 0992 2890 2891
        2932 2934 4163
 LINCNT 00B0 0124 1746 3580 3827
 LINLGT 0067 0287 0288 0296 1747 1974 1979 2008 2798 3459
        3602 3843
 LINMLT 0034 0288 1947
 LKPVAL 40EA 0249 2532 2546 2555 2595 2625 3480 3493 3658
        3686 3724 3730 3739
 LKPNDX 40EB 0250 2545 2611 2651 2652 2970 3674 3677 3682
        3723 3732 3733 3734 3735 3736
 LKPTST F8FF 3662 3669
 LKPNXT F908 3667 3672 3683
 LKPCM3 F90D 3670 3666
?LKPCM2 F911 3673
 LKPFND F92A 3684 3679
 LKPNTF F92F 3687 3664
 LKPTBL FE32 4365 2544 3661
 LKPTBE FEA2 4436 3663
 LNSVAL 40C7 0209 1885 1943 1966 2018 2029 2363 3641 3645
        3940 4002 4032
 LNSNDX 40C9 0210 1594 1600 1602 1887 1961 1968 1977 1978
        1995 2006 2007 2027 2374 2923 3588 3592 3596 3603
        3605 3606 3609 3610 3619 3630 3632 3633 3637 3943
        3946 4034
 LNSCNT 40CB 0211 3582 3607 3616 3624
 LNNOTP FE30 4363 1931 4259
 LOGING 41B8 0362 2112 2122 2170
 LOGQM  E111 0516 0506
 LOGLLL EE9D 2326 2346
 LOOKUP F8F3 3655 3479
 LOW    FD84 4275 4271
 LRVLP  F88D 3598 3608
```

```
LSPREF FA2E 3827 3134 3775 3856
LSTLIN 4113 0283 1745 1975 1976 2010 2786 3460
LSNN   FA3E 3833 3830
LSPINC FA4B 3843 3152 3780 3863
LXXE   FB3D 3968 3985
MANGLE F930 3690 1554 1673
MBYTS  E422 0934 0941 3065
MIST   FB20 3951 3944
MLP    E4FD 1055 1057
MNNYA  EC28 2056 2049 2072
MONLST E506 1064 1053 2749
MONTBL FE72 4410 2604 2980
?MONTBE FEA2 4435
MTTST  E5D5 1197 1202
MUSPIN 406A 0198 0501 0503 4316
MUXCMP 0394 0052 0862 0875 0887 0895 4134
MVCCNT 40D4 0220 1959 3746 3748 3757
MVC    F99F 3746 2025
MVCP   F9A2 3747 1174 2657 2678
MVCPP  F9A3 3748 1757
MVCLP  F9A6 3749 3758
MYDRM  0036 0098 0517 1156 1157 1198 1700 2089 2115 2139
       2903
MYMON  0016 0082 1154 1787 1824 2837
[illegible] 003A 0099 1159 1160
       [illegible]032 [illegible]077 1149 1152 1153 1678 2071 [illegible]
MYXTR  F3AD 2940 2944 2946 2955 2958 2960 2962 2964
NANIN  0020 0109 0113 0116 0930 1298 1300 1302 1305 1310
       1315 1645 2047 2556 2558 2596 2598 2600 4368 4370
       4372 4374 4379 4381 4383 4385 4387
NANA1  E3F2 0902 0900
NAZZ   EDAC 2218 2228 2233
NAZZX  EDC9 2230 2226
NBAN   0004 0110 4167
NBIN   0004 0075 0077 0078 0079 0080 0084 0085 0632 1207
       4167
NBOT   0004 0088 0090 0091 0092 0793 1120 1179 4167
NBMY   0004 0095 0097 0098 0099 1144 1195 4167
NBKFS  E02F 0405 0400
NCMD   E6FD 1376 1381
NDRMS  0008 0114 0115 0122 0123 0159 0160 0161 0162 0163
       0166 0167 0168 0169 0289 0617 0700 0778 1067 1306
       1311 1340 1810 1840 2677 2879 3455 3961 4013
NEGOE  FA9D 3886 3879 3881
NEIT   FDBF 4310 4308
NERV   FA83 3874 3866 3868
NFED   FB85 3594 3584 3586 3590
NFXPT  ED90 2207 2204
NGORE  FBEA 3646 3642
NLEZ   E2C5 0729 0727
NLD    FB9C 3606 3604
NMTAV  ED21 2162 2160
NOCHAX E079 0441 0437
NOCHAR E081 0444 0434 0442
NOPWR  E019 0394 0370
NOPRPX E0F6 0505 0502
NODAYX E176 0566 0561 0571
NO6OFF E00F 0389 0385
NOOURX E186 0573 0569 0577
NOMINX E193 0579 0575
NOMINY E196 0580 0583
NOSECX E1A0 0585 0580
NOEMG  E2BB 0725 0694
```

```
NOZAP   E2D7 0742 0708
NOTNT   E45A 0971 0961
NOSEC   E47C 0987 0984
NOMIN   E499 1001 0998
NOOUR   E4B0 1013 1010
NODAY   E4C7 1025 1022
NOWKRP  E4D9 1036 1033
NRCV    E055 0423 0397
NOMON   E4E7 1042 1039
NONEM   E4F7 1052 1048
NOTZO   E51A 1071 1069
NOHIB   E530 1087 1081
NOTBX   E533 1090 1078
NOTCOR  E547 1101 1097
NOTEQL  E643 1265 1255
NONCMX  E68B 1308 1323
NSTO    E421 0932 0929
NOBRCK  E834 1540 1533
NOMUG   E85A 1559 1555
NOX     E880 1579 1577
NTLON   E554 1108 1105
NSALL   EABF 1875 1842
NSLT    EAE3 1892 1868
NPLM1   EC6A 2083 2079 2738
NOEXT   EC8A--2099• 2095
NOLOG   ECAF 2119 2121
NUMNUL  0004 0200 0201 0511 4339
NSXE1   ED7D 2199 2197
NOMACL  EDEC 2246 2244
NOMA2   EDEE 2248 2229
NSS1    EE0E 2264 2262
NOOHIS  EECE 2347 2319
NOTIT   F892 3602 3599
NUMERC  F9B2 3762 3349 3477
NUMNOT  F7CB 3770 3765 3768
NORSE   FA6D 3863 3860
NONOZ   FAAB 3893 3891
NOGOOT  FDDD 4323 4343
NTHING  FDE3 4325 4329
NXD     F8D3 3633 3631
NXXE    F8BF 3623 3621
NXZ1    FB1F 3949 3939
NZAL    EAC5 1878 1874 1881
NZ8     FBBA 4025 4023
N1S     FA55 3847 3845
N2OTBX  E53B 1095 1091
OHDRM   002A 0091 0795 1125 1128 1129 1182 1704 2106 2135
        2907
OHMSK   0012 0081 0797 1708 1793 1830 2845 2913
OHCHG   002E 0092 1131 1132
OHVAL   0026 0090 0796 0798 0799 0805 0808 0811 0814 1710
        2108 2911
OKABV   F964 3716 3714
OKBML   FBA8 4017 4014
ONNYA   EC1C 2051 2046
ON11    E897 1589 1585
OPGTLN  EB16 1926 1919
OPCKSM  EB30 1938 1934
OPSTBG  EB13 1924 1921
OPNRLN  EB2A 1935 1930
OPNCLS  EB38 1941 1939
OPDATL  EB56 1954 1949
OPSEML  EB59 1956 1953
```

```
 OPNEMG CB5B 1958 1951
 OPFNVC EB68 1764 1962
 OPNRYL EB98 1984 2012
 OPFLEM EBB5 2001 1972
 OPNEW  EBD3 2014 1969
 OPNEW2 EBD6 2017 1983 2013
 OPOLD  EBDE 2021 1963
 OPNCPY EBE7 2027 2019
 OPSETB EBFC 2034 1724
 ORNG   FD8A 4279 4272 4276
 OUAA   C39A 0058 0384 4174 4180 4186
?OUAB   C39B 0059
 OUAC   C39E 0062 4175 4181 4188
?OUAD   C39F 0063
 OU18   0398 0056 0386 0807 4177 4183
 OU916  0399 0057 0810
 OU1724 C39C 0060 0813 4178 4184
 OU2532 C39D 0061 0816
 OUTDOT E335 0793 0665
 OUTAAV ED26 2164 2146 2153 2250
 OUTX   EE75 2308 2339
 OUTB   EE7A 2310 2331 2334 2598
 OUTV   F9DB 3733 3776
 OVRRDY FDA8 4298 1564
?PERTBL FE32 4366
?PERTBE FE42 4375
 PFGCLR F9CD 3775 1875
 PFLP   F9D2 3777 3781
 PICKMB F9DF 3785 1855 1900
 PICRIT F9E8 3789 3810 3821
 PICKEM F9F3 3795 3789 3792
 PICKDB FA09 3806 1861 1906
 PICKIB FA14 3812 1867 1912
 PIOK   FA1E 3817 3814
 PIYELL FA29 3823 3816
 PKMXIT FA08 3804 3797 3799 3802
 PLBLCT 40F5 0262 2405 2496 2510 2665
 PLCNT  40F8 0265 2431 2454 2528 2590 2627 2637
 PLEMG  40F9 0266 2357 2372 2384 2407 2705 2709 2752 2762
        2787 2793 2812 2820
 PLFGB  40FA 0267 2400 2411 2420 2439
 PLCHAR 40FB 0268 2671 2676 2682
 PLVAL  40FD 0270 2364 2382 2403 2825
 PLNDX  40FF 0271 2395 2409 2415 2418 2432 2456 2459 2533
        2567 2591 2593 2629 2631 2634 2640 2678 2684 2688
        2690 2783 2826
 PMMXLN 4059 0185 2717 2720 2755 2756 2807
 PLRTNP 4101 0272 2392 2394 2464
 PLRTP1 4103 0273 2492 2494 2499
 PLRTP2 4105 0274 2504 2506 2517 2522 2524
 PLRTP3 4107 0275 2673 2675 2691
 PLFEMG EF00 2370 2367
 PLCKFN EF06 2373 2369
 PLYELL EF0B 2376 2380
 PLEDBF EF10 2378 2359
 PLLNFD EF24 2386 2375
 PLPEMG EF78 2425 2408
 PLNXEX EF90 2436 2460
 PLEXRS EF9D 2444 2440
 POPALL E2D6 0739 0684 0736
 PLEXNC EFAB 2450 2448
 PLCTEX EFB4 2454 2438
 PLEXIT EFC3 2461 2455
```

```
FLXIT2 EFC6 2463 2424
FPLLFP E2CD 0734 0738
FLSTCF EFCB 2467 2683
FLSTCO EFCF 2470 2677
FLSTCX EFD3 2473 2429 2490
FLSTCM EFD5 2475 2469 2472 2531 2816
FLDMIA EFE1 2483 2414 2423
FLLNRS EFE7 2488 2484
FLDMPT F005 2502 2406 2497
FL2XIT F029 2517 2643
FLIATP F02E 2520 2426 2498
FLATVL F055 2538 2632
FLAVL2 F05C 2542 2540
FLANCM F077 2553 2549 2551
FLANER F088 2561 2557
FRTRTN 4068 0197 0498 4347 4347
FLC[illegible]L F094 2566 2560
FLATNM F0AB 2575 2571
FLATNE F0B3 2580 2577
FLATLT F0B6 2582
FLATGT F0BE 2586 2583
FSUFFG 40FC 0269 2435 2447 2451 2536 2548 2554 3218 3219
            3257 3261 4313 4320 4322
FLRLOT F0C0 2588 2579 2585
FLWKTB F0E7 2606 2597
FTDRLN EF2A 2390 2387 2827
FLSTLK F0EE 2610 2605
FLANB2 F0F9 2615 2597 2601 2603 2608
FLNTMP F10B 2622 2618 2620
FLANRS F114 2625 2614
FLANXT F117 2626 2574
FLIATX F129 2633 2541 2628
FULFUN 4055 0183 2043 2048 2071 2715 2716 2750 2751 2774
            2824
FUNFUN 4057 0184 2040 2042 2054 2056 2063 2066 2070 2077
            2759 2760 2777 2780 2781 2805 2806 2823
FUNDX  405B 0186 2766 2768 2782 2784 2785 2801 2802
FUTIT  E3EA 0899 0864 0867
FLIASX F12C 2635 2639
FLIAND F134 2640 2638
FLLKUP F13F 2645 2559 2613 2972
FLBITS F16A 2670 2514 2516 2526
FMNEMG F1C8 2710 2708
FMYELL F1E6 2723 2699 2702 2704 2707 3157
FUYELL F20E 2748 2697
FUCNTU F213 2750 2747
FUSRCH F224 2757 2721 2821 2828
FWRCTL 0392 0050 0389 0391 0477 4155 4159
FWRFAL 00BA 0137 0478 0530 0586
FWRON  E0B5 0470 4468 4469 4470
FWRAOK E12D 0529 0531
FWRFIX E12E 0530 0486
FUSRDY F237 2765 2763
FUCKLN F23A 2767 2803
FUCNXT F261 2784 2772 2776 2779
FLCKND F272 2790 2788
FLADLN F280 2797 2794
FLADDA F282 2799 2796
FUFNCH F28C 2804 2792
FUCLOS F2A2 2814 2809
FUSTEM F2AF 2820 2813
FUNCH  F2B5 2822 2811
RAMSTR 0002 0029 0072
```

```
RAMEND 7FFF 0030 0033
RANGLN FD59 4248 1937 2361 3015 3058
RANBAD FD67 4254 4261
RANTOP FD6C 4258 4253
RANGE8 FD75 4265 1807
RANG32 FD79 4267 1546 2052 4091
RANGLO FD7B 4268 1560 4266
RANGE  FD7C 4270 3692
RCVING 405D 0187 0423 0453 4239 4352
RDYST  EACD 1883 1878 2895
REDDIN E35E 0820 0610
RELFLG 40CC 0212 1721 2861 4302
RELCNT 40CD 0214 3166 3828 3848 3876 3904
RESIDX 40CE 0215 3137 3140 3149 3173 3174 3832 3837 3844
       3846 3847 3851 3870 3883 3888 3900 3902 3905 3916
       3926 3964
REDAIN E3B7 0874 0611
RELTBL E97C 1694 1655
RELVAL E980 1695 1659
RLRPX  FA67 3859 3864
RLRP   FAC5 3908 3861 3871
ROMSTR E000 0032 0360
RPHZRO 418B 0347 0521 0523 0525
?RPTLIT 0002 0067
RPTEXT E04E 0419 0395 0424 0428 0430 0448
SRLPXY FAA5 3890 3894
RSLVQM 40C6 0208 3629 3896 3990
RSOLVE FA63 3856 3989
RSTEMP 40C1 0205 0937 0952 3960 4140 4146
RSVEG  FB25 3958 3884 3892
RSVOYL FB67 3989 1571 1729 2865 2872 2887
RUBMON F3C0 2950 2952
RUNLIT 0008 0069 2888 2933
RUNING 4054 0180 0612 1727 2889 2931 4162
RUPTS  E004 0384 4467
SAVONE 40C4 0207 1549 1551 1562
SBENT  E61D 1246 1274 1276
SCEVAL FC22 4081 4074 4078
SCALXT FC2E 4087 4083 4085
SCSLP  E6EC 1364 1375
SCOTS  FAE4 3923 3914
SC2G   FC2F 4089 4070 4103
?SC2BIT FC41 4097
SCEVBT FC4F 4105 4096 4102
SCC2BT FC57 4110 4106
SCBTXT FC59 4112 4107 4109
SECLIT 0004 0068 0991
SEEPT  E122 0523 0520
SELDRM FB9A 4011 1573 2728 2867 3122
SELLIN FBC1 4030 2866 2921
SETAN1 FBD8 4041 1821 1825 1831 1835 2908 2918
SETAN2 FBEB 4052 2904
SETN2N FBEE 4053 1914
SETBTH FC68 4125 4054
SET1ST FC6B 4127 4043 4066
SETANA FC6F 4131 0474
SETBIT FC82 4140 4108
?SETBNS FC85 4141
SETCLK FC99 4154 0465 0553
SETMKS FCB7 4167 0464 1838
SETOUT FCC0 4173 0475
SETTTY FD2E 4228 0473 1098 1106
```

```
SETFIN FDC5 4312 4292
SETFIX FDCD 4315 4303
SKPEND 406B 0199 1352 1576 1626 1684 1918 2358 2698 3010
       3515 3545 4207 4212 4221
SKPTST E2E4 0752 0655 0670 0696 1582 1588 3169 3918 3928
       3929 3965
SKPDLM FCF1 4192 1355 3544 4214
SKPNXT FD18 4211 4195 4198
SLDMPT FBAE 4020 1767 3172
SKPNOE FD1E 4215 4203
SKPNOF FD22 4218 4205
SKPNOD FD24 4220 4201 4210 4217 4225
SKPOK  FD2B 4224 4208
SMALL  F94F 3704 3697
SMLEDC F786 3466 1777 3099
SMLCP  F953 3706 3710
SNDING 405E 0188 0396 0416 4240 4354
SPCOUT F69F 3331 2059 2085 2314 2481 2973 2976 4006 4288
SPPLAC 7FEB 0033 0462 0470 4284 4297
SPOT   418E 0350 2194 2196 2198 2199 2202 2207 2258 2261
       2263 2264 2265
SPTVDX ED70 2194 2191 2344
SPTTGT EDFC 2257 2172 2236
SPTMOV EDFF 2258 2179 2337
STCHAR E076 0438 0432
STJTY  E830 1537 1542
STRLOG ECB0 2120 2118
STFBL  F166 2666 2663
ST1PTR 40D0 0218 1170 1579 1595 1699 1709 1715 1737 1772
       1811 1812 1813 2024 2090 2099 2107 2351 2653 2654
       2874 2902 2912 3308 3749 3752 3790 3937 3942 3966
       3972 3979 3982 4020 4022 4024 4025 4026 4041 4071
       4094
ST2PTR 40D2 0219 1172 1735 1946 2093 2096 2655 2658 2676
       3307 3753 3756 3787 3791 3808 3819 3962 3963 3968
       3974 3983 3984 4046 4052 4057 4063 4076 4098
SUBTRC E64B 1269 1253
SUBXY  E671 1294 1270
STPENT F39A 2931 2862
STILU  FB70 3994 3991
ST1CL2 FBFD 4062 2914
STCL2N FC00 4064 1870
STCLCM FC06 4068 4044 4049 4055 4060
STTYIN FD41 4237 0504 1389
SYSTEN 00C0 0142 0981 0983 0986
SYSSEC 00C1 0143 0995 0997 1000 2965 2993
SYSMIN 00C2 0144 1007 1009 1012 2130 2963 2991
SYSTNO 0004 0146 1300 1302 1305 1310 1645 4379 4381 4383
       4385 4387
SYSTRS 00C3 0147 1316
SYSHR  00C3 0148 1019 1021 1024 2961 2989
SYSWKD 00C4 0149 1030 1032 1034 2959 2985
SYSDAY 00C5 0150 1036 1038 1041 2957 2982
SYSMO  00C6 0151 1045 1047 1050 1052 2947 2979
SYSMDY 00C7 0152 1037 1059 2954
SYSYR  00C8 0153 1049 2945 2977
SYSTMP E694 1315 1301
TAB5   F15D 2662 2427
TEMP   404C 0173 0623 0624 0625 0697 0706 0714 0744 0838
       0841 0870 0871 0879 0880 0899 0901 0902 0910 1331
       1334 1336 1337 1341 1343 1344 1347
TEMTBL FEA2 4437 3701 3715 3722 3728
TEMTB2 FECB 4442 3695 3715 3728
?TEMTBE FF97 4464
```

```
 TIME    00BC 0139 0539 0540 0541 0544 0545 0547 0548 0550
              0551 0579 0582 0590 0593 0594 0600 0601 0602 0604
 TIMWRK  40D0 0217 0558 0566 0589 0591 0595 0598 0599 0603
?TIMTBL  FE42 4377
?TIMTBE  FE56 4388
 TMPEND  0018 0111 1322 1552 1669 2078 2159 2617
 TOBAD   E5CA 1189 1184 1200 1212 1259 1263 1267
 TSTLTH  0028 0286 0289
 TSTAXT  E603 1234 0773
 TSTX1   E616 1243 1258 1262 1266
 TTYCTT  0388 0045 0394 0418 0507 1083 1095 1537 4227 4231
              4238 4357
 TTYDAT  0389 0046 0411 0426 0443 4232 4355
 TTYSOS  405F 0189 1111 1112 1382
 TTYLIV  E51F 1077 1001
 TWOOUT  F679 3329 2402 2832 2838 2844 2880
 TXTPTR  4062 0194 0405 0410 0512 1354 1634 1683 1727 3476
              3487 3491 3501 3504 3526 3543 3649 3675 3680 4222
              4244 4332
 TXTEND  4064 0195 0425 0444 0450 4202 4242
 TXTOUT  4066 0196 0406 0496 1356 2083 2312 2322 2446 2453
              2476 2507 2509 2547 2564 2566 2569 2612 2623 2626
              2971 3256 3276 3339 3999 4004 4243 4287 4299 4312
              4324 4327 4333 4341
 TXTBFR  406C 0201 0433 0495 1353 1358 1384 1518 2058 2321
              2975 3329 3330 4241 4298 4310 4311 4323 4328 4331
 TXTBND  40C1 0202 0447 0511 4204
 UNMGLE  F96C 3722 2082 2161 2621
 UNMNCM  F981 3731 3729
 USED    4053 0178 1240 1283 2150
 USEFNA  E062 1562 1557
 VAR1    404F 0175 0703 0709 0721 0783 0788 0878 0903 1246
              1257 1261 1265 1272
 WAZOO   E39B 0854 0860 0861 0885 0886 0893 0894
 WCHFND  EB9D 1987 1960 1967
 WCHEFD  EBA7 1992 1989
 WCHEMG  EBB1 1997 1993
 WCHFXT  EBB4 1999 1991 1996
 WDMWCH  003E 0104 1126 1150 1171 1183 1199 1211 3186 3203
              3205 3206 3234
 WDMHOW  0042 0105 1124 1148 1181 1197 1209 3200
 WHCANA  008F 0119 0874 0877 0882 0911 0916 0923 0928 0931
 WHCHPT  4185 0344 2306 2326
 WHRLIN  4183 0343 0467 2178 2186 2192 2323
 WHCSTG  4187 0345 2134 2138 2142 2214
 WHCVAL  4189 0346 2210 2223
 WHCBIT  41BB 0365 2212 2213 2218 2222
 WHX     EE71 2306 2329 2332 2336 2343
 WKTBL   FE56 4393 2609 2986
?WKTBE   FE72 4408
 WZNEG   40F6 0263 1630 1665 1671 2537 2550 2572 2619 2622
 XDNOYL  F463 3032 3018
 XEOMSK  F4AD 3066 3069
 XEMASK  40D7 0228 3052 3070 3074 3082 3083
 XELDAD  F4C0 3076 3086
 XEXTR   F491 3054 3092
 XEFSLT  F4C3 3077 3081
 XEFKNO  F4CA 3082 3057
 XESTAD  F4D6 3087 3078
 XESDGT  F4E2 3093 3048 3061 3063
 XEMXIT  F4E6 3095 3072 3085
 XEYELL  F4E8 3096 3094
 XNDVND  4190 0351 2174 2277 2284 2292 2293 2294
 XNDVSR  4194 0353 2176 2273 2276 2278 2283
 XNQUOT  4192 0352 2180 2182 2268 2269 2281 2282 2287 2288 2298
```

```
 XKDSPL 4195 0354 2275 2299 2304
 XTEVAL F793 3475 3473 3518 3529
 XTRVAL. 40DA 0233 1547 1555 1561 1575 1583 1644 1647 1674
        1678 1808 1884 1932 1942 2017 2053 2362 2701 2703
        2941 3013 3021 3022 3088 3089 3112 3116 3170 3492
        3494 3503 3527 3530 3531 3541 3553 3696 3699 3704
        3717 3718 4031 4092 4099 4249 4250 4270 4275
 XTRDGT 40DC 0234 1933 1944 2031 2365 3016 3059 3064 3075
        3514 3520 4011
 XTRDSH 40DD 0235 3512 3517 3537 3559
 XTRSAV 40DF 0237 3528 3533 3540 3550 3552 3554 3555
 XTREND 40E1 0238 3538 3539 3556
 XTRACT F7DA 3511 1545 1550 1572 1578 1667 1806 1883 1936
        2051 2360 2700 2727 2940 3012 3055 3111 4030 4090
?XTRCKD F7F3 3521
?XTRCSE F80C 3532
 XTRSKD F825 3542 3524 3536
?XTRRTN F830 3547
 XTRDSP F831 3549 3513
 XTRDSE F84C 3560 3558
 XTRXIT F84D 3562 3516
 XTRYEL F850 3563 3535 3546
 XXAG   ED07 2152 2163
 XXCDV  EE80 2312 2309
 XXAVLP EEB3 2336 2341
 X12MSK 40D6 0225 3005 3025 3040
 X12NDX 40D8 0229 3003 3020 3038
 X12COM F42E 3009 3006 3041
 X12STV F449 3019 3014
 X12CXT F45F 3028 3011
 YELPOP FD8C 4282 1890 3299 3487 3564 4008 4037 4256
 YELL   FD8C 4284 1377 1592 1662 1923 1985 2377 2725 2749
        2937 3033 3096 3824 4016
 ZAPXMT E041 0414 0407
 ZAPTTY E049 0417 0454
 ZAPPO  FB00 3937 3919 3932
 ZAPP2  FB03 3938 3973
 ZEROES F85F 3575 1841 4086 4340
 ZEX00  E09E 0459 0461
 ZERNIN F860 3576 1625 3051 3456 3468
 ZEX    FABE 3903 3901
 ZE04   FC2B 4086 4082
 ZGD    E6B9 1337 1335
 ZHZH   F4F4 3104 3107
 ZMCNTU F50A 3115 3113
 ZMLNNO 4109 0276 3128 3129 3143
 ZMMXLN 410B 0277 3132 3133 3146
 ZMLINE F541 3138 3153
 ZMNXLN F55F 3151 3145 3148
 ZMCLRX F564 3154 3123 3150 3175
 ZMYELL F569 3157 3114 3117 3120
 ZMEMG  F56C 3158 3119
 ZMPTRK F577 3163 3139
 ZMCLEM F590 3174 3177
 ZMEXIT F59A 3178 3162 3165 3168
 ZOOG   E6C7 1344 1342
 ZOUT   E316 0774 0763 0767 0771
 ZPHCOT E03D 0411 0403
 ZPTST  E56F 1124 1135
 ZPTSTM E58F 1148 1163
 ZROTBL 00A0 0123 1766 2873
 ZXEDL  F33D 2881 2883

TOTAL ERRORS   2
```

TABLE 19

INTERRELATIONSHIP BETWEEN THE HARDWARE AND SOFTWARE OF THE PROGRAMMABLE SEQUENCE CONTROLLER

1. The controller is a computer-based stand alone system, optimized for controlling energy collection and distribution. The Motorola 6800 (U86, see FIGS. 5A–5C) microprocessor is used as the central control element. The electronics shown in FIG. 4A include:

1. Microprocessor 100 and its support circuitry
2. 1 K PROM and up to 7 K additional ROM/PROM 102
3. 17152 words of nonvolatile RAM 104
4. Nonvolatile real-time clock-calendar and counter 106
5. Serial daisychain communications link 24 (IN) and 28 (OUT)
6. 32 digital inputs from switches or contacts 38
7. 32 digital output drivers to logic or relays 42
8. 32 analog inputs 34 from thermistors and instrumentation
9. Indicators for all status conditions (central processor activity indicators 103, communication indicators 109, digital input indicators 113, output driver indicators 115, power supply indicators 123)
10. Power supply 122 operating from 117 VAC.

2. General familiarity with the Motorola M6800 microcomputer is assumed. Refer to "M6800 Systems Reference and Data Sheets" (May, 1975), by Motorola Semiconductor Products Inc., Box 20912, Phoenix, Arizona 85036, a subsidiary of Motorola, Inc. The instruction set for the microprocessor is set forth in Table 19′.

The clock frequency for the microprocessor is 460.8 KHz, or 2.17 μs/cycle. This runs continuously (no cycles are lost for refresh, etc.).

Halt, TSC, and BA options are not used in this system. NMI is not available for use.

Reset occurs after power up, while a normal interrupt signals when power is about to be lost. After a power-down interrupt, there is a nominal 100 μs delay until reset appears. These signals are sequenced to assure that a reset will always follow a power-down interrupt, to avoid hanging-up the controller. As a further guard against this, a power-down acknowledge bit is set by the CPU before entering the wait state. This is further described below.

Programmers should be aware of a bug in the CLI and SEI instructions, requiring them to be preceded by a certain NOP.

3. PIA's in General

On the power-up ($\overline{RESET}$), all PIA registers are set to zeros. This configures all parallel lines as inputs. Those intended as outputs will thus assume Logic "1" (output drivers off) because of pullups.

The normal sequence is to first setup the data direction register to 1's for intended outputs. However, since the output register is clear, all outputs now go to Logic "$\phi$" (all drivers on), until the program gets around to turning off the ones that should be off. This "spike" in the outputs is often undesirable, all can be prevented by the following somewhat more complex, setup procedure:

1. Power comes up, all bits $\phi$, all outputs off. Leave all DDR bits $\phi$.
2. Change DDRA access bits to 1, to get at data registers. (Write 04 in Control Register).
3. Load data register with desired pattern at turn-on (or all ones for all off). This does not show up at the bit outputs, since they are still inputs). (Write FF in Data Register).
4. Change DDRA access bits to $\phi$, to get at DDR's. (Write DO in Control Register).
5. Set up DDR's to outputs. Bits previously programmed at "1" will keep their output drivers high. (Write ones in Data Register output bits).
6. Change DDRA access bits back to 1, set up rest of control word. (Write 3C in Control Register).

PIA's have been arranged with the data registers adjacent, as well as control registers adjacent, so LDX and STX may be used to load them.

Interrupt flags are cleared upon reading the control register.

The following may cause interrupts:

TABLE 19-1

| TO ENB BIT | INTR OF | TO CLR INTR READ | | |
|---|---|---|---|---|
| 0 | 0392 | 0390 | CA1 Power Down ↓ | |
| 0 | 0393 | 0391 | CB1 Clock Sync ↓ | (Clock Register is unreadable during 100 us after ↑ ) 1 Second period |
| 0 | 039A | 0398 | CA1 60 Hz sync ↓ | (could use ↑ ) |
| 5,7 | 0388 | 0389 | ACIA (See Below) | |

All CA2 and CB2 lines should be set up as setreset outputs, even if unused. Unused CA1 and CB1 inputs are disabled.

4. ACIA in General (U90, see FIG. 9)

The ACIA does not have Power-On Reset and must initially have 03 written in the control register (0388). The register should then be set up for ÷16 (Bit 1=0, Bit 0=1) and the desired word length, parity, transmit control, and interrupt enabling.

$\overline{DCD}$ is always enabled and should cause no interrupts. $\overline{CTS}$ is received from the master terminal or modem, and must be true (input>+3V, lamp on) to allow transmission. A simple hardwire jumper from Pin 4 to 5 (CTS to RTS) should permit this—so the computer should assert RTS ($\overline{RTS}$=Low) whenever it expects to transmit. The indicators are on when the RTS or CTS is asserted, or if $\overline{TD}$ or $\overline{RD}$ is spacing.

5. Address Map.

Table 19-2 shows the address space for microprocessor U86 (FIGS. 5A–5C). Decoding is not complete, so areas marked "Do Not Use" may address RAM, ROM, or peripherals. They may not be used.

TABLE 19-2

| Address Map | | | |
| --- | --- | --- | --- |
| R/W | 0000–00FF | RAM Bank ϕ (256.) | |
| R/W | 0100–01FF | RAM Bank 1 (256.) 3/4K RAM 104 | |
| R/W | 0200–02FF | RAM Bank 2 (256.) | |
| R/W | 0300–0380 | Empty | |
| R | 0381 | Clock MSB | |
| R | 0382 | Clock 2MSB | |
| R | 0383 | Clock LSB | |
| R | 0384 | Inputs 1–8 | DIGITAL SWITCH INPUTS 38 |
| R | 0385 | Inputs 9–16 | |
| R | 0386 | Inputs 17–24 | |
| R | 0387 | Inputs 25–32 | |
| R/W | 0388 | Control Reg. | TTY ACIA U90 |
| R/W | 0389 | Data Reg. | |
| | 038A–038F | Do Not Use (Image Addresses) | |
| R/W | 0390 | A Data - Baud Control | INTERNAL PIA U106 |
| W | 0391 | B Data - Indicators | |
| R/W | 0392 | A CR - Power Down | |
| R/W | 0393 | B CR - Clock Control | |
| R/W | 0394 | A Data - Mux & Comparator | ANALOG CONTROL PIA U24 — ANALOG INPUTS 34 |
| W | 0395 | B Data - DAC | |
| R/W | 0396 | A CR | |
| R/W | 0397 | B CR | |
| W | 0398 | A Data - Outputs 1–8 | OUT 1 PIA U77 — DIGITAL OUTPUTS 42 |
| W | 0399 | B Data - Outputs 9–16 | |
| R/W | 039A | A CR - 60 Hz Sync | |
| R/W | 039B | B CR | |
| R/W | ADDR | | |
| W | 039C | A Data - Outputs 17–24 | OUT 2 PIA DIGITAL OUTPUTS U60 |
| W | 039D | B Data - Outputs 25–32 | |
| R/W | 039E | A CR | |
| R/W | 039F | B CR | |
| | 03A0–3FFF | Do Not Use (Image Addresses) | |
| R/W | 4000–4FFF | RAM Bank 4 | 4096. × 4 16K RAM 136 |
| R/W | 5000–5FFF | RAM Bank 5 | |
| R/W | 6000–6FFF | RAM Bank 6 | |
| R/W | 7000–7FFF | RAM Bank 7 | |
| | 0380–DFFF | Do Not Use (Image Addresses) | |
| R | E000–E3FF | ROM Bank 8 (Use Last) | |
| R | E400–E7FF | ROM Bank 7 | |
| R | E800–EBFF | ROM Bank 6 | |
| R | EC00–EFFF | ROM Bank 5 | |
| R | F000–FBFF | ROM Bank 4 | |
| R | F400–F7FF | ROM Bank 3 | |
| R | F800–FBFF | ROM Bank 2 (Use First) | |
| R | FC00–FFFF | PROM Bank 1 (Always Present) | |

6. RAM 104 and 136 (see FIG. 7)

Locations 0000–02FF contain 768 words of nonvolatile RAM. It comes up random on first battery installation, and loses data after 1 month of power loss. It is arranged in 3 banks, and if a program does not require all 3, it should be kept within the lower bank(s) to allow depopulation. Locations 0000–00FF are directly addressible (1-byte address). 16K nonvolatile RAM: 4 banks 4000–7FFF, with 4 day battery backup.

7. PROM U50 (see FIG. 6)

Locations FC00-FFFF are contained in a single PROM chip which is always present. This contains the interrupt vectors as well as system constants which change for each application.

8. ROM U6, U12, U19, U32, U36, U40 (see FIG. 6)

Locations E000-FBFF may contain up to 7 ROM/-PROM chips which contain the program. If less space is needed, the higher addressed bank should be used first.

9. CLOCK-CALENDAR 106 (see FIG. 7)

The clock is really a nonvolatile power-down timer. Ordinarily, a line-derived 60 Hz interrupt (CA1 of 039A, U106) is counted by the processor and stored in nonvolatile RAM to keep the time. This provides better long-term accuracy than a crystal. While power is available, the microprocessor must continuously clear the clock counter (60 Hz rate is fine) using CB2 (0393 U 106). Once power has gone down, the clearing stops and the counter accumulates seconds elapsed. When power returns, the microprocessor reads this accumulated count, adds it to the last time recorded (when power went down), resumes keeping time with the 60 Hz, input, and resumes clearing the counter. The three bytes of the counter are readable in 0381 (MSB) through 0383 (LSB). In order to ensure that the counter is not rippling during reading, the microprocessor should only read the clock at the falling edge of CB1 (0393). Data is unstable for 100 μs after the rising edge of this signal, a 1 Hz squarewave with 50% duty cycle.

10. Digital Switch Inputs 38 (see FIGS. 8 and 15)

Four Read-Only registers contain the switch inputs. These are filtered, but non debounced; bounce can be ignored by scanning slower than 10 ms, such as 60 Hz.

The registers are set forth in Table 19-3.

TABLE 19-3

DIGITAL INPUT REGISTERS

| | 7 | 6 | 5 | 4 | 3 | 2 | 1 | 0 | |
|---|---|---|---|---|---|---|---|---|---|
| 0384 | 8 | 7 | 6 | 5 | 4 | 3 | 2 | 1 | Input |
| 0385 | 16 | 15 | 14 | 13 | 12 | 11 | 10 | 9 | # |
| 0386 | 24 | 23 | 22 | 21 | 20 | 19 | 18 | 17 | Inverting |
| 0387 | 32 | 31 | 30 | 29 | 28 | 27 | 26 | 25 | |

Switches connect each input to the +24 volt supply. When a switch is open, the corresponding indicator 113 is off and the register bit is a "one". When the switch is closed the corresponding indicator 113 is on and the bit is a "zero".

The inputs have hysteresis:
Rising threshold 9.2-15.5 V
Falling threshold 1.75-7.3 V
Nominal Impedance 1500Ω
OPEN=GND=NEGATIVE INPUT=OFF.

11. TTY ACIA U90 (see FIG. 9)

The ACIA is hooked up as a daisy chain (Zeus Buss). The male connector (JC) is used for TTY or master control, while the female connector extends the buss to other controllers is required. Connector JC is wired as a terminal, allowing pin-for-pin connection to a modem. To connect to a hand-held computer terminal, e.g. manufactured by the Termiflex Corporation (see U.S. Pat. Nos. 4,005,388 and 4,007,443) or other terminal, swap Pins 2 and 3, and swap Pins 4 and 5 in the interconnecting cable. (CDI terminals look like modems—no swap required)

The control register is at 0388, data register at 0389. Reset is first (write φ3 in 0388), then set up 0388 as set forth in Table 19-4.

TABLE 19-4

REGISTER 0388 SET UP (Write)

| | 7 | 6 | 5 | 4 | 3 | 2 | 1 | 0 |
|---|---|---|---|---|---|---|---|---|
| 0388 WRITE | • | 0 | • | 0 | 0 | 0 | 0 | 1 |

Assert RTS
7 Bits + Even Parity + 2 Stop Bits
÷16
XMIT INTR. ENB. IF 1 (TDRE)
RCV INTR. ENB. IF 1 (RDRF)

This is for typical terminal operation, and may be changed as required. Baud must be set up (see next paragraph).

Status is READ in register 0388 as set forth in Table 19-5. (Standard ACIA practice)

TABLE 19-5

REGISTER 0388 SET UP (Read)

| | 7 | 6 | 5 | 4 | 3 | 2 | 1 | 0 |
|---|---|---|---|---|---|---|---|---|
| 0388 READ | • | • | • | • | • | 0 | • | • |

DCD
RCV FLAG (RDRF) Full if 1 cleared by reading RCV DATA
XMIT FLAG (TDRE) Empty if 1
CTS - φ enables TDRE
Framing Error if 1 - accompanies data
Overrun Error if 1 - reset by reading RCV data
Parity Error if 1 - accompanies data
IRQ - 1 if any interrupt 12. Internal PIA (U106 see FIG. 9)

Set up as described above. Glitches on this PIA are unimportant (except CLOCK RESET and GOODBYE). See Table 19-6.

TABLE 19-6

0390 A DATA

| 7 | 6 | 5 | 4 | 3 | 2 | 1 | 0 |
|---|---|---|---|---|---|---|---|
| | | X | X | | | | |
| 2 | 1 | | | 3 | 2 | 1 | 0 |
| Ext. Baud Select (Read) | | | | Baud Rate (Write) | | | |

TABLE 19-7

Baud Table

| A3-Aφ | BAUD | Hand-Held Terminal TERMIFLEX Corp. | CDI | ZEUS BUSS |
|---|---|---|---|---|
| 0 | 3600 | | | |
| 1 | 4800 | | | |
| 2 | 7200 | | | |
| 3 | 9600 | | | • |
| 4 | 900 | | | |
| 5 | 1200 | • | | |
| 6 | 1800 | | | |
| 7 | 2400 | | | |
| 8 | 134.5# | | | |
| 9 | 150 | • | • | |
| A | 300 | • | • | • |
| B | 600 | | | |
| C | 19200 | | | • |
| D | 50 | | | |
| E | 75 | | | |
| F | 110@ | • | • | • |

#0.06% Slow
@0.07% Slow
Others ±.01%

Bits 0-3 are outputs, and select baud according to Table 19-7. Note that 110 baud (1111) is selected by pullups before the PIA is set up. This is the default baud rate. Bits 7 and 6 are inputs, which indicate the desired baud rate. Their interpretation is set forth in Table 19-8.

TABLE 19-8

BITS 7 and 6 of REGISTER 0390 of U106

| JC BIT | PIN18 7 | PIN11 6 | 0 = GND | 1 = OPEN |
|---|---|---|---|---|
| | 0 | 0 | 19200 Baud | |
| | 0 | 1 | 9600 Baud | |
| | 1 | 0 | 300 Baud | |
| | 1 | 1 | 110 Baud | (Default) |

Table 19-9 sets forth the set up of register 0391.

TABLE 19-9

0391 B DATA

| 7 | 6 | 5 | 4 | 3 | 2 | 1 | 0 |
|---|---|---|---|---|---|---|---|
| X | X | X | X | | | | |
| | | | | 4 | 3 | 2 | 1 |
| | | | | CPU Indicators (Write) | | | |

Location 0391 Controls the four CPU indicators 103 Each indicator is "ON" when the corresponding bit is a "one".

Table 19-20 sets forth the set up of REGISTER 0392

TABLE 19-20

0392 A CONTROL

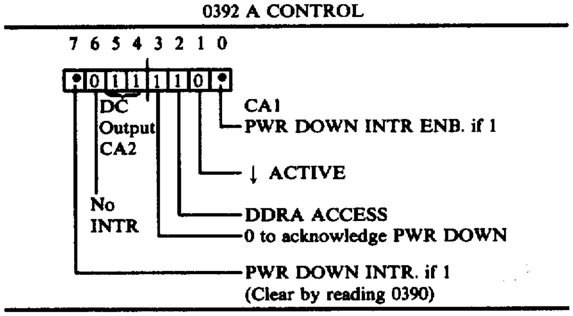

When setting up register 0392, bits 5, 4, and 3 should all be set simultaneously to prevent erroneous powerdown acknowledgement. Bit 7 going to a "one" warns the CPU of impending power failure. The CPU responds by clearing Bit 3, storing all information to be saved, and going into the wait state. When returning from RESET, BITS 5, 4 and 3 will be zero (input) which appears as a logic "one" output. When setting up again, the CA2 bit remains high.

Table 19–21 sets forth the set up of register 0393.

TABLE 19-21

0393 B CONTROL

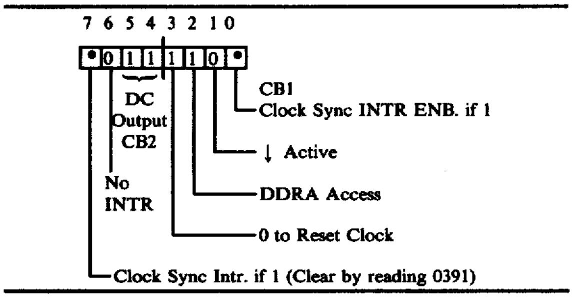

The clock counter is controlled by 0393. On Power-Up after reset, the clock will be counting seconds. Bits 5, 4 and 3 are zero, so CB2 is open (high). After setup, bits 5, 4 and 3 are one, and CB2 remains high. The CPU waits for clock sync INTR ↓, then reads the clock counter, saves the result, then clears bit 3 and immediately sets it. This pulse clears the clock. The clearing-and-setting of bit 3 should reoccur after each 60 Hz tick is counted, or as slowly as 1 Hz, until power-down, when the clock starts accumulating seconds again. It is important that the initial setup of 0393 sets Bits 5, 4, and 3 simultaneously to prevent erroneous clock resets.

13. Analog PIA U24 (see FIG. 11)

Setup as described above. Glitches on outputs are not important, but should be avoided anyway.

The setup of registers 0394, 0395, 0396, and 0397 are set forth in Table 19–22.

TABLE 19-22

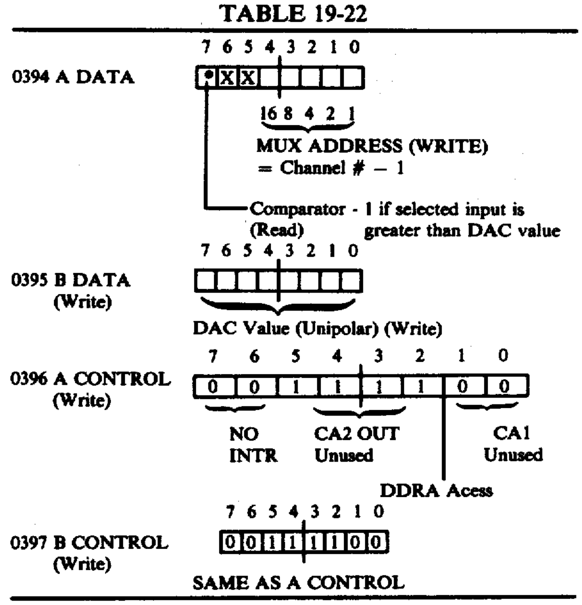

This PIA serves to measure the voltage at any of 32 analog inputs 34. The inputs are pulled-up to full scale (DAC=FF) with 3.3K, and the thermistor resistance forms a voltage divider to ground (see FIG. 14). The comparator output is 1 if the selected channel input voltage is greater than the DAC value. The DAC may be changed to check setpoints, or count-ramped to measure voltage, or successively-approximated. Open sensors appear as around FF, while shorted sensors read near 00. Since the same reference is used, the voltage divider fraction is equal to the fraction DAC/100 (HEX).

The 5 MUX outputs select the input channel. The channel number is one greater than the binary code (channels numbered 1–32).

Comparator-Dac settling time: 25 $\mu s$ (for full scale transistion)

14. Output Drivers First PIA U77 (see FIGS. 10 and 15)

Setup as directed above to avoid glitches into large resistive and inductive loads. See Table 19-23 for setup of registers 0398, 0399, 039A and 039B.

TABLE 19-23

| | 7 | 6 | 5 | 4 | 3 | 2 | 1 | 0 | |
|---|---|---|---|---|---|---|---|---|---|
| 0398 A DATA | 8 | 7 | 6 | 5 | 4 | 3 | 2 | 1 | OUTPUT # 0 = ON = LOW (WRITE) |
| 0399 B DATA | 16 | 15 | 14 | 13 | 12 | 11 | 10 | 9 | OUTPUT # 0 = ON = LOW (WRITE) |
| 039A A CONTROL | • | 0 | 1 | 1 | 1 | 1 | 0 | • | |
| 0398 B CONTROL | 0 | 0 | 1 | 1 | 1 | 1 | 0 | 0 | |

039A A CONTROL: bit 6: NO INTR; bits 5–3: CA2 OUT UNUSED; bit 2: DDRA ACCESS; bits 1–0: CA1 60 Hz INTR ENB; bit 7: 60 Hz INTER IF "1" (CLEAR BY READING 0398)

0398 B CONTROL: bits 7–6: NO INTR; bits 5–3: CB2 OUT UNUSED; bit 2: DDRA ACCESS; bits 1–0: CB1 UNUSED Output bits are non-inverted, active low. For TTL or CMOS connection, a "1" in the register bit causes a "1" at the output. For driving relays and lamps connected to voltages between 5 V and 24 V, the relay or lamp is "ON" when the register bit is "0". Clamping and inrush protection are already provided. LED is ON when register bit is "0".

The 60 Hz line derived clock is available on CA1. The interrupt bit 7 is cleared by reading 0398.

15. Output Drivers, Second 2 PIA U60 (see FIG. 10)

Identical to Outputs PIA U77 except no 60 Hz Interrupt. See Table 19-24 for setup of registers 039C, 039D, 039E, and 039F.

TABLE 19-24

| | 7 | 6 | 5 | 4 | 3 | 2 | 1 | 0 | |
|---|---|---|---|---|---|---|---|---|---|
| 039C A DATA | 24 | 23 | 22 | 21 | 20 | 19 | 18 | 17 | OUTPUT # 0 = ON = LOW (Write) SAME AS B CONTROL |
| 039D B DATA | 32 | 31 | 30 | 29 | 28 | 27 | 26 | 25 | OUTPUT # 0 = ON = LOW (Write) SAME AS B CONTROL |
| 039E A CONTROL | 0 | 0 | 1 | 1 | 1 | 1 | 0 | 0 | OUTPUT # 0 = ON = LOW (Write) SAME AS B CONTROL |
| 039F B CONTROL | 0 | 0 | 1 | 1 | 1 | 1 | 0 | 0 | |

039F B CONTROL: bits 7–6: NO INTR; bits 5–3: CA2, CB2 OUT UNUSED; bit 2: DDRA ACCESS; bits 1–0: CA1, CB1 UNUSED

-EOD-

See Table 19-25 for pinpoint designations for controller 20.

TABLE 19-25

| CONTROLLER PINOUTS | | | |
|---|---|---|---|
| | DB25S FEMALE JE DIGITAL OUTPUTS | | DB25S FEMALE JF DIGITAL OUTPUTS |
| 1 | OUT1 | 1 | OUT17 |
| 2 | OUT2 | 2 | OUT18 |
| 3 | OUT3 | 3 | OUT19 |
| 4 | OUT4 | 4 | OUT20 |
| 5 | OUT5 | 5 | OUT21 |
| 6 | OUT6 | 6 | OUT22 |
| 7 | OUT7 | 7 | OUT23 |
| 8 | OUT8 | 8 | OUT24 |
| 9 | OUT9 | 9 | OUT25 |
| 10 | OUT10 | 10 | OUT26 |
| 11 | OUT11 | 11 | OUT27 |
| 12 | OUT12 | 12 | OUT28 |
| 13 | OUT13 | 13 | OUT29 |
| 14 | OUT14 | 14 | OUT30 |
| 15 | OUT15 | 15 | OUT31 |
| 16 | OUT16 | 16 | OUT32 |
| 17 | +5V | 17 | +5V |
| 18 | +5V | 18 | +5V |
| 19 | +8V | 19 | +8V |
| 20 | +8V | 20 | +8V |
| 21 | +24V | 21 | +24V |
| 22 | +24V | 22 | +24V |
| 23 | GND | 23 | GND |
| 24 | GND | 24 | GND |
| 25 | GND | 25 | GND |
| | DB25P MALE JA DIGITAL INPUTS | | DB25P JB DIGITAL INPUTS |
| 1 | IN1 | 1 | IN17 |
| 2 | IN2 | 2 | IN18 |
| 3 | IN3 | 3 | IN19 |
| 4 | IN4 | 4 | IN20 |
| 5 | IN5 | 5 | IN21 |
| 6 | IN6 | 6 | IN22 |
| 7 | IN7 | 7 | IN23 |
| 8 | IN8 | 8 | IN24 |
| 9 | IN9 | 9 | IN25 |
| 10 | IN10 | 19 | IN26 |
| 11 | IN11 | 11 | IN27 |
| 12 | IN12 | 12 | IN28 |
| 13 | IN13 | 13 | IN29 |
| 14 | IN14 | 14 | IN30 |
| 15 | IN15 | 15 | IN31 |
| 16 | IN16 | 16 | IN32 |
| 18 | +24V | 17 | +24V |
| 18 | +24V | 18 | +24V |
| 19 | +24V | 19 | +24V |
| 20 | +24V | 20 | +24V |

TABLE 19-25-continued

| CONTROLLER PINOUTS | | | | |
|---|---|---|---|---|
| 21 | +24V | | 21 | +24V |
| 22 | +24V | | 22 | +24V |
| 23 | GND | | 23 | GND |
| 24 | GND | | 24 | GND |
| 25 | GND | | 25 | GND |
| | DB25P MALE JC MASTER EIA CONNECTOR | | | DB25S FEMALE JD SATELLITE EIA CONNECTOR |
| 1 | CHASSIS | —— | 1 | CHASSIS |
| 2 | $\overline{TDM}$ (OUTPUT OR'ED) | ← | 2 | $\overline{TDF}$ (INPUT) |
| 3 | $\overline{RDM}$ (INPUT) | → | 3 | $\overline{RDF}$ (OUTPUT) |
| 4 | $\overline{RTSM}$ (OUTPUT OR'ED) | ← | 4 | $\overline{RTSF}$ (INPUT) |
| 5 | $\overline{CTSM}$ (INPUT) | → | 5 | $\overline{CTSM}$ (OUTPUT) |
| 6 | — | | 6 | — |
| 7 | SIGNAL GND | —— | 7 | SIGNAL GND |
| 8 | — | | 8 | — |
| 9 | — | | 9 | — |
| 10 | — | | 10 | — |
| 11 | BS1 | —— | 11 | BS1 |
| 12 | — | | 12 | — |
| 13 | — | | 13 | — |
| 14 | — | | 14 | — |
| 15 | — | | 15 | — |
| 16 | — | | 16 | — |
| 17 | — | | 17 | — |
| 18 | BS2 | —— | 18 | BS1 |
| 19 | — | | 19 | — |
| 20 | — | | 20 | — |
| 21 | — | | 21 | — |
| 22 | — | | 22 | — |
| 23 | — | | 23 | — |
| 24 | — | | 24 | — |
| 25 | — | | 25 | — |

↑ THIS LOOKS LIKE A "TERMINAL" TO EIA INTERFACE

↑ SATELLITE DAISY-CHAIN RECEIVES EVERYTHING RECEIVED BY JC. TRANSMIT IN JD IS OR'ED WITH ACIA AND SENT OUT JC. NOT USED EXCEPT IN BUSS CONFIGURATION

PLUGS DIRECTLY INTO A "MODEM" SWAP 2-3 AND 4-5 TO CONNECT A "TERMINAL" SUCH AS HT/2

TABLE 19'

MICROPROCESSOR INSTRUCTION SET

The MC6800 has a set of 72 different instructions. Included are binary and decimal arithmetic, logical, shift, rotate, load, store, conditional or unconditional branch, interrupt and stack manipulation instructions

MPU ADDRESSING MODES

The MC6800 eight-bit microprocessing unit has seven address modes that can be used by a programmer, with the addressing mode a function of both the type of instruction and the coding within the instruction. A summary of the addressing modes for a particular instruction can be found in Table 7 along with the associated instruction execution time that is given in machine cycles. With a clock frequency of 1 MHz, these times would be microseconds.

Accumulator (ACCX) Addressing — In accumulator only addressing, either accumulator A or accumulator B is specified. These are one-byte instructions.

Immediate Addressing — In immediate addressing, the operand is contained in the second byte of the instruction execpt LDS and LDX which have the operand in the second and third bytes of the instruction. The MPU addresses this location when it fetches the immediate instruction for execution. These are two or three-byte instructions.

Direct Addressing — In direct addressing, the address of the operand is contained in the second byte of the instruction. Direct addressing allows the user to directly address the lowest 256 bytes in the machine i.e., locations zero through 255. Enhanced execution times are achieved by storing data in these locations. In most configurations, it should be a random access memory. These are two-byte instructions.

Extended Addressing — In extended addressing, the address contained in the second byte of the instruction is used as the higher eight-bits of the address of the operand. The third byte of the instruction is used as the lower eight-bits of the address for the operand. This is an absolute address in memory. These are three-byte instructions.

Indexed Addressing — In indexed addressing, the address contained in the second byte of the instruction is added to the index register's lowest eight bits in the MPU. The carry is then added to the higher order eight bits of the index register. This result is then used to address memory. The modified address is held in a temporary address register so there is no change to the index register. These are two-byte instructions.

Implied Addressing — In the implied addressing mode the instruction gives the address (i.e., stack pointer, index register, etc.). These are one-byte instructions.

Relative Addressing — In relative addressing, the address contained in the second byte of the instruction is added to the program counter's lowest eight bits plus two. The carry or borrow is then added to the high eight bits. This allows the user to address data within a range of −125 to +129 bytes of the present instruction. These are two-byte instructions.

MICROPROCESSOR INSTRUCTION SET — ALPHABETIC SEQUENCE

| | | | | | |
|---|---|---|---|---|---|
| ABA | Add Accumulators | CLR | Clear | PUL | Pull Data |
| ADC | Add with Carry | CLV | Clear Overflow | | |
| ADD | Add | CMP | Compare | ROL | Rotate Left |
| AND | Logical And | COM | Complement | ROR | Rotate Right |
| ASL | Arithmetic Shift Left | CPX | Compare Index Register | RTI | Return from Interrupt |
| ASR | Arithmetic Shift Right | | | RTS | Return from Subroutine |
| | | DAA | Decimal Adjust | | |
| BCC | Branch if Carry Clear | DEC | Decrement | SBA | Subtract Accumulators |
| BCS | Branch if Carry Set | DES | Decrement Stack Pointer | SBC | Subtract with Carry |
| BEQ | Branch if Equal to Zero | DEX | Decrement Index Register | SEC | Set Carry |
| BGE | Branch if Greater or Equal Zero | | | SEI | Set Interrupt Mask |
| BGT | Branch if Greater than Zero | EOR | Exclusive OR | SEV | Set Overflow |
| BHI | Branch if Higher | | | STA | Store Accumulator |
| BIT | Bit Test | INC | Increment | STS | Store Stack Register |
| BLE | Branch if Less or Equal | INS | Increment Stack Pointer | STX | Store Index Register |
| BLS | Branch if Lower or Same | INX | Increment Index Register | SUB | Subtract |

TABLE 19'-continued

MICROPROCESSOR INSTRUCTION SET

| | | | | | |
|---|---|---|---|---|---|
| BLT | Branch if Less than Zero | | | SWI | Software Interrupt |
| BMI | Branch if Minus | JMP | Jump | | |
| BNE | Branch if Not Equal to Zero | JSR | Jump to Subroutine | TAB | Transfer Accumulators |
| BPL | Branch if Plus | | | TAP | Transfer Accumulators to Condition Code Reg. |
| BRA | Branch Always | LDA | Load Accumulator | TBA | Transfer Accumulators |
| BSR | Branch to Subtoutine | LDS | Load Stack Pointer | TPA | Transfer Condition Code Reg. to Accumulator |
| BVC | Branch if Overflow Clear | LDX | Load Index Register | TST | Test |
| BVS | Branch if Overflow Set | LSR | Logical Shift Right | TSX | Transfer Stack Pointer to Index Register |
| | | | | TXS | Transfer Index Register to Stack Pointer |
| CBA | Compare Accumulators | NEG | Negate | | |
| CLC | Clear Carry | NOP | No Operation | WAI | Wait for Interrupt |
| CLI | Clear Interrupt Mask | | | | |
| | | QRA | Inclusive OR Accumulator | | |
| | | PSH | Push Data | | |

ACCUMULATOR AND MEMORY INSTRUCTIONS

| Operations | MNEMONIC | IMMED OP | IMMED ~ | IMMED # | DIRECT OP | DIRECT ~ | DIRECT # | INDEX OP | INDEX ~ | INDEX # | EXTND OP | EXTND ~ | EXTND # | IMPLIED OP | IMPLIED ~ | IMPLIED # | BOOLEAN/ARITHMETIC OPERATION (All register labels refer to contents) | 5 H | 4 I | 3 N | 2 Z | 1 V | 0 C |
|---|---|---|---|---|---|---|---|---|---|---|---|---|---|---|---|---|---|---|---|---|---|---|---|
| Add | ADDA | 88 | 2 | 2 | 9B | 3 | 2 | AB | 5 | 2 | BB | 4 | 3 | | | | A+M→A | ↕ | • | ↕ | ↕ | ↕ | ↕ |
| | ADDB | CB | 2 | 2 | DB | 3 | 2 | EB | 5 | 2 | FB | 4 | 3 | | | | B+M→B | ↕ | • | ↕ | ↕ | ↕ | ↕ |
| Add Acmlts | ABA | | | | | | | | | | | | | 1B | 2 | 1 | A + B → A | ↕ | • | ↕ | ↕ | ↕ | ↕ |
| Add with Carry | ADCA | 89 | 2 | 2 | 99 | 3 | 2 | A9 | 5 | 2 | B9 | 4 | 3 | | | | A + M + C→A | ↕ | • | ↕ | ↕ | ↕ | ↕ |
| | ADCB | C9 | 2 | 2 | D9 | 3 | 2 | E9 | 5 | 2 | F9 | 4 | 3 | | | | B + M + C → B | ↕ | • | ↕ | ↕ | ↕ | ↕ |
| and | ANDA | 84 | 2 | 2 | 94 | 3 | 2 | A4 | 5 | 2 | B4 | 4 | 3 | | | | A · M → A | • | • | ↕ | ↕ | R | • |
| | ANDB | C4 | 2 | 2 | D4 | 3 | 2 | E4 | 5 | 2 | F4 | 4 | 3 | | | | B · M → B | • | • | ↕ | ↕ | R | • |
| Bit Test | BITA | 85 | 2 | 2 | 95 | 3 | 2 | A5 | 5 | 2 | B5 | 4 | 3 | | | | A · M | • | • | ↕ | ↕ | R | • |
| | BITB | C5 | 2 | 2 | D5 | 3 | 2 | E5 | 5 | 2 | F5 | 4 | 3 | | | | B · M | • | • | ↕ | ↕ | R | • |
| Clear | CLR | | | | | | | 6F | 7 | 2 | 7F | 6 | 3 | | | | 00 → M | • | • | R | S | R | R |
| | CLRA | | | | | | | | | | | | | 4F | 2 | 1 | 00 → A | • | • | R | S | R | R |
| | CLRB | | | | | | | | | | | | | 5F | 2 | 1 | 00 → B | • | • | R | S | R | R |
| Compare | CMPA | 81 | 2 | 2 | 91 | 3 | 2 | A1 | 5 | 2 | B1 | 4 | 3 | | | | A − M | • | • | ↕ | ↕ | ↕ | ↕ |
| | CMPB | C1 | 2 | 2 | D1 | 3 | 2 | E1 | 5 | 2 | F1 | 4 | 3 | | | | B − M | • | • | ↕ | ↕ | ↕ | ↕ |
| Compare Acmlts | CBA | | | | | | | | | | | | | 11 | 2 | 1 | A − B | • | • | ↕ | ↕ | ↕ | ↕ |
| Complement 1's | COM | | | | | | | 63 | 7 | 2 | 73 | 6 | 3 | | | | $\overline{M}$ → M | • | • | ↕ | ↕ | R | S |
| | COMA | | | | | | | | | | | | | 43 | 2 | 1 | $\overline{A}$ → A | • | • | ↕ | ↕ | R | S |
| | COMB | | | | | | | | | | | | | 53 | 2 | 1 | $\overline{B}$ → B | • | • | ↕ | ↕ | R | S |
| Complement 2's | NEG | | | | | | | 60 | 7 | 2 | 70 | 6 | 3 | | | | 00 − M →M | • | • | ↕ | ↕ | ① | ② |
| (Negate) | NEGA | | | | | | | | | | | | | 40 | 2 | 1 | 00 − A → A | • | • | ↕ | ↕ | ① | ② |
| | NEGB | | | | | | | | | | | | | 50 | 2 | 1 | 00 − B → B | • | • | ↕ | ↕ | ① | ② |
| Decimal Adjust, A | DAA | | | | | | | | | | | | | 19 | 2 | 1 | Converts Binary Add of BCD Characters into BCD Format | • | • | ↕ | ↕ | ↕ | ③ |
| Decrement | DEC | | | | | | | 6A | 7 | 2 | 7A | 6 | 3 | | | | M − 1 → M | • | • | ↕ | ↕ | 4 | • |
| | DECA | | | | | | | | | | | | | 4A | 2 | 1 | A − 1 → A | • | • | ↕ | ↕ | 4 | • |
| | DECB | | | | | | | | | | | | | 5A | 2 | 1 | B − 1 → B | • | • | ↕ | ↕ | 4 | • |
| Exclusive OR | EORA | 88 | 2 | 2 | 98 | 3 | 2 | A8 | 5 | 2 | B8 | 4 | 3 | | | | A ⊕ M → A | • | • | ↕ | ↕ | R | • |

TABLE 19'-continued

MICROPROCESSOR INSTRUCTION SET

| | | | | | | | | | | | | | | | | | | | | | | | |
|---|---|---|---|---|---|---|---|---|---|---|---|---|---|---|---|---|---|---|---|---|---|---|---|
| | EORB | C8 | 2 | 2 | D8 | 3 | 2 | E8 | 5 | 2 | F8 | 4 | 3 | | | | B ⊕ M → R | • | • | ↕ | ↕ | R | • |
| Increment | INC | | | | | | | 6C | 7 | 2 | 7C | 6 | 3 | | | | M + 1 → M | • | • | ↕ | ↕ | (5) | • |
| | INCA | | | | | | | | | | | | | 4C | 2 | 1 | A + 1 → A | • | • | ↕ | ↕ | (5) | • |
| | INCB | | | | | | | | | | | | | 5C | 2 | 1 | B + 1 → B | • | • | ↕ | ↕ | (5) | • |
| Load Acmltr | LDAA | 86 | 2 | 2 | 96 | 3 | 2 | A6 | 5 | 2 | B6 | 4 | 3 | | | | M → A | • | • | ↕ | ↕ | R | • |
| | LDAB | C6 | 2 | 2 | D6 | 3 | 2 | E6 | 5 | 2 | F6 | 4 | 3 | | | | M → B | • | • | ↕ | ↕ | R | • |
| Or, Inclusive | ORAA | 8A | 2 | 2 | 9A | 3 | 2 | AA | 5 | 2 | BA | 4 | 3 | | | | A + M → A | • | • | ↕ | ↕ | R | • |
| | ORAB | CA | 2 | 2 | DA | 3 | 2 | EA | 5 | 2 | FA | 4 | 3 | | | | B + M → B | • | • | ↕ | ↕ | R | • |
| Push Data | PSHA | | | | | | | | | | | | | 36 | 4 | 1 | A → $M_{SP}$, SP − 1 → SP | • | • | • | • | • | • |
| | PSHB | | | | | | | | | | | | | 37 | 4 | 1 | B → $M_{SP}$, SP − 1 → SP | • | • | • | • | • | • |
| Pull Data | PULA | | | | | | | | | | | | | 32 | 4 | 1 | SP + 1 → SP, $M_{SP}$ → A | • | • | • | • | • | • |
| | PULB | | | | | | | | | | | | | 33 | 4 | 1 | SP + 1 → SP, $M_{SP}$ → B | • | • | • | • | • | • |
| Rotate Left | ROL | | | | | | | 69 | 7 | 2 | 79 | 6 | 3 | | | | M | • | • | ↕ | ↕ | (6) | ↕ |
| | ROLA | | | | | | | | | | | | | 49 | 2 | 1 | A | • | • | ↕ | ↕ | (8) | ↕ |
| | ROLB | | | | | | | | | | | | | 59 | 2 | 1 | B | • | • | ↕ | ↕ | (8) | ↕ |
| Rotate Right | ROR | | | | | | | 66 | 7 | 2 | 76 | 6 | 3 | | | | M | • | • | ↕ | ↕ | (6) | ↕ |
| | RORA | | | | | | | | | | | | | 46 | 2 | 1 | A | • | • | ↕ | ↕ | (6) | ↕ |
| | RORB | | | | | | | | | | | | | 56 | 2 | 1 | B | • | • | ↕ | ↕ | (8) | ↕ |
| Shift Left, Arithmetic | ASL | | | | | | | 68 | 7 | 2 | 78 | 6 | 3 | | | | M | • | • | ↕ | ↕ | (8) | ↕ |
| | ASLA | | | | | | | | | | | | | 48 | 2 | 1 | A | • | • | ↕ | ↕ | (6) | ↕ |
| | ASLB | | | | | | | | | | | | | 58 | 2 | 1 | B | • | • | ↕ | ↕ | (6) | ↕ |
| Shift Right, Arithmetic | ASR | | | | | | | 67 | 7 | 2 | 77 | 6 | 3 | | | | M | • | • | ↕ | ↕ | (8) | ↕ |
| | ASRA | | | | | | | | | | | | | 47 | 2 | 1 | A | • | • | ↕ | ↕ | (8) | ↕ |
| | ASRB | | | | | | | | | | | | | 57 | 2 | 1 | B | • | • | ↕ | ↕ | (6) | ↕ |
| Shift Right, Logic | LSR | | | | | | | 64 | 7 | 2 | 74 | 6 | 3 | | | | M | • | • | R | ↕ | (6) | ↕ |
| | LSRA | | | | | | | | | | | | | 44 | 2 | 1 | A | • | • | R | ↕ | (8) | ↕ |
| | LSRB | | | | | | | | | | | | | 54 | 2 | 1 | B | • | • | R | ↕ | (8) | ↕ |
| Store Acmltr. | STAA | | | | 97 | 4 | 2 | A7 | 6 | 2 | B7 | 5 | 3 | | | | A → M | • | • | ↕ | ↕ | R | • |
| | STAB | | | | D7 | 4 | 2 | E7 | 6 | 2 | F7 | 5 | 3 | | | | B → M | • | • | ↕ | ↕ | R | • |
| Subtract | SUBA | 80 | 2 | 2 | 90 | 3 | 2 | A0 | 5 | 2 | B0 | 4 | 3 | | | | A − M → A | • | • | ↕ | ↕ | ↕ | ↕ |
| | SUBB | C0 | 2 | 2 | D0 | 3 | 2 | E0 | 5 | 2 | F0 | 4 | 3 | | | | B − M → B | • | • | ↕ | ↕ | ↕ | ↕ |
| Subtract Acmltrs. | SBA | | | | | | | | | | | | | 10 | 2 | 1 | A − B → A | • | • | ↕ | ↕ | ↕ | ↕ |
| Subtr. with Carry | SBCA | 82 | 2 | 2 | 92 | 3 | 2 | A2 | 5 | 2 | B2 | 4 | 3 | | | | A − M − C → A | • | • | ↕ | ↕ | ↕ | ↕ |
| | SBCB | C2 | 2 | 2 | D2 | 3 | 2 | E2 | 5 | 2 | F2 | 4 | 3 | | | | B − M − C → B | • | • | ↕ | ↕ | ↕ | ↕ |
| Transfer Acmltrs. | TAB | | | | | | | | | | | | | 16 | 2 | 1 | A → B | • | • | ↕ | ↕ | R | • |
| | TBA | | | | | | | | | | | | | 17 | 2 | 1 | B → A | • | • | ↕ | ↕ | R | • |
| Test, Zero or Minus | TST | | | | | | | 6D | 7 | 2 | 7D | 6 | 3 | | | | M − 00 | • | • | ↕ | ↕ | R | R |
| | TSTA | | | | | | | | | | | | | 4D | 2 | 1 | A − 00 | • | • | ↕ | ↕ | R | R |
| | TSTB | | | | | | | | | | | | | 5D | 2 | 1 | B − 00 | • | • | ↕ | ↕ | R | R |

TABLE 19'-continued

MICROPROCESSOR INSTRUCTION SET

H I N Z V C

LEGEND:
OP Operation Code (Hexadecimal);
~ Number of MPU Cycles;
Number of Program Cycles;
+ Arithmetic Plus;
− Arithmetic Minus;
• Boolean ADD
$M_{SP}$ Contents of memory location pointed to be Stack Pointer
+ Boolean Inclusive OR;
⊙ Boolean Exclusive OR;
$\overline{M}$ Complement of M;
→ Transfer Into ;
0 Bit = Zero;
00 Byte = Zero;
Note - Accumulator addressing mode instructions are included in the column for IMPLIED addressing
CONDITION CODE SYMBOLS:
H Half-carry from bit 3;
I Interrupt mask
N Negative (sign bit)
Z Zero (byte)
V Overflow, 2's complement
C Carry from bit 2
R Reset Always
S Set Always
↕ Test and set if true, cleared otherwise
• Not Affected

INDEX REGISTER AND STACK MANIPULATION INSTRUCTIONS

| POINTER OPERATIONS | MNEMONIC | IMMED OP | ~ | # | DIRECT OP | ~ | # | INDEX OP | ~ | # | EXTND OP | ~ | # | IMPLIED OP | ~ | # | BOOLEAN/ARITHMETIC OPERATION | 5 H | 4 I | 3 N | 2 Z | 1 V | 0 C |
|---|---|---|---|---|---|---|---|---|---|---|---|---|---|---|---|---|---|---|---|---|---|---|---|
| Compare Index Reg | CPX | 8C | 3 | 3 | 9C | 4 | 2 | AC | 6 | 2 | BC | 5 | 3 | | | | $X_H - M, X_L - (M + 1)$ | • | • | ⑦ | ↕ | ⑦ | • |
| Decrement Index Reg | DEX | | | | | | | | | | | | | 09 | 4 | 1 | $X - 1 \rightarrow X$ | • | • | • | ↕ | • | • |
| Decrement Stack Pntr | DES | | | | | | | | | | | | | 34 | 4 | 1 | $SP - 1 \rightarrow SP$ | • | • | • | • | • | • |
| Increment Index Reg | INX | | | | | | | | | | | | | 08 | 4 | 1 | $X + 1 \rightarrow X$ | • | • | • | ↕ | • | • |
| Increment Stack Pntr | INS | | | | | | | | | | | | | 31 | 4 | 1 | $SP + 1 \rightarrow SP$ | • | • | • | • | • | • |
| Load Index Reg | LDX | CE | 3 | 3 | DE | 4 | 2 | EE | 6 | 2 | FE | 6 | 3 | | | | $M \rightarrow X_H, (M + 1) \rightarrow X_L$ | • | • | ⑨ | ↕ | R | • |
| Load Stack Pntr | LDS | 8E | 3 | 3 | 9E | 4 | 2 | AE | 6 | 2 | BE | 5 | 3 | | | | $M \rightarrow SP_H, (M + 1) \rightarrow SP_L$ | • | • | ⑨ | ↕ | R | • |
| Store Index Reg | STX | | | | DF | 5 | 2 | EF | 7 | 2 | FF | 6 | 3 | | | | $X_H \rightarrow M, X_L \rightarrow (M + 1)$ | • | • | ⑨ | ↕ | R | • |
| Store Stack Pntr | STS | | | | 9F | 5 | 2 | AF | 7 | 2 | 8F | 6 | 3 | | | | $SP_H \rightarrow M, SP_L \rightarrow (M + 1)$ | • | • | ⑨ | ↕ | R | • |
| Indx Reg → Stack Pntr | TXS | | | | | | | | | | | | | 35 | 4 | 1 | $X - 1 \rightarrow SP$ | • | • | • | • | • | • |
| Stack Pntr → Indx Reg | TSX | | | | | | | | | | | | | 30 | 4 | 1 | $SP + 1 \rightarrow X$ | • | • | • | • | • | • |

JUMP AND BRANCH INSTRUCTIONS

| OPERATIONS | MNEMONIC | RELATIVE OP | ~ | # | INDEX OP | ~ | # | EXTND OP | ~ | # | IMPLIED OP | ~ | # | BRANCH TEST | 5 H | 4 I | 3 N | 2 Z | 1 V | 0 C |
|---|---|---|---|---|---|---|---|---|---|---|---|---|---|---|---|---|---|---|---|---|
| Branch Always | BRA | 20 | 4 | 2 | | | | | | | | | | None | • | • | • | • | • | • |
| Branch If Carry Clear | BCC | 24 | 4 | 2 | | | | | | | | | | $C = 0$ | • | • | • | • | • | • |
| Branch If Carry Set | BCS | 25 | 4 | 2 | | | | | | | | | | $C = 1$ | • | • | • | • | • | • |
| Branch If = Zero | BEQ | 27 | 4 | 2 | | | | | | | | | | $Z = 1$ | • | • | • | • | • | • |
| Branch If ≧ Zero | BGE | 2C | 4 | 2 | | | | | | | | | | $N \oplus V = 0$ | • | • | • | • | • | • |
| Branch If > Zero | BGT | 2E | 4 | 2 | | | | | | | | | | $Z + (N \oplus V) = 0$ | • | • | • | • | • | • |

TABLE 19'-continued

MICROPROCESSOR INSTRUCTION SET

| | | | | | | | | | | | | | | | | | | | | |
|---|---|---|---|---|---|---|---|---|---|---|---|---|---|---|---|---|---|---|---|---|
| Branch If Higher | BHI | 22 | 4 | 2 | | | | | | | | | | C + Z = 0 | • | • | • | • | • | • |
| Branch If ≦ Zero | BLE | 2F | 4 | 2 | | | | | | | | | | Z + (N ⊕ V) = 1 | • | • | • | • | • | • |
| Branch If Lower Or Same | BLS | 23 | 4 | 2 | | | | | | | | | | C + Z = 1 | • | • | • | • | • | • |
| Branch If < Zero | BLT | 2D | 4 | 2 | | | | | | | | | | N ⊕ V = 1 | • | • | • | • | • | • |
| Branch If Minus | BMI | 2B | 4 | 2 | | | | | | | | | | N = 1 | • | • | • | • | • | • |
| Branch If Not Equal Zero | BNE | 26 | 4 | 2 | | | | | | | | | | Z = 0 | • | • | • | • | • | • |
| Branch If Overflow Clear | BVC | 28 | 4 | 2 | | | | | | | | | | V = 1 | • | • | • | • | • | • |
| Branch If Overflow Set | BVS | 29 | 4 | 2 | | | | | | | | | | V = 1 | • | • | • | • | • | • |
| Branch If Plus | BPL | 2A | 4 | 2 | | | | | | | | | | N = 0 | • | • | • | • | • | • |
| Branch To Subroutine | BSR | 8D | 8 | 2 | | | | | | | | | | See Special Operations | • | • | • | • | • | • |
| Jump | JMP | | | | 6E | 4 | 2 | 7E | 3 | 3 | | | | See Special Operations | • | • | • | • | • | • |
| Jump To Subroutine | JSR | | | | AD | 8 | 2 | 8D | 9 | 3 | | | | See Special Operations | • | • | • | • | • | • |
| No Operation | NOP | | | | | | | | | | 02 | 2 | 1 | Advances Prog. Cntr. Only | • | • | • | • | • | • |
| Return From Interrupt | RTI | | | | | | | | | | 3B | 10 | 1 | | • | • | (10) | • | • | • |
| Return From Subroutine | RTS | | | | | | | | | | 39 | 5 | 1 | See Special Operations | • | • | • | • | • | • |
| Software Interrupt | SWI | | | | | | | | | | 3F | 12 | 1 | See Special Operations | • | • | • | • | • | • |
| Wait for Interrupt | WAI | | | | | | | | | | 3E | 9 | 1 | See Special Operations | • | (11) | • | • | • | • |

SPECIAL OPERATIONS

JSR, JUMP TO SUBROUTINE

INDXD:

| PC | Main Program |
|---|---|
| n | AD = JSR |
| n + 1 | K = Offset* |
| n + 2 | Next Main Instr. |

*K = 8-Bit Unsigned Value

⇨

| SP | Stack |
|---|---|
| → SP − 2 | |
| ↑ SP − 1 | [n + 2] H |
| ↑ SP | [n + 2] L |

$[n + 2]_H$ and $[n + 2]_L$ Form n + 2

| PC | Subroutine |
|---|---|
| INX + K | 1st Subr. Instr. |
| | |

EXTND:

| PC | Main Program |
|---|---|
| N | BD = JSR |
| n + 1 | SH = Subr. Addr. |
| n + 2 | SL = Subr. Addr. |
| n + 3 | Next Main Instr. |

⇨

| SP | Stack |
|---|---|
| → SP − 2 | |
| SP − 1 | [n + 3] H |
| SP | [n + 3] L |

→ = Stack Pointer After Execution.

| PC | Subroutine |
|---|---|
| S | 1st Subr. Instr. |
| | |

(S Formed From $S_H$ and $S_L$)

BSR, BRANCH TO SUBROUTINE:

| PC | Main Program |
|---|---|
| n | 8D = BSR |
| n + 1 | ±K = Offset* |
| n + 2 | Next Main Instr. |

*K = 7-Bit Signed Value;

⇨

| SP | Stack |
|---|---|
| → SP − 2 | |
| SP − 1 | [n + 2] H |
| SP | [n + 2] L |

n + 2 Formed From $[n + 2]_H$ and $[n + 2]_L$

| PC | Subroutine |
|---|---|
| n + 2 + K | 1st Subr. Instr. |
| | |

JMP, JUMP:

INDXD:

| PC | Main Program |
|---|---|
| n | 6E = JMP |
| n + 1 | K = Offset |
| ⋮ | |
| X + K | Next Instruction |

EXTENDED:

| PC | Main Program |
|---|---|
| n | 7E = JMP |
| n + 1 | $K_H$ = Next Address |
| n + 2 | $K_L$ = Next Address |
| ⋮ | |
| K | Next Instruction |

RTS, RETURN FROM SUBROUTINE:

| PC | Subroutine |
|---|---|
| S | 39 = RTS |
| | |

⇨

| SP | Stack |
|---|---|
| SP | |
| SP + 1 | $N_H$ |
| ↓ → SP + 2 | $N_L$ |

| PC | Main Program |
|---|---|
| n | Next Main Instr. |
| | |

RTI, RETURN FROM INTERRUPT:

TABLE 19'-continued

MICROPROCESSOR INSTRUCTION SET

| PC | Interrupt Program |
|---|---|
| S | 3B = RTI |
| | |

⇨

| SP | Stack |
|---|---|
| SP | Condition Code |
| SP + 1 | Acmltr B |
| SP + 2 | Acmltr A |
| SP + 3 | Index Register ($X_H$) |
| SP + 4 | Index Register ($X_L$) |
| SP + 5 | $N_H$ |
| SP + 6 | $N_L$ |
| → SP + 7 | |

| PC | Main Program |
|---|---|
| n | Next Main Instr. |
| | |

CONDITION CODE REGISTER MANIPULATION INSTRUCTIONS

| | | IMPLIED | | | | COND. CODE REG. | | | | | |
|---|---|---|---|---|---|---|---|---|---|---|---|
| | | | | | | 5 | 4 | 3 | 2 | 1 | 0 |
| OPERATIONS | MNEMONIC | OP | ~ | # | BOOLEAN OPERATION | H | I | N | Z | V | C |
| Clear Carry | CLC | 0C | 2 | 1 | 0→C | • | • | • | • | • | R |
| Clear Interrupt Mask | CLI | 0E | 2 | 1 | 0→I | • | R | • | • | • | • |
| Clear Overflow | CLV | 0A | 2 | 1 | 0→V | • | • | • | • | R | • |
| Set Carry | SEC | 0D | 2 | 1 | 1→C | • | • | • | • | • | S |
| Set Interrupt Mask | SEI | 0F | 2 | 1 | 1→I | • | S | • | • | • | • |
| Set Overflow | SEV | 0B | 2 | 1 | 1→V | • | • | • | • | S | • |
| Acmltr A → CCR | TAP | 06 | 2 | 1 | A → CCR | — | — | (12) | — | — | — |
| CCR → Acmltr A | TPA | 07 | 2 | 1 | CCR → A | • | • | • | • | • | • |

CONDITION REGISTER NOTES:
(Bit set if test is true and cleared otherwise)
1 (Bit V) Test: Result = 10000000?
2 (Bit C) Test: Result = 00000000?
3 (Bit C) Test: Decimal value of most significant BCD Character greater than nine? (Not Cleared if previously set.)
4 (Bit V) Test: Operand = 10000000 prior to execution?
5 (Bit V) Test: Operand = 01111111 prior to execution?
6 (Bit V) Test: Set equal to result of N⊕C after shift has occurred.
7 (Bit N) Test: Sign bit of most significant (MS) byte = 1?
8 (Bit V) Test: 2's complement overflow from subtraction of MS bytes?
9 (Bit N) Test: Result less than zero? (Bit 15 = 1)
10 (All) Load Condition Code Register from Stack. (See Special Operations)
11 (Bit I) Set when interrupt occurs. If previously set, a Non-Maskable Interrupt is required to exit the wait state.
12 (All) Set according to the contents of Accumulator A.

Thus, what has been described is a programmable sequence controller that electronically generates a control sequence analogous to mechanical sequence drums with the additional capability of drum lines of these sequence drums being able to reference other drum lines in a nonsequential pattern as well as to provide branching capability for any drum line in which more than one exit drum line may be defined in a presently executed drum line. In addition, these electronically simulated drums can make reference to each other through the use of internal memory bits. The control program utilizing the drum line format is easily understandable by people unfamiliar with computers and related computer languages. That is, the control program inputted to the controller by the user is tailored to the control problems that the user wants to solve and not tailored to a sophisticated and relatively complex computer language.

Besides providing a simple user oriented language, the programmable sequence controller of the present invention allows the user via a data communications device such as a teletypewriter to not only input a desired control program, but to monitor the inputs and outputs of the controller in order to ascertain if the control program is obtaining the desired results. During de-bugging, the user may in effect disconnect the controller outputs from the external system which it is to later control and monitor the controller outputs without the danger of causing some unwanted occurrence in the external system. Once the user has satisfied himself or herself that the desired control sequence has been obtained, he or she can then reconnect the controller to the external system and have it proceed in controlling the system.

Furthermore, the programmable sequence controller of the present invention includes a clock-calendar which can be utilized to program the controller for events happening throughout any day, month or year as well as for timing purposes.

Finally, the programmable sequence controller of the present invention utilizes a handshaking arrangement between the power supply module and the remaining portions of the controller in order to insure the proper shutdown and power-up of the controller. This handshaking arrangement provides for the power supply to indicate to the remainder of the controller that a power-down situation is about to occur but that the controller must acknowledge this fact and in turn tell the power supply that it may proceed with its power-down. This prevents the power supply from coming back on line during the time when the remainder of the controller is getting its memory and other electronic data in order so as to allow for a proper power-up sequence sometime in the future. When the power supply has again received proper utility power or any other condition which has caused it to be in a power-down situation, it informs the remainder of the controller that it is ready to supply the controller with power, and it remains in this condition for a preset length of time. Then power is reconnected to the controller, thus ensuring a proper power-up sequence. This power-up, power-down handshaking between the controller and the power supply of the controller has broad application in any digital data processing device.

It will thus be seen that the objects set forth above, among those made apparent from the preceding description, are efficiently attained and, since changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having thus described the invention, what is claimed is:

1. A programmable sequence controller for control of at least one external device or system, the device or system generating ON/OFF inputs and analog voltage inputs to the controller and the controller generating ON/OFF digital output drivers for driving said device or system through solid state switches or other power amplifying devices, if necessary; said controller comprising:

(A) signal conditioning circuitry for receiving the digital and analog inputs from the external device or system;

(B) a data and addressing bus;

(C) digital input circuitry communicating with the signal conditioning circuitry and the data bus and responsive to the external device or system digital inputs for providing selected digital inputs onto the data and addressing bus;

(D) an analog multiplexer for receiving the analog inputs from the signal conditioning circuitry so as to select a desired analog input;

(E) an analog to digital converter, controller, and comparator interconnected to the data and addressing bus and the analog multiplexer for comparing a selected analog input with a desired value or for converting an analog input into a number representing the analog input magnitude;

(F) a memory, interconnected with the data and addressing bus;

(G) a clock-calendar for generating a number representing time;

(H) digital output driver circuitry, including signal conditioning circuitry, interconnected to said data and addressing bus and to the solid state switches, if present, or to the device or system, for driving said external device or system with desired ON-OFF signals;

(I) means, interconnected to the data and addressing bus, for interconnecting the controller to an external data communications device for user programming, monitoring, and debugging a control program; and (J) a central processing unit interconnected to said data and addressing bus for communicating with the digital input circuitry, digital output driver circuitry, analog input multiplexer, analog to digital converter, controller and comparator, memory, clock-calendar, and data communications interconnecting means, said central processing unit programmed to accept a user generated control program representing the desired state of said digital output drivers in relationship to the state of selected digital inputs, and values of selected analog inputs, and value of the clock-calendar, said control program comprising a plurality of addressable drum lines defining a simulated sequence drum, each drum line defining selected output drivers as being in the ON or OFF state and said drum line able to specify at least two sets of exit conditions, each set of exit conditions specifying a drum line to be next executed by the controller, the sets of exit conditions specifying at least one of the states of specified digital inputs, specified digital output drivers, specified analog input values, or time represented by the clock-calendar, the central processing unit further programmed to execute one of the drum lines during each scan of the simulated sequence drum, and to examine the sets of exit conditions of the executed drum line so as to next execute a drum line specified by a set of exit conditions if these exit conditions are satisfied;

whereby the controller executes one line of at least two specifiable different lines of said drum if one of the sets of exit conditions for the presently executed line is satisfied and thereby providing for branching capability.

2. A programmable sequence controller as defined in claim 1, wherein said control program can specify the condition of drum lines in at least two simulated sequence drums and wherein said central processing unit comprises means for scanning and executing any one line of each drum on a repetitive sequential basis, and wherein the control program can specify the ON or OFF state of addressable internal memory bits and wherein the set of exit conditions for all the drum lines of all the drums can make reference to the ON or OFF state of any internal memory bit as part of its set of exit conditions, the central processing unit further programmed to execute drum lines specifying the turning ON or OFF of internal memory bits and to examine sets of exit conditions specifying the states of selected internal memory bits regardless of where the states for these internal memory bits were set; thereby allowing the simulated sequence drums to indirectly reference each other via the internal memory bits.

3. A programmable sequence controller as defined in claim 2, wherein a set of exit conditions may provide for the comparison of two separate analog inputs as part of said set of exit conditions.

4. A programmable sequence controller as defined in claim 2, wherein said memory includes a random access memory which includes data which may be changed including data concerning a desired control program as well as the number generated by the clock-calendar representing time, and wherein said memory further includes a read-only memory for the storage of instructions and data for programming the central processing unit.

5. A programmable sequence controller as defined in claim 4, wherein the controller further comprises:

(K) means, interconnectable to utility AC and interconnected to the signal conditioning circuitry, data and address bus, digital input circuitry, analog multiplexer, analog to digital converter, controller and comparator, memory, clock-calendar, digital output driver circuitry, data communications interconnecting means, and central processing unit for providing direct current electrical power to the controller;

whereby the controller executes one line of at least two specifiable different lines of said drum if one of the sets of exit conditions for the presently executed line is satisfied and thereby providing for branching capability.

6. A programmable sequence controller as defined in claim 5, wherein the means for providing direct current power further comprises a battery backup system interconnected with the random access memory and clock-calendar for providing continuous power to at least a portion of the random access memory and the clock-calendar so as to maintain valid data in said random access memory as well as to maintain operation of the clock-calendar during power outages.

7. A programmable sequence controller as defined in claim 6, wherein the means for providing direct current power further comprises handshaking circuitry for sensing various power or operating characteristics of the controller, for generating a first signal when a sensed characteristic indicates an impending power or operating failure and wherein the controller further incorporates means, interconnected to the generated first signal, for acknowledging said signal's generation by generating a second signal interconnected to the handshaking circuitry, said handshaking circuitry having means for receiving the generated second signal so as to insure the generation of at least a third signal, said third signal communicated to the controller, including the central processing unit so as to cause the central processing unit to command an ordered storage of data and to cause the central processing unit and controller to enter a hold or standby state and therefore no active controlling by the controller, said handshaking circuitry de-generating the first signal upon correction of the power or operating failure indicating sensed characteristic, the controller acknowledging means de-generating the second signal in response to the de-generation of the first signal, and the handshaking circuitry having means for de-generating the third signal after a predetermined time delay upon de-generation of the first signal, and thereby allowing the controller to resume normal operation only after the operating failure has been corrected for at least said predetermined time, thereby insuring a quiescent resumption of the controller operation.

8. A programmable sequence controller as defined in claim 7, wherein the power and operating characteristics of the controller that are sensed by the handshaking circuitry include the presence of utility AC power, the presence of direct current electrical power, and the functioning of the central processing unit.

9. A programmable sequence controller as defined in claim 8, wherein said handshaking circuitry comprises:

(A) a first logic gate for generating a fourth signal (true to false $\overline{\text{UHOH}}$) if any of the sensed power and operating characteristics indicate an impending power or operating failure;

(B) a flip-flop for generating a fifth and sixth signal (U45, pin 4 true, U45, pin 11 false) in response to the generation of said fourth signal;

(C) amplifying means interconnected to said fifth signal for generating said first signal (true to false $\overline{\text{POWER-DOWN}}$ signal) in response to the fifth signal;

(D) a time delay and amplifying circuit for generating the third signals (a true $\overline{\text{STANDBY}}$ signal, a false $\overline{\text{CPU RESET}}$ signal and a false $\overline{\text{STANDBY}}$ signal), in response to the generation of said sixth signal after a first predetermined length of time, said time delay circuitry having means for providing a second longer time delay for de-generating the third signals after de-generation of the sixth signal;

(E) a second logic gate having an input connected to one of the third signals and a second input connected to the fourth signal, the output of the second logic gate connected to an input of said flip-flop for preventing the change of state of said flip-flop after the fourth signal is generated until the third signal is generated, thereby helping to insure that the flip-flop maintains the generation of the fifth and sixth output signals for at least as long as the first time delay generated by the time delay and amplifying circuitry, and (F) logic means, having a first input interconnected with the second signal and a second input connected to one of the third signals and an output connected to an input of said first logic gate for insuring that the fourth signal maintains its generation, once the remainder of the controller generates the second signal if the third signals have not been generated and even if the power or operating failure has been corrected, until the time delay and amplifying circuitry generates the third signals, at which time said logic means allows the first logic gate to de-generate the fourth signal if the power or operating failure indicating sensed characteristic has been corrected, thereby insuring the entry of a hold or standby state by the controller once an impending power or operating failure has been perceived by the controller through generation of the second signal even if the power or operating failure is extremely short lived or if a statistical glitch occurs in said flip-flop;

whereby the programmable sequence controller enters a hold or standby state whenever a power or operating failure is detected by the first logic gate regardless of the duration of the power or operating failure and whereby the controller only resumes normal operation after the power or operating condition has been corrected for said second predetermined length of time as generated by the time delay and amplifying circuit so as to insure that the direct current electrical power means of the controller have entered a quiescent state prior to resumption of controller activity.

10. A programmable sequence controller as defined in claim 1, wherein said memory includes a random access memory which includes data which may be changed including data concerning a desired control program as well as the number generated by the clock-calendar representing time, and wherein said memory further includes a read-only memory for the storage of instructions and data for programming the central processing unit.

11. A programmable sequence controller as defined in claim 10, wherein the controller further comprises:

(K) means, interconnectable to a source of utility AC, for providing direct current electrical power to the controller, said means including a battery backup system interconnected with the random access memory and clock-calendar for providing continuous power to at least a portion of the random access memory and the clock-calendar so as to maintain valid data in said random access memory as well as to maintain operation of the clock-calendar during power outages.

12. A programmable sequence controller as defined in claim 1, wherein said controller further comprises:

(K) means, interconnectable to a source of electrical power, for providing direct current electrical power to the controller, and further comprises a battery backup system for providing continuous power to at least a portion of the controller and handshaking circuitry for sensing various power or operating characteristics of the controller, for generating a first signal when a sensed characteristic indicates an impending power or operating failure and wherein the controller further incorporates means, interconnected to the generated first signal, for acknowledging said signal's generation by generating a second signal interconnected to the handshaking circuitry, said handshaking circuitry having means for receiving the generated second signal so as to insure the generation of at least a third signal, said third signal communicated to the controller, including the central processing unit so as to cause the central processing unit to command an ordered storage of data and to cause the central processing unit and controller to enter a hold or standby state and therefore no active controlling by the controller, said handshaking circuitry de-generating the first signal upon correction of the power or operating failure indicating a sensed characteristic, wherein said controller acknowledging means de-generates said second signal in response to the de-generated first signal, the handshaking circuitry de-generating the third signal after a predetermined time delay in response to the de-generation of the first signal, thereby allowing the controller to resume normal operation only after the operating failure has been corrected for at least said predetermined time and thereby insuring a quiescent resumption of the controller operation.

13. A programmable sequence controller as defined in claim 12, wherein the power and operating characteristics of the controller that are sensed by the handshaking circuitry include the presence of electrical power from the source of electrical power, the presence of direct current electrical power, and the functioning of the central processing unit.

14. A programmable sequence controller as defined in claim 13, wherein said handshaking circuitry comprises:

(A) a first logic gate for generating a fourth signal (true to false $\overline{\text{UHOH}}$) if any of the sensed power and operating characteristics indicate an impending power or operating failure;

(B) a flip-flop for generating a fifth and sixth signal (U45, pin 4 true, U45, pin 11 false) in response to the generation of said fourth signal;

(C) amplifying means interconnected to said fifth signal for generating said first signal (true to false $\overline{\text{POWER-DOWN}}$ signal) in response to the fifth signal;

(D) a time delay and amplifying circuit for generating the third signals (a true $\overline{\text{STANDBY}}$ signal, a false $\overline{\text{CPU RESET}}$ signal and a false $\overline{\text{STANDBY}}$ signal), in response to the generation of said sixth signal after a first predetermined length of time, said time delay circuitry having means for providing a second longer time delay for de-generating the third signals after de-generation of the sixth signal;

(E) a second logic gate having an input connected to one of the third signals and a second input connected to the fourth signal, the output of the second logic gate connected to an input of said flip-flop for preventing the change of state of said flip-flop after the fourth signal is generated until the third signal is generated, thereby helping to insure that the flip-flop maintains the generation of the fifth and sixth output signals for at least as long as the first time delay generated by the time delay and amplifying circuitry, and (F) logic means, having a first input interconnected with the second signal and a second input connected to one of the third signals and an output connected to an input of said first logic gate for insuring that the fourth signal maintains its generation, once the remainder of the controller generates the second signal if the third signals have not been generated and even if the power or operating failure has been corrected, until the time delay and amplifying circuitry generates the third signals, at which time said logic means allows the first logic gate to de-energize the fourth signal if the power or operating failure indicating sensed characteristic has been corrected, thereby insuring the entry of a hold of standby state by the controller once an impending power or operating failure has been perceived by the controller through generation of the second signal even if the power or operating failure is extremely short lived or if a statistical glitch occurs in said flip-flop;

whereby the programmable sequence controller enters a hold or standby state whenever a power or operating failure is detected by the first logic gate regardless of the duration of the power or operating failure and whereby the controller only resumes normal operation after the power or operating condition has been connected for said second predetermined length of time as generated by the time delay and amplifying circuit so as to insure that the direct current electrical power means of the controller have entered a quiescent state prior to resumption of controller activity.

15. A programmable sequence controller as defined in claim 1, further comprising indicators for showing the ON or OFF state of the digital outputs from the external device or system interconnected to the signal conditioning circuitry, the ON or OFF state of the digital output driver circuitry, the type of communication between the external data communications device and the controller, and the state of the means for providing direct current electrical power to the controller.

16. A programmable sequence controller as defined in claim 1, wherein the central processing unit incorporates a microprocessor.

17. A programmable sequence controller as defined in claim 1, wherein the external data communications means further comprises means for communicating between the programmable sequence controller and other programmable sequence controllers or data processing devices.

18. A programmable sequence controller as defined in claim 1, wherein the external device or system is an energy related device or energy control system and wherein the central processing unit is further programmed to accept diagnostic commands user generated by the external data communications device in order to facilitate monitoring and debugging the control program.

19. A programmable sequence controller as defined in claim 18, wherein the diagnostic commands include maintaining the output drivers at designated states while providing for the operation and monitoring of the control program as executed by the controller with the generated states for the driver circuitry disconnected from the external device or system, thereby allowing the user to monitor the execution of a control program without the control program actually controlling the external device or system.

20. A programmable sequence controller as defined in claim 19, wherein the diagnostic commands further include the altering of a selected analog value, the advancing of a drum line, the clearing of a digital input, the disabling of an analog input, the disabling of a selected output driver, the disabling of a selected digital input, the enabling of a selected analog input, the enabling of a selected output driver, the enabling of a selected digital input, the enabling of all digital inputs, analog inputs, and output drivers, the removal of a previously programmed drum line, the rotation of the simulated drum to another drum line, the resetting of the simulated drum to line zero, and the setting of a selected digital input to a specified state.

21. A programmable sequence controller as defined in claim 18, wherein the central processing unit is further programmed to generate error messages communicable to the user via the external data communications device so as to inform the user of any one of a number of errors in the control program.

22. A programmable sequence controller as defined in claim 18, wherein the central processing unit is further programmed to accept print or punch commands user generated by the external data communications device and to generate signals to the data communications device in response thereto, to print or punch information concerning the control program or state of the digital inputs and outputs or values of the analog inputs or time, and thereby facilitate programming and debugging the control program as well as to generate a readout of the control program or portion thereof.

23. A programmable sequence controller as defined in claim 22, wherein said print or punch commands include the printing of a selected analog input, the printing of a selected output driver, the printing of a selected digital input, the printing of a selected simulated drum line, the printing of the entire simulated sequence drum, the printing of the current drum line position, the punching of the entire control program, and the printing of the time as represented by the clock-calendar.

24. A programmable sequence controller as defined in claim 1, wherein the control program can specify the condition of dedicated emergency drum lines in a dedicated emergency simulated sequence drum, the emergency line specifying an emergency set of exit conditions and a specified drum line of the other simulated sequence drum to be next executed by the central processing unit regardless of the drum line of said simulated sequence drum that formerly was executed by the central processing unit and to thereby cause a particular drum line to be executed in response to an emergency condition, the central processing unit comprising means for examining the emergency exit lines of the simulated emergency sequence drum and to cause the other simulated sequence drum to execute the line specified by the emergency drum line if the emergency set of exit conditions is satisfied.

25. A programmable sequence controller for control of at least one external device or system, the device or system generating ON/OFF digital inputs and analog inputs to the controller and the controller generating ON/OFF digital type output drivers for driving said device or system through solid state switches or other power amplifying devices, if necessary, said controller comprising:

(A) a data and address bus;

(B) digital input circuitry for receiving the digital outputs of the external device or system, including buffer circuitry, interconnected with the data and address bus for providing selected digital data onto the data and address bus;

(C) an analog multiplexer for receiving the analog inputs of the external device or system so as to select a desired analog input;

(D) an analog to digital converter, controller, and comparator circuit interconnected to the data and addressing bus and the analog multiplexer for comparing a selected analog input with a desired value or for converting an analog input into a number representing an analog input magnitude;

(E) a memory, interconnected with the data and addressing bus;

(F) digital output driver circuitry, including signal conditioning circuitry, interconnected to the data and addressing bus and to the solid state switches, if present, or to the device or system, for driving said external device or system with desired ON/OFF signals; and (G) a central processing unit interconnected to the data and addressing bus for communicating with the digital input circuitry, digital output driver circuitry, analog input multiplexer, analog to digital converter, controller and comparator, and memory, said central processing unit having means for generating addressable internal memory bits and programmed to execute a control program representing the desired state of said digital output drivers in relationship to the state of selected digital inputs and addressable internal memory bits, and the values of selected analog inputs, said control program comprising at least two simulated sequence drums, each drum comprising a plurality of addressable drum lines, each drum line defining selected output drivers as being in the ON or OFF state as well as selected internal memory bits as being in the ON or OFF state, and said drum line able to specify a set of exit conditions, each set of exit conditions specifying a drum line to be next executed by the controller, the sets of exit conditions specifying the states of specified digital inputs, specified digital output drivers, specified internal memory bits, or specified analog input values, the central processing unit further programmed to execute one of the drum lines for each simulated sequence drum during each scan of the simulated sequence drums and further programmed so as to allow drum lines of any particular simulated sequence drum to be able to reference other drum lines in other simulated sequence drums only via the state of selected internal memory bits, and the central processing unit further programmed to examine the set of exit conditions for the presently executed drum line of each simulated drum so as to next execute a drum line specified by the set of exit conditions if these exit conditions are satisfied;

whereby the controller executes a different line of any simulated sequence drum if the exit condition for the presently executed line for that sequence drum is satisified and whereby simulated sequence drums may indirectly reference each other via the internal memory bits.

26. A programmable sequence controller as defined in claim 25, wherein the control program may specify a set of exit conditions so as to provide for the comparison of two separate analog inputs as part of a set of exit conditions.

27. A programmable sequence controller as defined in claim 25, further comprising a clock-calendar for generating a number representing time, wherein said number may be utilized in the control program for specifying at least a portion of a set of exit conditions for a drum line based upon elapsed time or absolute calendar time, and wherein the central processing unit is further programmed to utilize the number generated by the clock-calendar to represent a desired elapsed time or absolute calendar time.

28. A programmable sequence controller as defined in claim 27, wherein the controller further comprises means interconnectable to a source of utility power, for providing direct current electrical power to the controller, said means further comprising a battery backup system for providing continuous power to at least a portion of the memory and the clock-calendar so as to maintain the operation of the clock-calendar during power outages.

29. A programmable sequence controller as defined in claim 25, further comprising means, interconnected to the data and addressing bus, for interconnecting the controller to an external data communications device for user programming, monitoring, and debugging the control program.

30. A programmable sequence controller as defined in claim 29, further comprising indicators for showing the ON or OFF state of digital outputs from the external device or system interconnected to the digital input circuitry, the ON or OFF state of the digital output driver circuitry, and the type of communication between the external data communications device and the controller.

31. A programmable sequence controller as defined in claim 30, wherein the central processing unit incorporates a microprocessor.

32. A programmable sequence controller as defined in claim 29, wherein the central processing unit is further programmed to accept diagnostic commands user generated by the external data communications device in order to facilitate monitoring and debugging the control program.

33. A programmable sequence controller as defined in claim 32, wherein the diagnostic commands include disabling a specified internal memory bit, enabling a specified internal memory bit, and setting a specified internal memory bit to a specified state.

34. A programmable sequence controller as defined in claim 33, wherein the diagnostic commands further include maintaining the output drivers at designated states while providing for the operation and monitoring of the control program as executed by the controller with the generated states for the driver circuitry disconnected from the external device or system, thereby allowing the user to monitor the execution of a control program without the control program actually controlling the external device or system.

35. A programmable sequence controller as defined in claim 32, wherein the central processing unit is further programed to generate error messages communicable to the user via the external communications device so as to inform the user of any one of a number of errors in the control program.

36. A programmable sequence controller as defined in claim 35, wherein the central processing unit is further programmed to cause the external data communications device to print or punch information concerning the control program stored within the controller as well as the states of the digital inputs, digital output drivers, and internal memory bits, and the values of the analog inputs and thereby facilitate programming and debugging of the control program as well as to generate a readout of the entire control program or portion thereof.

37. A programmable sequence controller as defined in claim 25, wherein the controller further comprises means, interconnectable to a source of electrical power, for providing direct current electrical power to the controller, said means further comprising a battery backup system for providing continuous power to at least a portion of the controller and handshaking circuitry for sensing various power or operating characteristics of the controller, for generating a first signal when a sensed characteristic indicates an impending power or operating failure and wherein the controller further incorporates means, interconnected to the generated first signal, for acknowledging said signal's generation by generating a second signal interconnected to the handshaking circuitry, said handshaking circuitry having means for receiving the generated second signal so as to insure the generation of at least a third signal, said third signal communicated to the controller, including the central processing unit so as to cause the central processing unit to command an ordered storage of data and to cause the central processing unit and controller to enter a hold or standby state and therefore no active controlling by the controller, said handshaking circuitry de-generating the first signal upon correction of the power or operating failure indicating sensed characteristic, wherein said controller acknowledging means de-generates the second signal in response to the de-generated first signal, the handshaking circuitry having means for de-generating the third signal after a predetermined time delay in response to the de-generation of the first signal, thereby allowing the controller to resume normal operation only after the operating failure has been corrected for at least said predetermined length of time and thereby insuring a quiescent resumption of the controller operation.

38. A programmable sequence controller as defined in claim 25, wherein the control program can also represent at least one emergency simulated drum line of a dedicated emergency sequence drum, wherein each emergency drum line can specify a set of emergency exit conditions and a specified drum line in each of the other simulated sequence drums to be next executed by the controller regardless of the drum lines previously executed by the controller for these other simulated sequence drums if the set of emergency exit conditions is satisfied, the central processing unit further programmed to examine the emergency drum lines during each scan of the simulated sequence drums and to cause the specified drum lines for the other simulated sequence drums to next be executed if the emergency exit condition is satisified.

39. A programmable sequence controller for control of at least one external device or system, the device or system generating ON/OFF digital inputs and analog inputs to the controller and the controller generating ON/OFF digital output drivers for driving said device or system, said controller comprising:

(A) a data and address bus;

(B) digital input circuitry for receiving the digital inputs of the external device or system, including buffer circuitry, interconnected with the data and address bus for providing selected digital data onto the data and address bus;

(C) an analog multiplexer for receiving the analog inputs of the external device or system so as to select a desired analog input;

(D) an analog to digital converter, controller, and comparator circuit interconnected to the data and addressing bus and the analog multiplexer for comparing a selected analog input with a desired value or for converting an analog input into a number representing an analog input magnitude;

(E) a memory, interconnected with the data and addressing bus;

(F) digital output driver circuitry, including signal conditioning circuitry, interconnected to the data and addressing bus and communicating with the external device or system, for driving said external device or system with desired ON/OFF signals; and (G) a central processing unit interconnected to the data and addressing bus for communicating with the digital input circuitry, digital output driver circuitry, analog input multiplexer, analog to digital converter, controller and comparator, and memory, said central processing unit programmed to execute a control program representing the desired state of said digital output drivers in relationship to the state of selected digital inputs and values of selected analog inputs, said control program representing the desired state of said digital output drivers in relationship to the state of selected digital inputs and analog input values, said control program comprising a plurality of addressable drum lines defining a simulated sequence drum, each drum line defining selected output drivers as being in the ON or OFF state and said drum line able to specify at least two sets of exit conditions, each set of exit conditions specifying a drum line to be next executed by the controller, the sets of exit conditions specifying the states of specified digital inputs, specified digital output drivers, or specified analog input values, the central processing unit further programmed to execute one of the drum lines during each scan of the simulated sequence drum, and to examine the sets of exit conditions of the executed drum line so as to execute a drum line specified by a set of exit conditions if these exit conditions are satisified;

whereby the controller executes one line of at least two specifiable different lines of said drum if one of the sets of exit conditions of the presently executed line is satisfied and thereby providing for branching capability.

40. A programmable sequence controller as defined in claim 39, wherein said central processing unit is further programmed to examine each set of exit conditions for the preently executed drum line in sequence, and to terminate examination of all remaining sets of exit conditions of the presently executed line if the presently examined set of exit conditions is satisified.

41. A programmable sequence controller as defined in claim 40, wherein each drum line can specify up to two sets of exit conditions.

42. A programmable sequence controller as defined in claim 39, further comprising:

(H) a clock-calendar for generating a number representing time;

(I) means, interconnected to the data and address bus for interconnecting the controller to an external data communications device for user programming, monitoring, and de-bugging the control program and for allowing interconnection of the controller with other programmable sequence controllers or data processing devices so that these controllers and data processing devices can communicate with each other;

(J) means, interconnectable to a source of electrical power, for providing direct current electrical power to the controller; and (K) indicators, for showing the ON or OFF state of digital outputs from the external device or system interconnected to the digital input circuitry, the ON or OFF state of the digital output driver circuitry, and the type of communication between the external data communications device and the controller, and the state of the means for providing electrical power to the controller;

wherein the control program can specify the condition of drum lines in at least two simulated sequence drums and wherein the central processing unit comprises means for scanning and executing any one line of each drum on a repetitive sequential basis, and wherein the control program can specify the ON or OFF state of addressable internal memory bits and wherein the set of exit conditions for all the drum lines of all the drums can make reference to the ON or OFF state of any internal memory bit, the central processing unit further programmed to execute drum lines specifying the turning ON or OFF of internal memory bits and to examine sets of exit conditions specifying the states of selected internal memory bits regardless of where the states for these internal memory bits were set, thereby allowing the simulated sequence drums to indirectly reference each other via the internal memory bits; and wherein the means for providing direct current power further comprises a battery backup system for providing continuous power to at least a portion of the memory and the clock-calendar so as to maintain valid data in at least a portion of the memory as well as to maintain operation of the clock-calendar during power outages and further wherein said means for providing direct current power further comprises handshaking circuitry for sensing various power or operating characteristics of the controller, for generating a first signal when a sensed characteristic indicates an impending power or operating failure and wherein the controller further incorporates means, interconnected to the generated first signal, for acknowledging said signal's generation by generating a second signal interconnected to the handshaking circuitry, said handshaking circuitry having means for receiving the generated second signal so as to insure the generation of at least a third signal, the third signal communicated to the controller, including the central processing unit so as to cause the central processing unit to command an ordered storage of data and to cause the central processing unit and controller to enter a hold or standby state and therefore no active controlling by the controller, said handshaking circuitry de-generating the first signal upon correction of the power or operating failure indicating sensed characteristics, wherein said controller acknowledges means de-generates said second signal in response to the de-generated first signal, the handshaking circuitry de-generating the third signal after a predetermined time delay in response to the de-generation of the first signal, thereby allowing the controller to resume normal operation only after the operating failure has been corrected for at least said predetermined time and thereby insuring a quiescent resumption of the controller operation.

43. A programmable sequence controller as defined in claim 42, wherein said memory includes a random access memory which includes data which may be changed including data concerning the desired control program as well as the number generated by the clock-calendar representing time, and wherein the memory further comprises a read-only memory for the storage of instructions and data for programming the central processing unit; and wherein the power and operating characteristics of the controller that are sensed by the handshaking circuitry include the presence of utility AC power, the presence of direct current electrical power, and the functioning of the central processing unit, and wherein the central processing unit comprises a microprocessor.

44. A programmable sequence controller for the control of at least one external device or system, the device or system generating inputs to the controller and the controller generating output driver signals for driving said device or system, said controller comprising:

(A) input circuitry communicating with the inputs from the external device or system, and responsive thereto, for generating signals of selected inputs;

(B) output driver circuitry, interconnected to the device or system for generating output driver signals; and (C) a central processing unit communicating with the input circuitry and output driver circuitry, said central processing unit programmed to execute a control program representing the desired state of the output driver signals in relationship to the state of selected inputs from the external device or system, generated by the input circuitry, said control program comprising a plurality of addressable drum lines defining a simulated sequence drum, each drum line defining selected output driver signals as being as selected states and said drum line able to specify at least two sets of exit conditions, each set of exit conditions specifying a drum line to be next executed by the controller, the sets of exit conditions specifying the states of specified inputs from the external device or system and specified output driver signals, the central processing unit further programmed to execute one of the drum lines during scan of the simulated sequence drum, and to examine the sets of exit conditions of the executed drum line so as to next execute a drum line specified by a set of exit conditions if these exit conditions are satisfied;

whereby the controller executes one line of at least two specifiable different lines of said drum if one of the sets of exit conditions for the presently executed line is satisfied and thereby providing for branching capability.

45. A programmable sequence as defined in claim 44, wherein the central processing unit is further programmed to examine the sets of exit conditions for a presently executed drum line in a sequential fashion and to terminate the examination of the sets of exit conditions if the presently examined set of exit conditions is satisfied.

46. A programmable sequence controller as defined in claim 44, further comprising:

(E) means for interconnecting the controller to an external data communication device for user programming, monitoring, and debugging the control program.

47. A programmable sequence controller as defined in claim 44, further comprising:

(E) a clock-calendar for communicating with the central processing unit and for generating a number representing time, and wherein the sets of exit conditions may further specify time represented by the clock-calendar as part of the set of exit conditions.

48. A programmable sequence controller defined in claim 44, wherein said control program can specify the condition of drum lines in at least two simulated sequence drums and wherein said central processing unit comprises means for scanning and executing any one line of each drum on a repetitive sequential basis, and wherein the control program can specify the ON or OFF state of addressable internal memory bits and wherein the set of exit conditions for all the drum lines of all the drums can make reference to the ON or OFF state of any internal memory bit as part of its set of exit conditions, the central processing unit further programmed to execute drum lines specifying the turning ON or OFF of internal memory bits and to examine sets of exit conditions specifying the states of selected internal memory bits regardless of where the states for these internal memory bits were set; thereby allowing the simulated sequence drums to indirectly reference each other via the internal memory bits.

49. A programmable sequence controller as defined in claim 44, wherein said input circuitry incorporates means for examining less than all the inputs from the external device or system during each scan of the simulated sequence drum.

50. A programmable sequence controller for the control of at least one external device or system, the device or system generating inputs to the controller and the controller generating output driver signals for driving said device or system, said controller comprising:

(A) input circuitry communicating with the inputs from the external device or system, and responsive thereto, for generating signals of selected inputs;

(B) output driver circuitry, interconnected to the device or system, for generating output driver signals; and (C) a central processing unit communicating with the input circuitry and the output driver circuitry, said central processing unit having means for generating addressable internal memory bits and programmed to execute a control program representing the desired states of said output driver signals in relationship to the state of selected inputs generated by the input circuitry and selected addressable internal memory bits, said control program comprising at least two simulated sequence drums, each drum comprising a plurality of addressable drum lines, each drum line defining selected output driver signals as being in selected states as well as selected internal memory bits as being in selected states, and said drum line able to specify a set of exit conditions, each set of exit conditions specifying a drum line to be next executed by the controller, the sets of exit conditions specifying states of specified inputs, specified output driver signals, and specified internal memory bits, the central processing unit further programmed to execute one of the drum lines for each simulated sequence drum during each scan of the simulated sequence drum and further programmed so as to allow drum lines of any particular simulated sequence drum to be able to reference other drum lines of other simulated sequence drums only via the state of selected internal memory bits, and the central processing unit further programmed to examine the set of exit conditions for the presently executed drum line of each simulated drum so as to next execute a drum line specified by the set of exit conditions if these exit conditions are satisfied;

whereby the controller executes a different line of any simulated sequence drum if the exit conditions for the presently executed line for that sequence drum is satisfied and whereby simulated sequence drums may indirectly communicate with each other via the internal memory bits.

51. A programmable sequence controller as defined in claim 50, wherein each drum line specified by each set of exit conditions must be a drum line within the same simulated sequence drum as the presently executed drum line containing the presently examined set of exit conditions.

52. A programmable sequence controller for control of at least one external device or system providing a plurality of input state signals indicative of the state of the device or system, and accepting a plurality of output driver signals which drive said device or system toward desired states, said controller comprising:

(A) means for communicating with the input state signals from the external device or system, and responsive thereto, for generating signals of selected inputs;

(B) means, interconnectable with the device or system, for generating output driver signals; and (C) means, interconnected to the input communicating means and output driver signal generating means, for simulating and executing at least one sequence drum comprising a plurality of selectable drum lines, each defining, (a) specified states for specified output driver signals, and (b) at least two sets of exit conditions, each set of exit conditions specifying a drum line to be next executed, said sets of exit conditions also specifying the states of selected input state signals and output drum signals for satisfying the set of exit conditions, the executing of the simulated sequence drum comprising execution of one of said drum lines by specifying to the output driver signal generating means the states of specified output driver signals and by examining the drum line's sets of exit conditions by comparing the desired states of the specified input state signals and output driver signals with the actual states of these respective signals, and causing the drum line specified by the set of exit conditions to be next executed if said set of exit conditions is satisfied.

53. A programmable sequence controller as defined in claim 52, wherein said means for simulating and executing the drum sequentially examines the sets of exit conditions for the presently executed drum line and terminates said examination when a set of exit conditions is satisfied or when all the sets of exit conditions are not satisfied.

54. The programmable sequence controller defined in claim 52, further comprising a clock for providing input time state signals, wherein said time state signals can be specified in any set of exit conditions, and wherein said means for simulating and executing the drum further comprises means for examining said specified time state signals by comparing the specified time states with the state signals generated by the clock.

55. The programmable sequence controller as defined in claim 52 wherein said input state signals include analog signals and said simulating and executing means is provided at least in part by a digital computer; said programmable sequence controller further comprising:

(D) an analog to digital converter for converting analog state input signals to digital state signals for said digital computer.

56. A programmable sequence controller for control of at least one external device or system providing a plurality of input state signals indicative of the state of the device or system, and accepting a plurality of output driver signals which drive said device or system toward desired states, said controller comprising:

(A) a digital computer having an executive program stored therein for simulating and executing at least one sequence drum comprising a plurality of selectable drum lines, each capable of defining,
  (1) specified states for specified output driver signals, and
  (2) at least two sets of exit conditions, each set of exit conditions specifying a drum line to be next executed, said sets of exit conditions also specifying the states of selected input state signals and output driver signals for satisfying the set of exit conditions, the executive program of the digital computer causing the digital computer to execute one of said drum lines and to examine the drum line's sets of exit conditions by comparing the desired states of the specified input state signals and output driver signals with the actual states of these respective signals, and for causing the drum line specified by the set of exit conditions to be next executed if said set of exit conditions is satisfied; and (B) means, communicating with the digital computer, for user defining the selectable drum lines, and for monitoring these drum lines as well as the operation of the programmable sequence controller.

57. The method of operating a control system for control of at least one external device or system providing a plurality of input state signals indicative of the state of the device or system and accepting a plurality of output driver signals which drive said device or system towards desired states, said method comprising:

(A) simulating at least one sequence drum comprising a plurality of selectable drum lines, each defining,
  (a) specified states for specified output driver signals, and
  (b) at least two sets of exit conditions, each set of exit conditions specifying a drum line to be next executed, said sets of exit conditions also specifying the states of selected input state signals and output driver signals for satisfying the set of exit conditions; and (B) executing one of said drum lines and examining its sets of exit conditions by comparing the desired states of the specified input state signals and output driver signals with the actual states of these respective signals, and causing the drum lines specified by the set of exit conditions to be next executed if said set of exit conditions is satisfied.

* * * * *

UNITED STATES PATENT AND TRADEMARK OFFICE

CERTIFICATE OF CORRECTION

PATENT NO. : 4,213,174

DATED : July 15, 1980

INVENTOR(S) : Richard E. Morley et al

It is certified that error appears in the above-identified patent and that said Letters Patent are hereby corrected as shown below: On the Title page:

In the Abstract, line 10, delete "deenergization" and substitute therefor --de-energization--.

Col. 2, line 44, delete "suggest" and substitute therefor --suggested--.

Col. 4, line 47, delete "power drum" and substitute therefor --power down--.

Col. 4, line 60, delete "reenergize" and substitute therefor --re-energize--.

Col. 5, line 53, delete "accompaning" and sustitute therefor --accompanying--.

UNITED STATES PATENT AND TRADEMARK OFFICE
CERTIFICATE OF CORRECTION

PATENT NO. : 4,213,174

DATED : July 15, 1980

INVENTOR(S) : Richard E. Morley et al

It is certified that error appears in the above-identified patent and that said Letters Patent are hereby corrected as shown below:

Col. 6, line 29, insert --a-- before "diagram".

Col. 6, line 50, "Fig 13E" should begin new paragraph.

Col. 10, line 8, insert --be-- before "driven".

Col. 11, line 50, delete "non-existant" and substitute therefor --non- existent--.

Col. 12, line 13, insert --)-- after "number".

Col. 13, line 61, delete "calandar" and substitute therefor --calendar--.

Col. 21, line 40, delete "pump" and substitute therefor --dump--.

Col. 22, line 60, delete "tha" and substitute therefor --that--.

Col. 23, line 9, delete "allows" and substitute therefor --allow--.

Col. 23, line 36, delete "makes" and substitute therefor --make--.

Col. 23, line 45, before "exit", delete "a" and substitute therefor --an--.

UNITED STATES PATENT AND TRADEMARK OFFICE

CERTIFICATE OF CORRECTION

PATENT NO. : 4,213,174

DATED : July 15, 1980

INVENTOR(S) : Richard E. Morley et al

It is certified that error appears in the above-identified patent and that said Letters Patent are hereby corrected as shown below:

Col. 24, line, 13, before "analog" delete "a" and substitute therefor --an--.

Col. 24, line 57, delete "generally" and substitute therefor --generically--.

Col. 25, line 8, delete "as".

Col. 26, line 18, delete "emenate" and substitute therefor --emanate--.

Col. 29, line 24, delete "ship" and substitute therefor --chip--.

Col. 30, line 28, delete "data" and substitute therefor --date--.

Col. 30, line 64, delete "inputed" and substitute therefor --inputted--.

Col. 31, delete lines 20-21, "SEL4, SEL5, SEL6, SEL7" and substitute therefor --$\overline{SEL4}$, $\overline{SEL5}$, $\overline{SEL6}$, and $\overline{SEL7}$--.

Col. 31, line 50, delete "emamating" and substitute therefor --emanating--.

UNITED STATES PATENT AND TRADEMARK OFFICE
CERTIFICATE OF CORRECTION

PATENT NO. : 4,213,174

DATED : July 15, 1980

INVENTOR(S) : Richard E. Morley et al

It is certified that error appears in the above-identified patent and that said Letters Patent are hereby corrected as shown below:

Col. 32, line 5, delete "inputed" and substitute therefor --inputted--.

Col. 33, line 45, delete "outputs" and substitute therefor --output--.

Col. 34, line 48, delete "inputed" and substitute therefor --inputted--.

Col. 34, line 64, delete "present" and substitute therefor --preset--.

Col. 35, line 11, delete "inputed" and substitute therefor --inputted--.

Col. 36, line 17, delete "voltage" and substitute therefor --voltages--.

Col. 36, line 58, delete "setting" and substitute therefor --resetting--.

Col. 38, line 46, delete "a" and substitute therefor --to--

UNITED STATES PATENT AND TRADEMARK OFFICE
CERTIFICATE OF CORRECTION

PATENT NO. : 4,213,174

DATED : July 15, 1980

INVENTOR(S) : Richard E. Morley et al

It is certified that error appears in the above-identified patent and that said Letters Patent are hereby corrected as shown below:

Col. 38, line 58, delete "2V" and substitute therefor --+2V--.

Col. 351, line 28, delete "is" and substitute therefor --if--.

Col. 355, line 21, delete "0398 B" and substitute therefor --039B B--.

Col. 357, line 46, delete "18 +24V" and substitute therefor --17 +24V--.

Col. 361, (in chart) 1st col. -line 6, delete "Branch to Subtoutine" and substitute therefor --Branch to Subroutine--.

Col. 365; IN LEGEND delete ".Boolean ADD" and substitute therefore --.Boolean AND--

Col. 365; IN CONDITION CODE SYMBOLS; delete "C-CARRY FROM BIT 2" and substitute therefor --C-CARRY FROM BIT 7 --.

Col. 366; UNDER EXTND (OP) delete "8F" and substitute therefor --BF--.

Col. 367; ACROSS FROM JUMP TO SUBROUTINE; UNDER EXTND OP: delete "8D" and substitute therefor --BD--.

UNITED STATES PATENT AND TRADEMARK OFFICE
CERTIFICATE OF CORRECTION

PATENT NO. : 4,213,174

DATED : July 15, 1980

INVENTOR(S) : Richard E. Morley et al

It is certified that error appears in the above-identified patent and that said Letters Patent is hereby corrected as shown below:

Col. 367, UNDER BRANCH TEST; delete "V=1" and substitute therefor --V=0--.

Col. 371; LINE 66; delete "since changes" and substitute therefor --since certain changes--.

Col. 377, line 17, delete "hold of" and substitute therefor --hold or--.

Col. 377, lines 28 and 29, delete "connected" and substitute therefor --corrected--.

UNITED STATES PATENT AND TRADEMARK OFFICE

CERTIFICATE OF CORRECTION

PATENT NO. : 4,213,174

DATED : July 15, 1980

INVENTOR(S) : Richard E. Morley et al

It is certified that error appears in the above-identified patent and that said Letters Patent is hereby corrected as shown below:

Col. 382, lines 52-56, should not be indented at all.

Col. 382, line 54, delete "conditions of" and substitute therefor --conditions for--.

Col. 384, line 43, delete "being as selected" and substitute therefor --being in selected--.

Col. 384, line 51, delete "during scan" and substitute therefor --during each scan--.

Signed and Sealed this

Twenty-eighth Day of February, 1989

*Attest:*

DONALD J. QUIGG

*Attesting Officer*

*Commissioner of Patents and Trademarks*